United States Patent
Van Os et al.

(10) Patent No.: US 11,928,200 B2
(45) Date of Patent: Mar. 12, 2024

(54) IMPLEMENTATION OF BIOMETRIC AUTHENTICATION

(71) Applicant: Apple Inc., Cupertino, CA (US)

(72) Inventors: Marcel Van Os, San Francisco, CA (US); Peter D. Anton, San Francisco, CA (US); Lynne Devine, San Francisco, CA (US); Daamun Mohseni, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 17/496,716

(22) Filed: Oct. 7, 2021

(65) Prior Publication Data

US 2022/0027446 A1 Jan. 27, 2022

Related U.S. Application Data

(63) Continuation of application No. 16/369,355, filed on Mar. 29, 2019, now Pat. No. 11,170,085.

(60) Provisional application No. 62/752,234, filed on Oct. 29, 2018, provisional application No. 62/679,955, filed on Jun. 3, 2018.

(51) Int. Cl.
*G06F 21/00* (2013.01)
*G06F 21/31* (2013.01)
*G06F 21/32* (2013.01)

(52) U.S. Cl.
CPC ............ *G06F 21/32* (2013.01); *G06F 21/316* (2013.01)

(58) Field of Classification Search
CPC ........ G06F 21/32; G06F 21/316; G06F 3/041; G06F 3/0484; G06F 21/36; G06F 21/45; G06V 40/166; G06V 40/67
See application file for complete search history.

(56) References Cited

U.S. PATENT DOCUMENTS

| | | | |
|---|---|---|---|
| 5,229,764 A | 7/1993 | Matchett et al. |
| 5,237,159 A | 8/1993 | Stephens et al. |
| 5,265,007 A | 11/1993 | Barnhard, Jr. et al. |
| 5,484,988 A | 1/1996 | Hills et al. |

(Continued)

FOREIGN PATENT DOCUMENTS

| | | |
|---|---|---|
| AR | 060465 A1 | 6/2008 |
| AU | 2015100708 A4 | 7/2015 |

(Continued)

OTHER PUBLICATIONS

Adrianisen, "Samsung Galaxy S8 Face Recognition—Register Your Face Review!", Retrieved from < https://www.youtube.com/watch?v=04KVPaCJq94>, Apr. 27, 2017, 1 page.

(Continued)

*Primary Examiner* — Jeffrey C Pwu
*Assistant Examiner* — William A Corum, Jr.
(74) *Attorney, Agent, or Firm* — DLA Piper LLP (US)

(57) ABSTRACT

An electronic device performs techniques related to implementing biometric authentication, including providing user interfaces for: providing indications of error conditions during biometric authentication, providing indications about the biometric sensor during biometric authentication, orienting the device to enroll a biometric feature, and providing an indication of the location of the biometric sensor to correct a detected error condition.

51 Claims, 128 Drawing Sheets

(56) References Cited

U.S. PATENT DOCUMENTS

| | | |
|---|---|---|
| 5,615,384 A | 3/1997 | Allard et al. |
| 5,691,524 A | 11/1997 | Josephson |
| 5,717,868 A | 2/1998 | James |
| 5,767,457 A | 6/1998 | Gerpheide et al. |
| 5,783,808 A | 7/1998 | Josephson |
| 5,801,763 A | 9/1998 | Suzuki |
| 5,828,773 A | 10/1998 | Setlak et al. |
| 5,838,306 A | 11/1998 | O'Connor et al. |
| 5,852,670 A | 12/1998 | Setlak et al. |
| 5,910,989 A | 6/1999 | Naccache |
| 5,933,134 A | 8/1999 | Shieh |
| 5,974,150 A | 10/1999 | Kaish et al. |
| 5,983,197 A | 11/1999 | Enta |
| 6,016,484 A | 1/2000 | Williams et al. |
| 6,104,922 A | 8/2000 | Baumann |
| 6,111,517 A | 8/2000 | Atick et al. |
| 6,141,436 A | 10/2000 | Srey et al. |
| 6,151,208 A | 11/2000 | Bartlett |
| 6,151,593 A | 11/2000 | Cho et al. |
| 6,164,528 A | 12/2000 | Hills et al. |
| 6,173,402 B1 | 1/2001 | Chapman |
| 6,189,785 B1 | 2/2001 | Lowery |
| 6,192,380 B1 | 2/2001 | Light et al. |
| 6,193,152 B1 | 2/2001 | Fernando et al. |
| 6,219,793 B1 | 4/2001 | Li et al. |
| 6,230,148 B1 | 5/2001 | Pare, Jr. et al. |
| 6,260,027 B1 | 7/2001 | Takahashi et al. |
| 6,282,655 B1 | 8/2001 | Given |
| 6,289,114 B1 | 9/2001 | Mainguet |
| 6,317,835 B1 | 11/2001 | Bilger et al. |
| 6,323,846 B1 | 11/2001 | Westerman et al. |
| 6,328,207 B1 | 12/2001 | Gregoire et al. |
| 6,337,919 B1 | 1/2002 | Dunton |
| 6,374,145 B1 | 4/2002 | Lignoul |
| 6,398,646 B1 | 6/2002 | Wei et al. |
| 6,408,087 B1 | 6/2002 | Kramer |
| 6,421,453 B1 | 7/2002 | Kanevsky et al. |
| 6,560,711 B1 | 5/2003 | Given et al. |
| 6,570,557 B1 | 5/2003 | Westerman et al. |
| 6,573,883 B1 | 6/2003 | Bartlett |
| 6,581,042 B2 | 6/2003 | Pare, Jr. et al. |
| 6,618,806 B1 | 9/2003 | Brown et al. |
| 6,639,584 B1 | 10/2003 | Li |
| 6,644,546 B2 | 11/2003 | George et al. |
| 6,662,166 B2 | 12/2003 | Pare, Jr. et al. |
| 6,677,932 B1 | 1/2004 | Westerman |
| 6,709,333 B1 | 3/2004 | Bradford et al. |
| 6,720,860 B1 | 4/2004 | Narayanaswami |
| 6,795,569 B1 | 9/2004 | Setlak |
| 6,941,001 B1 | 9/2005 | Bolle et al. |
| 6,950,810 B2 | 9/2005 | Lapsley et al. |
| 6,970,855 B2 | 11/2005 | Das et al. |
| 6,980,081 B2 | 12/2005 | Anderson |
| 7,027,619 B2 | 4/2006 | Pavlidis et al. |
| 7,030,860 B1 | 4/2006 | Hsu et al. |
| 7,039,221 B1 | 5/2006 | Tumey et al. |
| 7,046,838 B1 | 5/2006 | Sakagawa et al. |
| 7,057,607 B2 | 6/2006 | Mayoraz et al. |
| 7,079,652 B1 | 7/2006 | Harris |
| 7,086,085 B1 | 8/2006 | Brown et al. |
| 7,099,845 B2 | 8/2006 | Higgins et al. |
| 7,099,850 B1 | 8/2006 | Mann, II et al. |
| 7,124,300 B1 | 10/2006 | Lemke |
| 7,130,454 B1 | 10/2006 | Berube et al. |
| 7,190,816 B2 | 3/2007 | Mitsuyu et al. |
| 7,239,728 B1 | 7/2007 | Choi et al. |
| 7,346,778 B1 | 3/2008 | Guiter et al. |
| 7,356,516 B2 | 4/2008 | Richey et al. |
| 7,359,880 B2 | 4/2008 | Abel et al. |
| 7,370,244 B2 | 5/2008 | Breitling et al. |
| 7,414,613 B2 | 8/2008 | Simelius |
| 7,415,720 B2 | 8/2008 | Jung |
| 7,420,546 B2 | 9/2008 | Abdallah et al. |
| 7,430,537 B2 | 9/2008 | Templeton et al. |
| 7,454,192 B1 | 11/2008 | Zhu |
| 7,496,527 B2 | 2/2009 | Silverstein et al. |
| 7,529,563 B1 | 5/2009 | Pitroda |
| 7,535,344 B2 | 5/2009 | Obradovich |
| 7,542,592 B2 | 6/2009 | Singh et al. |
| 7,546,470 B2 | 6/2009 | Schultz |
| 7,630,522 B2 | 12/2009 | Popp et al. |
| 7,633,076 B2 | 12/2009 | Huppi et al. |
| 7,644,019 B2 | 1/2010 | Woda et al. |
| 7,657,441 B2 | 2/2010 | Richey et al. |
| 7,657,849 B2 | 2/2010 | Chaudhri et al. |
| 7,676,748 B1 | 3/2010 | Barrus et al. |
| 7,689,508 B2 | 3/2010 | Davis et al. |
| 7,697,729 B2 | 4/2010 | Howell et al. |
| 7,705,737 B2 | 4/2010 | Senga |
| 7,730,401 B2 | 6/2010 | Gillespie et al. |
| 7,734,930 B2 | 6/2010 | Kirovski et al. |
| 7,738,916 B2 | 6/2010 | Fukuda |
| 7,818,399 B1 | 10/2010 | Ross, Jr. et al. |
| 7,860,536 B2 | 12/2010 | Jobs et al. |
| 7,860,936 B1 | 12/2010 | Newstadt et al. |
| 7,877,455 B2 | 1/2011 | Lamparello et al. |
| 7,921,297 B2 | 4/2011 | Ortiz et al. |
| RE42,574 E | 7/2011 | Cockayne |
| 8,006,299 B2 | 8/2011 | Suominen |
| 8,018,440 B2 | 9/2011 | Townsend et al. |
| 8,042,157 B2 | 10/2011 | Bennett et al. |
| 8,050,997 B1 | 11/2011 | Nosek et al. |
| 8,060,571 B2 | 11/2011 | Rao |
| 8,095,634 B2 | 1/2012 | Rao et al. |
| 8,112,787 B2 | 2/2012 | Buer |
| 8,131,848 B1 | 3/2012 | Denise |
| 8,145,912 B2 | 3/2012 | Mclean |
| 8,157,164 B1 | 4/2012 | Billman |
| 8,195,507 B2 | 6/2012 | Postrel |
| 8,195,576 B1 | 6/2012 | Grigg et al. |
| 8,254,642 B2 | 8/2012 | Kobayashi et al. |
| 8,254,647 B1 | 8/2012 | Nechyba et al. |
| 8,311,514 B2 | 11/2012 | Bandyopadhyay et al. |
| 8,336,086 B2 | 12/2012 | Seo |
| 8,341,557 B2 | 12/2012 | Pisula et al. |
| 8,392,259 B2 | 3/2013 | Macgillivray et al. |
| 8,395,658 B2 | 3/2013 | Corson |
| 8,396,265 B1 | 3/2013 | Ross et al. |
| 8,438,400 B2 | 5/2013 | Hoghaug et al. |
| 8,452,654 B1 | 5/2013 | Wooters et al. |
| 8,452,978 B2 | 5/2013 | Alward et al. |
| 8,467,766 B2 | 6/2013 | Rackley, III et al. |
| 8,488,040 B2 | 7/2013 | Chen et al. |
| 8,526,915 B2 | 9/2013 | Kakiuchi et al. |
| 8,538,158 B1 | 9/2013 | Denise |
| 8,543,834 B1 | 9/2013 | Barra |
| 8,560,004 B1 | 10/2013 | Tsvetkov et al. |
| 8,571,937 B2 | 10/2013 | Rose et al. |
| 8,581,877 B2 | 11/2013 | Yoo |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,619,050 B2 | 12/2013 | Herz et al. |
| 8,638,385 B2 | 1/2014 | Bhogal |
| 8,639,621 B1 | 1/2014 | Kennedy et al. |
| 8,679,012 B1 | 3/2014 | Kayyali |
| 8,762,272 B1 | 6/2014 | Cozens et al. |
| 8,763,896 B2 | 7/2014 | Kushevsky et al. |
| 8,769,624 B2 | 7/2014 | Cotterill |
| 8,782,775 B2 | 7/2014 | Fadell et al. |
| 8,788,838 B1 | 7/2014 | Fadell et al. |
| 8,827,153 B1 | 9/2014 | Rhoades et al. |
| 8,831,677 B2 | 9/2014 | Villa-Real |
| 8,880,055 B1 | 11/2014 | Clement et al. |
| 8,892,474 B1 | 11/2014 | Inskeep et al. |
| 8,904,479 B1 | 12/2014 | Johansson et al. |
| 8,924,259 B2 | 12/2014 | Neighman et al. |
| 8,942,420 B2 | 1/2015 | Kim et al. |
| 8,943,580 B2 | 1/2015 | Fadell et al. |
| 8,949,618 B1 | 2/2015 | Lee et al. |
| 8,949,902 B1 | 2/2015 | Fabian-Isaacs et al. |
| 8,963,806 B1 | 2/2015 | Starner et al. |
| 8,994,499 B2 | 3/2015 | Zhao et al. |
| 9,002,322 B2 | 4/2015 | Cotterill |

(56) References Cited

U.S. PATENT DOCUMENTS

| | | |
|---|---|---|
| 9,031,847 B2 | 5/2015 | Sarin et al. |
| 9,038,167 B2 | 5/2015 | Fadell et al. |
| 9,053,293 B2 | 6/2015 | Latzina |
| 9,128,601 B2 | 9/2015 | Fadell et al. |
| 9,134,896 B2 | 9/2015 | Fadell et al. |
| 9,177,130 B2 | 11/2015 | Nechyba et al. |
| 9,179,298 B2 | 11/2015 | Jung et al. |
| 9,250,795 B2 | 2/2016 | Fadell et al. |
| 9,253,375 B2 | 2/2016 | Milanfar et al. |
| 9,269,083 B1 | 2/2016 | Jarajapu et al. |
| 9,269,196 B1 | 2/2016 | Fan et al. |
| 9,274,647 B2 | 3/2016 | Fadell et al. |
| 9,294,476 B1 | 3/2016 | Lurey et al. |
| 9,304,624 B2 | 4/2016 | Fadell et al. |
| 9,305,310 B2 | 4/2016 | Radhakrishnan et al. |
| 9,324,067 B2 | 4/2016 | Van Os et al. |
| 9,329,771 B2 | 5/2016 | Fadell et al. |
| 9,349,035 B1 | 5/2016 | Gerber et al. |
| 9,355,393 B2 | 5/2016 | Purves et al. |
| 9,411,460 B2 | 8/2016 | Dumont et al. |
| 9,477,872 B2 | 10/2016 | Sarve et al. |
| 9,483,763 B2 | 11/2016 | Van Os et al. |
| 9,495,531 B2 | 11/2016 | Fadell et al. |
| 9,519,771 B2 | 12/2016 | Fadell et al. |
| 9,519,901 B1 | 12/2016 | Dorogusker |
| 9,526,127 B1 | 12/2016 | Taubman et al. |
| 9,558,636 B1 | 1/2017 | Burdick |
| 9,569,605 B1 | 2/2017 | Schneider et al. |
| 9,569,655 B2 | 2/2017 | Harper |
| 9,584,463 B2 | 2/2017 | Ji et al. |
| 9,600,709 B2 | 3/2017 | Russo |
| 9,613,245 B1 | 4/2017 | Eltoft et al. |
| 9,716,825 B1 | 7/2017 | Manzari et al. |
| 9,779,585 B2 | 10/2017 | Dupuis et al. |
| 9,817,549 B2 | 11/2017 | Chandrasekaran |
| 9,842,330 B1 | 12/2017 | Van Os et al. |
| 9,847,999 B2 | 12/2017 | Van Os et al. |
| 9,851,214 B1 | 12/2017 | Chintakindi |
| 9,881,198 B2 | 1/2018 | Lee et al. |
| 9,898,642 B2 | 2/2018 | Han et al. |
| 9,913,246 B1 | 3/2018 | Carey et al. |
| 9,922,327 B2 | 3/2018 | Johnson et al. |
| 9,953,149 B2 | 4/2018 | Tussy |
| 9,984,270 B2 | 5/2018 | Yousefpor et al. |
| 10,003,738 B2 | 6/2018 | Lautenbach et al. |
| 10,019,904 B1 | 7/2018 | Chan et al. |
| 10,032,100 B2 | 7/2018 | Mullen et al. |
| 10,073,541 B1 | 9/2018 | Baldwin |
| 10,089,607 B2 | 10/2018 | Ziat et al. |
| 10,223,631 B2 | 3/2019 | Mullen et al. |
| 10,248,779 B2 | 4/2019 | Song et al. |
| 10,255,545 B2 | 4/2019 | Mullen et al. |
| 10,319,203 B1 | 6/2019 | Testanero et al. |
| 10,334,054 B2 | 6/2019 | Van Os et al. |
| 10,410,035 B2 | 9/2019 | Han et al. |
| 10,482,461 B2 | 11/2019 | Van Os et al. |
| 10,510,073 B2 | 12/2019 | Wong et al. |
| 10,749,967 B2 | 8/2020 | Van Os et al. |
| 10,803,281 B2 | 10/2020 | Han et al. |
| 10,805,758 B2 | 10/2020 | Norris et al. |
| 10,971,171 B2 | 4/2021 | Davis et al. |
| 11,100,349 B2 | 8/2021 | Cohen et al. |
| 2001/0031072 A1 | 10/2001 | Dobashi et al. |
| 2001/0039497 A1 | 11/2001 | Hubbard |
| 2001/0044906 A1 | 11/2001 | Kanevsky et al. |
| 2001/0047365 A1 | 11/2001 | Yonaitis |
| 2001/0047488 A1 | 11/2001 | Verplaetse et al. |
| 2001/0049627 A1 | 12/2001 | Simpson |
| 2002/0004760 A1 | 1/2002 | Yoshida et al. |
| 2002/0015024 A1 | 2/2002 | Westerman et al. |
| 2002/0046064 A1 | 4/2002 | Maury et al. |
| 2002/0059295 A1 | 5/2002 | Ludtke et al. |
| 2002/0061130 A1 | 5/2002 | Kirk et al. |
| 2002/0065774 A1 | 5/2002 | Young et al. |
| 2002/0095588 A1 | 7/2002 | Shigematsu et al. |
| 2002/0097145 A1 | 7/2002 | Tumey et al. |
| 2002/0116276 A1 | 8/2002 | Ottley |
| 2002/0136435 A1 | 9/2002 | Prokoski |
| 2002/0141586 A1 | 10/2002 | Margalit et al. |
| 2002/0169673 A1 | 11/2002 | Prorock et al. |
| 2002/0170782 A1 | 11/2002 | Millikan |
| 2002/0190960 A1 | 12/2002 | Kuo et al. |
| 2002/0191029 A1 | 12/2002 | Gillespie et al. |
| 2002/0191817 A1 | 12/2002 | Sato et al. |
| 2003/0006280 A1 | 1/2003 | Seita et al. |
| 2003/0028639 A1 | 2/2003 | Yamamoto et al. |
| 2003/0038754 A1 | 2/2003 | Goldstein et al. |
| 2003/0046557 A1 | 3/2003 | Miller et al. |
| 2003/0048173 A1 | 3/2003 | Shigematsu et al. |
| 2003/0059092 A1 | 3/2003 | Okubo et al. |
| 2003/0097413 A1 | 5/2003 | Vishik et al. |
| 2003/0103652 A1 | 6/2003 | Lee et al. |
| 2003/0115490 A1 | 6/2003 | Russo et al. |
| 2003/0118217 A1 | 6/2003 | Kondo et al. |
| 2003/0120934 A1 | 6/2003 | Ortiz |
| 2003/0132974 A1 | 7/2003 | Bodin |
| 2003/0138136 A1 | 7/2003 | Umezaki et al. |
| 2003/0141959 A1 | 7/2003 | Keogh et al. |
| 2003/0142227 A1 | 7/2003 | Van Zee |
| 2003/0160815 A1 | 8/2003 | Muschetto |
| 2003/0163710 A1 | 8/2003 | Ortiz et al. |
| 2003/0181201 A1 | 9/2003 | Bomze et al. |
| 2003/0188183 A1 | 10/2003 | Lee et al. |
| 2003/0200184 A1 | 10/2003 | Dominguez et al. |
| 2003/0210127 A1 | 11/2003 | Anderson |
| 2003/0236746 A1 | 12/2003 | Turner et al. |
| 2004/0010722 A1 | 1/2004 | Ha |
| 2004/0030934 A1 | 2/2004 | Mizoguchi et al. |
| 2004/0073432 A1 | 4/2004 | Stone |
| 2004/0076310 A1 | 4/2004 | Hersch et al. |
| 2004/0085300 A1 | 5/2004 | Matusis et al. |
| 2004/0085351 A1 | 5/2004 | Tokkonen |
| 2004/0088564 A1 | 5/2004 | Norman |
| 2004/0091136 A1 | 5/2004 | Dombrowski |
| 2004/0113819 A1 | 6/2004 | Gauthey et al. |
| 2004/0122685 A1 | 6/2004 | Bunce |
| 2004/0131237 A1 | 7/2004 | Machida |
| 2004/0135801 A1 | 7/2004 | Thompson et al. |
| 2004/0137890 A1 | 7/2004 | Kalke |
| 2004/0143553 A1 | 7/2004 | Torget et al. |
| 2004/0151347 A1 | 8/2004 | Wisniewski |
| 2004/0169722 A1 | 9/2004 | Pena |
| 2004/0172562 A1 | 9/2004 | Berger et al. |
| 2004/0181695 A1 | 9/2004 | Walker et al. |
| 2004/0196400 A1 | 10/2004 | Stavely et al. |
| 2004/0210771 A1 | 10/2004 | Wood et al. |
| 2004/0215572 A1 | 10/2004 | Uehara et al. |
| 2004/0229560 A1 | 11/2004 | Maloney |
| 2004/0230843 A1 | 11/2004 | Jansen |
| 2004/0239648 A1 | 12/2004 | Abdallah et al. |
| 2004/0239732 A1 | 12/2004 | Silverbrook |
| 2004/0242200 A1 | 12/2004 | Maeoka et al. |
| 2004/0250138 A1 | 12/2004 | Schneider |
| 2004/0252867 A1 | 12/2004 | Lan et al. |
| 2004/0254891 A1 | 12/2004 | Blinn et al. |
| 2004/0257196 A1 | 12/2004 | Kotzin |
| 2004/0260955 A1 | 12/2004 | Mantyla |
| 2005/0024341 A1 | 2/2005 | Gillespie et al. |
| 2005/0028082 A1 | 2/2005 | Topalov et al. |
| 2005/0040962 A1 | 2/2005 | Funkhouser et al. |
| 2005/0041841 A1 | 2/2005 | Yoo et al. |
| 2005/0060554 A1 | 3/2005 | O'donoghue |
| 2005/0071188 A1 | 3/2005 | Thuerk |
| 2005/0071635 A1 | 3/2005 | Furuyama |
| 2005/0071647 A1 | 3/2005 | Fujinuma et al. |
| 2005/0078855 A1 | 4/2005 | Chandler et al. |
| 2005/0079896 A1 | 4/2005 | Kokko et al. |
| 2005/0091213 A1 | 4/2005 | Schutz et al. |
| 2005/0093834 A1 | 5/2005 | Abdallah et al. |
| 2005/0093868 A1 | 5/2005 | Hinckley |
| 2005/0096009 A1 | 5/2005 | Ackley |
| 2005/0097171 A1 | 5/2005 | Hikichi |
| 2005/0097608 A1 | 5/2005 | Penke et al. |
| 2005/0100198 A1 | 5/2005 | Nakano et al. |

(56) References Cited

U.S. PATENT DOCUMENTS

| | | |
|---|---|---|
| 2005/0105778 A1 | 5/2005 | Sung et al. |
| 2005/0110801 A1 | 5/2005 | Lin |
| 2005/0111708 A1 | 5/2005 | Chou |
| 2005/0113071 A1 | 5/2005 | Nagata |
| 2005/0114686 A1 | 5/2005 | Ball et al. |
| 2005/0144452 A1 | 6/2005 | Lynch et al. |
| 2005/0145244 A1 | 7/2005 | Hong et al. |
| 2005/0169503 A1 | 8/2005 | Howell et al. |
| 2005/0174325 A1 | 8/2005 | Setlak et al. |
| 2005/0187873 A1 | 8/2005 | Labrou et al. |
| 2005/0190059 A1 | 9/2005 | Wehrenberg |
| 2005/0193118 A1 | 9/2005 | Le et al. |
| 2005/0204173 A1 | 9/2005 | Chang |
| 2005/0206501 A1 | 9/2005 | Farhat |
| 2005/0220304 A1 | 10/2005 | Lenoir et al. |
| 2005/0221798 A1 | 10/2005 | Sengupta et al. |
| 2005/0226472 A1 | 10/2005 | Komura et al. |
| 2005/0231625 A1 | 10/2005 | Parulski et al. |
| 2005/0250538 A1 | 11/2005 | Narasimhan et al. |
| 2005/0253814 A1 | 11/2005 | Ghassabian |
| 2005/0253817 A1 | 11/2005 | Rytivaara et al. |
| 2005/0254086 A1 | 11/2005 | Shouno |
| 2005/0278587 A1 | 12/2005 | Breitling et al. |
| 2006/0017692 A1 | 1/2006 | Wehrenberg et al. |
| 2006/0021003 A1 | 1/2006 | Fisher et al. |
| 2006/0029262 A1 | 2/2006 | Fujimatsu et al. |
| 2006/0032908 A1 | 2/2006 | Sines |
| 2006/0036553 A1 | 2/2006 | Gupta et al. |
| 2006/0039686 A1 | 2/2006 | Soh et al. |
| 2006/0056664 A1 | 3/2006 | Iwasaki |
| 2006/0064313 A1 | 3/2006 | Steinbarth et al. |
| 2006/0075228 A1 | 4/2006 | Black et al. |
| 2006/0075250 A1 | 4/2006 | Liao |
| 2006/0078176 A1 | 4/2006 | Abiko et al. |
| 2006/0080525 A1 | 4/2006 | Ritter et al. |
| 2006/0093183 A1 | 5/2006 | Hosoi et al. |
| 2006/0093192 A1 | 5/2006 | Bechtel |
| 2006/0097172 A1 | 5/2006 | Park |
| 2006/0102843 A1 | 5/2006 | Bazakos et al. |
| 2006/0104488 A1 | 5/2006 | Bazakos et al. |
| 2006/0107067 A1 | 5/2006 | Safal et al. |
| 2006/0115130 A1 | 6/2006 | Kozlay |
| 2006/0116555 A1 | 6/2006 | Pavlidis et al. |
| 2006/0120707 A1 | 6/2006 | Kusakari et al. |
| 2006/0136087 A1 | 6/2006 | Higashiura |
| 2006/0136734 A1 | 6/2006 | Telek et al. |
| 2006/0156028 A1 | 7/2006 | Aoyama et al. |
| 2006/0165060 A1 | 7/2006 | Dua et al. |
| 2006/0179404 A1 | 8/2006 | Yolleck et al. |
| 2006/0192868 A1 | 8/2006 | Wakamori |
| 2006/0206709 A1 | 9/2006 | Labrou et al. |
| 2006/0208065 A1 | 9/2006 | Mendelovich et al. |
| 2006/0214910 A1 | 9/2006 | Mizuno et al. |
| 2006/0215886 A1 | 9/2006 | Black |
| 2006/0219776 A1 | 10/2006 | Finn |
| 2006/0224645 A1 | 10/2006 | Kadi |
| 2006/0234764 A1 | 10/2006 | Gamo et al. |
| 2006/0239517 A1 | 10/2006 | Creasey et al. |
| 2006/0274920 A1 | 12/2006 | Tochikubo et al. |
| 2006/0280340 A1 | 12/2006 | Derakhshani et al. |
| 2006/0282671 A1 | 12/2006 | Burton |
| 2006/0282682 A1 | 12/2006 | Masaki et al. |
| 2006/0285663 A1 | 12/2006 | Rathus et al. |
| 2006/0288226 A1 | 12/2006 | Kowal |
| 2006/0288234 A1 | 12/2006 | Azar et al. |
| 2006/0294007 A1 | 12/2006 | Barthelemy |
| 2006/0294025 A1 | 12/2006 | Mengerink |
| 2007/0008066 A1 | 1/2007 | Fukuda |
| 2007/0009139 A1 | 1/2007 | Landschaft et al. |
| 2007/0013662 A1 | 1/2007 | Fauth |
| 2007/0014439 A1 | 1/2007 | Ando et al. |
| 2007/0016958 A1 | 1/2007 | Bodepudi et al. |
| 2007/0021194 A1 | 1/2007 | Aida |
| 2007/0025723 A1 | 2/2007 | Baudisch et al. |
| 2007/0061126 A1 | 3/2007 | Russo et al. |
| 2007/0061889 A1 | 3/2007 | Sainaney et al. |
| 2007/0067642 A1 | 3/2007 | Singhal |
| 2007/0073649 A1 | 3/2007 | Kikkoji et al. |
| 2007/0079137 A1 | 4/2007 | Tu |
| 2007/0081081 A1 | 4/2007 | Cheng |
| 2007/0089164 A1 | 4/2007 | Gao et al. |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0126859 A1 | 6/2007 | Choi et al. |
| 2007/0131759 A1 | 6/2007 | Cox et al. |
| 2007/0143628 A1 | 6/2007 | Genda |
| 2007/0150842 A1 | 6/2007 | Chaudhri et al. |
| 2007/0157089 A1 | 7/2007 | Van Os et al. |
| 2007/0180492 A1 | 8/2007 | Hassan et al. |
| 2007/0186106 A1 | 8/2007 | Ting et al. |
| 2007/0189583 A1 | 8/2007 | Shimada et al. |
| 2007/0192168 A1 | 8/2007 | Van |
| 2007/0194113 A1 | 8/2007 | Esplin et al. |
| 2007/0200916 A1 | 8/2007 | Han |
| 2007/0201730 A1 | 8/2007 | Masaki et al. |
| 2007/0204037 A1 | 8/2007 | Kunz et al. |
| 2007/0208743 A1 | 9/2007 | Sainaney et al. |
| 2007/0219901 A1 | 9/2007 | Garbow et al. |
| 2007/0220273 A1 | 9/2007 | Campisi |
| 2007/0226778 A1 | 9/2007 | Pietruszka |
| 2007/0230773 A1 | 10/2007 | Nagao et al. |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0245148 A1 | 10/2007 | Buer |
| 2007/0250573 A1 | 10/2007 | Rothschild et al. |
| 2007/0253604 A1 | 11/2007 | Inoue et al. |
| 2007/0255564 A1 | 11/2007 | Yee et al. |
| 2007/0259716 A1 | 11/2007 | Mattice et al. |
| 2007/0260547 A1 | 11/2007 | Little |
| 2007/0260558 A1 | 11/2007 | Look |
| 2007/0277224 A1 | 11/2007 | Osborn et al. |
| 2007/0280515 A1 | 12/2007 | Goto |
| 2007/0284432 A1 | 12/2007 | Abouyounes |
| 2007/0287423 A1 | 12/2007 | Kakiuchi et al. |
| 2007/0294182 A1 | 12/2007 | Hammad |
| 2008/0001703 A1 | 1/2008 | Goto |
| 2008/0032801 A1 | 2/2008 | Brunet de Courssou |
| 2008/0041936 A1 | 2/2008 | Vawter |
| 2008/0042866 A1 | 2/2008 | Morse et al. |
| 2008/0042983 A1 | 2/2008 | Kim et al. |
| 2008/0048878 A1 | 2/2008 | Boillot |
| 2008/0049984 A1 | 2/2008 | Poo et al. |
| 2008/0052181 A1 | 2/2008 | Devitt-Carolan et al. |
| 2008/0054081 A1 | 3/2008 | Mullen |
| 2008/0059351 A1 | 3/2008 | Richey et al. |
| 2008/0069412 A1 | 3/2008 | Champagne et al. |
| 2008/0072045 A1 | 3/2008 | Mizrah |
| 2008/0084539 A1 | 4/2008 | Daniel |
| 2008/0092245 A1 | 4/2008 | Alward et al. |
| 2008/0114678 A1 | 5/2008 | Bennett et al. |
| 2008/0114980 A1 | 5/2008 | Sridhar |
| 2008/0120707 A1 | 5/2008 | Ramia et al. |
| 2008/0133931 A1 | 6/2008 | Kosaka |
| 2008/0165255 A1 | 7/2008 | Christie et al. |
| 2008/0172598 A1 | 7/2008 | Jacobsen et al. |
| 2008/0178283 A1 | 7/2008 | Pratt et al. |
| 2008/0208681 A1 | 8/2008 | Hammad et al. |
| 2008/0208762 A1 | 8/2008 | Arthur et al. |
| 2008/0212849 A1 | 9/2008 | Gao |
| 2008/0229409 A1 | 9/2008 | Miller et al. |
| 2008/0231729 A1 | 9/2008 | Sato et al. |
| 2008/0246917 A1 | 10/2008 | Phinney et al. |
| 2008/0250481 A1 | 10/2008 | Beck et al. |
| 2008/0275779 A1 | 11/2008 | Lakshminarayanan |
| 2008/0292144 A1 | 11/2008 | Kim et al. |
| 2008/0309632 A1 | 12/2008 | Westerman et al. |
| 2008/0314971 A1 | 12/2008 | Faith et al. |
| 2008/0317292 A1 | 12/2008 | Baker et al. |
| 2008/0319875 A1 | 12/2008 | Levchin et al. |
| 2009/0005165 A1 | 1/2009 | Arezina et al. |
| 2009/0006292 A1 | 1/2009 | Block |
| 2009/0006991 A1 | 1/2009 | Lindberg et al. |

(56) References Cited

U.S. PATENT DOCUMENTS

| | | |
|---|---|---|
| 2009/0016574 A1 | 1/2009 | Tsukahara |
| 2009/0031375 A1 | 1/2009 | Sullivan et al. |
| 2009/0036165 A1 | 2/2009 | Brede |
| 2009/0037742 A1 | 2/2009 | Narayanaswami |
| 2009/0054044 A1 | 2/2009 | Ikemori et al. |
| 2009/0055484 A1 | 2/2009 | Vuong et al. |
| 2009/0061837 A1 | 3/2009 | Chaudhri et al. |
| 2009/0063851 A1 | 3/2009 | Nijdam |
| 2009/0064055 A1 | 3/2009 | Chaudhri et al. |
| 2009/0067685 A1 | 3/2009 | Boshra et al. |
| 2009/0067689 A1 | 3/2009 | Porter et al. |
| 2009/0074255 A1 | 3/2009 | Holm |
| 2009/0082066 A1 | 3/2009 | Katz |
| 2009/0083847 A1 | 3/2009 | Fadell et al. |
| 2009/0083850 A1 | 3/2009 | Fadell et al. |
| 2009/0094134 A1 | 4/2009 | Toomer et al. |
| 2009/0094681 A1 | 4/2009 | Sadler et al. |
| 2009/0106558 A1 | 4/2009 | Delgrosso et al. |
| 2009/0119754 A1 | 5/2009 | Schubert |
| 2009/0122149 A1 | 5/2009 | Ishii |
| 2009/0135678 A1 | 5/2009 | Godat |
| 2009/0144074 A1 | 6/2009 | Choi |
| 2009/0146779 A1 | 6/2009 | Kumar et al. |
| 2009/0158390 A1 | 6/2009 | Guan |
| 2009/0159696 A1 | 6/2009 | Mullen |
| 2009/0160609 A1 | 6/2009 | Lin et al. |
| 2009/0160785 A1 | 6/2009 | Chen et al. |
| 2009/0164878 A1 | 6/2009 | Cottrille |
| 2009/0165107 A1 | 6/2009 | Tojo et al. |
| 2009/0168756 A1 | 7/2009 | Kurapati et al. |
| 2009/0173784 A1 | 7/2009 | Yang et al. |
| 2009/0175509 A1 | 7/2009 | Gonion et al. |
| 2009/0176565 A1 | 7/2009 | Kelly et al. |
| 2009/0187423 A1 | 7/2009 | Kim |
| 2009/0193514 A1 | 7/2009 | Adams et al. |
| 2009/0199188 A1 | 8/2009 | Fujimaki |
| 2009/0201257 A1 | 8/2009 | Saitoh et al. |
| 2009/0210308 A1 | 8/2009 | Toomer et al. |
| 2009/0215533 A1 | 8/2009 | Zalewski et al. |
| 2009/0224874 A1 | 9/2009 | Dewar et al. |
| 2009/0228938 A1 | 9/2009 | White et al. |
| 2009/0241169 A1 | 9/2009 | Dhand et al. |
| 2009/0258667 A1 | 10/2009 | Suzuki et al. |
| 2009/0307139 A1 | 12/2009 | Mardikar et al. |
| 2009/0327744 A1 | 12/2009 | Hatano et al. |
| 2009/0328162 A1 | 12/2009 | Kokumai et al. |
| 2010/0008535 A1 | 1/2010 | Abulafia et al. |
| 2010/0008545 A1 | 1/2010 | Ueki et al. |
| 2010/0023449 A1 | 1/2010 | Skowronek et al. |
| 2010/0026453 A1 | 2/2010 | Yamamoto et al. |
| 2010/0026640 A1 | 2/2010 | Kim et al. |
| 2010/0027854 A1 | 2/2010 | Chatterjee et al. |
| 2010/0034432 A1 | 2/2010 | Ono et al. |
| 2010/0042835 A1 | 2/2010 | Lee et al. |
| 2010/0078471 A1 | 4/2010 | Lin et al. |
| 2010/0078472 A1 | 4/2010 | Lin et al. |
| 2010/0082444 A1 | 4/2010 | Lin et al. |
| 2010/0082462 A1 | 4/2010 | Yuan et al. |
| 2010/0082481 A1 | 4/2010 | Lin et al. |
| 2010/0082485 A1 | 4/2010 | Lin et al. |
| 2010/0088148 A1 | 4/2010 | Presswala et al. |
| 2010/0107229 A1 | 4/2010 | Najafi et al. |
| 2010/0114731 A1 | 5/2010 | Kingston et al. |
| 2010/0124363 A1 | 5/2010 | Ek et al. |
| 2010/0131303 A1 | 5/2010 | Collopy et al. |
| 2010/0146384 A1 | 6/2010 | Peev et al. |
| 2010/0153265 A1 | 6/2010 | Hershfield et al. |
| 2010/0158327 A1 | 6/2010 | Kangas et al. |
| 2010/0164684 A1 | 7/2010 | Sasa et al. |
| 2010/0164864 A1 | 7/2010 | Chou et al. |
| 2010/0174644 A1 | 7/2010 | Rosano et al. |
| 2010/0185871 A1 | 7/2010 | Scherrer et al. |
| 2010/0191570 A1 | 7/2010 | Michaud et al. |
| 2010/0205091 A1 | 8/2010 | Graziano et al. |
| 2010/0207721 A1 | 8/2010 | Nakajima et al. |
| 2010/0216425 A1 | 8/2010 | Smith |
| 2010/0223145 A1 | 9/2010 | Dragt |
| 2010/0225607 A1 | 9/2010 | Kim |
| 2010/0231356 A1 | 9/2010 | Kim |
| 2010/0240415 A1 | 9/2010 | Kim et al. |
| 2010/0243741 A1 | 9/2010 | Eng |
| 2010/0248823 A1 | 9/2010 | Smith |
| 2010/0250376 A1 | 9/2010 | Nandiraju |
| 2010/0251243 A1 | 9/2010 | Gill et al. |
| 2010/0265204 A1 | 10/2010 | Tsuda |
| 2010/0267362 A1 | 10/2010 | Smith et al. |
| 2010/0269156 A1 | 10/2010 | Hohlfeld et al. |
| 2010/0273461 A1 | 10/2010 | Choi |
| 2010/0275259 A1 | 10/2010 | Adams et al. |
| 2010/0302016 A1 | 12/2010 | Zaborowski |
| 2010/0306107 A1 | 12/2010 | Nahari et al. |
| 2010/0311397 A1 | 12/2010 | Li |
| 2010/0313263 A1 | 12/2010 | Uchida et al. |
| 2011/0013813 A1 | 1/2011 | Yamamoto et al. |
| 2011/0035799 A1 | 2/2011 | Handler |
| 2011/0050976 A1 | 3/2011 | Kwon |
| 2011/0052013 A1 | 3/2011 | Sasahara et al. |
| 2011/0054268 A1 | 3/2011 | Fidacaro et al. |
| 2011/0055763 A1 | 3/2011 | Utsuki et al. |
| 2011/0065479 A1 | 3/2011 | Nader |
| 2011/0067098 A1 | 3/2011 | Ruggiero et al. |
| 2011/0088086 A1 | 4/2011 | Swink et al. |
| 2011/0099079 A1 | 4/2011 | White et al. |
| 2011/0106671 A1 | 5/2011 | Minnis et al. |
| 2011/0119610 A1 | 5/2011 | Hackborn et al. |
| 2011/0122294 A1 | 5/2011 | Suh et al. |
| 2011/0138166 A1 | 6/2011 | Peszek et al. |
| 2011/0138450 A1 | 6/2011 | Kesanupalli et al. |
| 2011/0142234 A1 | 6/2011 | Rogers |
| 2011/0145049 A1 | 6/2011 | Hertel et al. |
| 2011/0149874 A1 | 6/2011 | Reif |
| 2011/0161116 A1 | 6/2011 | Peak et al. |
| 2011/0164269 A1 | 7/2011 | Kamishiro |
| 2011/0175703 A1 | 7/2011 | Benkley, III |
| 2011/0187497 A1 | 8/2011 | Chin |
| 2011/0201306 A1 | 8/2011 | Ali Al-Harbi |
| 2011/0214158 A1 | 9/2011 | Pasquero et al. |
| 2011/0225057 A1 | 9/2011 | Webb et al. |
| 2011/0230769 A1 | 9/2011 | Yamazaki |
| 2011/0231914 A1 | 9/2011 | Hung |
| 2011/0251892 A1 | 10/2011 | Laracey |
| 2011/0254683 A1 | 10/2011 | Soldan et al. |
| 2011/0286640 A1 | 11/2011 | Kwon et al. |
| 2011/0288970 A1 | 11/2011 | Kidron et al. |
| 2011/0296324 A1 | 12/2011 | Goossens et al. |
| 2011/0300829 A1 | 12/2011 | Nurmi et al. |
| 2012/0009896 A1 | 1/2012 | Bandyopadhyay et al. |
| 2012/0023185 A1 | 1/2012 | Holden et al. |
| 2012/0023573 A1 | 1/2012 | Shi |
| 2012/0024947 A1 | 2/2012 | Naelon et al. |
| 2012/0028609 A1 | 2/2012 | Hruska et al. |
| 2012/0028659 A1 | 2/2012 | Whitney et al. |
| 2012/0028695 A1 | 2/2012 | Walker et al. |
| 2012/0032891 A1 | 2/2012 | Parivar et al. |
| 2012/0066731 A1 | 3/2012 | Vasquez et al. |
| 2012/0069231 A1 | 3/2012 | Chao |
| 2012/0072546 A1 | 3/2012 | Etchegoyen |
| 2012/0078751 A1 | 3/2012 | Macphail et al. |
| 2012/0081282 A1 | 4/2012 | Chin |
| 2012/0089507 A1 | 4/2012 | Zhang et al. |
| 2012/0095853 A1 | 4/2012 | Von et al. |
| 2012/0123806 A1 | 5/2012 | Schumann et al. |
| 2012/0123937 A1 | 5/2012 | Spodak et al. |
| 2012/0139698 A1 | 6/2012 | Tsui et al. |
| 2012/0185397 A1 | 7/2012 | Levovitz |
| 2012/0197740 A1 | 8/2012 | Grigg et al. |
| 2012/0197743 A1 | 8/2012 | Grigg et al. |
| 2012/0200489 A1 | 8/2012 | Miyashita et al. |
| 2012/0209748 A1 | 8/2012 | Small |
| 2012/0215553 A1 | 8/2012 | Leston |
| 2012/0218125 A1 | 8/2012 | Demirdjian et al. |
| 2012/0221464 A1 | 8/2012 | Pasquero et al. |
| 2012/0235790 A1 | 9/2012 | Zhao et al. |
| 2012/0238363 A1 | 9/2012 | Watanabe et al. |

(56) References Cited

U.S. PATENT DOCUMENTS

| | | |
|---|---|---|
| 2012/0245985 A1 | 9/2012 | Cho et al. |
| 2012/0245986 A1 | 9/2012 | Regan et al. |
| 2012/0267432 A1 | 10/2012 | Kuttuva |
| 2012/0271712 A1 | 10/2012 | Katzin et al. |
| 2012/0280917 A1 | 11/2012 | Toksvig et al. |
| 2012/0283871 A1 | 11/2012 | Chai et al. |
| 2012/0284185 A1 | 11/2012 | Mettler et al. |
| 2012/0290376 A1 | 11/2012 | Dryer et al. |
| 2012/0290449 A1 | 11/2012 | Mullen et al. |
| 2012/0290472 A1 | 11/2012 | Mullen et al. |
| 2012/0291121 A1 | 11/2012 | Huang et al. |
| 2012/0293438 A1 | 11/2012 | Chaudhri et al. |
| 2012/0295708 A1 | 11/2012 | Hernandez-Abrego et al. |
| 2012/0310760 A1 | 12/2012 | Phillips et al. |
| 2012/0311499 A1 | 12/2012 | Dellinger et al. |
| 2012/0316933 A1 | 12/2012 | Pentland et al. |
| 2012/0322370 A1 | 12/2012 | Lee |
| 2012/0322371 A1 | 12/2012 | Lee |
| 2013/0013499 A1 | 1/2013 | Kalgi |
| 2013/0015946 A1 * | 1/2013 | Lau ............ G06V 40/169 340/5.2 |
| 2013/0030934 A1 | 1/2013 | Bakshi et al. |
| 2013/0031217 A1 | 1/2013 | Rajapakse |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0067545 A1 | 3/2013 | Hanes |
| 2013/0073321 A1 | 3/2013 | Hofmann et al. |
| 2013/0074194 A1 | 3/2013 | White et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0082974 A1 | 4/2013 | Kerr et al. |
| 2013/0085931 A1 | 4/2013 | Runyan |
| 2013/0085936 A1 | 4/2013 | Law et al. |
| 2013/0086637 A1 | 4/2013 | Cotterill et al. |
| 2013/0102281 A1 | 4/2013 | Kanda et al. |
| 2013/0103519 A1 | 4/2013 | Kountotsis et al. |
| 2013/0110719 A1 | 5/2013 | Carter et al. |
| 2013/0122866 A1 | 5/2013 | Huang |
| 2013/0124423 A1 | 5/2013 | Fisher |
| 2013/0129162 A1 | 5/2013 | Cheng et al. |
| 2013/0136341 A1 | 5/2013 | Yamamoto |
| 2013/0144706 A1 | 6/2013 | Qawami et al. |
| 2013/0145448 A1 | 6/2013 | Newell |
| 2013/0148867 A1 | 6/2013 | Wang |
| 2013/0151360 A1 | 6/2013 | Scipioni et al. |
| 2013/0151414 A1 | 6/2013 | Zhu et al. |
| 2013/0159178 A1 | 6/2013 | Colon et al. |
| 2013/0160110 A1 | 6/2013 | Schechter et al. |
| 2013/0166325 A1 | 6/2013 | Ganapathy et al. |
| 2013/0166332 A1 | 6/2013 | Hammad |
| 2013/0169549 A1 | 7/2013 | Seymour et al. |
| 2013/0176208 A1 | 7/2013 | Tanaka et al. |
| 2013/0189953 A1 | 7/2013 | Mathews |
| 2013/0198112 A1 | 8/2013 | Bhat et al. |
| 2013/0200146 A1 | 8/2013 | Moghadam et al. |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0222323 A1 | 8/2013 | Mckenzie |
| 2013/0223696 A1 | 8/2013 | Azar et al. |
| 2013/0226792 A1 | 8/2013 | Kushevsky et al. |
| 2013/0232073 A1 | 9/2013 | Sheets et al. |
| 2013/0239202 A1 | 9/2013 | Adams et al. |
| 2013/0243264 A1 | 9/2013 | Aoki |
| 2013/0247175 A1 | 9/2013 | Nechyba et al. |
| 2013/0262857 A1 | 10/2013 | Neuman et al. |
| 2013/0275300 A1 | 10/2013 | Killian et al. |
| 2013/0279768 A1 | 10/2013 | Boshra |
| 2013/0282577 A1 | 10/2013 | Milne |
| 2013/0286161 A1 | 10/2013 | Lv et al. |
| 2013/0290187 A1 | 10/2013 | Itwaru |
| 2013/0297414 A1 | 11/2013 | Goldfarb et al. |
| 2013/0301832 A1 | 11/2013 | Harper |
| 2013/0304514 A1 | 11/2013 | Hyde et al. |
| 2013/0304651 A1 | 11/2013 | Smith et al. |
| 2013/0307771 A1 | 11/2013 | Parker et al. |
| 2013/0312087 A1 | 11/2013 | Latzina |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0332826 A1 | 12/2013 | Karunamuni et al. |
| 2013/0333006 A1 | 12/2013 | Tapling et al. |
| 2013/0336527 A1 | 12/2013 | Nechyba et al. |
| 2013/0336545 A1 | 12/2013 | Pritikin et al. |
| 2013/0342672 A1 | 12/2013 | Gray et al. |
| 2013/0346273 A1 | 12/2013 | Stockton et al. |
| 2013/0346302 A1 | 12/2013 | Purves et al. |
| 2014/0003677 A1 | 1/2014 | Han et al. |
| 2014/0006155 A1 | 1/2014 | Ramirez et al. |
| 2014/0006285 A1 | 1/2014 | Chi et al. |
| 2014/0013422 A1 | 1/2014 | Janus et al. |
| 2014/0019352 A1 | 1/2014 | Shrivastava |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0040120 A1 | 2/2014 | Cho et al. |
| 2014/0047560 A1 | 2/2014 | Meyer et al. |
| 2014/0052553 A1 | 2/2014 | Uzo |
| 2014/0056491 A1 | 2/2014 | Knight |
| 2014/0058805 A1 | 2/2014 | Paesler et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0062853 A1 | 3/2014 | Chaudhri et al. |
| 2014/0068740 A1 | 3/2014 | Lecun et al. |
| 2014/0070957 A1 | 3/2014 | Longinotti-Buitoni et al. |
| 2014/0074635 A1 | 3/2014 | Reese et al. |
| 2014/0074716 A1 | 3/2014 | Ni |
| 2014/0085191 A1 | 3/2014 | Gonion et al. |
| 2014/0085460 A1 | 3/2014 | Park et al. |
| 2014/0089196 A1 | 3/2014 | Paya et al. |
| 2014/0094143 A1 | 4/2014 | Ayotte |
| 2014/0095225 A1 | 4/2014 | Williams et al. |
| 2014/0099886 A1 | 4/2014 | Monroe et al. |
| 2014/0100952 A1 | 4/2014 | Bart et al. |
| 2014/0101056 A1 | 4/2014 | Wendling |
| 2014/0109018 A1 | 4/2014 | Casey et al. |
| 2014/0112555 A1 | 4/2014 | Fadell et al. |
| 2014/0115695 A1 | 4/2014 | Fadell et al. |
| 2014/0118519 A1 | 5/2014 | Sahin |
| 2014/0119620 A1 | 5/2014 | Jung et al. |
| 2014/0122331 A1 | 5/2014 | Vaish et al. |
| 2014/0123275 A1 * | 5/2014 | Azar ............ G06V 10/772 726/19 |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0135631 A1 | 5/2014 | Brumback et al. |
| 2014/0138435 A1 | 5/2014 | Khalid |
| 2014/0140587 A1 | 5/2014 | Ballard et al. |
| 2014/0143145 A1 | 5/2014 | Kortina et al. |
| 2014/0143693 A1 | 5/2014 | Goossens et al. |
| 2014/0156531 A1 | 6/2014 | Poon et al. |
| 2014/0157153 A1 | 6/2014 | Yuen et al. |
| 2014/0164082 A1 | 6/2014 | Sun et al. |
| 2014/0165000 A1 | 6/2014 | Fleizach et al. |
| 2014/0173450 A1 | 6/2014 | Akula |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0193783 A1 | 7/2014 | Jeong et al. |
| 2014/0195815 A1 | 7/2014 | Taveau et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0222436 A1 | 8/2014 | Binder et al. |
| 2014/0222664 A1 | 8/2014 | Milne |
| 2014/0236840 A1 | 8/2014 | Islam |
| 2014/0244365 A1 | 8/2014 | Price et al. |

(56) References Cited

U.S. PATENT DOCUMENTS

| | | |
|---|---|---|
| 2014/0244493 A1 | 8/2014 | Kenyon et al. |
| 2014/0244495 A1 | 8/2014 | Davis et al. |
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0258828 A1 | 9/2014 | Lymer et al. |
| 2014/0270374 A1 | 9/2014 | Unzueta |
| 2014/0279442 A1 | 9/2014 | Luoma et al. |
| 2014/0279497 A1 | 9/2014 | Qaim-Maqami et al. |
| 2014/0279556 A1 | 9/2014 | Priebatsch et al. |
| 2014/0281561 A1 | 9/2014 | Etchegoyen et al. |
| 2014/0282987 A1 | 9/2014 | Narendra et al. |
| 2014/0283128 A1 | 9/2014 | Shepherd et al. |
| 2014/0292396 A1 | 10/2014 | Bruwer et al. |
| 2014/0292641 A1 | 10/2014 | Cho et al. |
| 2014/0293079 A1 | 10/2014 | Milanfar et al. |
| 2014/0298432 A1 | 10/2014 | Brown |
| 2014/0298478 A1 | 10/2014 | Kim et al. |
| 2014/0304809 A1 | 10/2014 | Fadell et al. |
| 2014/0311447 A1 | 10/2014 | Sumilla et al. |
| 2014/0313307 A1 | 10/2014 | Oh et al. |
| 2014/0337221 A1 | 11/2014 | Hoyos |
| 2014/0337931 A1 | 11/2014 | Cotterill |
| 2014/0344082 A1 | 11/2014 | Soundararajan |
| 2014/0344896 A1 | 11/2014 | Pak et al. |
| 2014/0344904 A1 | 11/2014 | Venkataramani et al. |
| 2014/0350924 A1 | 11/2014 | Zurek et al. |
| 2014/0354401 A1 | 12/2014 | Soni et al. |
| 2014/0354538 A1 | 12/2014 | Lee et al. |
| 2014/0359140 A1 | 12/2014 | Shankarraman |
| 2014/0366159 A1 | 12/2014 | Cohen |
| 2014/0372309 A1 | 12/2014 | Bullard et al. |
| 2014/0375835 A1 | 12/2014 | Bos |
| 2014/0380465 A1 | 12/2014 | Fadell et al. |
| 2015/0002696 A1 | 1/2015 | He et al. |
| 2015/0006207 A1 | 1/2015 | Jarvis et al. |
| 2015/0012417 A1 | 1/2015 | Joao et al. |
| 2015/0012435 A1 | 1/2015 | Wright et al. |
| 2015/0014141 A1 | 1/2015 | Myers et al. |
| 2015/0019944 A1 | 1/2015 | Kalgi |
| 2015/0033364 A1 | 1/2015 | Wong |
| 2015/0039494 A1 | 2/2015 | Sinton et al. |
| 2015/0043790 A1 | 2/2015 | Ono et al. |
| 2015/0044965 A1 | 2/2015 | Kurimoto et al. |
| 2015/0046336 A1 | 2/2015 | Cummins |
| 2015/0049014 A1 | 2/2015 | Saito |
| 2015/0051846 A1 | 2/2015 | Masuya |
| 2015/0054764 A1 | 2/2015 | Kim et al. |
| 2015/0056957 A1 | 2/2015 | Mardikar et al. |
| 2015/0058146 A1 | 2/2015 | Aissi et al. |
| 2015/0058191 A1 | 2/2015 | Khan et al. |
| 2015/0067496 A1 | 3/2015 | Missig et al. |
| 2015/0067602 A1 | 3/2015 | Bernstein et al. |
| 2015/0074418 A1* | 3/2015 | Lee .................. G06F 21/32 |
| | | 713/186 |
| 2015/0074615 A1 | 3/2015 | Han et al. |
| 2015/0077362 A1 | 3/2015 | Seo |
| 2015/0089636 A1 | 3/2015 | Martynov et al. |
| 2015/0095174 A1 | 4/2015 | Dua |
| 2015/0095175 A1 | 4/2015 | Dua |
| 2015/0098309 A1 | 4/2015 | Adams et al. |
| 2015/0109191 A1 | 4/2015 | Johnson et al. |
| 2015/0112870 A1 | 4/2015 | Nagasundaram et al. |
| 2015/0115028 A1 | 4/2015 | Montealegre |
| 2015/0120545 A1 | 4/2015 | Fiore et al. |
| 2015/0121251 A1 | 4/2015 | Siddhartha et al. |
| 2015/0124053 A1 | 5/2015 | Tamura et al. |
| 2015/0127539 A1 | 5/2015 | Ye et al. |
| 2015/0127550 A1 | 5/2015 | Khan |
| 2015/0135282 A1 | 5/2015 | Kong et al. |
| 2015/0146945 A1 | 5/2015 | Han |
| 2015/0149899 A1 | 5/2015 | Bernstein et al. |
| 2015/0154001 A1 | 6/2015 | Knox et al. |
| 2015/0154589 A1 | 6/2015 | Li |
| 2015/0154676 A1 | 6/2015 | Matousek et al. |
| 2015/0170146 A1 | 6/2015 | Ji et al. |
| 2015/0178878 A1 | 6/2015 | Huang |
| 2015/0186152 A1 | 7/2015 | Jothiswaran et al. |
| 2015/0186636 A1 | 7/2015 | Tharappel et al. |
| 2015/0186860 A1 | 7/2015 | Rangarajan |
| 2015/0186892 A1 | 7/2015 | Zhang et al. |
| 2015/0187019 A1 | 7/2015 | Fernandes et al. |
| 2015/0195133 A1 | 7/2015 | Sheets et al. |
| 2015/0195277 A1 | 7/2015 | Faaborg et al. |
| 2015/0208244 A1 | 7/2015 | Nakao |
| 2015/0213244 A1 | 7/2015 | Lymberopoulos et al. |
| 2015/0213542 A1 | 7/2015 | Wallaja |
| 2015/0213560 A1 | 7/2015 | Aabye et al. |
| 2015/0215128 A1 | 7/2015 | Pal |
| 2015/0220924 A1 | 8/2015 | Bakker |
| 2015/0227922 A1 | 8/2015 | Filler |
| 2015/0229750 A1 | 8/2015 | Zhou et al. |
| 2015/0230277 A1 | 8/2015 | Omeara et al. |
| 2015/0235018 A1 | 8/2015 | Gupta et al. |
| 2015/0235055 A1 | 8/2015 | An et al. |
| 2015/0235098 A1* | 8/2015 | Lee .................. G06V 40/1306 |
| | | 715/709 |
| 2015/0242611 A1 | 8/2015 | Cotterill |
| 2015/0242837 A1 | 8/2015 | Yarbrough et al. |
| 2015/0245159 A1 | 8/2015 | Osman |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0261292 A1 | 9/2015 | Conzola et al. |
| 2015/0261387 A1 | 9/2015 | Petersen et al. |
| 2015/0278799 A1 | 10/2015 | Palanisamy |
| 2015/0278900 A1 | 10/2015 | Hosein et al. |
| 2015/0286694 A1 | 10/2015 | Kaplinger et al. |
| 2015/0295921 A1 | 10/2015 | Cao |
| 2015/0302493 A1 | 10/2015 | Batstone et al. |
| 2015/0302510 A1 | 10/2015 | Godsey et al. |
| 2015/0310259 A1 | 10/2015 | Lau et al. |
| 2015/0324113 A1 | 11/2015 | Kapp et al. |
| 2015/0324615 A1 | 11/2015 | Matsumoto et al. |
| 2015/0334567 A1 | 11/2015 | Chen et al. |
| 2015/0339652 A1 | 11/2015 | Park et al. |
| 2015/0346845 A1 | 12/2015 | Di Censo et al. |
| 2015/0348001 A1 | 12/2015 | Van Os et al. |
| 2015/0348002 A1 | 12/2015 | Van et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0349959 A1 | 12/2015 | Marciniak |
| 2015/0363632 A1 | 12/2015 | Ahn et al. |
| 2015/0365400 A1 | 12/2015 | Cox |
| 2015/0370323 A1 | 12/2015 | Cieplinski et al. |
| 2015/0379252 A1 | 12/2015 | Tang et al. |
| 2016/0005024 A1 | 1/2016 | Harrell |
| 2016/0005028 A1 | 1/2016 | Mayblum et al. |
| 2016/0012417 A1 | 1/2016 | Mizon |
| 2016/0012465 A1 | 1/2016 | Sharp |
| 2016/0019536 A1 | 1/2016 | Ortiz et al. |
| 2016/0021003 A1 | 1/2016 | Pan |
| 2016/0026779 A1 | 1/2016 | Grigg et al. |
| 2016/0034887 A1 | 2/2016 | Lee |
| 2016/0042166 A1 | 2/2016 | Kang et al. |
| 2016/0047666 A1 | 2/2016 | Fuchs |
| 2016/0050199 A1 | 2/2016 | Ganesan |
| 2016/0062487 A1 | 3/2016 | Foss et al. |
| 2016/0063235 A1 | 3/2016 | Tussy |
| 2016/0063298 A1 | 3/2016 | Tuneld et al. |
| 2016/0078281 A1 | 3/2016 | Gongaware et al. |
| 2016/0078434 A1 | 3/2016 | Huxham et al. |
| 2016/0086176 A1 | 3/2016 | Henrique et al. |
| 2016/0092665 A1 | 3/2016 | Cowan et al. |
| 2016/0092877 A1 | 3/2016 | Chew |
| 2016/0094705 A1 | 3/2016 | Vendrow |
| 2016/0100156 A1 | 4/2016 | Zhou et al. |
| 2016/0104034 A1 | 4/2016 | Wilder et al. |
| 2016/0104228 A1 | 4/2016 | Sundaresan |
| 2016/0117681 A1 | 4/2016 | Jiao et al. |
| 2016/0132864 A1 | 5/2016 | Shah et al. |
| 2016/0134488 A1 | 5/2016 | Straub et al. |
| 2016/0147987 A1 | 5/2016 | Jang et al. |

(56) References Cited

U.S. PATENT DOCUMENTS

| | | |
|---|---|---|
| 2016/0148042 A1 | 5/2016 | Gonion et al. |
| 2016/0148384 A1 | 5/2016 | Bud et al. |
| 2016/0154956 A1 | 6/2016 | Fadell et al. |
| 2016/0165205 A1 | 6/2016 | Liu et al. |
| 2016/0171192 A1 | 6/2016 | Holz et al. |
| 2016/0171482 A1 | 6/2016 | Muncey et al. |
| 2016/0180305 A1 | 6/2016 | Dresser et al. |
| 2016/0188860 A1 | 6/2016 | Lee et al. |
| 2016/0192324 A1 | 6/2016 | Zhang et al. |
| 2016/0210623 A1 | 7/2016 | Voege |
| 2016/0217310 A1 | 7/2016 | Shah et al. |
| 2016/0224966 A1 | 8/2016 | Van Os et al. |
| 2016/0224973 A1 | 8/2016 | Van Os et al. |
| 2016/0232513 A1 | 8/2016 | Purves et al. |
| 2016/0232516 A1 | 8/2016 | Dayan et al. |
| 2016/0234023 A1 | 8/2016 | Mozer et al. |
| 2016/0239701 A1 | 8/2016 | Lee et al. |
| 2016/0241543 A1 | 8/2016 | Jung et al. |
| 2016/0241555 A1 | 8/2016 | Vo et al. |
| 2016/0253665 A1 | 9/2016 | Van Os et al. |
| 2016/0267779 A1 | 9/2016 | Kuang |
| 2016/0270144 A1 | 9/2016 | Thanayankizil et al. |
| 2016/0275281 A1 | 9/2016 | Ranjit et al. |
| 2016/0277396 A1 | 9/2016 | Gardiner et al. |
| 2016/0292525 A1 | 10/2016 | Aoki |
| 2016/0294557 A1 | 10/2016 | Baldwin et al. |
| 2016/0300100 A1 | 10/2016 | Shen et al. |
| 2016/0308859 A1 | 10/2016 | Barry et al. |
| 2016/0314290 A1 | 10/2016 | Baca et al. |
| 2016/0314451 A1 | 10/2016 | Martin |
| 2016/0320838 A1* | 11/2016 | Teller et al. |
| 2016/0332025 A1 | 11/2016 | Repka |
| 2016/0335495 A1 | 11/2016 | Kim et al. |
| 2016/0342832 A1 | 11/2016 | Newell et al. |
| 2016/0345172 A1 | 11/2016 | Cotterill |
| 2016/0350522 A1 | 12/2016 | Chi et al. |
| 2016/0358180 A1 | 12/2016 | Van Os et al. |
| 2016/0364561 A1 | 12/2016 | Lee et al. |
| 2016/0364591 A1 | 12/2016 | El-Khoury et al. |
| 2016/0364600 A1 | 12/2016 | Shah et al. |
| 2016/0378961 A1 | 12/2016 | Park |
| 2016/0378966 A1 | 12/2016 | Alten |
| 2017/0004828 A1 | 1/2017 | Lee et al. |
| 2017/0017834 A1 | 1/2017 | Sabitov et al. |
| 2017/0032375 A1 | 2/2017 | Van Os et al. |
| 2017/0046507 A1 | 2/2017 | Archer et al. |
| 2017/0046508 A1 | 2/2017 | Shin et al. |
| 2017/0046704 A1 | 2/2017 | Büchner et al. |
| 2017/0054731 A1 | 2/2017 | Cotterill |
| 2017/0063851 A1 | 3/2017 | Kim et al. |
| 2017/0063852 A1 | 3/2017 | Azar et al. |
| 2017/0070680 A1 | 3/2017 | Kobayashi |
| 2017/0076132 A1 | 3/2017 | Sezan et al. |
| 2017/0102916 A1 | 4/2017 | Noble et al. |
| 2017/0103382 A1 | 4/2017 | Kim et al. |
| 2017/0147186 A1 | 5/2017 | Velusamy et al. |
| 2017/0147681 A1 | 5/2017 | Tankersley et al. |
| 2017/0147802 A1 | 5/2017 | Li |
| 2017/0163588 A1 | 6/2017 | Devasthali et al. |
| 2017/0169202 A1 | 6/2017 | Duggan et al. |
| 2017/0169204 A1 | 6/2017 | Fadell et al. |
| 2017/0169287 A1 | 6/2017 | Tokunaga et al. |
| 2017/0180637 A1* | 6/2017 | Lautenbach .......... H04N 23/63 |
| 2017/0185760 A1 | 6/2017 | Wilder |
| 2017/0193214 A1 | 7/2017 | Shim et al. |
| 2017/0193314 A1 | 7/2017 | Kim et al. |
| 2017/0199997 A1 | 7/2017 | Fadell et al. |
| 2017/0235361 A1 | 8/2017 | Rigazio et al. |
| 2017/0244703 A1 | 8/2017 | Lee et al. |
| 2017/0300897 A1 | 10/2017 | Ferenczi et al. |
| 2017/0323141 A1 | 11/2017 | Lee et al. |
| 2017/0329949 A1 | 11/2017 | Civelli |
| 2017/0337542 A1 | 11/2017 | Kim et al. |
| 2017/0339151 A1 | 11/2017 | Van Os et al. |
| 2017/0344251 A1 | 11/2017 | Hajimusa et al. |
| 2017/0357972 A1 | 12/2017 | Van Os et al. |
| 2017/0357973 A1 | 12/2017 | Van Os et al. |
| 2018/0004924 A1 | 1/2018 | Tieu |
| 2018/0021954 A1 | 1/2018 | Fischer et al. |
| 2018/0053157 A1 | 2/2018 | Roffey |
| 2018/0063249 A1 | 3/2018 | Nguyen |
| 2018/0068313 A1 | 3/2018 | Van Os et al. |
| 2018/0082282 A1 | 3/2018 | Van Os et al. |
| 2018/0088787 A1 | 3/2018 | Bereza et al. |
| 2018/0096690 A1 | 4/2018 | Mixter et al. |
| 2018/0109629 A1 | 4/2018 | Van Os et al. |
| 2018/0114010 A1 | 4/2018 | Van Os et al. |
| 2018/0117944 A1 | 5/2018 | Lee |
| 2018/0144178 A1 | 5/2018 | Han et al. |
| 2018/0150627 A1 | 5/2018 | Rodefer |
| 2018/0158066 A1 | 6/2018 | Van Os et al. |
| 2018/0173928 A1 | 6/2018 | Han et al. |
| 2018/0173929 A1 | 6/2018 | Han et al. |
| 2018/0173930 A1 | 6/2018 | Han et al. |
| 2018/0181737 A1 | 6/2018 | Tussy |
| 2018/0211093 A1 | 7/2018 | Bae et al. |
| 2018/0233139 A1 | 8/2018 | Finkelstein et al. |
| 2018/0262834 A1 | 9/2018 | Cho et al. |
| 2018/0268747 A1 | 9/2018 | Braun |
| 2018/0276673 A1 | 9/2018 | Van Os et al. |
| 2018/0302790 A1 | 10/2018 | Cotterill |
| 2018/0321826 A1 | 11/2018 | Bereza et al. |
| 2018/0365898 A1 | 12/2018 | Costa |
| 2019/0050867 A1 | 2/2019 | Van Os et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0124510 A1 | 4/2019 | Cotterill |
| 2019/0156607 A1 | 5/2019 | Tao et al. |
| 2019/0164134 A1 | 5/2019 | Morrow et al. |
| 2019/0180088 A1 | 6/2019 | Norimatsu |
| 2019/0220647 A1 | 7/2019 | Han et al. |
| 2019/0243957 A1 | 8/2019 | Fadell et al. |
| 2019/0289079 A1 | 9/2019 | Van Os et al. |
| 2019/0333508 A1 | 10/2019 | Rao et al. |
| 2019/0347391 A1 | 11/2019 | Kim et al. |
| 2019/0370448 A1 | 12/2019 | Devine et al. |
| 2019/0370583 A1 | 12/2019 | Van Os et al. |
| 2020/0042685 A1 | 2/2020 | Tussy et al. |
| 2020/0065470 A1 | 2/2020 | Van Os et al. |
| 2020/0065821 A1 | 2/2020 | Van Os et al. |
| 2020/0103963 A1 | 4/2020 | Kelly et al. |
| 2020/0104620 A1 | 4/2020 | Cohen et al. |
| 2020/0120503 A1 | 4/2020 | Cotterill |
| 2020/0184472 A1 | 6/2020 | Van Os et al. |
| 2020/0234027 A1 | 7/2020 | Han et al. |
| 2020/0311509 A1 | 10/2020 | Benkley et al. |
| 2020/0356761 A1 | 11/2020 | Gonion et al. |
| 2020/0366742 A1 | 11/2020 | Van Os et al. |
| 2020/0372514 A1 | 11/2020 | Van Os et al. |
| 2021/0042549 A1 | 2/2021 | Van Os et al. |
| 2021/0048883 A1 | 2/2021 | Kelly et al. |
| 2021/0073823 A1 | 3/2021 | Van Os |
| 2021/0192530 A1 | 6/2021 | Van Os et al. |
| 2021/0201288 A1 | 7/2021 | Van Os et al. |
| 2021/0224785 A1 | 7/2021 | Van Os et al. |
| 2021/0272118 A1 | 9/2021 | Van Os et al. |
| 2021/0383386 A1 | 12/2021 | Abrams et al. |
| 2022/0058257 A1 | 2/2022 | Cotterill |
| 2022/0067133 A1 | 3/2022 | Fadell et al. |
| 2022/0124254 A1 | 4/2022 | Dellinger et al. |
| 2022/0180667 A1 | 6/2022 | Cohen et al. |
| 2022/0237274 A1 | 7/2022 | Paul et al. |
| 2022/0244838 A1 | 8/2022 | Bereza et al. |
| 2022/0284084 A1 | 9/2022 | Deng |
| 2022/0342972 A1 | 10/2022 | Van Os et al. |
| 2022/0351549 A1 | 11/2022 | Van Os et al. |
| 2023/0019250 A1 | 1/2023 | Lee et al. |
| 2023/0021247 A1 | 1/2023 | Han et al. |
| 2023/0185373 A1 | 6/2023 | Kelly et al. |
| 2023/0214466 A1 | 7/2023 | Fadell et al. |
| 2023/0236722 A1 | 7/2023 | Miller et al. |

(56) References Cited

U.S. PATENT DOCUMENTS

| | | |
|---|---|---|
| 2023/0237287 A1 | 7/2023 | Young et al. |
| 2023/0237480 A1 | 7/2023 | Miller et al. |
| 2023/0252779 A1 | 8/2023 | Gonion et al. |

FOREIGN PATENT DOCUMENTS

| | | |
|---|---|---|
| AU | 2015100709 A4 | 7/2015 |
| AU | 2017100556 A4 | 6/2017 |
| CN | 1163669 A | 10/1997 |
| CN | 1183475 A | 6/1998 |
| CN | 1220433 A | 6/1999 |
| CN | 1452739 A | 10/2003 |
| CN | 1484425 A | 3/2004 |
| CN | 1183475 C | 1/2005 |
| CN | 1592914 A | 3/2005 |
| CN | 1663174 A | 8/2005 |
| CN | 1685357 A | 10/2005 |
| CN | 1695163 A | 11/2005 |
| CN | 1741104 A | 3/2006 |
| CN | 1742252 A | 3/2006 |
| CN | 1801708 A | 7/2006 |
| CN | 1836397 A | 9/2006 |
| CN | 1846221 A | 10/2006 |
| CN | 1908981 A | 2/2007 |
| CN | 1960546 A | 5/2007 |
| CN | 101005681 A | 7/2007 |
| CN | 101035335 A | 9/2007 |
| CN | 101039184 A | 9/2007 |
| CN | 101080737 A | 11/2007 |
| CN | 101171604 A | 4/2008 |
| CN | 101226616 A | 7/2008 |
| CN | 101227359 A | 7/2008 |
| CN | 101268470 A | 9/2008 |
| CN | 101299694 A | 11/2008 |
| CN | 101341718 A | 1/2009 |
| CN | 101485128 A | 7/2009 |
| CN | 101610155 A | 12/2009 |
| CN | 101656548 A | 2/2010 |
| CN | 101719955 A | 6/2010 |
| CN | 101730907 A | 6/2010 |
| CN | 101788880 A | 7/2010 |
| CN | 101796764 A | 8/2010 |
| CN | 101809581 A | 8/2010 |
| CN | 101816165 A | 8/2010 |
| CN | 101833651 A | 9/2010 |
| CN | 101847139 A | 9/2010 |
| CN | 101960896 A | 1/2011 |
| CN | 102004908 A | 4/2011 |
| CN | 102065148 A | 5/2011 |
| CN | 102096546 A | 6/2011 |
| CN | 102164213 A | 8/2011 |
| CN | 102202192 A | 9/2011 |
| CN | 102209321 A | 10/2011 |
| CN | 102244530 A | 11/2011 |
| CN | 102265586 A | 11/2011 |
| CN | 102282578 A | 12/2011 |
| CN | 102394838 A | 3/2012 |
| CN | 102394919 A | 3/2012 |
| CN | 102396205 A | 3/2012 |
| CN | 102542444 A | 7/2012 |
| CN | 102591889 A | 7/2012 |
| CN | 102663303 A | 9/2012 |
| CN | 102737313 A | 10/2012 |
| CN | 102833423 A | 12/2012 |
| CN | 102841683 A | 12/2012 |
| CN | 202735894 U | 2/2013 |
| CN | 102982144 A | 3/2013 |
| CN | 103001856 A | 3/2013 |
| CN | 103020807 A | 4/2013 |
| CN | 103067248 A | 4/2013 |
| CN | 103092503 A | 5/2013 |
| CN | 103188280 A | 7/2013 |
| CN | 103209642 A | 7/2013 |
| CN | 103257826 A | 8/2013 |
| CN | 103262108 A | 8/2013 |
| CN | 103294171 A | 9/2013 |
| CN | 103324909 A | 9/2013 |
| CN | 203179000 U | 9/2013 |
| CN | 103346957 A | 10/2013 |
| CN | 103413218 A | 11/2013 |
| CN | 103455913 A | 12/2013 |
| CN | 103489095 A | 1/2014 |
| CN | 103501304 A | 1/2014 |
| CN | 103577982 A | 2/2014 |
| CN | 103701605 A | 4/2014 |
| CN | 103765861 A | 4/2014 |
| CN | 103778533 A | 5/2014 |
| CN | 104038256 A | 9/2014 |
| CN | 104077534 A | 10/2014 |
| CN | 104252675 A | 12/2014 |
| CN | 104361302 A | 2/2015 |
| CN | 104487927 A | 4/2015 |
| CN | 104508618 A | 4/2015 |
| CN | 104539924 A | 4/2015 |
| CN | 104732396 A | 6/2015 |
| CN | 104753766 A | 7/2015 |
| CN | 104813354 A | 7/2015 |
| CN | 104903835 A | 9/2015 |
| CN | 104935497 A | 9/2015 |
| CN | 105051651 A | 11/2015 |
| CN | 105099861 A | 11/2015 |
| CN | 105320864 A | 2/2016 |
| CN | 105389491 A | 3/2016 |
| CN | 105391843 A | 3/2016 |
| CN | 105474224 A | 4/2016 |
| CN | 105612543 A | 5/2016 |
| CN | 105787718 A | 7/2016 |
| CN | 105794244 A | 7/2016 |
| CN | 105844101 A | 8/2016 |
| CN | 105844468 A | 8/2016 |
| CN | 105868613 A | 8/2016 |
| CN | 105874405 A | 8/2016 |
| CN | 105893814 A | 8/2016 |
| CN | 106020436 A | 10/2016 |
| CN | 106095247 A | 11/2016 |
| CN | 106156566 A | 11/2016 |
| CN | 106164934 A | 11/2016 |
| CN | 106355058 A | 1/2017 |
| CN | 106462383 A | 2/2017 |
| CN | 106485123 A | 3/2017 |
| CN | 106503514 A | 3/2017 |
| CN | 106778222 A | 5/2017 |
| CN | 108574773 A | 9/2018 |
| CN | 109769397 A | 5/2019 |
| DE | 10153591 A1 | 5/2003 |
| EP | 0593386 A2 | 4/1994 |
| EP | 0923018 A2 | 6/1999 |
| EP | 1229496 A2 | 8/2002 |
| EP | 1422589 A1 | 5/2004 |
| EP | 1626330 A1 | 2/2006 |
| EP | 1645989 A2 | 4/2006 |
| EP | 1736908 A2 | 12/2006 |
| EP | 1835697 A2 | 9/2007 |
| EP | 1950678 A1 | 7/2008 |
| EP | 2180665 A1 | 4/2010 |
| EP | 1835697 A3 | 6/2010 |
| EP | 2224348 A1 | 9/2010 |
| EP | 2309410 A1 | 4/2011 |
| EP | 1626330 A4 | 1/2012 |
| EP | 2654275 A1 | 10/2013 |
| EP | 2674889 A2 | 12/2013 |
| EP | 2701107 A1 | 2/2014 |
| EP | 2713298 A1 | 4/2014 |
| EP | 2725521 A2 | 4/2014 |
| EP | 2725537 A1 | 4/2014 |
| EP | 2960822 A1 | 12/2015 |
| EP | 2993619 A1 | 3/2016 |
| EP | 3057024 A1 | 8/2016 |
| EP | 3076334 A1 | 10/2016 |
| EP | 3118761 A1 | 1/2017 |
| EP | 3190563 A1 | 7/2017 |
| EP | 2801972 B1 | 1/2018 |
| EP | 1835697 B1 | 5/2018 |
| EP | 3373132 A2 | 9/2018 |

(56) References Cited

FOREIGN PATENT DOCUMENTS

| | | |
|---|---|---|
| GB | 2184576 A | 6/1987 |
| GB | 2312040 A | 10/1997 |
| GB | 2313460 A | 11/1997 |
| GB | 2360618 A | 9/2001 |
| GB | 2466038 A | 6/2010 |
| GB | 2500321 A | 9/2013 |
| IN | 201917024374 A | 9/2020 |
| JP | 4-158434 A | 6/1992 |
| JP | 6-284182 A | 10/1994 |
| JP | 7-146942 A | 6/1995 |
| JP | 9-81309 A | 3/1997 |
| JP | 9-128208 A | 5/1997 |
| JP | 9-221950 A | 8/1997 |
| JP | 9-269930 A | 10/1997 |
| JP | 10-069346 A | 3/1998 |
| JP | 10-232934 A | 9/1998 |
| JP | 10-247936 A | 9/1998 |
| JP | 10-269358 A | 10/1998 |
| JP | 11-39385 A | 2/1999 |
| JP | 11-73530 A | 3/1999 |
| JP | 11-185016 A | 7/1999 |
| JP | 11-242745 A | 9/1999 |
| JP | 11-272769 A | 10/1999 |
| JP | 2000-259477 A | 9/2000 |
| JP | 2000-283720 A | 10/2000 |
| JP | 2000-315118 A | 11/2000 |
| JP | 2001-92554 A | 4/2001 |
| JP | 2001-92783 A | 4/2001 |
| JP | 2001-103046 A | 4/2001 |
| JP | 2001-155137 A | 6/2001 |
| JP | 2001-331758 A | 11/2001 |
| JP | 2002-49570 A | 2/2002 |
| JP | 2002-99854 A | 4/2002 |
| JP | 2002-149171 A | 5/2002 |
| JP | 2002-159052 A | 5/2002 |
| JP | 2002-515145 A | 5/2002 |
| JP | 2002-183093 A | 6/2002 |
| JP | 2002-207525 A | 7/2002 |
| JP | 2002-222412 A | 8/2002 |
| JP | 2002-288137 A | 10/2002 |
| JP | 2003-16398 A | 1/2003 |
| JP | 2003-67343 A | 3/2003 |
| JP | 2003-141541 A | 5/2003 |
| JP | 2003-143290 A | 5/2003 |
| JP | 2003-150550 A | 5/2003 |
| JP | 2003-178244 A | 6/2003 |
| JP | 2003-298689 A | 10/2003 |
| JP | 2003-346059 A | 12/2003 |
| JP | 2004-86866 A | 3/2004 |
| JP | 2004-252736 A | 9/2004 |
| JP | 2004-265353 A | 9/2004 |
| JP | 2004-287592 A | 10/2004 |
| JP | 2004-532477 A | 10/2004 |
| JP | 2004-313459 A | 11/2004 |
| JP | 2004-334788 A | 11/2004 |
| JP | 2004-348600 A | 12/2004 |
| JP | 2004-348601 A | 12/2004 |
| JP | 2004-356816 A | 12/2004 |
| JP | 2005-4490 A | 1/2005 |
| JP | 2005-71225 A | 3/2005 |
| JP | 2005-84991 A | 3/2005 |
| JP | 2005-115480 A | 4/2005 |
| JP | 2005-122700 A | 5/2005 |
| JP | 2005-202578 A | 7/2005 |
| JP | 2005-521961 A | 7/2005 |
| JP | 2005-523505 A | 8/2005 |
| JP | 2005-317049 A | 11/2005 |
| JP | 2005-327076 A | 11/2005 |
| JP | 2005-339425 A | 12/2005 |
| JP | 2006-12080 A | 1/2006 |
| JP | 2006-18613 A | 1/2006 |
| JP | 2006-31182 A | 2/2006 |
| JP | 2006-85559 A | 3/2006 |
| JP | 2006-93912 A | 4/2006 |
| JP | 2006-107288 A | 4/2006 |
| JP | 2006-114018 A | 4/2006 |
| JP | 2006-115043 A | 4/2006 |
| JP | 2006-127502 A | 5/2006 |
| JP | 2006-163960 A | 6/2006 |
| JP | 2006-172180 A | 6/2006 |
| JP | 2006-189999 A | 7/2006 |
| JP | 2006-191245 A | 7/2006 |
| JP | 2006-197071 A | 7/2006 |
| JP | 2006-202278 A | 8/2006 |
| JP | 2006-203858 A | 8/2006 |
| JP | 2006-212185 A | 8/2006 |
| JP | 2006-215705 A | 8/2006 |
| JP | 2006-259930 A | 9/2006 |
| JP | 2006-259931 A | 9/2006 |
| JP | 2006-277670 A | 10/2006 |
| JP | 2006-303701 A | 11/2006 |
| JP | 2006-308375 A | 11/2006 |
| JP | 2007-11667 A | 1/2007 |
| JP | 2007-34637 A | 2/2007 |
| JP | 2007-52574 A | 3/2007 |
| JP | 2007-52770 A | 3/2007 |
| JP | 2007-58397 A | 3/2007 |
| JP | 2007-71008 A | 3/2007 |
| JP | 2007-507011 A | 3/2007 |
| JP | 2007-102278 A | 4/2007 |
| JP | 2007-116318 A | 5/2007 |
| JP | 2007-116602 A | 5/2007 |
| JP | 2007-128201 A | 5/2007 |
| JP | 2007-135149 A | 5/2007 |
| JP | 2007-140696 A | 6/2007 |
| JP | 2007-148801 A | 6/2007 |
| JP | 2007-199984 A | 8/2007 |
| JP | 2007219665 A | 8/2007 |
| JP | 2007-226293 A | 9/2007 |
| JP | 2007-226794 A | 9/2007 |
| JP | 2007-334637 A | 12/2007 |
| JP | 2008-5180 A | 1/2008 |
| JP | 2008-15800 A | 1/2008 |
| JP | 2008-33681 A | 2/2008 |
| JP | 2008-46692 A | 2/2008 |
| JP | 2008-70926 A | 3/2008 |
| JP | 2008-71158 A | 3/2008 |
| JP | 2008-75424 A | 4/2008 |
| JP | 2008-250601 A | 10/2008 |
| JP | 2009-9434 A | 1/2009 |
| JP | 2009-15543 A | 1/2009 |
| JP | 2009-49878 A | 3/2009 |
| JP | 2009-87156 A | 4/2009 |
| JP | 2009-99076 A | 5/2009 |
| JP | 2009-135770 A | 6/2009 |
| JP | 2009-211166 A | 9/2009 |
| JP | 2009-240523 A | 10/2009 |
| JP | 2009-258991 A | 11/2009 |
| JP | 2010-009513 A | 1/2010 |
| JP | 2010-15417 A | 1/2010 |
| JP | 2010-028404 A | 2/2010 |
| JP | 2010-086281 A | 4/2010 |
| JP | 2010-102718 A | 5/2010 |
| JP | 2010-517390 A | 5/2010 |
| JP | 2010-152506 A | 7/2010 |
| JP | 2010-165012 A | 7/2010 |
| JP | 2010-524051 A | 7/2010 |
| JP | 2010-211577 A | 9/2010 |
| JP | 2010-211579 A | 9/2010 |
| JP | 2010-250386 A | 11/2010 |
| JP | 2010-271762 A | 12/2010 |
| JP | 2010-271779 A | 12/2010 |
| JP | 2010-541046 A | 12/2010 |
| JP | 2011-53849 A | 3/2011 |
| JP | 2011-54120 A | 3/2011 |
| JP | 2011-97287 A | 5/2011 |
| JP | 2011-519439 A | 7/2011 |
| JP | 2011-192228 A | 9/2011 |
| JP | 2011-217146 A | 10/2011 |
| JP | 2011-242924 A | 12/2011 |
| JP | 2012-8951 A | 1/2012 |
| JP | 2012-8985 A | 1/2012 |
| JP | 2012-504273 A | 2/2012 |
| JP | 2012-73724 A | 4/2012 |

(56) References Cited

FOREIGN PATENT DOCUMENTS

| | | |
|---|---|---|
| JP | 2012-508930 A | 4/2012 |
| JP | 2012-99025 A | 5/2012 |
| JP | 2012164070 A | 8/2012 |
| JP | 2012-168802 A | 9/2012 |
| JP | 2012-194661 A | 10/2012 |
| JP | 2012-208719 A | 10/2012 |
| JP | 2012-215981 A | 11/2012 |
| JP | 2012-529699 A | 11/2012 |
| JP | 2013-20496 A | 1/2013 |
| JP | 2013-30052 A | 2/2013 |
| JP | 2013-34322 A | 2/2013 |
| JP | 2013-58828 A | 3/2013 |
| JP | 2013-88906 A | 5/2013 |
| JP | 2013-114317 A | 6/2013 |
| JP | 2013-114498 A | 6/2013 |
| JP | 2013-140540 A | 7/2013 |
| JP | 2013-530445 A | 7/2013 |
| JP | 2013-149206 A | 8/2013 |
| JP | 2013-533532 A | 8/2013 |
| JP | 5267966 B2 | 8/2013 |
| JP | 2013-534662 A | 9/2013 |
| JP | 2013-222410 A | 10/2013 |
| JP | 2013-232197 A | 11/2013 |
| JP | 2014-44719 A | 3/2014 |
| JP | 2014-44724 A | 3/2014 |
| JP | 2014-75155 A | 4/2014 |
| JP | 2014-102845 A | 6/2014 |
| JP | 2014-110009 A | 6/2014 |
| JP | 2014-517366 A | 7/2014 |
| JP | 2014-191653 A | 10/2014 |
| JP | 2014-230061 A | 12/2014 |
| JP | 2014-239478 A | 12/2014 |
| JP | 2015-14923 A | 1/2015 |
| JP | 2015-36925 A | 2/2015 |
| JP | 2015-56142 A | 3/2015 |
| JP | 2015-75877 A | 4/2015 |
| JP | 2015-187783 A | 10/2015 |
| JP | 2015-207051 A | 11/2015 |
| JP | 2016-53766 A | 4/2016 |
| JP | 2016-71655 A | 5/2016 |
| JP | 2016-76799 A | 5/2016 |
| JP | 2016-521403 A | 7/2016 |
| JP | 2016-162000 A | 9/2016 |
| JP | 2016-534435 A | 11/2016 |
| JP | 6023162 B2 | 11/2016 |
| JP | 2016-224960 A | 12/2016 |
| JP | 2017-16170 A | 1/2017 |
| JP | 2017-500656 A | 1/2017 |
| JP | 2017-91129 A | 5/2017 |
| JP | 2017-102952 A | 6/2017 |
| JP | 2017-117159 A | 6/2017 |
| JP | 2017-138846 A | 8/2017 |
| JP | 2018-36965 A | 3/2018 |
| KR | 10-2000-0030544 A | 6/2000 |
| KR | 10-2001-0019345 A | 3/2001 |
| KR | 2001-0074059 A | 8/2001 |
| KR | 2002-0002484 A | 1/2002 |
| KR | 10-2002-0019031 A | 3/2002 |
| KR | 10-2002-0022295 A | 3/2002 |
| KR | 10-2002-0038162 A | 5/2002 |
| KR | 10-2002-0087665 A | 11/2002 |
| KR | 10-0403196 B1 | 10/2003 |
| KR | 10-2004-0005505 A | 1/2004 |
| KR | 10-2004-0049502 A | 6/2004 |
| KR | 10-2005- 0061975 A | 6/2005 |
| KR | 10-2006-0018063 A | 2/2006 |
| KR | 10-0652624 B1 | 12/2006 |
| KR | 10-2007-0026808 A | 3/2007 |
| KR | 10-2007-0081773 A | 8/2007 |
| KR | 10-2007-0120125 A | 12/2007 |
| KR | 10-0805341 B1 | 2/2008 |
| KR | 10-2008-0064395 A | 7/2008 |
| KR | 10-2009-0011323 A | 2/2009 |
| KR | 10-2009-0089472 A | 8/2009 |
| KR | 10-2010-0074218 A | 7/2010 |
| KR | 10-2011-0056561 A | 5/2011 |
| KR | 10-2011-0098435 A | 9/2011 |
| KR | 10-2011-0101683 A | 9/2011 |
| KR | 10-2011-0114732 A | 10/2011 |
| KR | 10-2012-0040693 A | 4/2012 |
| KR | 10-2012-0052150 A | 5/2012 |
| KR | 10-2012-0076675 A | 7/2012 |
| KR | 10-2012-0087333 A | 8/2012 |
| KR | 10-2013-0011423 A | 1/2013 |
| KR | 10-2013-0027326 A | 3/2013 |
| KR | 10-1253392 B1 | 4/2013 |
| KR | 10-2013-0044292 A | 5/2013 |
| KR | 10-1312097 B1 | 9/2013 |
| KR | 10-2013-0116905 A | 10/2013 |
| KR | 10-1330962 B1 | 11/2013 |
| KR | 10-2013-0138659 A | 12/2013 |
| KR | 10-1342208 B1 | 12/2013 |
| KR | 10-2014-0001515 A | 1/2014 |
| KR | 10-2014-0015171 A | 2/2014 |
| KR | 10-2014-0018019 A | 2/2014 |
| KR | 10-2014-0026263 A | 3/2014 |
| KR | 10-2014-0055429 A | 5/2014 |
| KR | 10-2014-0121764 A | 10/2014 |
| KR | 10-2014-0137400 A | 12/2014 |
| KR | 10-2015-0013264 A | 2/2015 |
| KR | 10-2015-0029495 A | 3/2015 |
| KR | 10-2015-0068013 A | 6/2015 |
| KR | 10-2016-0012636 A | 2/2016 |
| KR | 10-2016-0014623 A | 2/2016 |
| KR | 10-2016-0026337 A | 3/2016 |
| KR | 10-2016-0026791 A | 3/2016 |
| KR | 10-2016-0045633 A | 4/2016 |
| KR | 10-2016-0048215 A | 5/2016 |
| KR | 10-2016-0054573 A | 5/2016 |
| KR | 10-2016-0099397 A | 8/2016 |
| KR | 10-2016-0099432 A | 8/2016 |
| KR | 10-2016-0105296 A | 9/2016 |
| KR | 10-2017-0023063 A | 3/2017 |
| KR | 10-2017-0065563 A | 6/2017 |
| KR | 101820573 B1 | 1/2018 |
| TW | 200529636 A | 9/2005 |
| TW | 200601176 A | 1/2006 |
| TW | 200642408 A | 12/2006 |
| TW | 200919255 A | 5/2009 |
| WO | 1997/41528 A1 | 11/1997 |
| WO | 1998/58346 A1 | 12/1998 |
| WO | 1999/28701 A1 | 6/1999 |
| WO | 1999/44114 A1 | 9/1999 |
| WO | 00/55812 A1 | 9/2000 |
| WO | 01/57757 A1 | 8/2001 |
| WO | 2001/80017 A1 | 10/2001 |
| WO | 2002/01864 A1 | 1/2002 |
| WO | 2003/038698 A1 | 5/2003 |
| WO | 2003/083793 A2 | 10/2003 |
| WO | 2004/029862 A1 | 4/2004 |
| WO | 2004/104813 A1 | 12/2004 |
| WO | 2005/008568 A1 | 1/2005 |
| WO | 2005/020036 A2 | 3/2005 |
| WO | 2005/048832 A1 | 6/2005 |
| WO | 2005/106774 A2 | 11/2005 |
| WO | 2006/051462 A1 | 5/2006 |
| WO | 2006/113834 A2 | 10/2006 |
| WO | 2007/029710 A1 | 3/2007 |
| WO | 2007/041834 A1 | 4/2007 |
| WO | 2007/060102 A1 | 5/2007 |
| WO | 2007/070014 A1 | 6/2007 |
| WO | 2007/072447 A2 | 6/2007 |
| WO | 2007/073422 A1 | 6/2007 |
| WO | 2007/076210 A1 | 7/2007 |
| WO | 2007/116521 A1 | 10/2007 |
| WO | 2008/008101 A2 | 1/2008 |
| WO | 2008/024454 A1 | 2/2008 |
| WO | 2008/147457 A1 | 12/2008 |
| WO | 2008/151229 A1 | 12/2008 |
| WO | 2009/042392 A2 | 4/2009 |
| WO | 2009/045335 A2 | 4/2009 |
| WO | 2010/039337 A2 | 4/2010 |
| WO | 2010/056484 A2 | 5/2010 |
| WO | 2010/059306 A2 | 5/2010 |

(56) References Cited

FOREIGN PATENT DOCUMENTS

| | | |
|---|---|---|
| WO | 2010/077960 A2 | 7/2010 |
| WO | 2010/086993 A1 | 8/2010 |
| WO | 2010/120972 A1 | 10/2010 |
| WO | 2010/128442 A2 | 11/2010 |
| WO | 2011/074500 A1 | 6/2011 |
| WO | 2011/159579 A2 | 12/2011 |
| WO | 2012/068193 A2 | 5/2012 |
| WO | 2012/083113 A2 | 6/2012 |
| WO | 2012/128750 A1 | 9/2012 |
| WO | 2012/129231 A1 | 9/2012 |
| WO | 2013/003372 A1 | 1/2013 |
| WO | 2013000150 A1 | 1/2013 |
| WO | 2013/023224 A2 | 2/2013 |
| WO | 2013/066659 A1 | 5/2013 |
| WO | 2013/096943 A1 | 6/2013 |
| WO | 2013/103912 A1 | 7/2013 |
| WO | 2013/125222 A1 | 8/2013 |
| WO | 2013/169849 A2 | 11/2013 |
| WO | 2013/169877 A2 | 11/2013 |
| WO | 2013/177500 A1 | 11/2013 |
| WO | 2013/177548 A1 | 11/2013 |
| WO | 2013/181102 A1 | 12/2013 |
| WO | 2014/012456 A1 | 1/2014 |
| WO | 2014/033939 A1 | 3/2014 |
| WO | 2014/105276 A1 | 7/2014 |
| WO | 2014/147297 A1 | 9/2014 |
| WO | 2014/193465 A1 | 12/2014 |
| WO | 2015/057320 A1 | 4/2015 |
| WO | 2015/062382 A1 | 5/2015 |
| WO | 2015/062410 A1 | 5/2015 |
| WO | 2015/069153 A1 | 5/2015 |
| WO | 2015/088141 A1 | 6/2015 |
| WO | 2015/112868 A1 | 6/2015 |
| WO | 2015/120019 A1 | 8/2015 |
| WO | 2015/187608 A1 | 12/2015 |
| WO | 2015/195216 A1 | 12/2015 |
| WO | 2015/196448 A1 | 12/2015 |
| WO | 2016/036218 A1 | 3/2016 |
| WO | 2016/111808 A1 | 7/2016 |
| WO | 2016/123309 A1 | 8/2016 |
| WO | 2016/126374 A1 | 8/2016 |
| WO | 2016/126775 A1 | 8/2016 |
| WO | 2016/129938 A1 | 8/2016 |
| WO | 2016/189390 A2 | 12/2016 |
| WO | 2016/196054 A1 | 12/2016 |
| WO | 2016/201037 A1 | 12/2016 |
| WO | 2017/012302 A1 | 1/2017 |
| WO | 2017/030223 A1 | 2/2017 |
| WO | 2017/043314 A1 | 3/2017 |
| WO | 2017/094052 A1 | 6/2017 |
| WO | 2017/218094 A1 | 12/2017 |
| WO | 2018/226255 A1 | 12/2018 |
| WO | 2019/033129 A2 | 2/2019 |

OTHER PUBLICATIONS

Advisory Action received for U.S. Appl. No. 12/207,374, dated Feb. 25, 2013, 3 pages.
Advisory Action received for U.S. Appl. No. 12/207,374, dated May 15, 2014, 3 pages.
Advisory Action received for U.S. Appl. No. 14/311,214, dated Feb. 10, 2015, 4 pages.
Advisory Action received for U.S. Appl. No. 14/503,296, dated Oct. 2, 2015, 3 pages.
Advisory Action received for U.S. Appl. No. 15/137,944, dated May 11, 2017, 6 pages.
Advisory Action received for U.S. Appl. No. 15/274,910, dated Aug. 12, 2019, 3 pages.
Advisory Action received for U.S. Appl. No. 16/164,561, dated Nov. 14, 2019, 2 pages.
Advisory Action received for U.S. Appl. No. 15/250,152, dated Mar. 25, 2019, 5 pages.
Applicant Initiated Interview Summary received for U.S. Appl. No. 13/243,045, dated Oct. 22, 2019, 3 pages.
Applicant Initiated Interview Summary received for U.S. Appl. No. 15/351,230, dated Nov. 22, 2019, 5 pages.
Applicant Initiated Interview Summary received for U.S. Appl. No. 15/433,320, dated Feb. 11, 2020, 5 pages.
Applicant Initiated Interview Summary received for U.S. Appl. No. 15/714,887, dated Aug. 19, 2020, 4 pages.
Applicant Initiated Interview Summary received for U.S. Appl. No. 15/714,887, dated Mar. 17, 2020, 5 pages.
Applicant Initiated Interview Summary received for U.S. Appl. No. 15/823,269, dated Sep. 17, 2020, 3 pages.
Applicant Initiated Interview Summary received for U.S. Appl. No. 16/147,023, dated Oct. 29, 2019, 3 pages.
Applicant Initiated Interview Summary received for U.S. Appl. No. 16/553,622, dated Aug. 3, 2020, 3 pages.
Applicant-Initiated Interview Summary received for U.S. Appl. No. 14/612,214, dated Feb. 18, 2020, 3 pages.
Applicant-Initiated Interview Summary received for U.S. Appl. No. 15/274,910, dated Jul. 9, 2020, 3 pages.
Applicant-Initiated Interview Summary received for U.S. Appl. No. 15/433,320, dated Nov. 25, 2020, 4 pages.
Applicant-Initiated Interview Summary received for U.S. Appl. No. 16/125,267, dated Feb. 8, 2021, 3 pages.
Applicant-Initiated Interview Summary received for U.S. Appl. No. 16/125,267, dated Jun. 25, 2021, 5 pages.
Applicant-Initiated Interview Summary received for U.S. Appl. No. 16/125,267, dated Sep. 14, 2020, 5 pages.
Applicant-Initiated Interview Summary received for U.S. Appl. No. 16/369,355, dated Jul. 28, 2021, 2 pages.
Applicant-Initiated Interview Summary received for U.S. Appl. No. 16/369,473, dated Apr. 16, 2021, 2 pages.
Applicant-Initiated Interview Summary received for U.S. Appl. No. 16/369,473, dated Oct. 13, 2020, 5 pages.
Applicant-Initiated Interview Summary received for U.S. Appl. No. 16/369,473, dated Sep. 21, 2020, 5 pages.
Applicant-Initiated Interview Summary received for U.S. Appl. No. 16/667,271, dated Apr. 8, 2020, 3 pages.
Applicant-Initiated Interview Summary received for U.S. Appl. No. 16/670,949, dated Apr. 6, 2021, 2 pages.
Bao et al., "Location-based and Preference-Aware Recommendation Using Sparse Geo-Social Networking Data", ACM SIGSPATIAL GIS '12, Redondo Beach, CA, USA, Online available at :https://www.microsoft.com/en-us/research/wp-content/uploads/2016/02/LocationRecommendation.pdf, Nov. 6-9, 2012, 10 pages.
Board Decision received for Chinese Patent Application No. 201410407626.4, dated Jun. 8, 2020, 17 pages.
Brief Communication Regarding Oral Proceedings received for European Patent Application No. 15727291.5, dated Jun. 9, 2020, 12 pages.
Brief Communication Regarding Oral Proceedings received for European Patent Application No. 16201159.7, dated Jun. 29, 2021, 13 pages.
Brief Communication regarding Oral Proceedings received for European Patent Application No. 16201205.8, dated May 29, 2020, 29 pages.
Brief Communication Regarding Oral Proceedings received for European Patent Application No. 18830326.7, dated Jun. 30, 2021, 2 pages.
Brief Communication regarding Oral Proceedings received for European Patent Application No. 19171661.2, dated May 28, 2020, 2 pages.
Brief Communication Regarding Oral Proceedings received for European Patent Application No. 19171661.2, dated Sep. 3, 2020, 2 pages.
Certificate of Examination received for Australian Patent Application No. 2017100553, dated Jan. 17, 2018, 2 pages.
Certificate of Examination received for Australian Patent Application No. 2017101425, dated Jan. 17, 2018, 2 pages.
Certificate of Examination received for Australian Patent Application No. 2018101014, dated Mar. 20, 2019, 2 pages.
Corrected Notice of Allowance received for U.S. Appl. No. 14/612,214, dated May 1, 2020, 2 pages.

(56) References Cited

OTHER PUBLICATIONS

Corrected Notice of Allowance received for U.S. Appl. No. 15/017,436, dated Sep. 2, 2016, 5 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/269,801, dated Oct. 3, 2017, 4 pages.
Corrected Notice of Allowance received for U.S. Appl. No. 15/294,439, dated Mar. 13, 2019, 4 pages.
Corrected Notice of Allowance received for U.S. Appl. No. 15/357,873, dated Jan. 19, 2018, 2 pages.
Corrected Notice of Allowance received for U.S. Appl. No. 15/357,873, dated Mar. 16, 2018, 2 pages.
Corrected Notice of Allowance received for U.S. Appl. No. 15/845,794, dated Feb. 25, 2019, 2 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
Corrected Notice of Allowance received for U.S. Appl. No. 16/386,707, dated Feb. 19, 2021, 2 pages.
Corrected Notice of Allowance received for U.S. Appl. No. 16/386,707, dated Jan. 25, 2021, 2 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Corrected Notice of Allowance received for U.S. Appl. No. 16/456,839, dated Apr. 29, 2021, 2 pages.
Corrected Notice of Allowance received for U.S. Appl. No. 16/456,839, dated Jul. 20, 2021, 3 pages.
Corrected Notice of Allowance received for U.S. Appl. No. 16/553,622, dated Sep. 23, 2020, 5 pages.
CV Meerkat, "Extracting Face Orientation in Real-time", Available online at: <https://www.youtube.com/watch?v=Ugwfnjx6UYw>, Jul. 22, 2016, 3 pages.
Decision from Intellectual Property Tribunal received for Korean Patent Application No. 10-2011-7023152, dated Feb. 17, 2015, 22 pages.
Decision on Appeal received for Korean Patent Application No. 10-2015-7010262, dated Dec. 21, 2018, 16 pages.
Decision on Appeal received for Korean Patent Application No. 10-2016-0152210, dated Jun. 23, 2020, 20 pages.
Decision on Appeal received for Korean Patent Application No. 10-2018-7019643, dated Jun. 9, 2020, 27 pages.
Decision on Appeal received for U.S. Appl. No. 13/243,045, dated Mar. 18, 2019, 10 pages.
Decision on Appeal received for U.S. Appl. No. 13/243,045, dated May 10, 2021, 11 pages.
Decision on Appeal received for U.S. Appl. No. 14/612,214, dated Sep. 3, 2019, 10 pages.
Decision on Appeal received for U.S. Appl. No. 14/869,831, dated Nov. 2, 2020, 8 pages.
Decision on Request for Rehearing received for U.S. Appl. No. 14/869,831, dated Mar. 8, 2021, 9 pages.
Decision to Grant received for Danish Patent Application No. PA201670042, dated Mar. 19, 2018, 2 pages.
Decision to Grant received for Danish Patent Application No. PA201670628, dated Nov. 20, 2017, 2 pages.
Decision to Grant received for Danish Patent Application No. PA201770418, dated Oct. 25, 2019, 3 pages.
Decision to Grant received for Danish Patent Application No. PA201770419, dated Oct. 25, 2018, 2 pages.
Decision to Grant received for Danish Patent Application No. PA201770715, dated Feb. 15, 2019, 2 pages.
Decision to Grant received for Danish Patent Application No. PA201770782, dated Oct. 25, 2019, 2 pages.
Decision to Grant received for Danish Patent Application No. PA201770804, dated Jun. 28, 2019, 2 pages.
Decision to Grant received for Danish Patent Application No. PA201870370, dated Mar. 29, 2019, 2 pages.
Decision to Grant received for Danish Patent Application No. PA201870371, dated Mar. 29, 2019, 2 pages.
Decision to Grant received for Danish Patent Application No. PA201870855, dated Oct. 20, 2020, 2 pages.
Decision to Grant received for Danish Patent Application No. PA201970127, dated Aug. 20, 2020, 2 pages.
Decision to Grant received for European Patent Application No. 12773460.6, dated Jun. 27, 2019, 2 pages.
Decision to Grant received for European Patent Application No. 13171145.9, dated Jul. 11, 2019, 2 pages.
Decision to Grant received for European Patent Application No. 14853215.3, dated Sep. 27, 2018, 2 pages.
Decision to Grant received for European Patent Application No. 17853654.6, dated Apr. 15, 2021, 2 pages.
Decision to Grant received for European Patent Application No. 18190250.3, dated Oct. 1, 2020, 2 pages.
Decision to Grant received for European Patent Application No. 18704335.1, dated Sep. 24, 2020, 2 pages.
Decision to Grant received for Japanese Patent Application No. 2017-075031, dated Jul. 1, 2019, 3 pages.
Decision to Grant received for the European Patent Application No. 12181538.5, dated Jul. 2, 2015, 1 page.
Decision to Refuse received for European Patent Application No. 08834386.8, dated Apr. 8, 2013, 8 pages.
Decision to Refuse received for European Patent Application No. 12770400.5, dated Nov. 8, 2018, 12 pages.
Decision to Refuse received for European Patent Application No. 15727291.5, dated Jun. 30, 2020, 21 pages.
Decision to Refuse received for European Patent Application No. 15728352.4, dated May 28, 2020, 25 pages.
Decision to Refuse received for European Patent Application No. 16201195.1, dated Mar. 4, 2019, 23 pages.
Decision to Refuse received for European Patent Application No. 16201205.8, dated Jun. 30, 2020, 29 pages.
Decision to Refuse received for European Patent Application No. 16703893.4, dated Jul. 24, 2019, 22 pages.
Decision to Refuse received for European Patent Application No. 19171661.2, dated Oct. 22, 2020, 7 pages.
Does Apple Pay change payment?, Mac Fan, Japan, Mynavi Publishing Corporation, vol. 22, No. 11 common No. 381, Nov. 1, 2014, 11 pages.
Drareni Jamil, "Face Tracking and Head Pose Estimation with Open CV", Available online at: <https://www.youtube.com/watch?v=Etj_aktbnwM>, Jun. 9, 2013, 3 pages.
European Search Report received for European Patent Application No. 17865509.8, dated Oct. 2, 2019, 5 pages.
European Search Report received for European Patent Application No. 19171661.2, dated Jul. 17, 2019, 6 pages.
European Search Report received for European Patent Application No. 21150992.2, dated Jun. 23, 2021, 6 pages.
Ex Parte Quayle Action received for U.S. Appl. No. 14/869,831, dated May 28, 2021, 16 pages.
Examination Report received for Australian Patent Application No. 2015202397, dated Feb. 29, 2016, 4 pages.
Examiner's Answer to Appeal Brief received for U.S. Appl. No. 13/243,045, dated Oct. 26, 2020, 17 pages.
Examiner's Answer to Appeal Brief received for U.S. Appl. No. 14/869,831, dated Aug. 12, 2019, 16 pages.
Examiner's Pre-Review Report received for Japanese Patent Application No. 2013-098406, dated Oct. 8, 2015, 7 pages.
Examiner's Pre-Review Report received for Japanese Patent Application No. 2018-113081, dated Apr. 28, 2021, 4 pages.
Extended European Search Report for European Application No. 17813737.8, dated Nov. 22, 2019, 9 pages.
Extended European Search Report includes Partial European Search Report and European Search Opinion) received for European Patent Application No. 13171145.9, dated Feb. 5, 2014, 6 pages.

(56) References Cited

OTHER PUBLICATIONS

Extended European Search Report includes Partial European Search Report and European Search Opinion) received for European Patent Application No. 15168475.0, dated Oct. 21, 2015, 6 pages.
Extended European Search Report received for European Patent Application No. 12181538.5, dated Oct. 23, 2012, 6 pages.
Extended European Search Report received for European Patent Application No. 14853215.3, dated Sep. 13, 2016, 9 pages.
Extended European Search Report received for European Patent Application No. 16177139.9, dated Nov. 4, 2016, 7 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 17799904.2, dated Jul. 30, 2018, 7 pages.
Extended European Search Report received for European Patent Application No. 17810682.9, dated Mar. 26, 2019, 7 pages.
Extended European Search Report received for European Patent Application No. 17835789.3, dated Jun. 23, 2020, 12 pages.
Extended European Search Report received for European Patent Application No. 17853654.6, dated Jul. 8, 2019, 9 pages.
Extended European Search Report received for European Patent Application No. 18190250.3, dated Nov. 9, 2018, 6 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19160344.8, dated Jun. 14, 2019, 7 pages.
Extended European Search Report received for European Patent Application No. 19160348.9, dated Jul. 19, 2019, 6 pages.
Extended European Search Report received for European Patent Application No. 19186538.5, dated Oct. 9, 2019, 10 pages.
Extended European Search Report received for European Patent Application No. 19194828.0, dated Dec. 19, 2019, 7 pages.
Extended European Search Report received for European Patent Application No. 20186286.9, dated Nov. 2, 2020, 9 pages.
Extended European Search Report received for European Patent Application No. 20191533.7, dated Nov. 13, 2020, 8 pages.
Extended European Search Report received for European Patent Application No. 20196476.4, dated Nov. 5, 2020, 5 pages.
Extended European Search Report received for European Patent Application No. 20198076.0, dated Jan. 13, 2021, 8 pages.
Final Office Action received for U.S. Appl. No. 12/207,370, dated Dec. 13, 2011, 15 pages.
Final Office Action received for U.S. Appl. No. 12/207,370, dated Feb. 15, 2013, 17 pages.
Final Office Action received for U.S. Appl. No. 12/207,374, dated Jan. 31, 2014, 12 pages.
Final Office Action received for U.S. Appl. No. 12/207,374, dated Nov. 6, 2012, 25 pages.
Final Office Action received for U.S. Appl. No. 12/207,374, dated Oct. 21, 2011, 16 pages.
Final Office Action received for U.S. Appl. No. 13/243,045, dated Aug. 5, 2015, 10 pages.
Final Office Action received for U.S. Appl. No. 13/243,045, dated Jan. 15, 2020, 12 pages.
Final Office Action received for U.S. Appl. No. 13/248,882, dated Dec. 4, 2013, 22 pages.
Final Office Action received for U.S. Appl. No. 14/142,669, dated Jun. 12, 2015, 14 pages.
Final Office Action received for U.S. Appl. No. 14/285,378, dated Jul. 23, 2015, 19 pages.
Final Office Action received for U.S. Appl. No. 14/311,214, dated Jan. 8, 2015, 12 pages.
Final Office Action received for U.S. Appl. No. 14/311,214, dated Sep. 24, 2015, 15 pages.
Final Office Action received for U.S. Appl. No. 14/479,088, dated Mar. 11, 2015, 10 pages.
Final Office Action received for U.S. Appl. No. 14/480, 183, dated Jun. 28, 2017, 14 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/612,214, dated Dec. 7, 2015, 13 pages.
Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 15/137,944, dated Feb. 27, 2017, 10 pages.
Final Office Action received for U.S. Appl. No. 15/274,910, dated May 31, 2019, 31 pages.
Final Office Action received for U.S. Appl. No. 15/274,910, dated Oct. 16, 2020, 34 pages.
Final Office Action received for U.S. Appl. No. 15/351,230, dated Nov. 4, 2019, 6 pages.
Final Office Action received for U.S. Appl. No. 15/433,320, dated Dec. 31, 2019, 30 pages.
Final Office Action received for U.S. Appl. No. 15/470,752, dated Mar. 13, 2018, 14 pages.
Final Office Action received for U.S. Appl. No. 15/714,887, dated Nov. 13, 2020, 60 pages.
Final Office Action received for U.S. Appl. No. 15/714,887, dated Nov. 15, 2019, 55 pages.
Final Office Action received for U.S. Appl. No. 15/866,341, dated May 14, 2019, 10 pages.
Final Office Action received for U.S. Appl. No. 15/872,685, dated Oct. 26, 2018, 10 pages.
Final Office Action received for U.S. Appl. No. 15/899,966, dated Nov. 5, 2018, 10 pages.
Final Office Action received for U.S. Appl. No. 16/125,267, dated Dec. 10, 2020, 20 pages.
Final Office Action received for U.S. Appl. No. 16/147,023, dated Jul. 23, 2019, 18 pages.
Final Office Action received for U.S. Appl. No. 16/147,115, dated Jun. 19, 2019, 14 pages.
Final Office Action received for U.S. Appl. No. 16/164,561, dated Sep. 5, 2019, 12 pages.
Final Office Action received for U.S. Appl. No. 16/369,473, dated Dec. 14, 2020, 17 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Final Office Action received for U.S. Appl. No. 14/870,694, dated Apr. 7, 2017, 16 pages.
Giving Apple Pay a Try, The Consumer Credit Monthly, Kinzai Institute for Financial Affairs, Inc, vol. 33, No. 1, ISSN: 0288-8122, 2015, 7 pages.
How To Smartphone, "Samsung Galaxy S7—screen rotation on / off", Available Online at <https://www.youtube.com/watch?v=np54sEEI11E >, see video from 1:10 to 1:30., Dec. 12, 2016, 3 pages.
IDEX, "IDEX Fingerprint Sensor Mobile Glass Display", Youtube, available at <https://www.youtube.com/watch?v=X1dAIP5sFzw>, Apr. 11, 2013, 2 pages.
Intention to Grant received for Danish patent Application No. PA201670042, dated Jan. 29, 2018, 2 pages.

(56) References Cited

OTHER PUBLICATIONS

Intention to Grant received for Danish Patent Application No. PA201670628, dated Aug. 28, 2017., 2 pages.
Intention to Grant received for Danish Patent Application No. PA201770418, dated Aug. 22, 2019, 2 pages.
Intention to Grant received for Danish Patent Application No. PA201770418, dated Nov. 16, 2018, 3 pages.
Intention to Grant received for Danish Patent Application No. PA201770419, dated Mar. 28, 2018, 2 pages.
Intention to Grant received for Danish Patent Application No. PA201770714, dated Feb. 15, 2019, 2 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.
Intention to Grant received for Danish Patent Application No. PA201770782, dated Aug. 8, 2019, 2 pages.
Intention to Grant received for Danish Patent Application No. PA201770804, dated Apr. 10, 2019, 2 pages.
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Intention to Grant received for Danish Patent Application No. PA201870855, dated Jul. 13, 2020, 2 pages.
Intention to Grant received for Danish Patent Application No. PA201970127, dated Apr. 21, 2020, 2 pages.
Intention to Grant received for European Patent Application No. 12181538.5, dated Feb. 20, 2015, 8 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
Intention to Grant received for European Patent Application No. 13171145.9, dated Feb. 21, 2019, 8 pages.
Intention to Grant received for European Patent Application No. 14853215.3, dated Jun. 27, 2018, 9 pages.
Intention to Grant received for European Patent Application No. 15168475.0, dated Feb. 4, 2020, 9 pages.
Intention to Grant received for European Patent Application No. 15168475.0, dated Jan. 22, 2021, 8 pages.
Intention to Grant received for European Patent Application No. 15168475.0, dated Jul. 7, 2021, 8 pages.
Intention to Grant received for European Patent Application No. 17853654.6, dated Nov. 23, 2020, 8 pages.
Intention to Grant received for European Patent Application No. 18190250.3, dated May 15, 2020, 9 pages.
Intention to grant received for European Patent Application No. 18704335.1, dated Apr. 17, 2020, 6 pages.
International Preliminary Report on Patentability received for PCT Patent Application No. PCT/US2018/014658, dated Nov. 28, 2019, 14 pages.
International Preliminary Report on Patentability received for PCT Patent Application No. PCT/US2018/049289, dated Mar. 19, 2020, 9 pages.
International Preliminary Report on Patentability received for PCT Patent Application No. PCT/US2008/075738, completed on Jan. 28, 2010, 15 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2014/054800, dated Mar. 31, 2016, 27 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/031748, dated Dec. 20, 2018, 10 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2017/049760, dated Apr. 4, 2019, 9 pages.
International Preliminary Report on Patentability received for PCT Patent Application No. PCT/US2017/058368, dated Feb. 19, 2019, 5 pages.
International Preliminary Report on Patentability received for PCT Patent Application No. PCT/US2017/49500, dated Mar. 21, 2019, 14 pages.
International Preliminary Report on Patentability received for PCT Patent Application No. PCT/US2018/015603, dated Mar. 19, 2020, 8 pages.
International Preliminary Report on Patentability received for PCT Patent Application No. PCT/US2019/035092, dated Dec. 17, 2020, 10 pages.
International Preliminary Report on Patentability received for PCT Patent Application No. PCT/US2019/049227, dated Apr. 8, 2021, 11 pages.
International Preliminary Report on Patentability received for PCT Patent Application No. PCT/US2019/049239, dated Apr. 8, 2021, 12 pages.
International Search Report and Written Opinion received for PCT Application No. PCT/US2015/033326, dated Aug. 10, 2015, 13 pages.
International Search Report and Written Opinion received for PCT Patent Application No. PCT/US17/31086, dated Sep. 8, 2017, 15 pages.
International Search Report and Written Opinion received for PCT Patent Application No. PCT/US17/49760, dated Jan. 19, 2018, 12 pages.
International Search Report and Written Opinion received for PCT Patent Application No. PCT/US2008/075738, dated Jul. 2, 2009, 14 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2014/054800, dated Jan. 29, 2015, 33 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2017/058368, dated Feb. 23, 2018, 12 pages.
International Search Report and Written Opinion received for PCT Patent Application No. PCT/US2017/49500, dated Jan. 18, 2018, 18 pages.

(56) References Cited

OTHER PUBLICATIONS

International Search Report and Written Opinion received for PCT Patent Application No. PCT/US2018/014658, dated Jun. 6, 2018, 20 pages.
International Search Report and Written Opinion received for PCT Patent Application No. PCT/US2018/015603, dated Jun. 22, 2018, 13 pages.
International Search Report and Written Opinion received for PCT Patent Application No. PCT/US2018/049289, dated Feb. 19, 2019, 12 pages.
International Search Report and Written Opinion received for PCT Patent Application No. PCT/US2019/035092, dated Jan. 16, 2020, 16 pages.
International Search Report and Written Opinion received for PCT Patent Application No. PCT/US2019/049227, dated Dec. 12, 2019, 14 pages.
International Search Report and Written Opinion received for PCT Patent Application No. PCT/US2019/049239, dated Jan. 22, 2020, 18 pages.
International Search Report and Written Opinion received for PCT Patent Application No. PCT/US2016/015316, dated Mar. 8, 2016, 13 pages.
Invitation to Pay Addition Fees received for PCT Patent Application No. PCT/US2018/014658, dated Apr. 11, 2018, 14 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fee received for PCT Patent Application No. PCT/US2019/035092, dated Nov. 20, 2019, 6 pages.
Invitation to Pay Additional Fee received for PCT Patent Application No. PCT/US2017/058368, dated Dec. 14, 2017, 2 pages.
Invitation to pay Additional fees received for PCT Patent Application No. PCT/US17/49760, dated Nov. 21, 2017, 2 pages.
Invitation to Pay Additional Fees received for PCT Patent Application No. PCT/US2014/054800, dated Oct. 31, 2014, 2 pages.
Invitation to Pay Additional Fees received for PCT Patent Application No. PCT/US2019/049239, dated Dec. 4, 2019, 10 pages.
IPhone 4S Tips 'N' Tricks: Access the Camera from the Lock Screen—Phones 4u, Youtube, available at <https://www.youtube.com/watch?v=C8eDN4Vu2mg>, Dec. 9, 2011, 2 pages.
Iphoneblog, "iOS 5.0.1 Security Flaw- Bypass the Passcode-Access Camera Roll", Youtube, available at <https://www.youtube.com/watch?v=qd0Fwgaymb0>, Feb. 24, 2012, 2 pages.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31.
Komachi Aneem, "Time Attendance—Face Recognition—Biometrics", Available at <https://www.youtube.com/watch?v=asclTiliSbc>, Feburary 9, 2010, 1 page.
Kurihara Ryo, "Torisetsu of Os X that we want to know", Mac Fan, Japan, Mai Navi Co, Ltd, vol. 21, No. 6, Jun. 1, 2013, 8 pages.
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Managing Windows User Accounts on Your Home Computer, Available online at: https://www.informit.com/articles/article.aspx?p=478948&seqNum=8, Jun. 23, 2006, 2 pages.
Minutes of Oral Proceeding received for European Patent Application No. 16703893.4, dated Jul. 22, 2019, 9 pages.
Minutes of the Oral Proceedings received for European Application No. 12770400.5, dated Nov. 6, 2018, 7 pages.
Minutes of the Oral Proceedings received for European Patent Application No. 15727291.5, dated Jun. 29, 2020, 8 pages.
Minutes of the Oral Proceedings received for European Patent Application No. 15728352.4, dated May 27, 2020, 3 pages.
Minutes of the Oral Proceedings received for European Patent Application No. 16201205.8, dated Jun. 29, 2020, 6 pages.
Minutes of the Oral Proceedings received for European Patent Application No. 19171661.2, dated Oct. 15, 2020, 5 pages.
Naver Blog, "How to Use Smart Wallet and Registered Card", Online Available at <http://feena74.blog.me/140185758401>, Mar. 29, 2013, 20 pages.
Nhdanh -Protocol Corp, "How To Enroll Face Enbioaccess T9 Nitgen Korea—Đăng Ký Khuôn Mặt Enbioaccess T9 Nitgen", Available online at <https://www.youtube.com/watch?v=mFn03PD4NIE>, Mar. 30, 2017, 1 page.
Nomad, Studio, Hajimete-no-smartphone-no-komatta-wo-sakutto-kaiketsu
Non-Final Office Action received for U.S. Appl. No. 12/207,370, dated Aug. 2, 2012, 16 pages.
Non-Final Office Action received for U.S. Appl. No. 12/207,370, dated May 6, 2011, 15 pages.
Non-Final Office Action received for U.S. Appl. No. 12/207,370, dated Oct. 17, 2013, 17 pages.
Non-Final Office Action received for U.S. Appl. No. 12/207,374, dated Apr. 15, 2011, 13 pages.
Non-Final Office Action received for U.S. Appl. No. 12/207,374, dated Jun. 7, 2013, Jun. 7, 2013, 26 pages.
Non-Final Office Action received for U.S. Appl. No. 12/207,374, dated May 24, 2012, 20 pages.
Non-Final Office Action received for U.S. Appl. No. 13/243,045, dated Jun. 12, 2019, 11 pages.
Non-Final Office Action received for U.S. Appl. No. 13/243,326, dated Feb. 14, 2013, 13 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/142,669, dated Oct. 28, 2015, 14 pages.
Non-Final Office Action received for U.S. Appl. No. 14/142,669, dated Sep. 12, 2014, 11 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/311,214, dated Apr. 10, 2015, 12 pages.
Non-Final Office Action received for U.S. Appl. No. 14/311,214, dated Sep. 18, 2014, 10 pages.
Non-Final Office Action received for U.S. Appl. No. 14/479,088, dated Jul. 6, 2015, 10 pages.
Non-Final Office Action received for U.S. Appl. No. 14/479,088, dated Nov. 18, 2014, 8 pages.
Non-Final Office Action received for U.S. Appl. No. 14/480,183, dated Oct. 18, 2016, 12 pages.
Non-Final Office Action received for U.S. Appl. No. 14/503,072, dated Jan. 26, 2015, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Jan. 30, 2015, 16 pages.
Non-Final Office Action received for U.S. Appl. No. 14/503,296, dated Oct. 5, 2016., 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/612,214, dated Jul. 29, 2015, 12 pages.
Non-Final Office Action received for U.S. Appl. No. 14/612,214, dated Nov. 20, 2019, 11 pages.
Non-Final Office Action received for U.S. Appl. No. 14/642,366, dated Aug. 24, 2015, 7 pages.

(56) References Cited

OTHER PUBLICATIONS

Non-Final Office Action received for U.S. Appl. No. 15/134,638, dated Sep. 20, 2016, 6 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016., 10 pages.
Non-Final Office Action received for U.S. Appl. No. 15/269,801, dated Dec. 30, 2016, 17 pages.
Non-Final Office Action received for U.S. Appl. No. 15/274,086, dated Jan. 11, 2017, 21 pages.
Non-Final Office Action received for U.S. Appl. No. 15/274,910, dated Apr. 6, 2020, 33 pages.
Non-Final Office Action received for U.S. Appl. No. 15/274,910, dated Oct. 18, 2018, 26 pages.
Non-Final Office Action received for U.S. Appl. No. 15/294,439, dated Jan. 26, 2018, 18 pages.
Non-Final Office Action received for U.S. Appl. No. 15/351,230, dated Apr. 18, 2019, 16 pages.
Non-Final Office Action received for U.S. Appl. No. 15/433,320, dated Jul. 31, 2020, 13 pages.
Non-Final Office Action received for U.S. Appl. No. 15/470,752, dated Aug. 28, 2018, 12 pages.
Non-Final Office Action received for U.S. Appl. No. 15/470,752, dated Jul. 28, 2017, 11 pages.
Non-Final Office Action received for U.S. Appl. No. 15/714,887, dated May 27, 2020, 48 pages.
Non-Final Office Action received for U.S. Appl. No. 15/714,887, dated May 30, 2019, 47 pages.
Non-Final Office Action received for U.S. Appl. No. 15/782,068, dated Jun. 3, 2019, 17 pages.
Non-Final Office Action received for U.S. Appl. No. 15/823,269, dated Jun. 23, 2020, 14 pages.
Non-Final Office Action received for U.S. Appl. No. 15/845,794, dated Oct. 15, 2018, 8 pages.
Non-Final Office Action received for U.S. Appl. No. 15/866,341, dated Nov. 13, 2018, 11 pages.
Non-Final Office Action received for U.S. Appl. No. 15/872,685, dated Mar. 27, 2018, 9 pages.
Non-Final Office Action received for U.S. Appl. No. 15/894,221, dated Jul. 25, 2018, 21 pages.
Non-Final Office Action received for U.S. Appl. No. 15/899,966, dated May 4, 2018, 10 pages.
Non-Final Office Action received for U.S. Appl. No. 15/900,047, dated May 8, 2018, 7 pages.
Non-Final Office Action received for U.S. Appl. No. 15/903,456, dated Sep. 6, 2018, 20 pages.
Non-Final Office Action received for U.S. Appl. No. 15/992,722, dated Aug. 6, 2020, 7 pages.
Non-Final Office Action received for U.S. Appl. No. 16/035,419, dated Jan. 30, 2019, 24 pages.
Non-Final Office Action received for U.S. Appl. No. 16/125,267, dated Jul. 2, 2020, 20 pages.
Non-Final Office Action received for U.S. Appl. No. 16/125,267, dated Mar. 26, 2021, 20 pages.
Non-Final Office Action received for U.S. Appl. No. 16/147,023, dated Dec. 26, 2018, 17 pages.
Non-Final Office Action received for U.S. Appl. No. 16/147,115, dated Dec. 13, 2018, 12 pages.
Non-Final Office Action received for U.S. Appl. No. 16/164,561, dated Jan. 4, 2019, 14 pages.
Non-Final Office Action received for U.S. Appl. No. 16/369,355, dated Apr. 29, 2021, 16 pages.
Non-Final Office Action received for U.S. Appl. No. 16/369,473, dated Apr. 27, 2020, 12 pages.
Non-Final Office Action received for U.S. Appl. No. 16/369,473, dated Jun. 11, 2021, 19 pages.
Non-Final Office Action received for U.S. Appl. No. 16/434,865, dated Jan. 16, 2020, 9 pages.
Non-Final Office Action received for U.S. Appl. No. 16/542,084, dated Jan. 24, 2020, 21 pages.
Non-Final Office Action received for U.S. Appl. No. 16/553,622, dated May 29, 2020, 11 pages.
Non-Final Office Action received for U.S. Appl. No. 16/667,174, dated Jun. 24, 2021, 16 pages.
Non-Final Office Action received for U.S. Appl. No. 16/667,271, dated Dec. 13, 2019, 8 pages.
Non-Final Office Action received for U.S. Appl. No. 16/670,949, dated Dec. 9, 2020, 11 pages.
Non-Final Office Action received for U.S. Appl. No. 16/789,132, dated Aug. 5, 2021, 25 pages.
Non-Final Office Action received for U.S. Appl. No. 16/987,003, dated May 10, 2021, 20 pages.
Non-Final Office Action received for U.S. Appl. No. 16/990,974, dated Oct. 15, 2020, 6 pages.
Non-Final Office Action received for U.S. Appl. No. 17/087,855, dated Jul. 12, 2021, 17 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Non-Final Office Action received for U.S. Appl. No. 13/243,045, dated Mar. 17, 2015, 9 pages.
Non-Final Office Action received for U.S. Appl. No. 14/870,694, dated Sep. 23, 2016, 13 pages.
Notice of Acceptance received for Australian Patent Application No. 2018200628, dated Jun. 13, 2019, 3 pages.
Notice of Acceptance received for Australian Patent Application No. 2008305338, dated Oct. 27, 2011, 1 page.
Notice of Acceptance received for Australian Patent Application No. 2014334869, dated Jan. 3, 2018, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016201310, dated Feb. 21, 2018, 3 pages.
Notice of Acceptance received for Australian Patent Application No. 2016203896, dated Mar. 2, 2018, 3 pages.
Notice of Acceptance received for Australian Patent Application No. 2016203898 dated Feb. 21, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2017317605, dated Aug. 28, 2019, 3 pages.
Notice of Acceptance received for Australian Patent Application No. 2017330208, dated Nov. 28, 2019, 3 pages.
Notice of Acceptance received for Australian Patent Application No. 2018202559, dated Oct. 21, 2019, 3 pages.
Notice of Acceptance received for Australian Patent Application No. 2018270420, dated Jul. 21, 2021, 3 pages.
Notice of Acceptance received for Australian Patent Application No. 2018279788, dated Nov. 6, 2019, 3 pages.
Notice of Acceptance received for Australian Patent Application No. 2018312629, dated Nov. 7, 2019, 4 pages.

(56) References Cited

OTHER PUBLICATIONS

Notice of Acceptance received for Australian Patent Application No. 2019200360, dated Mar. 15, 2019, 3 pages.
Notice of Acceptance received for Australian Patent Application No. 2019201101, dated May 6, 2019, 3 pages.
Notice of Acceptance received for Australian Patent Application No. 2019203473, dated Nov. 7, 2019, 3 pages.
Notice of Acceptance received for Australian Patent Application No. 2019204387, dated Dec. 4, 2020, 3 pages.
Notice of Acceptance received for Australian Patent Application No. 2019250143, dated Jan. 29, 2021, 3 pages.
Notice of Acceptance received for Australian Patent Application No. 2019346842, dated Jan. 21, 2021, 3 pages.
Notice of Acceptance received for Australian Patent Application No. 2020200685, dated Oct. 29, 2020, 3 pages.
Notice of Acceptance received for Australian Patent Application No. 2020200795, dated Feb. 28, 2020, 3 pages.
Notice of Acceptance received for Australian Patent Application No. 2020201306, dated Mar. 12, 2020, 3 pages.
Notice of Acceptance received for Australian Patent Application No. 2020201721, dated Jul. 6, 2021, 3 pages.
Notice of Acceptance received for Australian Patent Application No. 2020239783, dated Mar. 2, 2021, 3 pages.
Notice of Allowance received for Australian Patent Application No. 2015202397, dated Feb. 15, 2017, 3 pages.
Notice of Allowance received for Chinese Patent Application No. 200880108306.1, dated Oct. 28, 2014, 2 pages.
Notice of Allowance received for Chinese Patent Application No. 201280047459.6, dated Jan. 31, 2018, 2 pages.
Notice of Allowance received for Chinese Patent Application No. 201410407626.4, dated Aug. 27, 2020, 2 pages.
Notice of Allowance received for Chinese Patent Application No. 201480058054.1, dated Jul. 8, 2019, 2 pages.
Notice of Allowance received for Chinese Patent Application No. 201520357381.9, dated Jul. 29, 2015, 4 pages.
Notice of Allowance received for Chinese Patent Application No. 201520358683.8, dated Mar. 10, 2016, 5 pages.
Notice of Allowance received for Chinese Patent Application No. 201610069731.0, dated Sep. 6, 2019, 2 pages.
Notice of Allowance received for Chinese Patent Application No. 201620480708.6, dated Apr. 20, 2017, 3 pages.
Notice of Allowance received for Chinese Patent Application No. 201620480846.4, dated Apr. 20, 2017, 3 pages.
Notice of Allowance received for Chinese Patent Application No. 201710093861.2, dated Sep. 24, 2019, 4 pages.
Notice of Allowance received for Chinese Patent Application No. 201780002398.4, dated Jun. 17, 2019, 2 pages.
Notice of Allowance received for Chinese Patent Application No. 201810338038.8, dated Jun. 30, 2020, 2 pages.
Notice of Allowance received for Chinese Patent Application No. 201810954931.3, dated Jun. 23, 2021, 4 pages.
Notice of Allowance received for Chinese Patent Application No. 201810955077.2, dated Jul. 14, 2021, 2 pages.
Notice of Allowance received for Chinese Patent Application No. 201811460172.1, dated Jan. 11, 2021, 2 pages.
Notice of Allowance received for Chinese Patent Application No. 201910278273.5, dated Nov. 19, 2020, 2 pages.
Notice of Allowance received for Chinese Patent Application No. 201910354714.5, dated Oct. 14, 2020, 2 pages.
Notice of Allowance received for Chinese Patent Application No. 201910498825.3, dated Mar. 8, 2021, 2 pages.
Notice of Allowance received for Chinese Patent Application No. 201910744886.3, dated Jun. 3, 2021, 2 pages.
Notice of Allowance received for Chinese Patent Application No. 201910899698.8, dated Oct. 23, 2020, 4 pages.
Notice of Allowance received for Japanese Patent Application No. 2013-098406, dated Jan. 23, 2017, 18 pages.
Notice of Allowance received for Japanese Patent Application No. 2015-083696, dated Jan. 6, 2017, 3 pages.
Notice of Allowance received for Japanese Patent Application No. 2016-131998, dated Nov. 30, 2018, 4 pages.
Notice of Allowance received for Japanese Patent Application No. 2016-224506, dated Jan. 24, 2020, 4 pages.
Notice of Allowance received for Japanese Patent Application No. 2016-224507, dated Mar. 26, 2019, 3 pages.
Notice of Allowance received for Japanese Patent Application No. 2016-224508, dated Jun. 20, 2017, 3 pages.
Notice of Allowance received for Japanese Patent Application No. 2016-540927, dated May 14, 2018., 4 pages.
Notice of Allowance received for Japanese Patent Application No. 2016-558332, dated Jan. 11, 2019, 4 pages.
Notice of Allowance received for Japanese Patent Application No. 2016-569665, dated Feb. 22, 2019, 4 pages.
Notice of Allowance received for Japanese Patent Application No. 2017-013383, dated Mar. 31, 2017, 3 pages.
Notice of Allowance received for Japanese Patent Application No. 2017-085582, dated Nov. 30, 2018, 4 pages.
Notice of Allowance received for Japanese Patent Application No. 2017-540616, dated Apr. 23, 2019, 4 pages.
Notice of Allowance received for Japanese Patent Application No. 2018-158482, dated Sep. 7, 2020, 4 pages.
Notice of Allowance received for Japanese Patent Application No. 2018-241505, dated Oct. 4, 2019, 4 pages.
Notice of Allowance received for Japanese Patent Application No. 2018-504997, dated Aug. 3, 2018, 4 pages.
Notice of Allowance received for Japanese Patent Application No. 2018-551159, dated Jun. 15, 2020, 4 pages.
Notice of Allowance received for Japanese Patent Application No. 2018-560107, dated Dec. 6, 2019, 4 pages.
Notice of Allowance received for Japanese Patent Application No. 2019-053379, dated Nov. 16, 2020, 4 pages.
Notice of Allowance received for Japanese Patent Application No. 2019-096220, dated Nov. 25, 2019, 4 pages.
Notice of Allowance received for Japanese Patent Application No. 2019-107235, dated May 15, 2020, 4 pages.
Notice of Allowance received for Japanese Patent Application No. 2019-194603, dated Apr. 19, 2021, 4 pages.
Notice of Allowance received for Japanese Patent Application No. 2019-238894, dated Oct. 5, 2020, 4 pages.
Notice of Allowance received for Japanese Patent Application No. 2019-510416, dated Oct. 12, 2020, 4 pages.
Notice of Allowance received for Japanese Patent Application No. 2019-511975, dated Dec. 14, 2020, 4 pages.
Notice of Allowance received for Japanese Patent Application No. 2020-569806, dated Jul. 12, 2021, 4 pages.
Notice of Allowance received for Korean Patent Application No. 10-2010-7008899, dated Feb. 12, 2016, 3 pages.
Notice of Allowance received for Korean Patent Application No. 10-2014-7004771, dated Oct. 29, 2015, 3 pages.
Notice of Allowance received for Korean Patent Application No. 10-2014-7004772, dated Feb. 12, 2016, 4 pages.
Notice of Allowance received for Korean Patent Application No. 10-2014-7004773, dated Jan. 7, 2016, 3 pages.
Notice of Allowance received for Korean Patent Application No. 10-2014-7025441, dated Feb. 26, 2016, 3 pages.
Notice of Allowance received for Korean Patent Application No. 10-2015-7004548, dated Feb. 26, 2016, 3 pages.
Notice of Allowance received for Korean Patent Application No. 10-2016-7009347, dated May 10, 2018, 4 pages.
Notice of Allowance received for Korean Patent Application No. 10-2016-7009632, dated Aug. 17, 2018., 4 pages.
Notice of Allowance received for Korean Patent Application No. 10-2016-7035555, dated Sep. 23, 2019, 3 pages.
Notice of Allowance received for Korean Patent Application No. 10-2017-0022365, dated Mar. 27, 2018, 4 pages.
Notice of Allowance received for Korean Patent Application No. 10-2017-0022546, dated Feb. 27, 2018, 4 pages.
Notice of Allowance received for Korean Patent Application No. 10-2017-0022582, dated Feb. 27, 2020, 5 pages.
Notice of Allowance received for Korean Patent Application No. 10-2017-7012145, dated Oct. 30, 2019, 3 pages.

(56) References Cited

OTHER PUBLICATIONS

Notice of Allowance received for Korean Patent Application No. 10-2017-7015582, dated Dec. 27, 2018, 5 pages.
Notice of Allowance received for Korean Patent Application No. 10-2017-7024513, dated Apr. 20, 2018, 5 pages.
Notice of Allowance received for Korean Patent Application No. 10-2018-7022895, dated Feb. 22, 2019, 4 pages.
Notice of Allowance received for Korean Patent Application No. 10-2018-7028845, dated Apr. 16, 2020, 5 pages.
Notice of Allowance received for Korean Patent Application No. 10-2018-7032467, dated Jan. 28, 2019, 4 pages.
Notice of Allowance received for Korean Patent Application No. 10-2018-7033301, dated Feb. 20, 2019, 5 pages.
Notice of Allowance received for Korean Patent Application No. 10-2019-7003374, dated Oct. 4, 2019, 9 pages.
Notice of Allowance received for Korean Patent Application No. 10-2019-7003836, dated Oct. 4, 2019, 4 pages.
Notice of Allowance received for Korean Patent Application No. 10-2019-7004734, dated Oct. 24, 2019, 6 pages.
Notice of Allowance received for Korean Patent Application No. 10-2019-7005136, dated Feb. 19, 2021, 5 pages.
Notice of Allowance received for Korean Patent Application No. 10-2019-7005925, dated Jan. 21, 2020, 6 pages.
Notice of Allowance received for Korean Patent Application No. 10-2019-7014494, dated Mar. 19, 2020, 4 pages.
Notice of Allowance received for Korean Patent Application No. 10-2019-7014988, dated Jan. 19, 2020, 4 pages.
Notice of Allowance received for Korean Patent Application No. 10-2019-7038021, dated May 2, 2020, 5 pages.
Notice of Allowance received for Korean Patent Application No. 10-2020-0048600, dated Apr. 30, 2020, 5 pages.
Notice of Allowance received for Korean Patent Application No. 10-2020-0097418, dated Apr. 27, 2021, 5 pages.
Notice of Allowance received for Korean Patent Application No. 10-2020-7002929, dated Nov. 26, 2020, 3 pages.
Notice of Allowance received for Korean Patent Application No. 10-2020-7011172, dated Aug. 25, 2020, 7 pages.
Notice of Allowance received for Korean Patent Application No. 10-2020-7011424, dated Jan. 21, 2021, 4 pages.
Notice of Allowance received for Korean Patent Application No. 10-2020-7017803, dated Nov. 5, 2020, 6 pages.
Notice of Allowance received for Korean Patent Application No. 10-2020-7027862, dated Jun. 29, 2021, 5 pages.
Notice of Allowance received for Korean Patent Application No. 10-2020-7036748, dated Jan. 25, 2021, 3 pages.
Notice of Allowance received for Korean Patent Application No. 10-2021-7005691, dated Mar. 29, 2021, 3 pages.
Notice of Allowance received for Korean Patent Application No. 10-2021-7020549, dated Jul. 13, 2021, 3 pages.
Notice of Allowance received for Korean Patent Application No. 10-2014-7008348, dated Feb. 21, 2019, 5 pages.
Notice of Allowance received for Taiwan Patent Application No. 097134592, dated Aug. 12, 2014, 3 pages.
Notice of Allowance received for Taiwan Patent Application No. 101107082, dated Oct. 22, 2014, 2 pages.
Notice of Allowance received for Taiwanese Patent Application No. 103131074, dated Nov. 17, 2015, 3 pages.
Notice of Allowance received for Taiwanese Patent Application No. 103136545, dated Nov. 27, 2017, 4 pages.
Notice of Allowance received for Taiwanese Patent Application No. 104117508, dated Sep. 18, 2019, 5 pages.
Notice of Allowance received for Taiwanese Patent Application No. 104140890, dated Oct. 25, 2017, 5 pages.
Notice of Allowance received for Taiwanese Patent Application No. 106141250, dated May 24, 2018, 7 pages.
Notice of Allowance received for Taiwanese Patent Application No. 107121719, dated Sep. 27, 2018, 7 pages.
Notice of Allowance received for Taiwanese Patent Application No. 107138003, dated Aug. 30, 2019, 4 pages.
Notice of Allowance received for U.S. Appl. No. 16/369,355, dated Sep. 1, 2021, 10 pages.
Notice of Allowance received for the U.S. Appl. No. 14/503,381, dated Dec. 16, 2015, 8 pages.
Notice of Allowance received for U.S. Appl. No. 12/207,370, dated Jun. 7, 2013, 9 pages.
Notice of Allowance received for U.S. Appl. No. 12/207,370, dated Mar. 6, 2014, 5 pages.
Notice of Allowance received for U.S. Appl. No. 12/207,374, dated Aug. 29, 2014, 8 pages.
Notice of Allowance received for U.S. Appl. No. 12/207,374, dated Dec. 4, 2014, 8 pages.
Notice of Allowance received for U.S. Appl. No. 13/243,045, dated Aug. 4, 2021, 8 pages.
Notice of Allowance received for U.S. Appl. No. 13/243,326, dated Sep. 23, 2013, 11 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/142,657, dated Jan. 8, 2015, 5 pages.
Notice of Allowance received for U.S. Appl. No. 14/142,657, dated Jul. 23, 2015, 2 pages.
Notice of Allowance received for U.S. Appl. No. 14/142,657, dated Jun. 29, 2015, 7 pages.
Notice of Allowance received for U.S. Appl. No. 14/142,657, dated Sep. 10, 2014, 9 pages.
Notice of Allowance received for U.S. Appl. No. 14/142,661, dated Aug. 3, 2015, 10 pages.
Notice of Allowance received for U.S. Appl. No. 14/142,661, dated Sep. 28, 2015, 9 pages.
Notice of Allowance received for U.S. Appl. No. 14/142,669, dated Aug. 25, 2016, 2 pages.
Notice of Allowance received for U.S. Appl. No. 14/142,669, dated Jun. 14, 2016, 5 pages.
Notice of Allowance received for U.S. Appl. No. 14/142,669, dated Sep. 21, 2016, 2 pages.
Notice of Allowance received for U.S. Appl. No. 14/142,674, dated Feb. 18, 2015, 7 pages.
Notice of Allowance received for U.S. Appl. No. 14/142,674, dated Jan. 23, 2015, 7 pages.
Notice of Allowance received for U.S. Appl. No. 14/142,674, dated Sep. 26, 2014, 18 pages.
Notice of Allowance received for U.S. Appl. No. 14/255,765, dated Jun. 12, 2014, 10 pages.
Notice of Allowance received for U.S. Appl. No. 14/285,378, dated May 19, 2016, 10 pages.
Notice of Allowance received for U.S. Appl. No. 14/479,088, dated Mar. 9, 2016, 2 pages.
Notice of Allowance received for U.S. Appl. No. 14/479,088, dated Nov. 12, 2015, 7 pages.
Notice of Allowance received for U.S. Appl. No. 14/480,183, dated Nov. 29, 2017, 7 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.
Notice of Allowance received for U.S. Appl. No. 14/503,364, dated Jun. 16, 2016, 11 pages.
Notice of Allowance received for U.S. Appl. No. 14/612,214, dated Apr. 15, 2020, 8 pages.
Notice of Allowance received for U.S. Appl. No. 14/642,366, dated Jan. 14, 2016, 8 pages.
Notice of Allowance received for U.S. Appl. No. 14/661,796, dated Jul. 7, 2015, 10 pages.
Notice of Allowance received for U.S. Appl. No. 14/661,796, dated Jul. 23, 2015, 2 pages.
Notice of Allowance received for U.S. Appl. No. 14/869,831, dated Jul. 2, 2021, 9 pages.

(56) References Cited

OTHER PUBLICATIONS

Notice of Allowance received for U.S. Appl. No. 14/870,694, dated Dec. 11, 2018, 6 pages.
Notice of Allowance received for U.S. Appl. No. 14/870,694, dated Jul. 31, 2018, 7 pages.
Notice of allowance received for U.S. Appl. No. 15/017,436, dated May 27, 2016, 17 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/137,944, dated Dec. 21, 2017, 8 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/351,230, dated Dec. 11, 2019, 11 pages.
Notice of Allowance received for U.S. Appl. No. 15/357,873, dated Aug. 23, 2017, 10 pages.
Notice of Allowance received for U.S. Appl. No. 15/357,873, dated Jan. 8, 2018, 9 pages.
Notice of Allowance received for U.S. Appl. No. 15/433,320, dated Apr. 1, 2021, 19 pages.
Notice of Allowance received for U.S. Appl. No. 15/470,752, dated Feb. 7, 2019, 11 pages.
Notice of Allowance received for U.S. Appl. No. 15/782,068, dated Sep. 24, 2019, 7 pages.
Notice of Allowance received for U.S. Appl. No. 15/823,269, dated Dec. 10, 2020, 10 pages.
Notice of Allowance received for U.S. Appl. No. 15/823,269, dated Feb. 22, 2021, 7 pages.
Notice of Allowance received for U.S. Appl. No. 15/823,269, dated Jun. 3, 2021, 6 pages.
Notice of Allowance received for U.S. Appl. No. 15/823,269, dated Mar. 10, 2021, 6 pages.
Notice of Allowance received for U.S. Appl. No. 15/823,269, dated Mar. 31, 2021, 9 pages.
Notice of Allowance received for U.S. Appl. No. 15/845,794, dated Feb. 14, 2019, 6 pages.
Notice of Allowance received for U.S. Appl. No. 15/866,341, dated Jul. 26, 2019, 8 pages.
Notice of Allowance received for U.S. Appl. No. 15/872,685, dated Mar. 8, 2019, 10 pages.
Notice of Allowance received for U.S. Appl. No. 15/894,221, dated Apr. 11, 2019, 5 pages.
Notice of Allowance received for U.S. Appl. No. 15/894,221, dated Aug. 13, 2019, 2 pages.
Notice of Allowance received for U.S. Appl. No. 15/894,221, dated Feb. 1, 2019, 5 pages.
Notice of Allowance received for U.S. Appl. No. 15/894,221, dated Mar. 4, 2019, 2 pages.
Notice of Allowance received for U.S. Appl. No. 15/899,966, dated Mar. 21, 2019, 7 pages.
Notice of Allowance received for U.S. Appl. No. 15/899,996, dated Apr. 24, 2018, 9 pages.
Notice of Allowance received for U.S. Appl. No. 15/900,047, dated Dec. 5, 2018, 10 pages.
Notice of Allowance received for U.S. Appl. No. 15/903,456, dated May 1, 2019, 6 pages.
Notice of Allowance received for U.S. Appl. No. 15/945,610, dated May 20, 2019, 7 pages.
Notice of Allowance received for U.S. Appl. No. 15/992,722, dated Oct. 19, 2020, 5 pages.
Notice of Allowance received for U.S. Appl. No. 16/035,419, dated May 24, 2019, 14 pages.
Notice of Allowance received for U.S. Appl. No. 16/131,767, dated Sep. 6, 2019, 7 pages.
Notice of Allowance received for U.S. Appl. No. 16/147,023, dated Apr. 3, 2020, 2 pages.
Notice of Allowance received for U.S. Appl. No. 16/147,023, dated Aug. 13, 2020, 2 pages.
Notice of Allowance received for U.S. Appl. No. 16/147,023, dated Feb. 27, 2020, 2 pages.
Notice of Allowance received for U.S. Appl. No. 16/147,023, dated Jan. 31, 2020, 7 pages.
Notice of Allowance received for U.S. Appl. No. 16/147,023, dated Jul. 2, 2020, 2 pages.
Notice of Allowance received for U.S. Appl. No. 16/147,023, dated Jul. 21, 2020, 2 pages.
Notice of Allowance received for U.S. Appl. No. 16/147,023, dated Jun. 1, 2020, 2 pages.
Notice of Allowance received for U.S. Appl. No. 16/147,023, dated Jun. 18, 2020, 2 pages.
Notice of Allowance received for U.S. Appl. No. 16/147,023, dated Mar. 27, 2020, 2 pages.
Notice of Allowance received for U.S. Appl. No. 16/147,023, dated May 5, 2020, 2 pages.
Notice of Allowance received for U.S. Appl. No. 16/147,023, dated May 20, 2020, 7 pages.
Notice of Allowance received for U.S. Appl. No. 16/147,115, dated Oct. 30, 2019, 10 pages.
Notice of Allowance received for U.S. Appl. No. 16/164,561, dated Apr. 8, 2020, 5 pages.
Notice of Allowance received for U.S. Appl. No. 16/386,707, dated Dec. 31, 2020, 18 pages.
Notice of Allowance received for U.S. Appl. No. 16/434,865, dated Apr. 7, 2020, 5 pages.
Notice of Allowance received for U.S. Appl. No. 16/456,839, dated Apr. 15, 2021, 8 pages.
Notice of Allowance received for U.S. Appl. No. 16/456,839, dated Dec. 11, 2020, 10 pages.
Notice of Allowance received for U.S. Appl. No. 16/542,084, dated May 20, 2020, 7 pages.
Notice of Allowance received for U.S. Appl. No. 16/553,622, dated Sep. 11, 2020, 8 pages.
Notice of Allowance received for U.S. Appl. No. 16/667,271, dated May 12, 2020, 11 pages.
Notice of Allowance received for U.S. Appl. No. 16/670,949, dated May 27, 2021, 7 pages.
Notice of Allowance received for U.S. Appl. No. 16/990,974, dated Apr. 28, 2021, 5 pages.
Notice of Allowance received for U.S. Appl. No. 16/990,974, dated Jan. 22, 2021, 7 pages.
Notice of Allowance received for U.S. Appl. No. 17/015,429, dated Jun. 17, 2021, 10 pages.
Notice of Allowance received for U.S. Appl. No. 14/311,214, dated Jan. 21, 2016, 7 pages.
Notice of Allowance received for U.S. Appl. No. 14/142,661, dated Dec. 3, 2015, 2 pages.
Notice of Allowance received for U.S. Appl. No. 14/479,088, dated Dec. 23, 2015, 5 pages.
Notice of Allowance received for U.S. Appl. No. 14/479,088, dated Jan. 11, 2016, 2 pages.
Notice of Allowance received for U.S. Appl. No. 14/873,023, dated Dec. 23, 2015, 10 pages.
Notice of Allowance received for U.S. Appl. No. 14/873,023, dated Jan. 14, 2016, 2 pages.
Notice of Preliminary Rejection received for Korean Patent Application No. 10-2014-7025441, dated Jun. 12, 2015, 9 pages.

(56) References Cited

OTHER PUBLICATIONS

Notice of Preliminary Rejection received for Korean Patent Application No. 10-2015-7004548, dated Jun. 12, 2015, 8 pages.
Notice of Preliminary Rejection received from Korean Patent Application No. 10-2015-7010262, dated Jun. 12, 2015, 5 pages.
Office Action received for Australian Patent Application No. 2008305338, dated Mar. 21, 2011, 3 pages.
Office Action received for Australian Patent Application No. 2008305338, dated Oct. 19, 2010, 3 pages.
Office Action received for Australian Patent Application No. 2012200716, dated Jul. 16, 2014, 4 pages.
Office Action received for Australian Patent Application No. 2012200716, dated Nov. 15, 2013, 3 pages.
Office Action received for Australian Patent Application No. 2014204462, dated May 8, 2015, 4 pages.
Office Action received for Australian Patent Application No. 2014204462, dated Apr. 29, 2016, 3 pages.
Office Action received for Australian Patent Application No. 2014334869, dated Jan. 11, 2017, 4 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016102031, dated Feb. 28, 2017, 4 pages.
Office Action received for Australian Patent Application No. 2016201310, dated Feb. 28, 2017., 3 pages.
Office Action received for Australian Patent Application No. 2016203896, dated Jan. 19, 2018, 4 pages.
Office Action received for Australian Patent Application No. 2016203896, dated Mar. 6, 2017., 3 pages.
Office Action received for Australian Patent Application No. 2016203898, dated Dec. 19, 2017, 4 pages.
Office Action received for Australian Patent Application No. 2016203898, dated Feb. 17, 2017., 3 pages.
Office Action received for Australian Patent Application No. 2017100070, dated Mar. 16, 2017, 6 pages.
Office Action received for Australian Patent Application No. 2017100553, dated Aug. 4, 2017, 5 pages.
Office Action received for Australian Patent Application No. 2017100558, dated Feb. 27, 2018, 3 pages.
Office Action received for Australian Patent Application No. 2017100558, dated Sep. 1, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2017317605, dated Apr. 11, 2019, 4 pages.
Office Action received for Australian Patent Application No. 2017317605, dated Feb. 22, 2019, 4 pages.
Office Action received for Australian Patent Application No. 2017324176, dated Apr. 21, 2020, 3 pages.
Office Action received for Australian Patent Application No. 2017324176, dated Aug. 17, 2020, 5 pages.
Office Action received for Australian Patent Application No. 2017324176, dated Feb. 25, 2021, 6 pages.
Office Action received for Australian Patent Application No. 2017324176, dated Feb. 27, 2020, 3 pages.
Office Action received for Australian Patent Application No. 2017324176, dated Jan. 14, 2021, 6 pages.
Office Action received for Australian Patent Application No. 2017330208, dated Jul. 25, 2019, 5 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018200628, dated Jan. 24, 2019, 3 pages.
Office Action received for Australian Patent Application No. 2018202559, dated Apr. 8, 2019, 4 pages.
Office Action Received for Australian Patent Application No. 2018202559, dated Jan. 16, 2019, 6 pages.
Office Action received for Australian Patent Application No. 2018202559, dated Jul. 19, 2019, 5 pages.
Office Action received for Australian Patent Application No. 2018202712, dated Mar. 22, 2019, 5 pages.
Office Action received for Australian Patent Application No. 2018202712, dated Nov. 15, 2019, 5 pages.
Office Action received for Australian Patent Application No. 2018202712, dated Nov. 20, 2018, 12 pages.
Office Action received for Australian Patent Application No. 2018202712, dated Sep. 2, 2019, 4 pages.
Office Action received for Australian Patent Application No. 2018203732, dated Feb. 26, 2019, 5 pages.
Office Action received for Australian Patent Application No. 2018203732, dated Jun. 6, 2019, 4 pages.
Office Action received for Australian Patent Application No. 2018203732, dated Jun. 21, 2018, 3 pages.
Office Action Received for Australian Patent Application No. 2018203732, dated Nov. 30, 2018, 3 pages.
Office Action received for Australian Patent Application No. 2018270420, dated Apr. 19, 2021, 4 pages.
Office Action received for Australian Patent Application No. 2018270420, dated Jan. 7, 2021, 5 pages.
Office Action received for Australian Patent Application No. 2018270420, dated Jul. 21, 2020, 5 pages.
Office Action received for Australian Patent Application No. 2018279788, dated Feb. 8, 2019, 4 pages.
Office Action received for Australian Patent Application No. 2018312629, dated Feb. 25, 2019, 4 pages.
Office Action received for Australian Patent Application No. 2019201101, dated Feb. 28, 2019, 3 pages.
Office Action received for Australian Patent Application No. 2019203473, dated Oct. 25, 2019, 2 pages.
Office Action received for Australian Patent Application No. 2019204387, dated Jun. 17, 2020, 7 pages.
Office Action received for Australian Patent Application No. 2019250143, dated Dec. 3, 2020, 5 pages.
Office Action received for Australian Patent Application No. 2019250143, dated Sep. 15, 2020, 5 pages.
Office Action received for Australian Patent Application No. 2019268070, dated Jan. 29, 2021, 6 pages.

(56) References Cited

OTHER PUBLICATIONS

Office Action received for Australian Patent Application No. 2020200685, dated Apr. 20, 2020, 3 pages.
Office Action received for Australian Patent Application No. 2020200685, dated Aug. 12, 2020, 3 pages.
Office Action received for Australian Patent Application No. 2020200685, dated Feb. 10, 2020, 4 pages.
Office Action received for Australian Patent Application No. 2020201721, dated Feb. 26, 2021, 7 pages.
Office Action received for Australian Patent Application No. 2020203899, dated May 5, 2021, 10 pages.
Office Action received for Australian Patent Application No. 2020204256, dated Jun. 21, 2021, 2 pages.
Office Action received for Australian Patent Application No. 2020239783, dated Oct. 13, 2020, 4 pages.
Office Action received for Australian Patent Application No. 2020273355, dated Jul. 6, 2021, 3 pages.
Office Action received for Chinese Patent Application No. 200880108306.1, dated Aug. 24, 2011, 10 pages.
Office Action received for Chinese Patent Application No. 200880108306.1, dated Mar. 20, 2012, 8 pages.
Office Action received for Chinese Patent Application No. 200880108306.1, dated Mar. 27, 2014, 6 pages.
Office Action received for Chinese Patent Application No. 201410407626.4, dated May 21, 2018, 13 pages.
Office Action received for Chinese Patent Application No. 201410407626.4, dated Oct. 31, 2016, 10 pages.
Office Action received for Chinese Patent Application No. 201410407626.4, dated Sep. 11, 2017, 11 pages.
Office Action received for Chinese Patent Application No. 201480058054.1, dated Jan. 22, 2019, 6 pages.
Office Action received for Chinese Patent Application No. 201480058054.1, dated May 3, 2018, 18 pages.
Office Action received for Chinese Patent Application No. 201510284715.9, dated Apr. 14, 2020, 19 pages.
Office Action received for Chinese Patent Application No. 201510284715.9, dated Dec. 18, 2019, 24 pages.
Office Action received for Chinese Patent Application No. 201510284715.9, dated Dec. 21, 2018, 22 pages.
Office Action received for Chinese Patent Application No. 201510284715.9, dated Jun. 19, 2019, 26 pages.
Office Action received for Chinese Patent Application No. 201510284896.5, dated Jun. 28, 2018, 15 pages.
Office Action received for Chinese Patent Application No. 201510284896.5, dated Mar. 6, 2019, 13 pages.
Office Action received for Chinese Patent Application No. 201510284896.5, dated Sep. 3, 2019, 9 pages.
Office Action received for Chinese Patent Application No. 201520358683.8, dated Sep. 2, 2015, 4 pages.
Office Action received for Chinese Patent Application No. 201610069731.0, dated Mar. 5, 2019, 10 pages.
Office Action received for Chinese Patent Application No. 201610459968.X, dated Aug. 23, 2018, 14 pages.
Office Action received for Chinese Patent Application No. 201610459968.X, dated Aug. 23, 2019, 12 pages.
Office Action received for Chinese Patent Application No. 201610459968.X, dated Feb. 18, 2020, 8 pages.
Office Action received for Chinese Patent Application No. 201610459968.X, dated Feb. 22, 2019, 11 pages.
Office Action received for Chinese Patent Application No. 201620101636.X, dated May 25, 2016, 3 pages.
Office Action received for Chinese Patent Application No. 201620101636.X, dated Oct. 13, 2016, 3 pages.
Office Action received for Chinese Patent Application No. 201620480708.6, dated Jan. 9, 2017, 3 pages.
Office Action received for Chinese Patent Application No. 201620480708.6, dated Sep. 14, 2016, 3 pages.
Office Action received for Chinese Patent Application No. 201620480846.4, dated Jan. 9, 2017, 3 pages.
Office Action received for Chinese Patent Application No. 201620480846.4, dated Sep. 14, 2016, 3 pages.
Office Action received for Chinese Patent Application No. 201710093861.2, dated Mar. 5, 2019, 6 pages.
Office Action received for Chinese Patent Application No. 201710093861.2, dated Sep. 14, 2018, 15 pages.
Office Action received for Chinese Patent Application No. 201710094150.7, dated Dec. 19, 2018, 12 pages.
Office Action received for Chinese Patent Application No. 201710094150.7, dated Jul. 31, 2019, 6 pages.
Office Action received for Chinese Patent Application No. 201710198190.6, dated May 8, 2021, 22 pages.
Office Action received for Chinese Patent Application No. 201710198190.6, dated Oct. 12, 2020, 18 pages.
Office Action received for Chinese Patent Application No. 201710198190.6, dated Sep. 25, 2019, 27 pages.
Office Action received for Chinese Patent Application No. 201711292804.3, dated Aug. 5, 2020, 26 pages.
Office Action received for Chinese Patent Application No. 201711292804.3, dated Feb. 23, 2021, 17 pages.
Office Action received for Chinese Patent Application No. 201780002398.4, dated Feb. 27, 2019, 6 pages.
Office Action received for Chinese Patent Application No. 201780002398.4, dated Sep. 12, 2018, 17 pages.
Office Action received for Chinese Patent Application No. 201780002648.4, dated Dec. 5, 2018, 13 pages.
Office Action received for Chinese Patent Application No. 201780002648.4, dated Jun. 12, 2019, 11 pages.
Office Action received for Chinese Patent Application No. 201780002648.4, dated Nov. 26, 2019, 10 pages.
Office Action received for Chinese Patent Application No. 201780053143.0, dated Dec. 24, 2020, 21 pages.
Office Action received for Chinese Patent Application No. 201780053143.0, dated May 22, 2020, 21 pages.
Office Action received for Chinese Patent Application No. 201780069966.2, dated Jun. 1, 2021, 23 pages.
Office Action received for Chinese Patent Application No. 201810094316.X, dated Apr. 28, 2019, 9 pages.
Office Action received for Chinese Patent Application No. 201810094316.X, dated Aug. 5, 2019, 9 pages.
Office Action received for Chinese Patent Application No. 201810094316.X, dated Oct. 29, 2018, 12 pages.
Office Action received for Chinese Patent Application No. 201810338038.8, dated Jan. 21, 2020, 26 pages.
Office Action received for Chinese Patent Application No. 201810338038.8, dated May 14, 2019, 26 pages.
Office Action received for Chinese Patent Application No. 201810338040.5, dated Jun. 3, 2021, 25 pages.
Office Action received for Chinese Patent Application No. 201810338826.7, dated Apr. 3, 2019, 21 pages.
Office Action received for Chinese Patent Application No. 201810338826.7, dated Jan. 16, 2020, 16 pages.
Office Action received for Chinese Patent Application No. 201810338826.7, dated Oct. 21, 2019, 19 pages.
Office Action received for Chinese Patent Application No. 201810339290.0, dated Jun. 4, 2021, 20 pages.
Office Action received for Chinese Patent Application No. 201810954931.3, dated Jan. 15, 2021, 11 pages.
Office Action received for Chinese Patent Application No. 201810955077.2, dated Feb. 20, 2021, 19 pages.
Office Action received for Chinese Patent Application No. 201811460172.1, dated Jan. 21, 2020, 17 pages.
Office Action received for Chinese Patent Application No. 201811460172.1, dated Oct. 14, 2020, 7 pages.
Office Action received for Chinese Patent Application No. 201880000798.6, dated Aug. 5, 2020, 18 pages.
Office Action received for Chinese Patent Application No. 201880000798.6, dated Jul. 2, 2021, 15 pages.
Office Action received for Chinese Patent Application No. 201910070375.8, dated Dec. 4, 2019, 23 pages.
Office Action received for Chinese Patent Application No. 201910070375.8, dated Sep. 3, 2020, 8 pages.

(56) References Cited

OTHER PUBLICATIONS

Office Action received for Chinese Patent Application No. 201910109868.8, dated Jun. 30, 2020, 15 pages.
Office Action received for Chinese Patent Application No. 201910109868.8, dated Mar. 16, 2020, 19 pages.
Office Action received for Chinese Patent Application No. 201910109868.8, dated Sep. 19, 2019, 23 pages.
Office Action received for Chinese Patent Application No. 201910246439.5, dated Apr. 23, 2020, 14 pages.
Office Action received for Chinese Patent Application No. 201910246439.5, dated Oct. 15, 2019, 17 pages.
Office Action received for Chinese Patent Application No. 201910246439.5, dated Sep. 2, 2020, 15 pages.
Office Action received for Chinese Patent Application No. 201910278273.5, dated Jan. 3, 2020, 17 pages.
Office Action received for Chinese Patent Application No. 201910278273.5, dated Jun. 9, 2020, 8 pages.
Office Action received for Chinese Patent Application No. 201910354714.5, dated Feb. 3, 2020, 12 pages.
Office Action received for Chinese Patent Application No. 201910498825.3, dated May 21, 2020, 16 pages.
Office Action received for Chinese Patent Application No. 201910744886.3, dated Jan. 18, 2021, 7 pages.
Office Action received for Chinese Patent Application No. 201910899698.8, dated Mar. 23, 2020, 15 pages.
Office Action received for Chinese Patent Application No. 201910899698.8, dated May 27, 2020, 10 pages.
Office Action received for Chinese Patent Application No. 201911199010.1, dated Mar. 29, 2021, 14 pages.
Office Action received for Chinese Patent Application No. 201911199010.1, dated Nov. 4, 2020, 20 pages.
Office Action received for Chinese Patent Application No. 201980041865.3, dated May 24, 2021, 14 pages.
Office Action received for Chinese Patent Application No. 201410407626.4, dated Feb. 12, 2019, 13 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017., 2 pages.
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Nov. 9, 2018, 3 pages.
Office Action received for Danish Patent Application No. PA201770292, dated Sep. 6, 2017, 4 pages.
Office Action received for Danish Patent Application No. PA201770418, dated May 8, 2018, 3 pages.
Office Action received for Danish Patent Application No. PA201770419, dated Jan. 10, 2018, 4 pages.
Office Action received for Danish Patent Application No. PA201770712, dated Jul. 20, 2018, 4 pages.
Office Action received for Danish Patent Application No. PA201770712, dated Mar. 1, 2019, 3 pages.
Office Action received for Danish Patent Application No. PA201770713, dated Apr. 18, 2018, 4 pages.
Office Action received for Danish Patent Application No. PA201770713, dated Jun. 7, 2019, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.
Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201770804, dated Feb. 1, 2018, 9 pages.
Office Action received for Danish Patent Application No. PA201770804, dated May 31, 2018, 6 pages.
Office Action received for Danish Patent Application No. PA201770804, dated Nov. 6, 2018., 4 pages.
Office Action received for Danish Patent Application No. PA201870370, dated Nov. 9, 2018, 4 pages.
Office Action received for Danish Patent Application No. PA201870371, dated Nov. 20, 2018, 3 pages.
Office Action received for Danish Patent Application No. PA201870855, dated May 14, 2020, 4 pages.
Office Action received for Danish Patent Application No. PA201870855, dated Nov. 7, 2019, 4 pages.
Office Action received for Danish Patent Application No. PA201970127, dated Dec. 20, 2019, 3 pages.
Office Action received for Danish Patent Application No. PA201970127, dated Feb. 24, 2020, 2 pages.
Office Action received for European Patent Application No. 08834386.8, dated Aug. 23, 2010, 4 pages.
Office Action received for European Patent Application No. 12181538.5, dated Dec. 16, 2013, 4 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action Received for European Patent Application No. 13171145.9, dated Apr. 28, 2016, 5 pages.
Office Action Received for European Patent Application No. 13171145.9, dated May 3, 2018, 4 pages.
Office Action received for European Patent Application No. 15168475.0, dated Dec. 19, 2016, 5 pages.
Office Action received for European Patent Application No. 15168475.0, dated May 6, 2020, 5 pages.
Office Action received for European Patent Application No. 15168475.0, dated Oct. 5, 2018, 4 pages.
Office Action received for European Patent Application No. 15727291.5, dated Jan. 15, 2018, 8 pages.
Office Action received for European Patent Application No. 15728352.4, dated Jan. 25, 2018, 10 pages.
Office Action received for European Patent Application No. 16201159.7, dated Jun. 12, 2019, 10 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16703893.4, dated Sep. 17, 2018, 7 pages.
Office Action received for European Patent Application No. 17799904.2, dated Oct. 21, 2020, 6 pages.

(56) References Cited

OTHER PUBLICATIONS

Office Action received for European Patent Application No. 17810682.9, dated Mar. 26, 2021, 8 pages.
Office Action received for European Patent Application No. 17813737.8, dated Apr. 16, 2021, 7 pages.
Office Action received for European Patent Application No. 17835789.3, dated Jan. 20, 2021, 14 pages.
Office Action received for European Patent Application No. 17853654.6, dated Mar. 23, 2020, 4 pages.
Office Action received for European Patent Application No. 17865509.8, dated Jul. 28, 2020, 8 pages.
Office Action received for European Patent Application No. 17865509.8, dated Oct. 10, 2019, 6 pages.
Office Action received for European Patent Application No. 18208881.5, dated Jun. 11, 2019, 5 pages.
Office Action received for European Patent Application No. 18208881.5, dated May 7, 2021, 6 pages.
Office Action received for European Patent Application No. 18704335.1, dated Sep. 23, 2019, 7 pages.
Office Action received for European Patent Application No. 18713408.5, dated May 20, 2019, 5 pages.
Office Action received for European Patent Application No. 18713408.5, dated May 26, 2020, 5 pages.
Office Action received for European Patent Application No. 18713408.5, dated Nov. 4, 2020, 6 pages.
Office Action received for European Patent Application No. 18713408.5, dated Nov. 20, 2019, 4 pages.
Office Action received for European Patent Application No. 18830326.7, dated Apr. 30, 2020, 5 pages.
Office Action received for European Patent Application No. 18830326.7, dated Aug. 13, 2020, 6 pages.
Office Action received for European Patent Application No. 18830326.7, dated Aug. 27, 2019, 6 pages.
Office Action received for European Patent Application No. 18830326.7, dated Nov. 22, 2019, 8 pages.
Office Action received for European Patent Application No. 18830326.7, dated Sep. 16, 2019, 6 pages.
Office Action received for European Patent Application No. 19150528.8, dated Jul. 1, 2020, 6 pages.
Office Action received for European Patent Application No. 19160344.8, dated Mar. 26, 2021, 7 pages.
Office Action received for European Patent Application No. 19160348.9, dated May 14, 2020, 4 pages.
Office Action received for European Patent Application No. 19160348.9, dated Nov. 17, 2020, 6 pages.
Office Action received for European Patent Application No. 19171661.2, dated Aug. 7, 2019, 7 pages.
Office Action received for European Patent Application No. 19186538.5, dated Oct. 12, 2020, 7 pages.
Office Action received for European Patent Application No. 19194828.0, dated May 10, 2021, 6 pages.
Office Action received for European Patent Application No. 19194828.0, dated Oct. 15, 2020, 7 pages.
Office Action received for European Patent Application No. 20186286.9, dated Jul. 29, 2021, 8 pages.
Office Action received for European Patent Application No. 21150992.2, dated Jul. 6, 2021, 6 pages.
Office Action received for German Patent Application No. 202015004267.8, dated Nov. 4, 2015, 4 pages.
Office Action received for German Patent Application No. 202017005507.4, dated Feb. 5, 2018, 2 pages.
Office Action received for Indian Patent Application No. 201617006865, dated Dec. 11, 2019, 7 pages.
Office Action received for Indian Patent Application No. 201617039493, dated Oct. 21, 2019, 6 pages.
Office Action received for Indian Patent Application No. 201618024020, dated Sep. 14, 2020, 7 pages.
Office Action received for Japanese Patent Application No. 2010-525891, dated Jun. 12, 2012, 11 pages.
Office Action received for Japanese Patent Application No. 2013-098406, dated Dec. 9, 2013, 12 pages.
Office Action received for Japanese Patent Application No. 2013-098406, dated Dec. 15, 2014, 12 pages.
Office Action received for Japanese Patent Application No. 2013-098406, dated Jul. 19, 2016, 10 pages.
Office Action received for Japanese Patent Application No. 2015-083696, dated Jun. 17, 2016, 12 pages.
Office Action received for Japanese Patent Application No. 2016-131998, dated Aug. 10, 2018, 9 pages.
Office Action received for Japanese Patent Application No. 2016-131998, dated Sep. 25, 2017, 10 pages.
Office Action received for Japanese Patent Application No. 2016-224506, dated May 14, 2019, 22 pages.
Office Action received for Japanese Patent Application No. 2016-224507, dated Dec. 1, 2017, 14 pages.
Office Action received for Japanese Patent Application No. 2016-224507, dated Jun. 16, 2017, 16 pages.
Office Action received for Japanese Patent Application No. 2016-540927, dated Jun. 20, 2017., 12 pages.
Office Action received for Japanese Patent Application No. 2016-558332, dated Dec. 8, 2017, 12 pages.
Office Action received for Japanese Patent Application No. 2016-558332, dated Jul. 27, 2018, 9 pages.
Office Action received for Japanese Patent Application No. 2016-569665, dated Aug. 20, 2018, 9 pages.
Office Action received for Japanese Patent Application No. 2016-569665, dated Jan. 19, 2018, 10 pages.
Office Action received for Japanese Patent Application No. 2017-075031, dated Jul. 30, 2018, 16 pages.
Office Action received for Japanese Patent Application No. 2017-085582, dated Jul. 2, 2018, 11 pages.
Office Action received for Japanese Patent Application No. 2017-540616, dated Jan. 12, 2018, 24 pages.
Office Action received for Japanese Patent Application No. 2017-540616, dated Jul. 27, 2018, 20 pages.
Office Action received for Japanese Patent Application No. 2018-113081, dated Apr. 9, 2019, 6 pages.
Office Action received for Japanese Patent Application No. 2018-113081, dated Jan. 10, 2020, 8 pages.
Office Action received for Japanese Patent Application No. 2018-113081, dated Oct. 2, 2020, 7 pages.
Office Action received for Japanese Patent Application No. 2018-158482, dated Jan. 10, 2020, 9 pages.
Office Action received for Japanese Patent Application No. 2018-551159, dated Jan. 27, 2020, 8 pages.
Office Action received for Japanese Patent Application No. 2018-551159, dated Sep. 30, 2019, 6 pages.
Office Action received for Japanese Patent Application No. 2018-560107, dated Jun. 14, 2019, 26 pages.
Office Action received for Japanese Patent Application No. 2019-053379, dated May 29, 2020, 11 pages.
Office Action received for Japanese Patent Application No. 2019-053379, dated Oct. 18, 2019, 11 pages.
Office Action received for Japanese Patent Application No. 2019-096220, dated Sep. 9, 2019, 8 pages.
Office Action received for Japanese Patent Application No. 2019-107235, dated Oct. 18, 2019, 8 pages.
Office Action received for Japanese Patent Application No. 2019-194603, dated Jan. 4, 2021, 8 pages.
Office Action received for Japanese Patent Application No. 2019-238894, dated Mar. 6, 2020, 7 pages.
Office Action received for Japanese Patent Application No. 2019-510416, dated May 15, 2020, 4 pages.
Office Action received for Japanese Patent Application No. 2019-510416, dated Oct. 18, 2019, 4 pages.
Office Action received for Japanese Patent Application No. 2019-511975, dated Apr. 10, 2020, 6 pages.
Office Action received for Japanese Patent Application No. 2019-563560, dated Jun. 14, 2021, 6 pages.
Office Action received for Japanese Patent Application No. 2019-563560, dated Nov. 30, 2020, 7 pages.

(56) References Cited

OTHER PUBLICATIONS

Office Action received for Japanese Patent Application No. 2020-028315, dated Jul. 6, 2020, 18 pages.
Office Action received for Japanese Patent Application No. 2020-028315, dated Nov. 9, 2020, 11 pages.
Office Action received for Japanese Patent Application No. 2020-126751, dated Jan. 5, 2021, 8 pages.
Office Action received for Japanese Patent Application No. 2020-159979, dated May 10, 2021, 9 pages.
Office Action received for Japanese Patent Application No. 2021-015128, dated Jun. 14, 2021, 4 pages.
Office Action received for Korean Patent Application No. 10-2010-7008899, dated Aug. 17, 2014, 7 pages.
Office Action received for Korean Patent Application No. 10-2010-7008899, dated Feb. 3, 2015, 7 pages.
Office Action received for Korean Patent Application No. 10-2010-7008899, dated Jan. 28, 2013, 5 pages.
Office Action received for Korean Patent Application No. 10-2010-7008899, dated Jun. 12, 2015, 4 pages.
Office Action received for Korean Patent Application No. 10-2010-7008899, dated Mar. 29, 2012, 6 pages.
Office Action received for Korean Patent Application No. 10-2010-7008899, dated May 30, 2011, 4 pages.
Office Action received for Korean Patent Application No. 10-2011-7023152, dated Apr. 22, 2014, 6 pages.
Office Action received for Korean Patent Application No. 10-2014-7004771, dated Apr. 22, 2014, 5 pages.
Office Action received for Korean Patent Application No. 10-2014-7004771, dated Jun. 12, 2015, 6 pages.
Office Action received for Korean Patent Application No. 10-2014-7004771, dated Oct. 21, 2014, 7 pages.
Office Action received for Korean Patent Application No. 10-2014-7004772, dated Apr. 22, 2014, 8 pages.
Office Action received for Korean Patent Application No. 10-2014-7004772, dated Oct. 21, 2014, 5 pages.
Office Action received for Korean Patent Application No. 10-2014-7004773, dated Apr. 22, 2014, 9 pages.
Office Action received for Korean Patent Application No. 10-2014-7004773, dated Jun. 12, 2015, 6 pages.
Office Action received for Korean Patent Application No. 10-2014-7004773, dated Oct. 21, 2014, 9 pages.
Office Action received for Korean Patent Application No. 10-2014-7008348, dated Jan. 22, 2019, 16 pages.
Office Action received for Korean Patent Application No. 10-2014-7025441, dated Oct. 21, 2014, 5 pages.
Office Action received for Korean Patent Application No. 10-2015-7010262, dated Mar. 8, 2017, 6 pages.
Office Action received for Korean Patent Application No. 10-2015-7010262, dated May 24, 2016, 10 pages.
Office Action received for Korean Patent Application No. 10-2016-0152210, dated Jan. 29, 2019, 7 pages.
Office Action received for Korean Patent Application No. 10-2016-0152210, dated May 14, 2018, 13 pages.
Office Action received for Korean Patent Application No. 10-2016-0152210, dated May 30, 2019, 8 pages.
Office Action received for Korean Patent Application No. 10-2016-7009347, dated Feb. 18, 2018, 9 pages.
Office Action received for Korean Patent Application No. 10-2016-7009632, dated Feb. 2, 2018., 11 pages.
Office Action received for Korean Patent Application No. 10-2016-7035555, dated Dec. 26, 2017, 5 pages.
Office Action received for Korean Patent Application No. 10-2016-7035555, dated Jul. 18, 2019, 9 pages.
Office Action received for Korean Patent Application No. 10-2016-7035555, dated Sep. 18, 2018, 9 pages.
Office Action received for Korean Patent Application No. 10-2017-0022365, dated Jun. 26, 2017, 10 pages.
Office Action received for Korean Patent Application No. 10-2017-0022546, dated Jun. 21, 2017, 12 pages.
Office Action received for Korean Patent Application No. 10-2017-0022582, dated Jul. 31, 2019, 5 pages.
Office Action received for Korean Patent Application No. 10-2017-0022582, dated Sep. 19, 2018, 6 pages.
Office Action received for Korean Patent Application No. 10-2017-7012145, dated Jul. 18, 2019, 5 pages.
Office Action received for Korean Patent Application No. 10-2017-7012145, dated Sep. 13, 2018, 6 pages.
Office Action received for Korean Patent Application No. 10-2017-7015582, dated Apr. 5, 2018, 8 pages.
Office Action received for Korean Patent Application No. 10-2017-7015582, dated Jun. 12, 2017, 9 pages.
Office Action received for Korean Patent Application No. 10-2018-7019643, dated Jan. 6, 2020, 7 pages.
Office Action received for Korean Patent Application No. 10-2018-7019643, dated Jul. 2, 2019, 12 pages.
Office Action received for Korean Patent Application No. 10-2018-7022895, dated Aug. 17, 2018, 8 pages.
Office Action received for Korean Patent Application No. 10-2018-7028845, dated Jun. 19, 2019, 7 pages.
Office Action received for Korean Patent Application No. 10-2018-7033301, dated Dec. 14, 2018, 6 pages.
Office Action received for Korean Patent Application No. 10-2019-7003374, dated Jun. 10, 2019, 7 pages.
Office Action received for Korean Patent Application No. 10-2019-7003836, dated Jun. 14, 2019, 7 pages.
Office Action received for Korean Patent Application No. 10-2019-7004734, dated Jul. 4, 2019, 7 pages.
Office Action received for Korean Patent Application No. 10-2019-7005136, dated Jan. 28, 2020, 5 pages.
Office Action received for Korean Patent Application No. 10-2019-7005925, dated Jul. 4, 2019, 24 pages.
Office Action received for Korean Patent Application No. 10-2019-7006639, dated Dec. 21, 2020, 20 pages.
Office Action received for Korean Patent Application No. 10-2019-7006639, dated Jun. 15, 2021, 8 pages.
Office Action received for Korean Patent Application No. 10-2019-7014494, dated Jun. 14, 2019, 11 pages.
Office Action received for Korean Patent Application No. 10-2019-7014988, dated Jul. 19, 2019, 9 pages.
Office Action received for Korean Patent Application No. 10-2019-7033799, dated Apr. 27, 2021, 9 pages.
Office Action received for Korean Patent Application No. 10-2020-0097418, dated Aug. 28, 2020, 6 pages.
Office Action received for Korean Patent Application No. 10-2020-7002929, dated Mar. 22, 2020, 5 pages.
Office Action received for Korean Patent Application No. 10-2020-7010007, dated Aug. 26, 2020, 12 pages.
Office Action received for Korean Patent Application No. 10-2020-7010007, dated Jun. 21, 2021, 7 pages.
Office Action received for Korean Patent Application No. 10-2020-7010007, dated Mar. 15, 2021, 7 pages.
Office Action received for Korean Patent Application No. 10-2020-7011424, dated Jul. 7, 2020, 6 pages.
Office Action received for Korean Patent Application No. 10-2020-7020782, dated Aug. 19, 2020, 8 pages.
Office Action received for Korean Patent Application No. 10-2020-7020782, dated Mar. 29, 2021, 7 pages.
Office Action received for Korean Patent Application No. 10-2020-7022596, dated Jul. 28, 2021, 26 pages.
Office Action received for Korean Patent Application No. 10-2020-7027862, dated Jan. 29, 2021, 8 pages.
Office Action received for Korean Patent Application No. 10-2021-7011888, dated Jul. 27, 2021, 11 pages.
Office Action received for Korean Patent Application No. 10-2016-7009347, dated Mar. 9, 2017., 15 pages.
Office Action received for Korean Patent Application No. 10-2018-7028845, dated Dec. 10, 2018, 8 pages.
Office Action received for Taiwan Patent Application No. 103136545, dated May 25, 2016, 7 pages.
Office Action received for Taiwan Patent Application No. 103136545, dated Nov. 2, 2015, 39 pages.

(56) References Cited

OTHER PUBLICATIONS

Office Action received for Taiwan Patent Application No. 101107082, dated Jul. 7, 2014, 21 pages.
Office Action received for Taiwan Patent Application No. 103131074, dated Jul. 21, 2015, 16 pages.
Office Action received for Taiwanese Patent Application No. 104117508, dated Jul. 14, 2017, 9 pages.
Office Action received for Taiwanese Patent Application No. 104117508, dated Jul. 20, 2016, 19 pages.
Office Action received for Taiwanese Patent Application No. 104117508, dated Mar. 20, 2017, 22 pages.
Office Action received for Taiwanese Patent Application No. 104117508, dated Jan. 25, 2019, 24 pages.
Office Action received for Taiwanese Patent Application No. 104117508, dated May 22, 2019, 7 pages.
Office Action received for Taiwanese Patent Application No. 107138003, dated Mar. 20, 2019, 6 pages.
Office Action received from Japanese Patent Application No. 2013-098406, vMay 8, 2015, 14 pages.
Okazolab, "Kinect Based 3D Head Tracking in Behavioural Research", Available online at: <https://www.youtube.com/watch?v=nigRvT9beQw>, Aug. 8, 2012, 3 pages.
OneFaceIn, "[How it Works] Securing Your Smartphone With OneFaceIn", Biometric Password Manager, Available at <https://www.youtube.com/watch?v=h-JG5SPxBQ0>, Dec. 2, 2016, 1 page.
Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
Phonebuff, "How to Use Face Unlock on Android 4.0 ICS", Retrieved from <https://www.youtube.com/watch?v=0ASf6jkpFKE>, Dec. 15, 2011, 1 page.
Plaisant et al., "Touchscreen Toggle Switches: Push or slide? Design Issues and Usability Study", Technical Report CAR-TR-521, CS-TR-2557, Nov. 1990, pp. 1-10.
Pre-Brief Appeal Conference decision received for U.S. Appl. No. 14/869,831, dated Jan. 18, 2019., 3 pages.
PSP Security Ltd, "AccuFACE features", Available online at <https://www.youtube.com/watch?v=p3jvGoEbioY>, Oct. 14, 2009, 1 page.
PSP Security LTD, "PSP Security—AccuFACE Step by Step Enrollment Process", Available online at <https://www.youtube.com/watch?v=0IIF5OOdya0>, Oct. 14, 2009, 1 page.
Punchkick Interactive, "Punchkick hands-on review: Fitbit Surge", URL: https://www.youtube.com/watch?v=K2G7aebUYcA, Mar. 25, 2015, 3 pages.
"Real Solution of two-step-authentication Password Management for Authentication Enhancement", Fukuda Takao, Nikkei PC, JPN, Nikkei Business Publications, Inc., No. 694, Mar. 24, 2014, 11 pages
Record of Oral Hearing received for U.S. Appl. No. 13/243,045, mailed on Apr. 1, 2019, 18 pages.
Record of Oral Hearing received for U.S. Appl. No. 13/243,045, mailed on May 7, 2021, 18 pages.
Record of Oral Hearing received for U.S. Appl. No. 14/869,831, mailed on Oct. 6, 2020, 12 pages.
Result of Consultation received for European Patent Application No. 16703893.4, dated Jun. 7, 2019, 3 pages.
Result of Consultation received for European Patent Application No. 18830326.7, dated Jun. 21, 2021, 5 pages.
Riley et al., "Instruction, Feedback and Biometrics: The User Interface for Fingerprint Authentication System", Interact 2009, Part II, LNCS 5727, IFPI International Federation for Information Processing, 2009, pp. 293-305.
Sawamura Toru, "Emergency Proposal; personal information should be immediately unitarily managed", PC fan, Japan, Mainichi Communications Inc., 11th Edition, vol. 11, No. 240, Jun. 15, 2004, pp. 20-21.
Schofield Tim, "Face Unlock Demonstration on the HTC EVO 4G LTE", Retrieved from <https://www.youtube.com/watch?v=TNL9Or_9SWg>, May 31, 2012, 1 page.

Search Report and Opinion received for Danish Patent Application No. PA201770418, dated Jun. 23, 2017, 8 pages.
Search Report and Opinion received for Danish Patent Application No. PA201770419, dated Jun. 19, 2017, 6 pages.
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Search Report and Opinion received for Danish Patent Application No. PA201870855, dated Apr. 3, 2019, 12 pages.
Search Report and Opinion received for Danish Patent Application No. PA201970127, dated Oct. 4, 2019, 9 pages.
Search Report received for Germany Patent Application No. 202017005507.4, dated Jan. 2, 2019, 6 pages.
Sensory Trulysecure, "AppLock Face/Voice Recognition", Available at <https://www.youtube.com/watch?v=odax5O51aT0>, May 27, 2015, 1 page.
Stateoftech, "iPhone 6 Tips—How to Access the Camera from the Lock Screen", Screen captures with generated transcript from YouTube video clip, Online Available at: <https://www.youtube.com/watch?v=frB151RYB7U>, Jul. 2, 2015, 23 pages.
Summons to Attend Oral Proceedings received for European Patent Application No. 08834386.8, mailed on Aug. 24, 2012, 4 pages.
Summons to Attend Oral Proceedings received for European Patent Application No. 12770400.5, mailed on Mar. 19, 2018, 10 pages.
Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on May 12, 2020, 25 pages.
Summons to Attend Oral Proceedings received for European Patent Application No. 15728352.4, mailed on Nov. 18, 2019, 15 pages.
Summons to Attend Oral Proceedings received for European Patent Application No. 16201159.7, mailed on Feb. 4, 2021, 12 pages.
Summons to Attend Oral Proceedings received for European Patent Application No. 16201195.1, mailed on Sep. 4, 2018, 21 pages.
Summons to Attend Oral Proceedings received for European Patent Application No. 16201205.8, mailed on Jan. 28, 2020, 18 pages.
Summons to Attend Oral Proceedings received for European Patent Application No. 16703893.4, mailed on Mar. 26, 2019, 14 pages.
Summons to Attend Oral Proceedings received for European Patent Application No. 17865509.8, mailed on Jul. 14, 2021, 8 pages.
Summons to Attend Oral Proceedings received for European Patent Application No. 18713408.5, mailed on Apr. 30, 2021, 5 pages.
Summons to Attend Oral Proceedings received for European Patent Application No. 18830326.7, mailed on Feb. 25, 2021, 6 pages.
Summons to Attend Oral Proceedings received for European Patent Application No. 19171661.2, mailed on Apr. 16, 2020, 12 pages.
Summons to Attend Oral Proceedings received for European Patent Application No. 19171661.2, mailed on Jun. 2, 2020, 13 pages.
Supplemental Notice of Allowance received for U.S. Appl. No. 12/207,370, dated Aug. 8, 2013, 2 pages.
Supplemental Notice of Allowance received for U.S. Appl. No. 14/870,694, dated Jan. 17, 2019, 3 pages.
Supplemental Notice of Allowance received for U.S. Appl. No. 15/899,996, dated Jul. 25, 2018, 2 pages.
Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, 16 pages.
Thanakulmas Thanit, "MasterCard Identity Check Facial Recognition Biometrics", Available at <https://www.youtube.com/watch?v=g4sMbrkt1gl>, Oct. 10, 2016, 1 page.
Third Party Observations received for European Patent Application No. 15168475.0, mailed on Jul. 19, 2016, 4 pages.
Use NFC with Screen Off or in Lock Screen on Galaxy Nexus, Available online at : https://www.xda-developers.com/use-nfc-with-screen-off-or-in-lock-screen-on-galaxy-nexus/, Jun. 14, 2012, 4 pages.

(56) References Cited

OTHER PUBLICATIONS

Videoreborn, "Motorola Atrix 4g: Wet Fingerprint Scanner Better Than iPhone 5S Finger Print Scanner!", Youtube, available at <https://www.youtube.com/watch?v=MSJIIG93MPg>, Mar. 16, 2011, 2 pages.
Wang Na, "Research of Face Detection System Based on Mobile Phone Platform", Video Engineering, vol. 36, No. 11, Nov. 2012, 5 pages.
Wikipedia, "QR code", Available online at: https://en.wikipedia.org/w/index.php?title=QR_code&oldid=452939488, Sep. 28, 2011, pp. 1-9.
Board Decision received for Chinese Patent Application No. 201710198190.6, dated May 23, 2022, 2 pages (1 page of English Translation and 1 page of Official Copy).
Intention to Grant received for European Patent Application No. 19769336.9, dated May 31, 2022, 13 pages.
Notice of Acceptance received for Australian Patent Application No. 2021202352, dated Jun. 6, 2022, 3 pages.
Notice of Allowance received for Japanese Patent Application No. 2020-028315, dated May 27, 2022, 3 pages (1 page of English Translation and 2 pages of Official Copy).
Notice of Allowance received for Japanese Patent Application No. 2021-035572, dated Jun. 3, 2022, 4 pages (1 page of English Translation and 3 pages of Official Copy).
Notice of Allowance received for U.S. Appl. No. 16/369,473, dated Jun. 8, 2022, 7 pages.
Notice of Allowance received for U.S. Appl. No. 17/208,957, dated Jun. 15, 2022, 12 pages.
Decision to Grant received for European Patent Application No. 19769336.9, dated Oct. 7, 2022, 2 pages.
Non-Final Office Action received for U.S. Appl. No. 17/193,991, dated Oct. 6, 2022, 7 pages.
Notice of Allowance received for Chinese Patent Application No. 201710198190.6, dated Sep. 23, 2022, 7 pages (3 pages of English Translation and 4 pages of Official Copy).
Office Action received for Japanese Patent Application No. 2020-566978, dated Sep. 26, 2022, 4 pages (2 pages of English Translation and 2 pages of Official Copy).
Feng et al., "A Prototype Three-Dimensional Position Sensitive CdZnTe Detector Array", IEEE Transactions On Nuclear Science, vol. 54, No. 4., Aug. 2007, 6 pages.
Jianxin et al., "Fingerprint-based Authentication in Networking Environment", Artificial Intelligence Institute of Zhejiang University, Hangzhou Zhejiang 310027, China, Dec. 28, 2001, 4 pages.
Applicant-Initiated Interview Summary received for U.S. Appl. No. 17/087,855, dated Jul. 5, 2022, 2 pages.
Intention to Grant received for European Patent Application No. 19194828.0, dated Jun. 30, 2022, 9 pages.
Minutes of the Oral Proceedings received for European Patent Application No. 19194828.0, dated Jun. 28, 2022, 6 pages.
Non-Final Office Action received for U.S. Appl. No. 17/516,495, dated Jul. 6, 2022, 10 pages.
Notice of Allowance received for Korean Patent Application No. 10-2021-7032984, dated Jun. 29, 2022, 5 pages (2 pages of English Translation and 3 pages of Official Copy).
Notice of Allowance received for Korean Patent Application No. 10-2020-7034405, dated Jun. 20, 2022, 6 pages (2 pages of English Translation and 4 pages of Official Copy).
Office Action received for Japanese Patent Application No. 2019-563560, dated Jul. 4, 2022, 34 pages (15 pages of English Translation and 19 pages of Official Copy).
Office Action received for Japanese Patent Application No. 2021-084065, dated Jun. 24, 2022, 12 pages (6 pages of English Translation and 6 pages of Official Copy).
Office Action received for Korean Patent Application No. 10-2022-7012864, dated Jun. 27, 2022, 9 pages (4 pages of English Translation and 5 pages of Official Copy).
Office Action received for Korean Patent Application No. 10-2022-7012869, dated Jun. 27, 2022, 11 pages (5 pages of English Translation and 6 pages of Official Copy).

Summons to Attend Oral Proceedings received for European Patent Application No. 18208881.5, mailed on Jun. 29, 2022, 9 pages.
Applicant-Initiated Interview Summary received for U.S. Appl. No. 16/938,362, dated Nov. 2, 2022, 2 pages.
Applicant-Initiated Interview Summary received for U.S. Appl. No. 17/409,570, dated Nov. 3, 2022, 5 pages.
Final Office Action received for U.S. Appl. No. 17/409,570, dated Nov. 9, 2022, 37 pages.
Final Office Action received for U.S. Appl. No. 17/516,495, dated Nov. 15, 2022, 12 pages.
Hwang et al., "Toward Event-Based Haptics: Rendering Contact Using Open-Loop Force Pulses", 12th International Symposium on Haptic Interfaces for Virtual Environment and Teleoperator Systems, 2004, 8 pages.
Liu et al., "PKI Authentication System Combining with Fingerprint", Computer Engineering, vol. 39, No. 9, May 2005, 3 pages (Official Copy Only) (See Communication under 37 CFR § 1.98(a) (3)).
Notice of Allowance received for Japanese Patent Application No. 2022-070240, dated Aug. 5, 2022, 4 pages (1 page of English Translation and 3 pages of Official Copy).
Notice of Allowance received for U.S. Appl. No. 17/208,957, dated Aug. 17, 2022, 11 pages.
Notice of Hearing received for Indian Patent Application No. 201617039493, dated Aug. 10, 2022, 3 pages.
Office Action received for Chinese Patent Application No. 201710198190.6, dated Jul. 5, 2022, 7 pages (3 pages of English Translation and 4 pages of Official Copy).
Office Action received for European Patent Application No. 19160348.9, dated Aug. 4, 2022, 6 pages.
13 questions and answers about using Apple Pay online, online available at: http://www.it528.com/apple/1356.html, Feb. 18, 2016, 5 pages (Official Copy Only) (See Communication under 37 CFR § 1.98(a) (3)).
Adractas et al., "The road to mobile payments services", Mckinsey on Payments, online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Advisory Action received for U.S. Appl. No. 14/980,344, dated Feb. 10, 2020, 5 pages.
Advisory Action received for U.S. Appl. No. 14/980,344, dated Mar. 27, 2019, 5 pages.
Applicant-Initiated Interview Summary received for U.S. Appl. No. 16/125,267, dated Oct. 25, 2021, 4 pages.
Applicant-Initiated Interview Summary received for U.S. Appl. No. 16/369,473, dated Oct. 18, 2021, 2 pages.
Applicant-Initiated Interview Summary received for U.S. Appl. No. 16/667,174, dated Oct. 25, 2021, 2 pages.
Applicant-Initiated Interview Summary received for U.S. Appl. No. 17/087,855, dated Nov. 5, 2021, 2 pages.
Board Opinion received for Chinese Patent Application No. 201810094316.X, dated Sep. 30, 2021, 11 pages (3 pages of English Translation and 8 pages of Official Copy).
Brief Communication Regarding Oral Proceedings received for European Patent Application No. 17865509.8, mailed on Nov. 1, 2021, 2 pages.
Brief Communication Regarding Oral Proceedings received for European Patent Application No. 18713408.5, mailed on Sep. 28, 2021, 2 pages.
Corrected Notice of Allowance received for U.S. Appl. No. 12/074,985, dated Oct. 10, 2013, 4 pages.
Corrected Notice of Allowance received for U.S. Appl. No. 16/670,949, dated Sep. 8, 2021, 2 pages.
Corrected Notice of Allowance received for U.S. Appl. No. 16/987,003, dated Sep. 1, 2021, 3 pages.
Decision to Grant received for European Patent Application No. 15168475.0, dated Sep. 30, 2021, 2 pages.
Decision to Refuse received for European Patent Application No. 16201159.7, dated Sep. 27, 2021, 22 pages.
Examiner's Answer to Appeal Brief received for U.S. Appl. No. 15/714,887, dated Aug. 27, 2021, 23 pages.

(56) References Cited

OTHER PUBLICATIONS

Extended European Search Report received for European Patent Application No. 21166287.9, dated Nov. 5, 2021, 10 pages.
Extended European Search Report received for European Patent Application No. 21173988.3, dated Aug. 23, 2021, 6 pages.
Final Office Action received for U.S. Appl. No. 12/074,985, dated Dec. 2, 2011, 19 pages.
Final Office Action received for U.S. Appl. No. 14/980,344, dated Dec. 5, 2018, 17 pages.
Final Office Action received for U.S. Appl. No. 14/980,344, dated Nov. 25, 2019, 13 pages.
Final Office Action received for U.S. Appl. No. 16/125,267, dated Aug. 26, 2021, 22 pages.
Intention to Grant received for European Patent Application No. 18713408.5, dated Oct. 28, 2021, 10 pages.
Intention to Grant received for European Patent Application No. 18830326.7, dated Sep. 15, 2021, 11 pages.
Intention to Grant received for European Patent Application No. 20196476.4, dated Aug. 25, 2021, 9 pages.
Minutes of the Oral Proceedings received for European Patent Application No. 16201159.7, dated Sep. 23, 2021, 6 pages.
Non-Final Office Action received for U.S. Appl. No. 12/074,985, dated Apr. 19, 2011, 24 pages.
Non-Final Office Action received for U.S. Appl. No. 12/074,985, dated Mar. 18, 2013, 19 pages.
Non-Final Office Action received for U.S. Appl. No. 14/090,344, dated Jan. 15, 2015, 13 pages.
Non-Final Office Action received for U.S. Appl. No. 14/980,344, dated Mar. 14, 2018, 13 pages.
Non-Final Office Action received for U.S. Appl. No. 14/980,344, dated May 14, 2019, 11 pages.
Notice of Acceptance received for Australian Patent Application No. 2020204256, dated Oct. 9, 2021, 3 pages.
Notice of Allowance received for Japanese Patent Application No. 2020-103213, dated Oct. 25, 2021, 4 pages (1 page of English Translation and 3 pages of Official Copy).
Notice of Allowance received for Japanese Patent Application No. 2020-126751, dated Aug. 16, 2021, 4 pages (1 page of English Translation and 3 pages of Official Copy).
Notice of Allowance received for Japanese Patent Application No. 2021-015128, dated Sep. 3, 2021, 4 pages (1 page of English Translation and 3 pages of Official Copy).
Notice of Allowance received for U.S. Appl. No. 12/074,985, dated Jul. 30, 2013, 8 pages.
Notice of Allowance received for U.S. Appl. No. 14/090,344, dated Aug. 26, 2015, 7 pages.
Notice of Allowance received for U.S. Appl. No. 14/980,344, dated Mar. 23, 2020, 9 pages.
Notice of Allowance received for U.S. Appl. No. 16/670,949, dated Sep. 14, 2021, 7 pages.
Notice of Allowance received for U.S. Appl. No. 16/843,638, dated Oct. 29, 2021, 28 pages.
Notice of Allowance received for U.S. Appl. No. 16/987,003, dated Aug. 18, 2021, 9 pages.
Notice of Allowance received for U.S. Appl. No. 17/015,429, dated Oct. 8, 2021, 5 pages.
Notice of Allowance received for U.S. Appl. No. 17/015,429, dated Oct. 22, 2021, 2 pages.
Notice of Allowance received for U.S. Appl. No. 17/015,429, dated Sep. 22, 2021, 6 pages.
Office Action received for Australian Patent Application No. 2019268070, dated Sep. 21, 2021, 4 pages.
Office Action received for Australian Patent Application No. 2020289822, dated Aug. 24, 2021, 7 pages.
Office Action received for Chinese Patent Application No. 201711292804.3, dated Sep. 10, 2021, 19 pages (8 pages of English Translation and 11 pages of Official Copy).
Office Action received for Chinese Patent Application No. 201780033622.6, dated Sep. 3, 2021, 11 pages (5 pages of English Translation and 6 pages of Official Copy).

Office Action received for Chinese Patent Application No. 201780033899.9, dated Sep. 3, 2021, 12 pages (6 pages of English Translation and 6 pages of Official Copy).
Office Action received for Chinese Patent Application No. 201780053143.0, dated Sep. 3, 2021, 24 pages (15 pages of English Translation and 9 pages of Official Copy).
Office Action received for Chinese Patent Application No. 201810339290.0, dated Oct. 18, 2021, 20 pages (11 pages of English Translation and 9 pages of Official Copy).
Office Action received for Chinese Patent Application No. 201911199010.1, dated Sep. 3, 2021, 12 pages (7 pages of English Translation and 5 pages of Official Copy).
Office Action received for European Patent Application No. 19160344.8, dated Oct. 7, 2021, 8 pages.
Office Action received for European Patent Application No. 19186538.5, dated Oct. 22, 2021, 7 pages.
Office Action received for European Patent Application No. 19769336.9, dated Nov. 4, 2021, 6 pages.
Office Action received for European Patent Application No. 20198076.0, dated Sep. 22, 2021, 6 pages.
Office Action received for Indian Patent Application No. 201817036875, dated Oct. 29, 2021, 8 pages.
Office Action received for Korean Patent Application No. 10-2019-7006639, dated Sep. 16, 2021, 20 pages (10 pages of English Translation and 10 pages of Official Copy).
Office Action received for Korean Patent Application No. 10-2020-7034180, dated Aug. 17, 2021, 15 pages (6 pages of English Translation and 9 pages of Official Copy).
Office Action received for Korean Patent Application No. 10-2021-7015473, dated Aug. 25, 2021, 5 pages (2 page of English Translation and 3 pages of Official Copy).
Pu, Fang, "Research on Location-aware Service in Pervasive Computing", Issue No. 7, Information Technology Series, China Doctoral Dissertations, Jul. 15, 2008, 140 pages (Official Copy only) (See Communication under 37 CFR § 1.98(a) (3)).
Result of Consultation received for European Patent Application No. 17865509.8, dated Nov. 2, 2021, 3 pages.
Result of Consultation received for European Patent Application No. 18713408.5, dated Aug. 30, 2021, 5 pages.
Supplemental Notice of Allowance received for U.S. Appl. No. 14/869,831, dated Aug. 20, 2021, 2 pages.
Board Decision received for Chinese Patent Application No. 201810338826.7, dated May 30, 2022, 20 pages (2 pages of English Translation and 18 pages of Official Copy).
Board Opinion received for Chinese Patent Application No. 201510284715.9, dated Jun. 6, 2022, 14 pages (3 pages of English Translation and 11 pages of Official Copy).
Corrected Notice of Allowance received for U.S. Appl. No. 17/208,957, dated Jun. 30, 2022, 2 pages.
Notice of Allowance received for Chinese Patent Application No. 201510284896.5, dated Jun. 6, 2022, 2 pages (1 page of English Translation and 1 page of Official Copy).
Brief Communication Regarding Oral Proceedings received for European Patent Application No. 17799904.2, mailed on Sep. 13, 2022, 1 page.
Decision to Refuse received for European Patent Application No. 17799904.2, dated Sep. 19, 2022, 4 pages.
Decision to Refuse received for European Patent Application No. 19150528.8, dated Sep. 9, 2022, 4 pages.
Intention to Grant received for European Patent Application No. 20186286.9, dated Sep. 15, 2022, 9 pages.
Non-Final Office Action received for U.S. Appl. No. 17/409,570, vSep. 21, 2022, 35 pages.
Notice of Allowance received for Japanese Patent Application No. 2021-001028, dated Sep. 9, 2022, 4 pages (1 page of English Translation and 3 pages of Official Copy).
Office Action received for Australian Patent Application No. 2021250944, dated Sep. 16, 2022, 3 pages.
Office Action received for European Patent Application No. 20198076.0, dated Sep. 22, 2022, 7 pages.
Summons to Attend Oral Proceedings received for European Patent Application No. 15727291.5, mailed on Sep. 12, 2022, 13 pages.

(56) References Cited

OTHER PUBLICATIONS

Summons to Attend Oral Proceedings received for European Patent Application No. 16201195.1, mailed on Sep. 12, 2022, 14 pages.
Qiye Wang, "Design and implementation of SAN Device Access Control in Unified Storage Platform", Master's Theses, Huazhong University of Science & Technology, Wuhan, Jun. 2008, 63 pages, Cited by Chinese Patent Office in an Office Action for related Patent Application No. 201810338040.5 dated Mar. 30, 2022.
Taro Matsumura, "The Credit Card Industry and the small financial institutions and the future in Apple Pay?", MacFan, Japan, Mynavi Corporation, vol. 23, No. 10, Oct. 1, 2015, 8 pages, Cited by Japanese Patent Office in an Office Action for related Patent Application No. 2020-169988 dated Feb. 4, 2022.
Yongxl et al., "Application of RFID Technology in Mobile Payment", China Academic Journal Electronic Publishing House,1994-2022, Nov. 25, 2012, pp. 97-99, Cited by Chinese Patent Office in an Office Action for related Patent Application No. 201710094150.7 dated Feb. 23, 2022.
Decision on Appeal received for Korean Patent Application No. 10-2019-7033799, dated Jul. 19, 2022, 23 pages (3 pages of English Translation and 20 pages of Official Copy).
International Search Report and Written Opinion received for PCT Patent Application No. PCT/US2022/013730, dated Apr. 8, 2022, 19 pages.
Non-Final Office Action received for U.S. Appl. No. 17/087,855, dated Jul. 21, 2022, 23 pages.
Applicant-Initiated Interview Summary received for U.S. Appl. No. 16/125,267, dated Jan. 25, 2022, 5 pages.
Applicant-Initiated Interview Summary received for U.S. Appl. No. 16/789,132, dated Nov. 29, 2021, 5 pages.
Applicant-Initiated Interview Summary received for U.S. Appl. No. 17/087,855, dated Feb. 28, 2022, 2 pages.
Board Decision received for Chinese Patent Application No. 201510284896.5, dated Nov. 19, 2021, 14 pages (1 page of English Translation and 13 pages of Official Copy).
Board Decision received for Chinese Patent Application No. 201710094150.7, dated Dec. 22, 2021, 20 pages (1 page of English Translation and 19 pages of Official Copy).
Board Decision received for Chinese Patent Application No. 201780002648.4, dated Jan. 10, 2022, 21 pages (1 page of English Translation and 20 pages of Official Copy).
Board Decision received for Chinese Patent Application No. 201810094316.X, dated Dec. 3, 2021, 18 pages (1 page of English Translation and 17 pages of Official Copy).
Board Opinion received for Chinese Patent Application No. 201610459968.X, dated Mar. 3, 2022, 11 pages (3 pages of English Translation and 8 pages of Official Copy).
Board Opinion received for Chinese Patent Application No. 201810338826.7, dated Jan. 19, 2022, 18 pages (6 pages of English Translation and 12 pages of Official Copy).
Corrected Notice of Allowance received for U.S. Appl. No. 16/125,267, dated Apr. 4, 2022, 2 pages.
Corrected Notice of Allowance received for U.S. Appl. No. 16/125,267, dated Mar. 16, 2022, 2 pages.
Corrected Notice of Allowance received for U.S. Appl. No. 16/125,267, dated May 4, 2022, 3 pages.
Corrected Notice of Allowance received for U.S. Appl. No. 16/667,174, dated Apr. 12, 2022, 2 pages.
Notice of Allowance received for U.S. Appl. No. 16/667,174, dated Mar. 9, 2022, 2 pages.
Notice of Allowance received for U.S. Appl. No. 16/843,638, dated Dec. 22, 2021, 2 pages.
Notice of Allowance received for U.S. Appl. No. 16/843,638, dated Feb. 16, 2022, 2 pages.
Das et al., "A Security Framework for Mobile-to-Mobile Payment Network", International Conference on Personal Wireless Communications, Jan. 25, 2005, pp. 420-423.
Decision on Appeal received for Korean Patent Application No. 10-2020-7020782, dated Jan. 24, 2022, 22 pages (2 pages of English Translation and 20 pages of Official Copy).
Decision on Appeal received for U.S. Appl. No. 15/714,887, dated Feb. 18, 2022, 14 pages.
Decision to Grant received for European Patent Application No. 18830326.7, dated Nov. 11, 2021, 3 pages.
Decision to Grant received for European Patent Application No. 20196476.4, dated Jan. 13, 2022, 2 pages.
Decision to Refuse received for European Patent Application No. 17865509.8, dated Jan. 4, 2022, 13 pages.
Examiner's Pre-Review Report received for Japanese Patent Application No. 2019-563560, vDec. 27, 2021, 4 pages (2 pages of English Translation and 2 pages of Official Copy).
Extended European Search Report received for European Patent Application No. 22150595.1, dated Apr. 8, 2022, 6 pages.
Final Office Action received for U.S. Appl. No. 16/369,473, dated Jan. 25, 2022, 19 pages.
Final Office Action received for U.S. Appl. No. 16/789,132, dated Feb. 25, 2022, 20 pages.
Final Office Action received for U.S. Appl. No. 17/087,855, dated Mar. 31, 2022, 23 pages.
Google Scholar, "Contextual transactions management and payment systems: Search", NPL (non-patent literature), Feb. 22, 2022, 2 pages.
Intention to Grant received for European Patent Application No. 18713408.5, dated Mar. 17, 2022, 10 pages.
Invitation to Pay Additional Fees and Partial International Search Report received for PCT Patent Application No. PCT/US2021/037949, dated Sep. 22, 2021, 13 pages.
Invitation to Pay Search Fees received for European Patent Application No. 19731554.2, dated Dec. 16, 2021, 3 pages.
Minutes of the Oral Proceedings received for European Patent Application No. 17865509.8, dated Jan. 4, 2022, 8 pages.
Non-Final Office Action received for U.S. Appl. No. 15/274,910, dated Dec. 24, 2021, 35 pages.
Office Action received for U.S. Appl. No. 15/274,910, dated Feb. 1, 2022, 34 pages.
Office Action received for U.S. Appl. No. 16/125,267, dated Nov. 23, 2021, 21 pages.
Office Action received for U.S. Appl. No. 17/087,855, dated Dec. 24, 2021, 21 pages.
Notice of Acceptance received for Australian Patent Application No. 2020273355, dated Jan. 17, 2022, 3 pages.
Notice of Acceptance received for Australian Patent Application No. 2020289822, dated Dec. 22, 2021, 3 pages.
Notice of Allowance received for Chinese Patent Application No. 201710094150.7, dated Feb. 23, 2022, 4 pages (1 page of English Translation and 3 pages of Official Copy).
Notice of Allowance received for Chinese Patent Application No. 201780033622.6, dated Feb. 16, 2022, 2 pages (1 page of English Translation and 1 page of Official Copy).
Notice of Allowance received for Chinese Patent Application No. 201780033899.9, dated Feb. 8, 2022, 2 pages (1 page of English Translation and 1 page of Official Copy).
Notice of Allowance received for Chinese Patent Application No. 201780069966.2, dated Feb. 23, 2022, 4 pages (1 page of English Translation and 3 pages of Official Copy).
Notice of Allowance received for Chinese Patent Application No. 201810338040.5, dated Mar. 30, 2022, 6 pages (2 pages of English Translation and 4 pages of Official Copy).
Notice of Allowance received for Chinese Patent Application No. 201810339290.0, dated Mar. 9, 2022, 2 pages (1 page of English Translation and 1 page of Official Copy).
Notice of Allowance received for Japanese Patent Application No. 2018-113081, dated Nov. 8, 2021, 15 pages (1 page of English Translation and 14 pages of Official Copy).
Notice of allowance received for Japanese Patent Application No. 2020-159979, dated Nov. 8, 2021, 5 pages (2 pages of English Translation and 3 pages of Official Copy).
Notice of Allowance received for Japanese Patent Application No. 2021-163037, dated Dec. 6, 2021, 4 pages (1 page of English Translation and 3 pages of Official Copy).
Notice of Allowance received for Japanese Patent Application No. 2021-208395, dated Mar. 25, 2022, 4 pages (1 page of English Translation and 3 pages of Official Copy).

(56) References Cited

OTHER PUBLICATIONS

Notice of Allowance received for Korean Patent Application No. 10-2020-7022596, dated Jan. 27, 2022, 7 pages (2 pages of English Translation and 5 pages of Official Copy).
Notice of Allowance received for Korean Patent Application No. 10-2020-7034180, dated Feb. 22, 2022, 8 pages (2 pages of English Translation and 6 pages of Official Copy).
Notice of Allowance received for Korean Patent Application No. 10-2021-0099243, dated Oct. 30, 2021, 4 pages (1 page of English Translation and 3 pages of Official Copy).
Notice of Allowance received for Korean Patent Application No. 10-2021-7011888, dated Jan. 27, 2022, 5 pages (1 page of English Translation and 4 pages of Official Copy).
Notice of Allowance received for Korean Patent Application No. 10-2021-7015473, dated Feb. 24, 2022, 5 pages (1 page of English Translation and 4 pages of Official Copy).
Notice of Allowance received for Korean Patent Application No. 10-2021-7024020, dated Jan. 14, 2022, 4 pages (1 page of English Translation and 3 pages of Official Copy).
Notice of Allowance received for Korean Patent Application No. 10-2021-7030343, dated Dec. 9, 2021, 6 pages (2 pages of English Translation and 4 pages of Official Copy).
Notice of Allowance received for Korean Patent Application No. 10-2022-7004804, dated Mar. 8, 2022, 8 pages (2 pages of English Translation and 6 pages of Official Copy).
Notice of Allowance received for U.S. Appl. No. 16/125,267, dated Mar. 3, 2022, 10 pages.
Notice of Allowance received for U.S. Appl. No. 16/667,174, dated Feb. 24, 2022, 7 pages.
Notice of Allowance received for U.S. Appl. No. 16/843,638, dated Feb. 4, 2022, 7 pages.
Notice of Allowance received for U.S. Appl. No. 17/015,429, dated Apr. 4, 2022, 2 pages.
Notice of Allowance received for U.S. Appl. No. 17/015,429, dated Apr. 15, 2022, 2 pages.
Notice of Allowance received for U.S. Appl. No. 17/015,429, dated Dec. 13, 2021, 2 pages.
Notice of Allowance received for U.S. Appl. No. 17/015,429, dated Dec. 24, 2021, 2 pages.
Notice of Allowance received for U.S. Appl. No. 17/015,429, dated Feb. 16, 2022, 5 pages.
Notice of Allowance received for U.S. Appl. No. 17/015,429, dated Mar. 4, 2022, 2 pages.
Notice of Allowance received for U.S. Appl. No. 17/015,429, dated Nov. 24, 2021, 2 pages.
Action received for Australian Patent Application No. 2019268070, dated Jan. 27, 2022, 3 pages.
Action received for Australian Patent Application No. 2019281965, dated Nov. 30, 2021, 3 pages.
Office Action received for Australian Patent Appiication No. 2020203899, dated Nov. 26, 2021, 4 pages.
Office Action received for Australian Patent Application No. 2020273355, dated Nov. 23, 2021, 6 pages.
Office Action received for Australian Patent Application No. 2021200415, dated Jan. 18, 2022, 3 pages.
Office Action received for Australian Patent Application No. 2021201276, dated Feb. 24, 2022, 4 pages.
Office Action received for Australian Patent Application No. 2021202352, dated Mar. 15, 2022, 3 pages.
Office Action received for Australian Patent Application No. 2021202959, dated Apr. 22, 2022, 6 pages.
Office Action received for Chinese Patent Application No. 201510284896.5, dated Mar. 14, 2022, 10 pages (5 pages of English Translation and 5 pages of Official Copy).
Office Action received for Chinese Patent Application No. 201710094150.7, dated Jan. 10, 2022, 6 pages (3 pages of English Translation and 3 pages of Official Copy).
Office Action received for Chinese Patent Application No. 201710198190.6, dated Jan. 24, 2022, 16 pages (6 pages of English Translation and 10 pages of Official Copy).
Office Action received for Chinese Patent Application No. 201780002648.4, dated Apr. 19, 2022, 6 pages (3 pages of English Translation and 3 pages of Official Copy).
Office Action received for Chinese Patent Application No. 201780002648.4, dated Jan. 18, 2022, 12 pages (6 pages of English Translation and 6 pages of Official Copy).
Office Action received for Chinese Patent Application No. 201780053143.0, dated Dec. 16, 2021, 19 pages (10 pages of English Translation and 9 pages of Official Copy).
Office Action received for Chinese Patent Application No. 201810338040.5, dated Oct. 25, 2021, 22 pages (13 pages of English Translation and 9 pages of Official Copy).
Office Action received for Chinese Patent Application No. 201880000798.6, dated Dec. 30, 2021, 10 pages (5 pages of English Translation and 5 pages of Official Copy).
Office Action received for European Patent Application No. 19731554.2, dated Apr. 19, 2022, 8 pages.
Office Action received for European Patent Application No. 20186286.9, dated Jan. 25, 2022, 8 pages.
Office Action received for European Patent Application No. 20198076.0, dated Mar. 25, 2022, 5 pages.
Office Action received for Indian Patent Application No. 201917024374, dated Dec. 30, 2021, 10 pages.
Office Action received for Indian Patent Application No. 201918003782, dated Nov. 18, 2021, 8 pages.
Office Action received for Indian Patent Application No. 201918027146, dated Jan. 4, 2022, 7 pages.
Office Action received for Indian Patent Application No. 202018009834, dated Nov. 12, 2021, 6 pages.
Office Action received for Indian Patent Application No. 202018014786, dated Nov. 9, 2021, 7 pages.
Office Action received for Indian Patent Application No. 202018038351, dated Feb. 25, 2022, 6 pages.
Office Action received for Indian Patent Application No. 202018041558, dated Dec. 3, 2021, 7 pages.
Office Action received for Indian Patent Application No. 202018044420, dated Jan. 31, 2022, 6 pages.
Office Action received for Indian Patent Application No. 202118009403, dated Feb. 21, 2022, 6 pages.
Office Action received for Indian Patent Application No. 202118018461, dated Feb. 23, 2022, 6 pages.
Office Action received for Japanese Patent Application No. 2020-028315, dated Feb. 7, 2022, 6 pages (3 pages of English Translation and 3 pages of Official Copy).
Office Action received for Japanese Patent Application No. 2020-169988, dated Feb. 4, 2022, 8 pages (4 pages of English Translation and 4 pages of Official Copy).
Office Action received for Japanese Patent Application No. 2020-184605, dated Feb. 14, 2022, 24 pages (11 pages of English Translation and 13 pages of Official Copy).
Office Action received for Japanese Patent Application No. 2020-566978, dated Feb. 4, 2022, 12 pages (6 pages of English Translation and 6 pages of Official Copy).
Office Action received for Japanese Patent Application No. 2021-001028, dated Jan. 31, 2022, 10 pages (5 pages of English Translation and 5 pages of Official Copy).
Office Action received for Korean Patent Application No. 10-2019-7006639, dated Mar. 23, 2022, 9 pages (4 pages of English Translation and 5 pages of Official Copy).
Office Action received for Korean Patent Application No. 10-2019-7033799, dated Nov. 23, 2021, 6 pages (3 pages of English Translation and 3 pages of Official Copy).
Office Action received for Korean Patent Application No. 10-2020-7034405, dated Dec. 4, 2021, 15 pages (7 pages of English Translation and 8 pages of Official Copy).
Office Action received for Korean Patent Application No. 10-2021-7032984, dated Feb. 22, 2022, 8 pages (4 pages of English Translation and 4 pages of Official Copy).
Office Action received for Korean Patent Application No. 10-2022-7004578, dated Mar. 22, 2022, 11 pages (5 pages of English Translation and 6 pages of Official Copy).
Qiye Wang, "Design and Implementation of SAN Device Access Control in Unified Storage Platform", Master's Theses, Huazhong

(56) References Cited

OTHER PUBLICATIONS

University of Science & Technology, Wuhan, Jun. 2008, 63 pages (Official Copy only). {See Communication Under Rule 37 CFR § 1.98(a) (3)}.
Record of Oral Hearing received for U.S. Appl. No. 15/714,887, dated Feb. 15, 2022, 16 pages.
Requirement for Restriction/Election received for U.S. Appl. No. 16/938,362, dated May 4, 2022, 6 pages.
Result of Consultation received for European Patent Application No. 19160344.8, dated Feb. 4, 2022, 3 pages.
Schürmann et al., "BANDANA—Body Area Network Device-to-Device Authentication Using Natural gait", Ambient Intelligence, Comnet, Aalto University, DOI: 10.1109/PERCOM.2017.7917865, Dec. 11, 2016, 11 pages.
Summons to Attend Oral Proceedings received for European Patent Application No. 17799904.2, mailed on Dec. 20, 2021, 8 pages.
Summons to Attend Oral Proceedings received for European Patent Application No. 17813737.8, mailed on Jan. 4, 2022, 12 pages.
Summons to Attend Oral Proceedings received for European Patent Application No. 19150528.8, mailed on Mar. 15, 2022, 7 pages.
Summons to Attend Oral Proceedings received for European Patent Application No. 19194828.0, mailed on Feb. 3, 2022, 10 pages.
Summons to Attend Oral Proceedings received for European Patent Application No. 19194828.0, mailed on Feb. 10, 2022, 2 pages.
Taro Matsumura, "The Credit Card Industry and the small financial institutions and the future in Apple Pay?", MacFan, Japan, Mynavi Corporation, vol. 23, No. 10, Oct. 1, 2015, 8 pages (Official Copy only). {See Communication Under Rule 37 CFR § 1.98(a) (3)}.
Weiss et al., "Smartphone and Smartwatch-Based Biometrics using Activities of Daily Living", IEEE Access, DOI: 10.1109/ACCESS.2019.2940729, vol. XX, 2017, 13 pages.
Yongxi et al., "Application of RFID Technology in Mobile Payment", China Academic Journal Electronic Publishing House, 1994-2022, Nov. 25, 2012, pp. 97-99 (Official Copy Only). {See Communication Under Rule 37 CFR § 1.98(a) (3)}.
Zhang et al., "Wrist Unlock: Secure and Usable Smartphone Unlocking with Wrist Wearables", IEEE Conference on Communications and Network Security (CNS), 2019, 9 pages.
Intention to Grant received for European Patent Application No. 18713408.5, dated May 23, 2022, 10 pages.
Notice of Allowance received for U.S. Appl. No. 17/015,429, dated Jun. 1, 2022, 5 pages.
Office Action received for Chinese Patent Application No. 201910246400.3, dated Apr. 19, 2022, 24 pages (13 pages of English Translation and 11 pages of Official Copy).
Brief Communication Regarding Oral Proceedings received for European Patent Application No. 19150528.8, dated Sep. 5, 2022, 2 pages.
Corrected Notice of Allowance received for U.S. Appl. No. 16/369,473, dated Sep. 9, 2022, 2 pages.
Decision to Grant received for European Patent Application No. 18713408.5, dated Sep. 1, 2022, 3 pages.
Decision to Grant received for European Patent Application No. 19160344.8, dated Sep. 1, 2022, 3 pages.
Non-Final Office Action received for U.S. Appl. No. 16/938,362, dated Sep. 14, 2022, 14 pages.
Office Action received for Australian Patent Application No. 2019281965, dated Aug. 31, 2022, 5 pages.
Office Action received for Japanese Patent Application No. 2021-131310, dated Sep. 2, 2022, 9 pages (5 pages of English Translation and 4 pages of Official Copy).
Applicant-Initiated Interview Summary received for U.S. Appl. No. 17/409,570, dated Dec. 7, 2022, 4 pages.
Applicant-Initiated Interview Summary received for U.S. Appl. No. 17/863,974, dated Dec. 9, 2022, 2 pages.
Office Action received for Australian Patent Application No. 2022200900, dated Nov. 30, 2022, 6 pages.
Office Action received for Chinese Patent Application No. 201910109868.8, dated Nov. 18, 2022, 32 pages (17 pages of English Translation and 15 pages of Official Copy).
Office Action received for Japanese Patent Application No. 2021-084065, dated Nov. 14, 2022, 10 pages (5 pages of English Translation and 5 pages of Official Copy).
Result of Consultation received for European Patent Application No. 18208881.5, dated Dec. 6, 2022, 10 pages.
Advisory Action received for U.S. Appl. No. 16/369,473, dated May 12, 2022, 4 pages.
Brief Communication Regarding Oral Proceedings received for European Patent Application No. 19194828.0, dated May 6, 2022, 1 page.
Intention to Grant received for European Patent Apptication No. 19160344.8, dated May 13, 2022, 10 pages.
Notice of Acceptance received for Australian Patent Application No. 2021200415, dated May 9, 2022, 3 pages.
Notice of Acceptance received for Australian Patent Application No. 2022200617, dated May 12, 2022, 3 pages.
Notice of Atlowance received for U.S. Appl. No. 17/015,429, dated May 10, 2022, 2 pages.
Office Action received for Australian Patent Application No. 2019281965, dated May 11, 2022, 5 pages.
Office Action received for Australian Patent Application No. 2020203899, dated May 5, 2022, 4 pages.
Office Action received for Chinese Patent Application No. 201780053143.0, dated Mar. 30, 2022, 12 pages (5 pages of English Translation and 7 pages of Official Copy).
Office Action received for Chinese Patent Application No. 201980041865.3, dated Apr. 13, 2022, 12 pages (6 pages of English Translation and 6 pages of Official Copy).
Office Action received for European Patent Application No. 20191533.7, dated May 12, 2022, 5 pages.
Office Action received for Indian Patent Application No. 202018009906, dated Apr. 29, 2022, 9 pages.
Office Action received for Korean Patent Application No. 10-2022-0010942, dated Apr. 27, 2022, 5 pages (2 pages of English Translation and 3 pages of Official Copy).
Result of Consultation received for European Patent Application No. 19194828.0, dated May 9, 2022, 4 pages.
Applicant-Initiated Interview Summary received for U.S. Appl. No. 17/409,570, dated Nov. 29, 2022, 4 pages.
Brief Communication Regarding Oral Proceedings received for European Patent Application No. 19160348.9, dated Nov. 8, 2022, 3 pages.
Notice of Acceptance received for Australian Patent Application No. 2021250944, dated Nov. 14, 2022, 3 pages.
Notice of Allowance received for U.S. Appl. No. 17/087,855, dated Nov. 25, 2022, 8 pages.
Office Action received for Australian Patent Application No. 2019281965, dated Nov. 18, 2022, 7 pages.
The YouTube Tech Guy, "How to Setup Face Unlock on Your Android", Available online at: https://www.youtube.com/watch?v=iJYFLYKYvTk, Apr. 12, 2012, 1 page.
Board Decision received for Chinese Patent Application No. 2015102847159, dated Jul. 21, 2022, 22 pages (2 pages of English Translation and 20 pages of Official Copy).
Notice of Allowance received for Chinese Patent Application No. 2019800418653, dated Aug. 16, 2022, 6 pages (3 pages of English Translation and 3 pages of Official Copy).
Notice of Allowance received for Korean Patent Application No. 10-2022-0010942, dated Aug. 10, 2022, 6 pages (2 pages of English Translation and 4 pages of Official Copy).
Decision to Grant received for European Patent Application No. 19194828.0, dated Oct. 27, 2022, 3 pages.
Extended European Search Report received for European Patent Application No. 22188377.0, dated Oct. 27, 2022, 8 pages.
Non-Final Office Action received for U.S. Appl. No. 17/863,974, dated Oct. 24, 2022, 23 pages.
Office Action received for Australian Patent Application No. 2021254574, dated Oct. 15, 2022, 3 pages.
Office Action received for Japanese Patent Application No. 2021-149549, dated Oct. 21, 2022, 4 pages (2 pages of English Translation and 2 pages of Official Copy).
Applicant-Initiated Interview Summary received for U.S. Appl. No. 17/062,941, dated Apr. 19, 2023, 2 pages.

(56) References Cited

OTHER PUBLICATIONS

Extended European Search Report received for European Patent Application No. 23157906.1, dated Apr. 6, 2023, 10 pages.
Office Action received for Chinese Patent Application No. 201910246439.5, dated Apr. 6, 2023, 14 pages (7 pages of English Translation and 7 pages of Official Copy).
Office Action received for Chinese Patent Application No. 202211283788.2, dated Mar. 22, 2023, 15 pages (7 pages of English Translation and 8 pages of Official Copy).
Office Action received for European Patent Application No. 19769669.3, dated Apr. 18, 2023, 20 pages.
Office Action received for Japanese Patent Application No. 2021-084065, dated Apr. 10, 2023, 6 pages (3 pages of English Translation and 3 pages of Official Copy).
Corrected Notice of Allowance received for U.S. Appl. No. 16/938,362, dated Feb. 7, 2023, 4 pages.
Notice of Allowance received for Chinese Patent Application No. 201910246400.3, dated Jan. 28, 2023, 5 pages (1 page of English Translation and 4 pages of Official Copy).
Office Action received for Korean Patent Application No. 10-2022-7014519, dated Jan. 26, 2023, 9 pages (4 pages of English Translation and 5 pages of Official Copy).
Applicant-Initiated Interview Summary received for U.S. Appl. No. 17/962,369, dated Jul. 24, 2023, 4 pages.
Notice of Allowance received for U.S. Appl. No. 17/193,991, dated Jul. 17, 2023, 10 pages.
Notice of Allowance received for U.S. Appl. No. 17/409,570, dated Jul. 20, 2023, 7 pages.
Notice of Allowance received for U.S. Appl. No. 17/863,974, dated Jul. 21, 2023, 2 pages.
Office Action received for Australian Patent Application No. 2022200900, dated Jul. 13, 2023, 3 pages.
Brief Communication regarding Oral Proceedings received for European Patent Application No. 20198076.0, mailed on May 2, 2023, 1 page.
Corrected Notice of Allowance received for U.S. Appl. No. 17/409,570, dated May 10, 2023, 2 pages.
Non-Final Office Action received for U.S. Appl. No. 17/725,311, dated May 10, 2023, 54 pages.
Notice of Allowance received for Korean Patent Application No. 10-2022-7012869, dated Apr. 18, 2023, 7 pages (2 pages of English Translation and 5 pages of Official Copy).
Non-Final Office Action received for U.S. Appl. No. 17/962,369, dated Jun. 9, 2023, 17 pages.
Notice of Allowance received for U.S. Appl. No. 17/519,025, dated Jun. 22, 2023, 7 pages.
Office Action received for Chinese Patent Application No. 202211285112.7, dated May 18, 2023, 16 pages (6 pages of English Translation and 10 pages of Official Copy).
Appeal Decision received for Australian Patent Application No. 2019268070, mail on Dec. 22, 2022, 26 pages.
Applicant-initiated Interview Summary received for U.S. Appl. No. 17/409,570, dated Dec. 27, 2022, 2 pages.
Decision to Refuse received for European Patent Application No. 18208815, dated Dec. 23, 2022, 12 pages.
Final Office Action received for U.S. Appl. No. 17/193,991, dated Dec. 22, 2022, 6 pages.
Final Office Action received for U.S. Appl. No. 17/863,974, dated Dec. 16, 2022, 23 pages.
Minutes of Oral Proceedings received for European Patent Application No. 18208881.5, dated Dec. 22, 2022, 4 pages.
Notice of Acceptance received for Australian Patent Application No. 2021254574, dated Dec. 14, 2022, 3 pages.
Notice of Allowance received for Japanese Patent Application No. 2021-131310, dated Dec. 9, 2022, 4 pages (1 pages of English Translation and 3 pages of Official Copy).
Notice of Allowance received for Korean Patent Application No. 10-2022-7012864, dated Dec. 15, 2022, 7 pages (2 pages of English Translation and 5 pages of Official Copy).

Office Action received for Japanese Patent Application No. 2020484605, dated Dec. 12, 2022, 9 pages (4 pages of English Translation and 5 pages of Official Copy).
Advisory Action received for U.S. Appl. No. 17/193,991, dated Jan. 31, 2023, 3 pages.
Choong et al., "Fingerprint Self-Captures: Usability of a fingerprint system with real-time feedback.", IEEE Fifth International Conference on Biometrics: Theory, Applications and Systems (BTAS). IEEE, 2012. URL: https://ieeexplore.ieee.orgistamp/stamp.jsp?tp. Szar-munber=6374553, 2012, pp. 16-22.
Corrected Notice of Allowance received for U.S. Appl. No. 17/087,855, dated Jan. 25, 2023, 4 pages.
Extended European Search Report received for European Patent Application No. 22198902.3, dated Jan. 20, 2023, 9 pages.
Notice of Allowance received for U.S. Appl. No. 16/938,362, dated Jan. 19, 2023, 8 pages.
Notice of Allowance received for U.S. Appl. No. 17/409,570, dated Jan. 25, 2023, 7 pages.
Office Action received for Chinese Patent Application No. 201780053143.0, dated Nov. 30, 2022, 13 pages (6 pages of English Translation and 7 pages of Official Copy).
Office Action received for European Patent Application No. 21173988.3, dated Jan. 19, 2023, 5 pages.
Office Action received for German Patent Application No. 112014004134.3, dated Dec. 21, 2022, 22 pages (8 pages of English Translation and 14 pages of Official Copy).
Office Action received for Japanese Patent Application No. 2019-563560, dated Jan. 20, 2023, 56 pages (25 pages of English Translation and 31 pages of Official Copy).
Examiner's Answer to Appeal Brief received for U.S. Appl. No. 17/516,495, dated Jul. 28, 2023, 13 pages.
International Preliminary Report on Patentability received for PCT Patent Application No. PCT/US2022/013730, dated Aug. 3, 2023, 15 pages.
International Search Report and Written Opinion received for PCT Patent Application No. PCT/US2023/010234, dated Apr. 26, 2023, 18 pages.
Notice of Allowance received for Korean Patent Application No. 10-2022-7014519, dated Jul. 28, 2023, 7 pages (2 pages of English Translation and 5 pages of Official Copy).
Notice of Allowance received for Korean Patent Application No. 10-2022-7015289, dated Jul. 31, 2023, 8 pages (2 pages of English Translation and 6 pages of Official Copy).
Notice of Allowance received for U.S. Appl. No. 17/863,974, dated Aug. 9, 2023, 2 pages.
Office Action received for Chinese Patent Application No. 201910901500.5, dated Jun. 30, 2023, 27 pages (9 pages of English Translation and 18 pages of Official Copy).
Office Action received for Korean Patent Application No. 10-2022-7033655, dated Jul. 27, 2023, 5 pages (2 pages of English Translation and 3 pages of Official Copy).
Brief Communication Regarding Oral Proceedings received for European Patent Application No. 20198076.0, mailed on Aug. 28, 2023, 1 page.
Notice of Acceptance received for Australian Patent Application No. 2022206826, dated Aug. 24, 2023, 3 pages.
Office Action received for Australian Patent Application No. 2022209019, dated Aug. 18, 2023, 4 pages.
Extended European Search Report received for European Patent Application No. 22197755.6, dated Feb. 20, 2023, 8 pages.
Extended European Search Report received for European Patent Application No. 22212086.7, dated Feb. 21, 2023, 10 pages.
Non-Final Office Action received for U.S. Appl. No. 17/955,311, dated Mar. 15, 2023, 6 pages.
Notice of Acceptance received for Australian Patent Application No. 2019268070, dated Feb. 27, 2023, 3 pages.
Office Action received for Korean Patent Application No. 10-2021-7010306, dated Feb. 15, 2023, 10 pages (5 pages of English Translation and 5 pages of Official Copy).
Pre-Appeal Review Report received for Japanese Patent Application No. 2020-566978, dated Feb. 21, 2023, 4 pages (2 pages of English Translation and 2 pages of Official Copy).

(56) References Cited

OTHER PUBLICATIONS

Non-Final Office Action received for U.S. Appl. No. 17/062,941, dated Mar. 30, 2023, 6 pages.
Non-Final Office Action received for U.S. Appl. No. 17/863,974, dated Apr. 13, 2023, 30 pages.
Notice of Allowance received for U.S. Appl. No. 16/938,362, dated Apr. 10, 2023, 7 pages.
Notice of Allowance received for U.S. Appl. No. 17/193,991, dated Mar. 29, 2023, 9 pages.
Notice of Allowance received for U.S. Appl. No. 17/409,570, dated Apr. 11, 2023, 7 pages.
Office Action received for Australian Patent Application No. 2022200900, dated Mar. 28, 2023, 3 pages.
Office Action received for Australian Patent Application No. 2022200900, dated Sep. 8, 2023, 4 pages.
Office Action received for Australian Patent Application No. 2023203469, dated Aug. 31, 2023, 5 pages.
Office Action received for German Patent Application No. 112014004134.3, dated Jul. 31, 2023, 11 pages (1 page of English Translation and 10 pages of Official Copy).
Decision to Grant received for European Patent Application No. 20186286.9, dated May 11, 2023, 4 pages.
Notice of Allowance received for Japanese Patent Application No. 2021-084065, dated May 15, 2023, 4 pages (1 page of English Translation and 3 pages of Official Copy).
Notice of Allowance received for U.S. Appl. No. 17/955,311, dated May 22, 2023, 7 pages.
Office Action received for Chinese Patent Application No. 201910109868.8, dated Apr. 23, 2023, 29 pages (3 pages of English Translation and 26 pages of Official Copy).
Office Action received for Korean Patent Application No. 10-2022-7029609, dated Apr. 28, 2023, 9 pages (4 pages of English Translation and 5 pages of Official Copy).
Applicant-Initiated Interview Summary received for U.S. Appl. No. 17/863,974, dated May 25, 2023, 2 pages.
Office Action received for Korean Patent Application No. 10-2022-7004578, dated May 11, 2023, 8 pages (4 pages of English Translation and 4 pages of Official Copy).
Supplemental Notice of Allowance received for U.S. Appl. No. 17/955,311, dated May 26, 2023, 2 pages.
Advisory Action received for U.S. Appl. No. 17/863,974, dated Feb. 15, 2023, 2 pages.
Extended European Search Report received for European Patent Application No. 22197752.3, dated Feb. 15, 2023, 7 pages.
Intention to Grant received for European Patent Application No. 20186286.9, dated Feb. 17, 2023, 9 pages.
Intention to Grant received for European Patent Application No. 21166287.9, dated Feb. 23, 2023, 9 pages.
Notice of Allowance received for U.S. Appl. No. 17/519,025, dated Mar. 2, 2023, 8 pages.
Office Action received for Japanese Patent Application No. 2021-168243, dated Feb. 6, 2023, 8 pages (4 pages of English Translation and 4 pages of Official Copy).
Office Action received for Korean Patent Application No. 10-2022-7004578, dated Jan. 27, 2023, 8 pages (4 pages of English Translation and 4 pages of Official Copy).
Office Action received for Korean Patent Application No. 10-2022-7015289, dated Jan. 28, 2023, 12 pages (5 pages of English translation and 7 pages of Official copy).
Summons to Attend Oral Proceedings received for European Patent Application No. 20198076.0, mailed on Feb. 16, 2023, 8 pages.
Applicant Initiated Interview Summary received for U.S. Appl. No. 17/725,311, dated Jun. 30, 2023, 5 pages.
Decision to Refuse received for Japanese Patent Application No. 2021-149549, dated Jun. 26, 2023, 4 pages (2 pages of English Translation and 2 pages of Official Copy).
Notice of Allowance received for U.S. Appl. No. 17/863,974, dated Jul. 11, 2023, 5 pages.
Office Action received for Australian Patent Application No. 2022206826, dated Jul. 4, 2023, 3 pages.
Office Action received for Japanese Patent Application No. 2020-184605, dated Jul. 3, 2023, 6 pages (3 pages of English Translation and 3 pages of Official Copy).
Decision to Refuse received for Japanese Patent Application No. 2021-168243, mailed on Aug. 14, 2023, 7 pages (3 pages of English Translation and 4 pages of Official Copy).
Final Office Action received for U.S. Appl. No. 17/962,369, dated Aug. 15, 2023, 20 pages.
Notice of Allowance received for Korean Patent Application No. 10-2021-7010306, dated Aug. 14, 2023, 7 pages (2 pages of English Translation and 5 pages of Official Copy).
Notice of Allowance received for U.S. Appl. No. 17/062,941, dated Aug. 11, 2023, 11 pages.
Office Action received for Australian Patent Application No. 2022231779, dated Aug. 7, 2023, 5 pages.
Office Action received for Chinese Patent Application No. 202211283788.2, dated Jul. 7, 2023, 11 pages (8 pages of English Translation and 3 pages of Official Copy).
Office Action received for Japanese Patent Application No. 2022-100394, dated Sep. 29, 2023, 6 pages (3 pages of English Translation and 3 pages of Official Copy).
Office Action received for Japanese Patent Application No. 2022-151495, dated Sep. 29, 2023, 11 pages (5 pages of English Translation and 6 pages of Official Copy).
Office Action received for Korean Patent Application No. 10-2022-0150750, dated Sep. 20, 2023, 15 pages (7 pages of English Translation and 8 pages of Official Copy).
Office Action received for Korean Patent Application No. 10-2023-7024803, dated Sep. 19, 2023, 7 pages (3 pages of English Translation and 4 pages of Official Copy).
Corrected Notice of Allowance received for U.S. Appl. No. 17/087,855, dated Jan. 12, 2023, 6 pages.
Office Action received for Chinese Patent Application No. 201910901500.5, dated Nov. 24, 2022, 22 pages (7 pages of English Translation and 15 pages of Official Copy).
Applicant-Initiated Interview Summary received for U.S. Appl. No. 17/962,369, dated Oct. 16, 2023, 4 pages.
Final Office Action received for U.S. Appl. No. 17/725,311, dated Oct. 13, 2023, 66 pages.
Non-Final Office Action received for U.S. Appl. No. 18/101,037, dated Oct. 20, 2023, 15 pages.
Non-Final Office Action received for U.S. Appl. No. 18/105,191, dated Oct. 13, 2023, 23 pages.
Notice of Allowance received for Japanese Patent Application No. 2020-184605, dated Oct. 10, 2023, 4 pages (1 page of English Translation and 3 pages of Official Copy).
Notice of Allowance received for Japanese Patent Application No. 2021-149549, dated Oct. 16, 2023, 4 pages (1 page of English Translation and 3 pages of Official Copy).
Notice of Allowance received for Korean Patent Application No. 10-2022-7029609, dated Oct. 23, 2023, 8 pages (2 pages of English Translation and 6 pages of Official Copy).
Office Action received for Australian Patent Application No. 2022279466, dated Oct. 25, 2023, 3 pages.
Notice of Acceptance received for Australian Patent Application No. 2022279466, dated Jan. 10, 2024, 3 pages.

\* cited by examiner

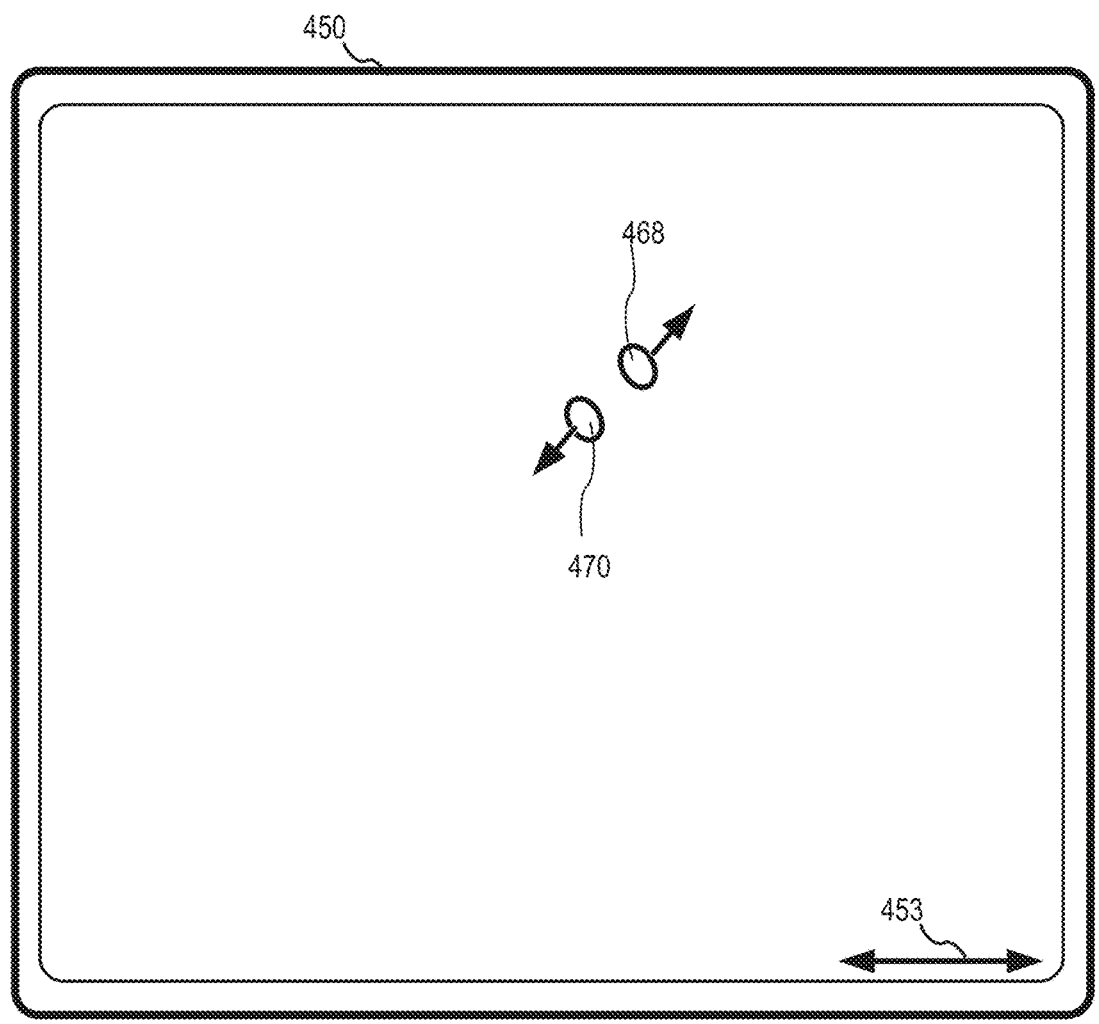
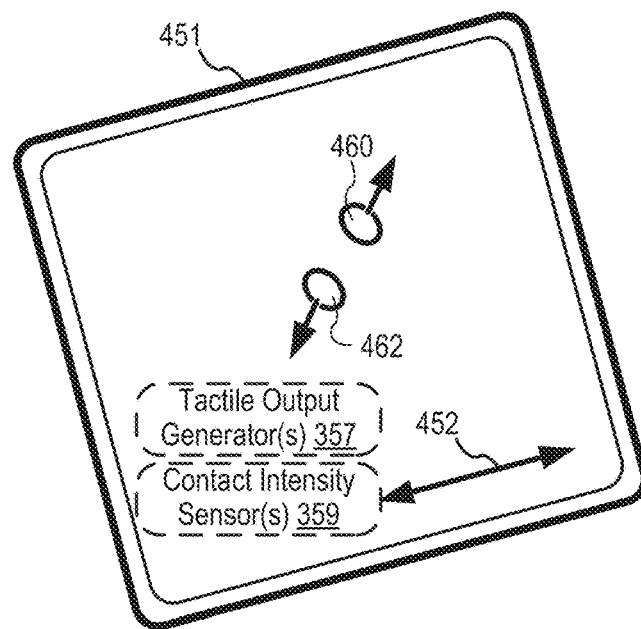
*FIG. 4B*

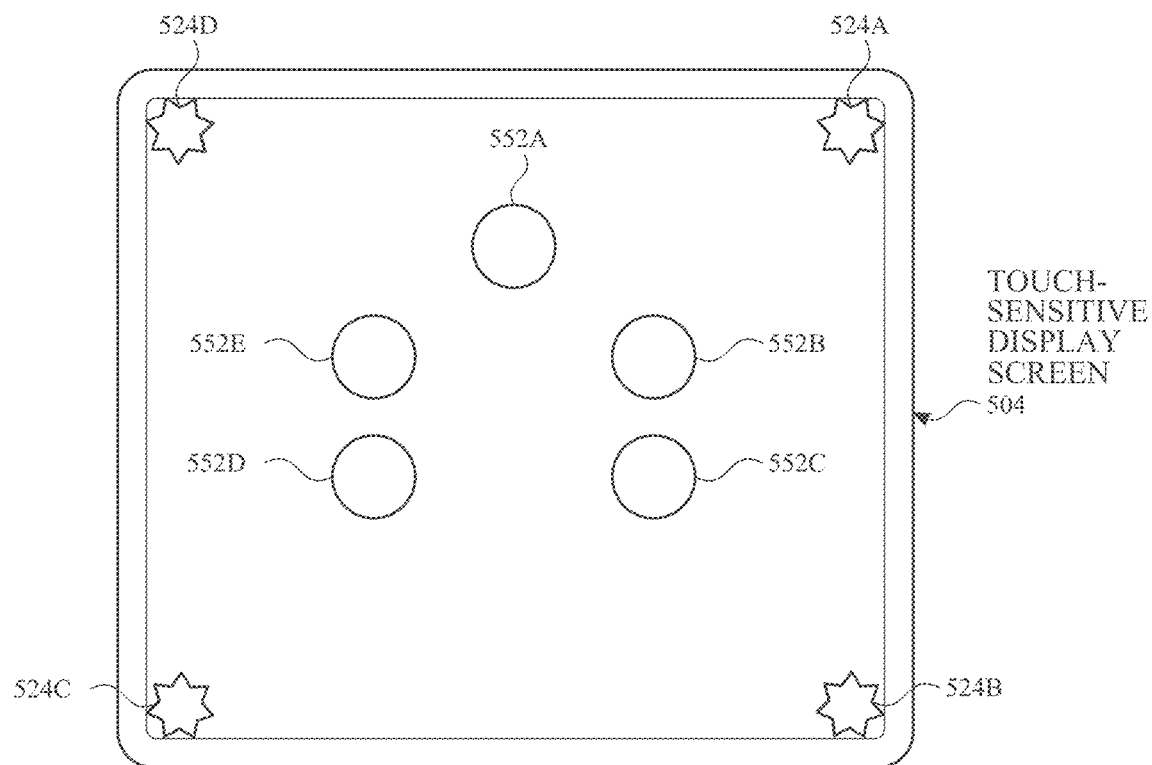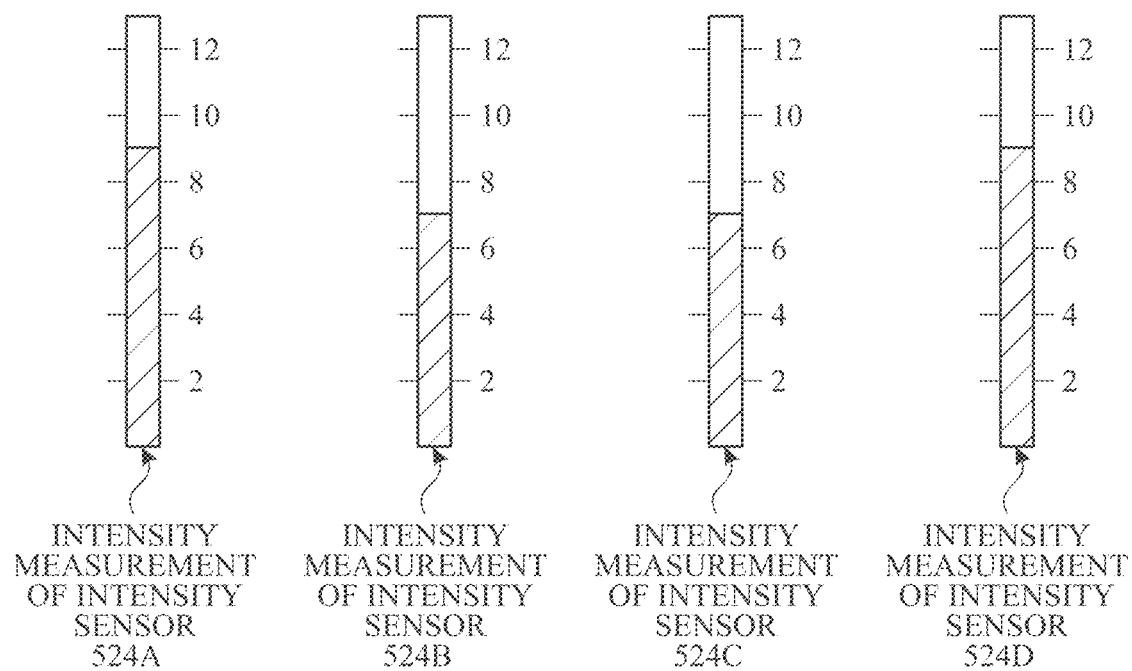
FIG. 5C

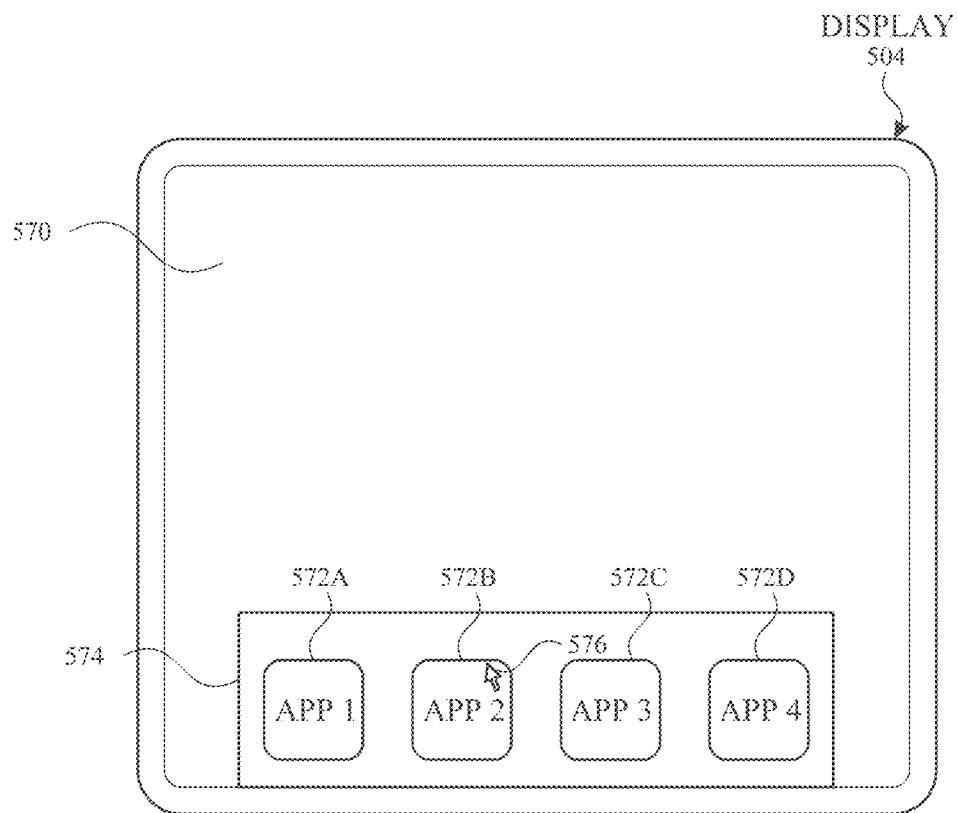
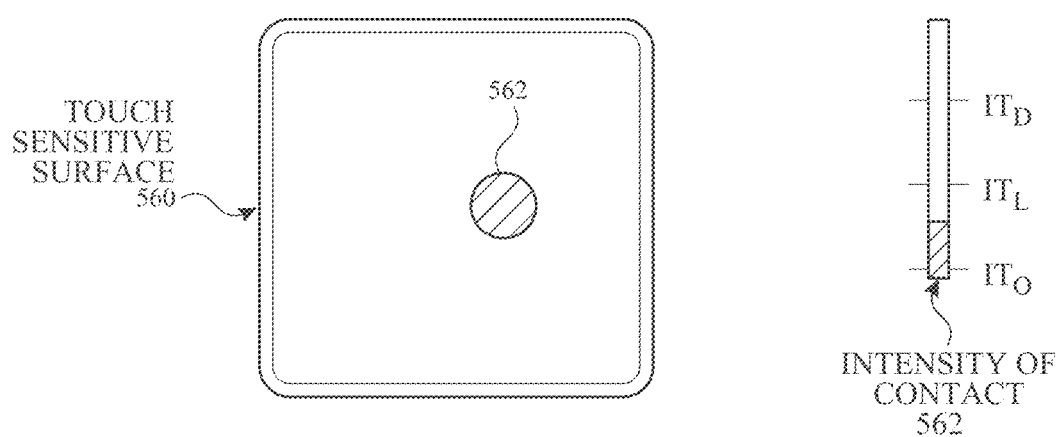
FIG. 5E

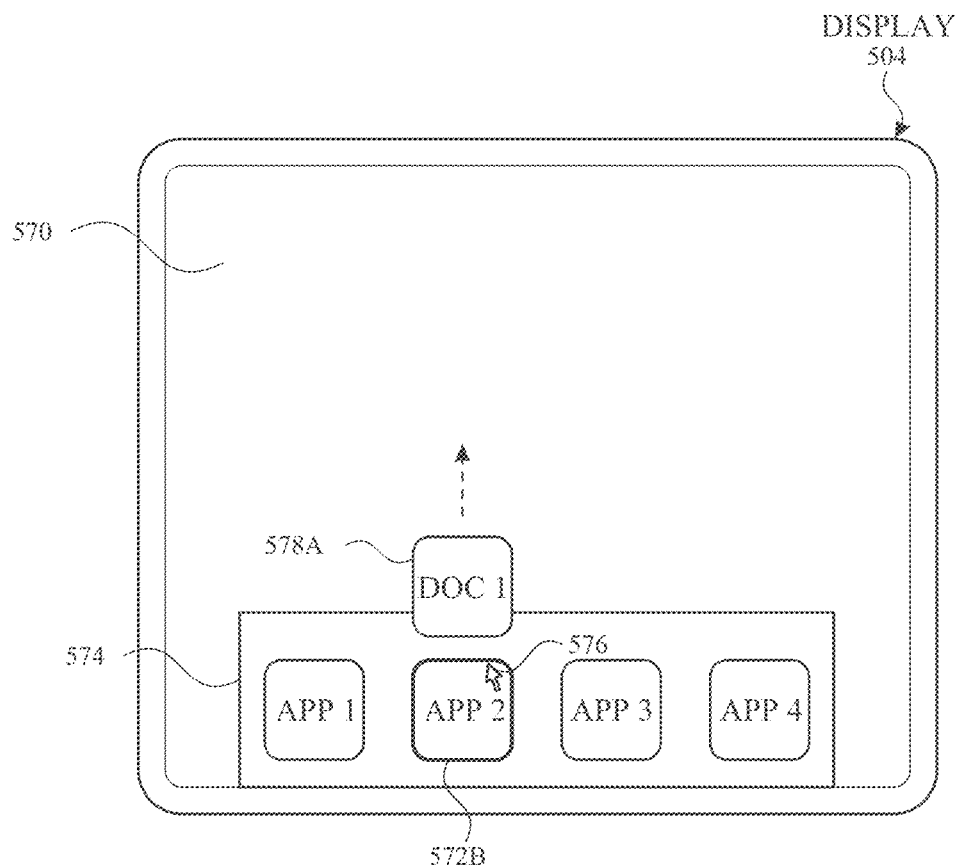
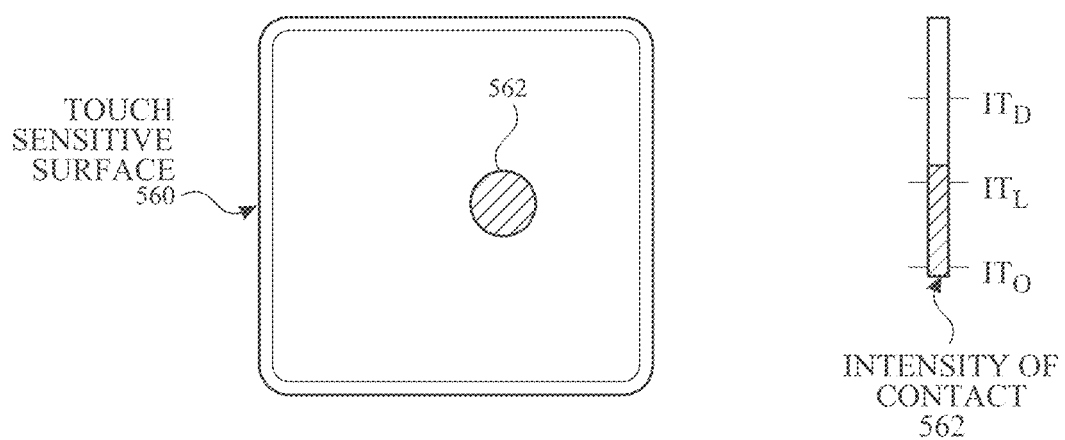
*FIG. 5F*

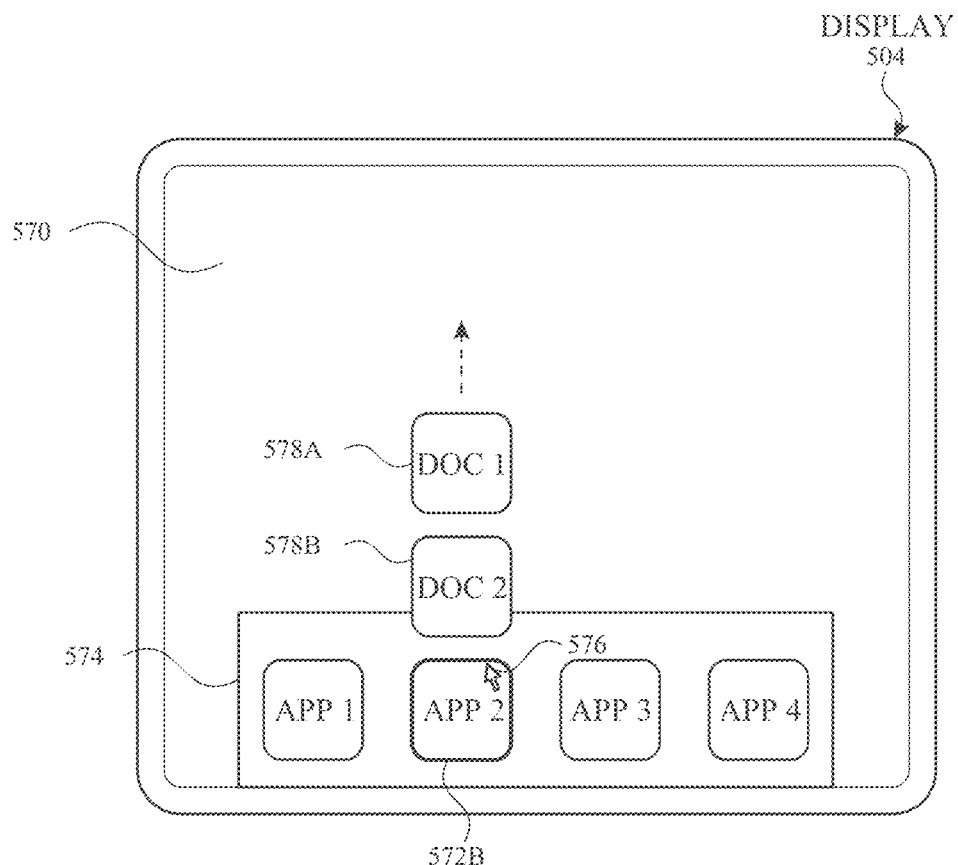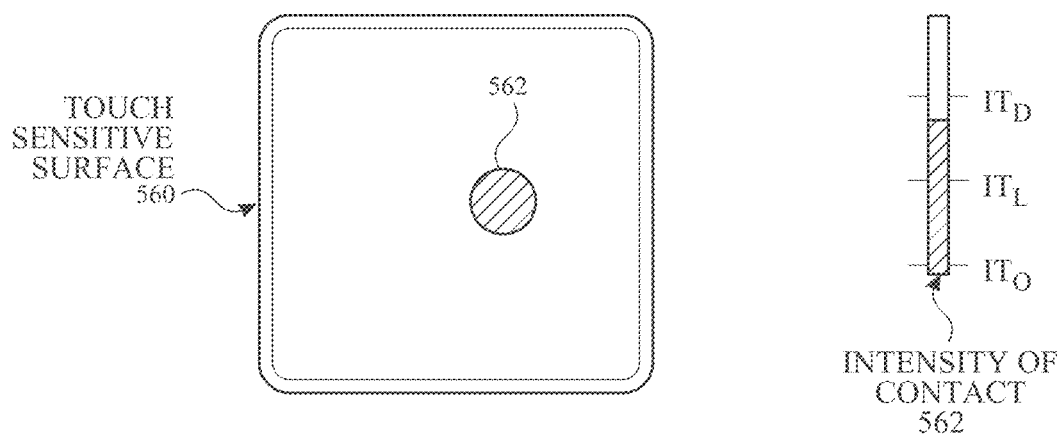
FIG. 5G

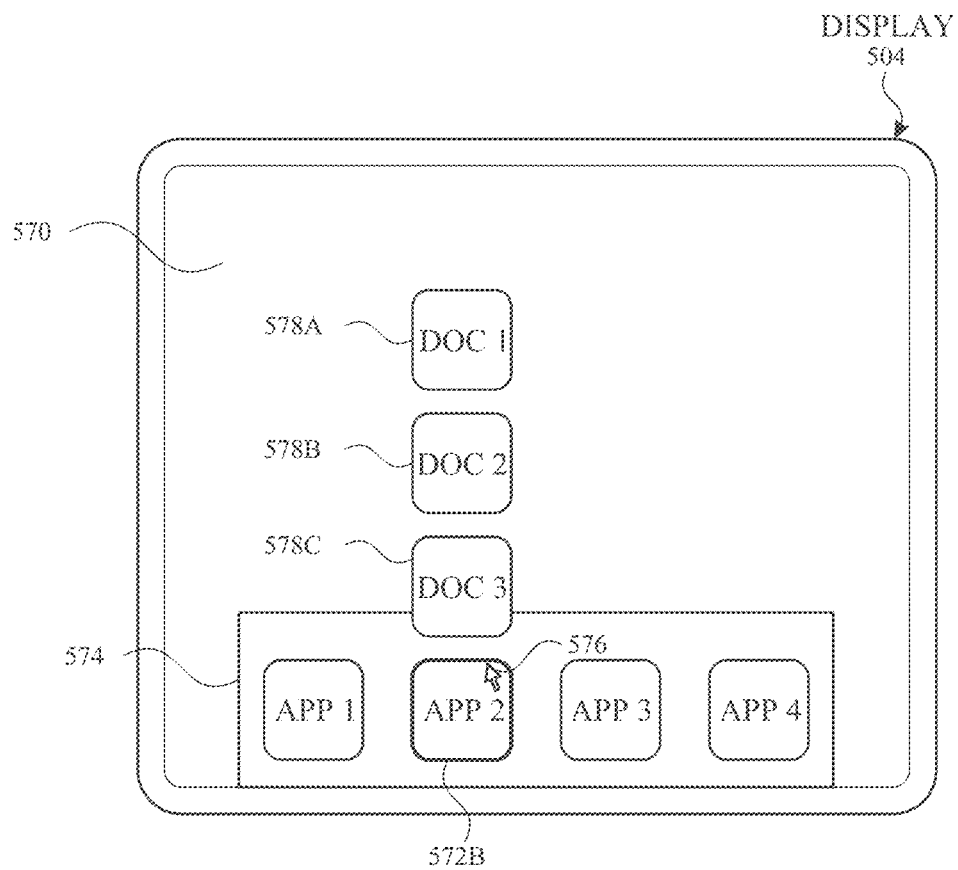
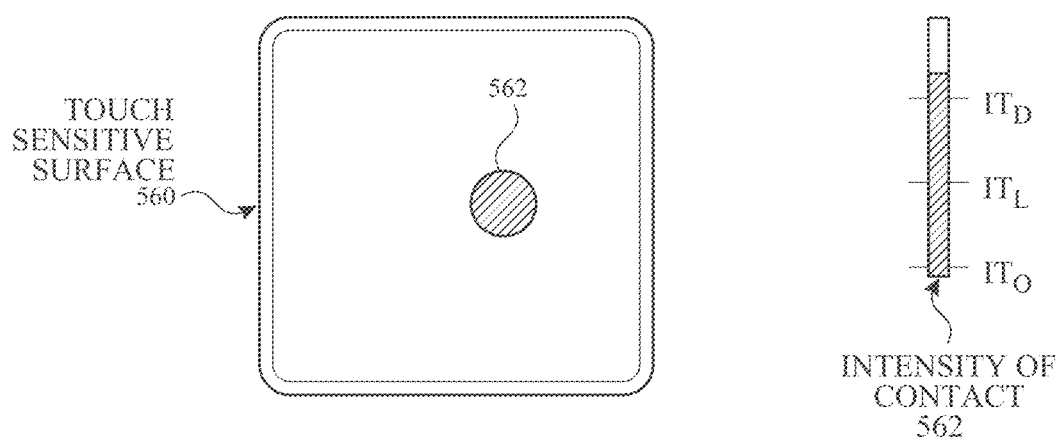
FIG. 5H

804
In response to the request to perform the operation that requires authentication:

808
In accordance with a determination that authentication is not successful and that a set of error condition criteria is met:

818
In accordance with a determination that the set of error condition criteria continues to be met, forgo attempting biometric authentication on the electronic device.

820
In accordance with a determination that the set of error condition criteria is no longer met:

822
Enable retrying biometric authentication on the electronic device.

824
Retry authentication

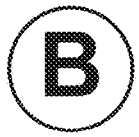

826
In accordance with a determination that authentication is not successful and that a set of error condition criteria is not met:

828
Forgo displaying, on the display, the indication of the error condition.

830
Forgo performing the operation.

*FIG. 8B*

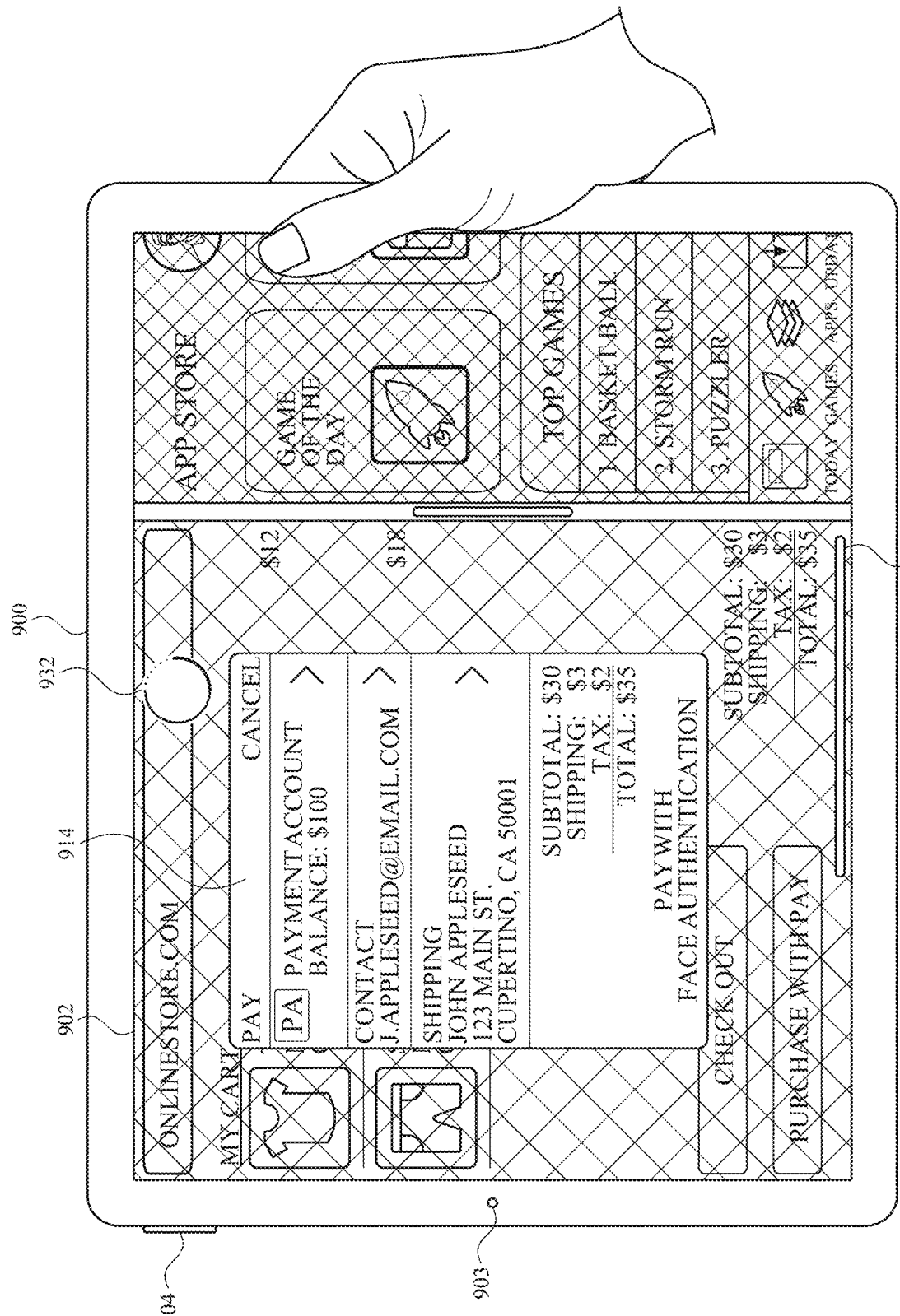

1014
While attempting to obtain biometric information using the biometric sensor:

1016
Display, on the display, a first progress indicator, including:

1018
In accordance with a determination that the user interface of the electronic device is in a third orientation relative to the biometric sensor, the user interface in the third orientation having a first top side, display the first progress indicator proximate to the first top side of the user interface in the third orientation.

1020
In accordance with a determination that the user interface of the electronic device is in a fourth orientation relative to the biometric sensor, the user interface in the fourth orientation having a second top side, display the first progress indicator proximate to the second top side of the user interface in the fourth orientation, the third orientation being different from the fourth orientation.

1022
Concurrently display, on the display, a first application in a first region and a second application in a second region, the second application being adjacent to the first application.

1024
Display, on the display, a second transaction interface.

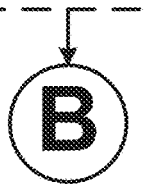

*FIG. 10B*

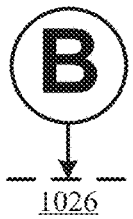

1026
In accordance with a determination that the second transaction interface corresponds to the first application, modify a first visual characteristic of the first application.

1028
Modifying the first visual characteristic of the first application includes displaying the first application in the second region in accordance with a determination that the second region is closer to the first portion of the electronic device than the first region.

1030
In accordance with a determination that the second transaction interface corresponds to the second application, modify a first visual characteristic of the second application.

1032
Modifying the first visual characteristic of the second application includes displaying the second application in the first region in accordance with a determination that the first region is closer to the first portion of the electronic device than the second region.

*FIG. 10C*

1206
In response to receiving the input:

---
1216
In response to receiving the request to perform the operation that requires authentication:

---
1218
In accordance with a determination that data obtained by the one or more biometric sensors corresponds to the enrolled biometric feature, perform the operation that requires authentication.

---
1220
In accordance with a determination that data obtained by the one or more biometric sensors does not correspond to the enrolled biometric feature, forgo performing the operation that requires authentication.

---

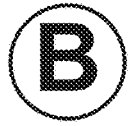

---
1222
In accordance with a determination that the orientation of the electronic device does not satisfy the set of enrollment criteria, output one or more prompts to change the orientation of the electronic device to a different orientation that satisfies the set of enrollment criteria.

---
1224
Output a first prompt to orient the electronic device to an initial orientation.

---
1226
Output a second prompt to orient the electronic device to the different orientation that satisfies the set of enrollment criteria, the first prompt being different from the second prompt.

---

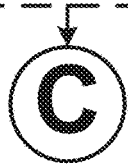

*FIG. 12B*

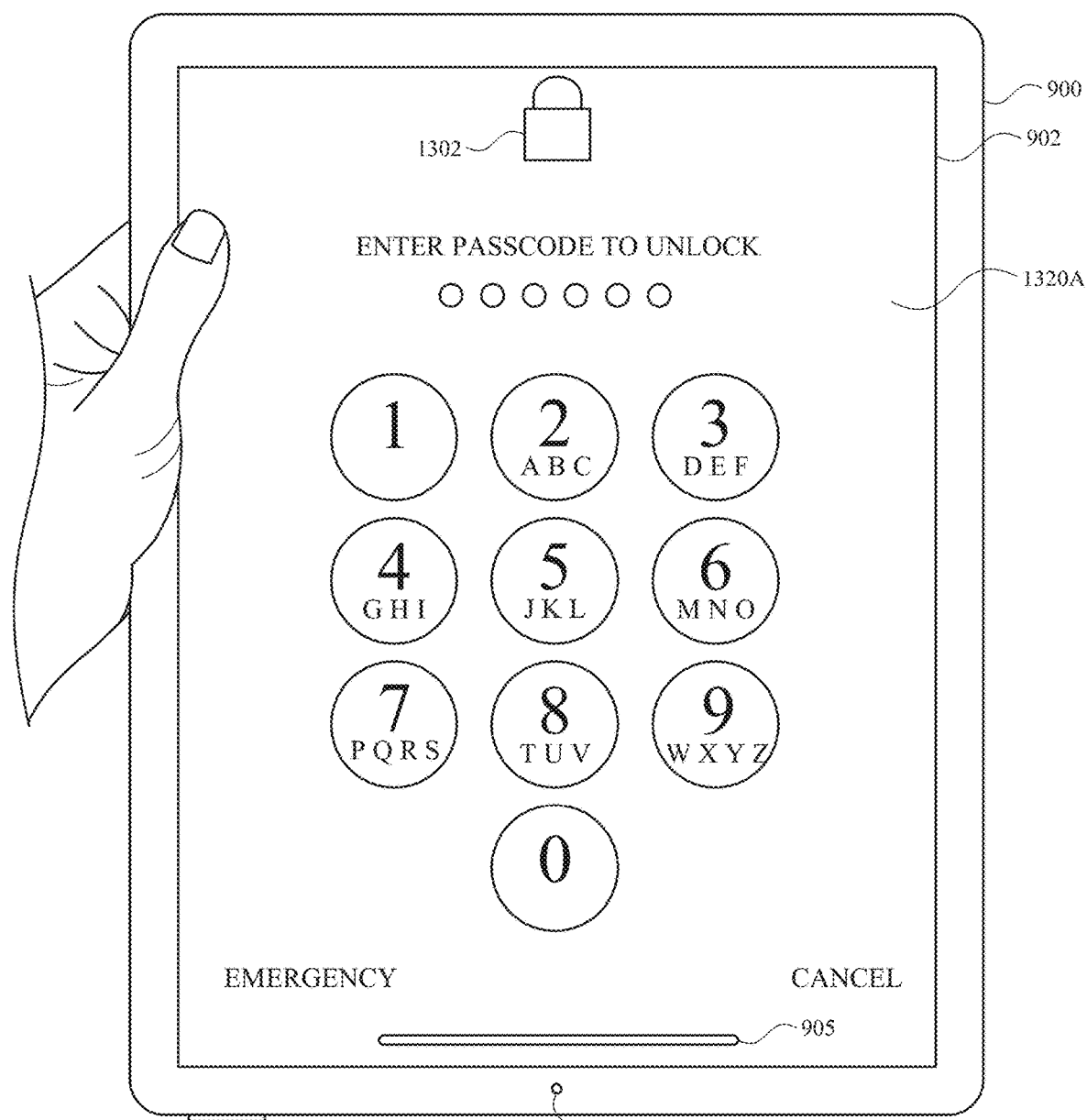
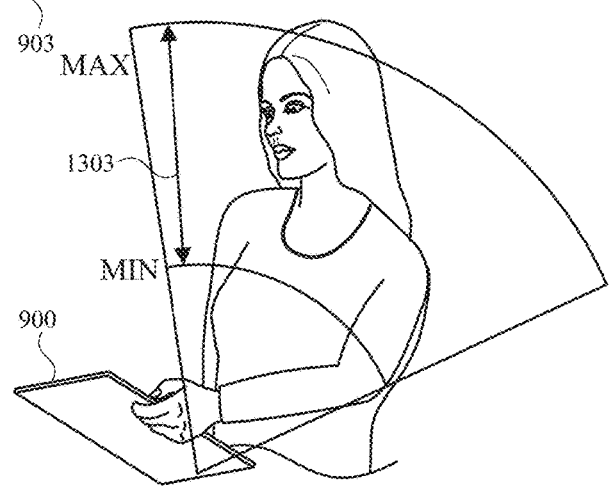
*FIG. 13E*

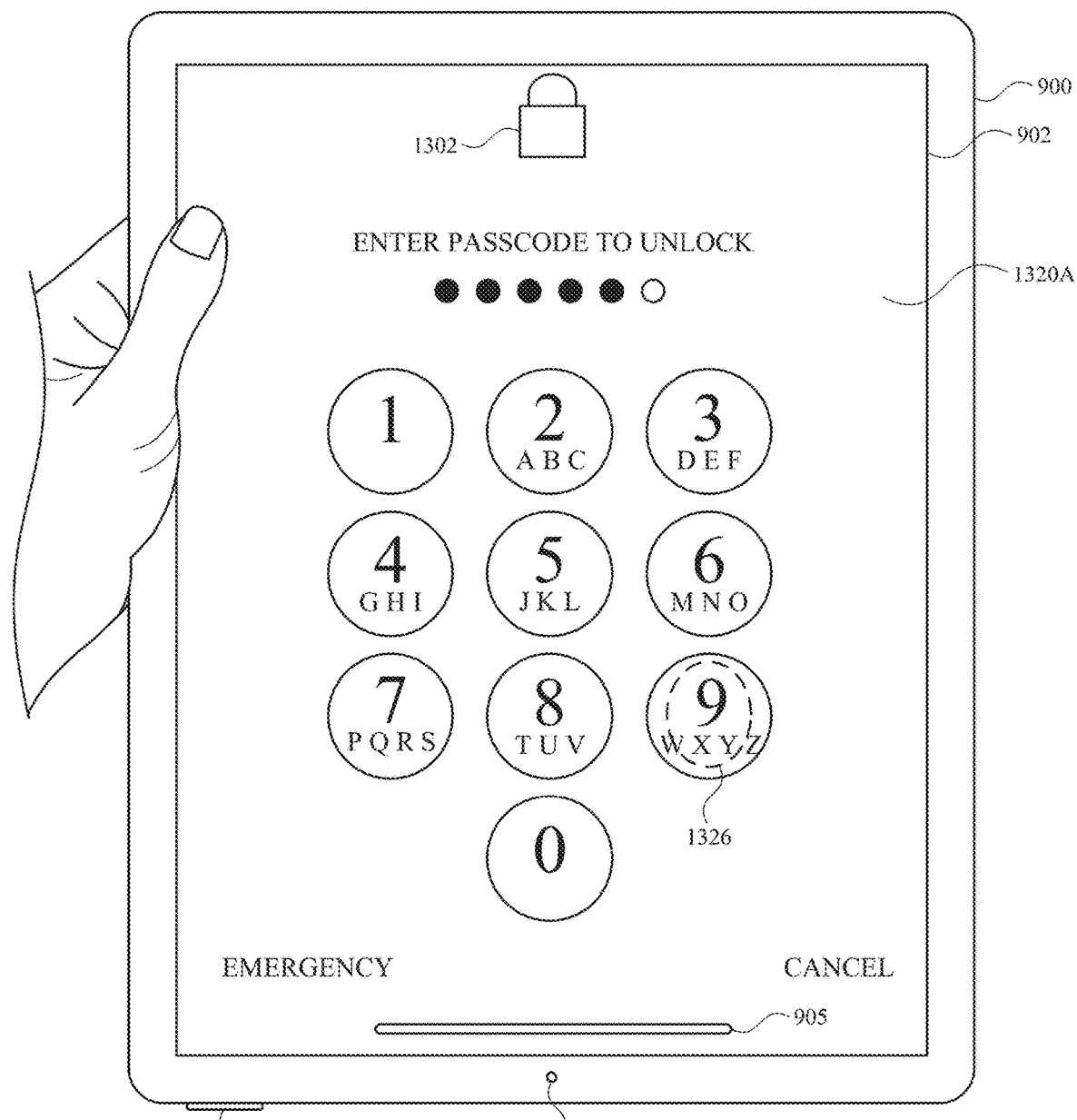
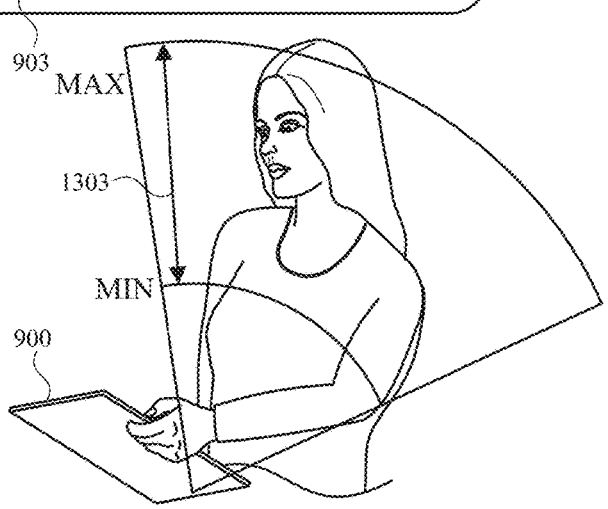
FIG. 13I

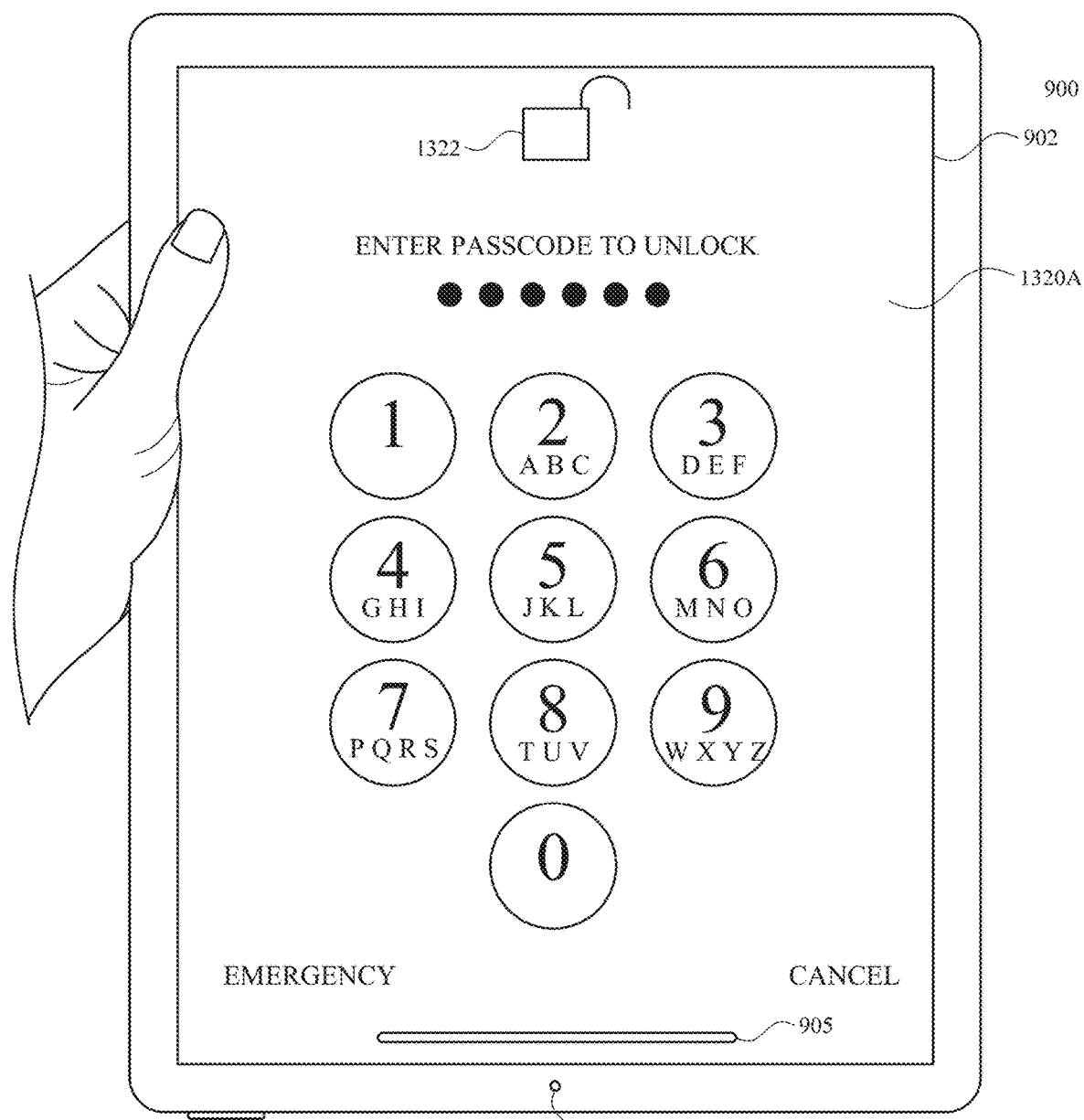
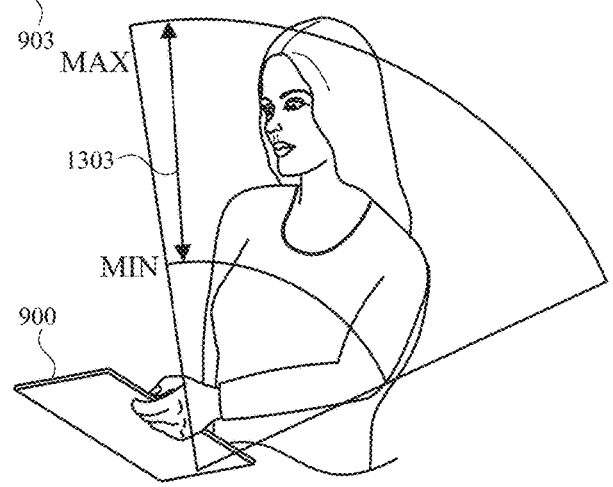
FIG. 13J

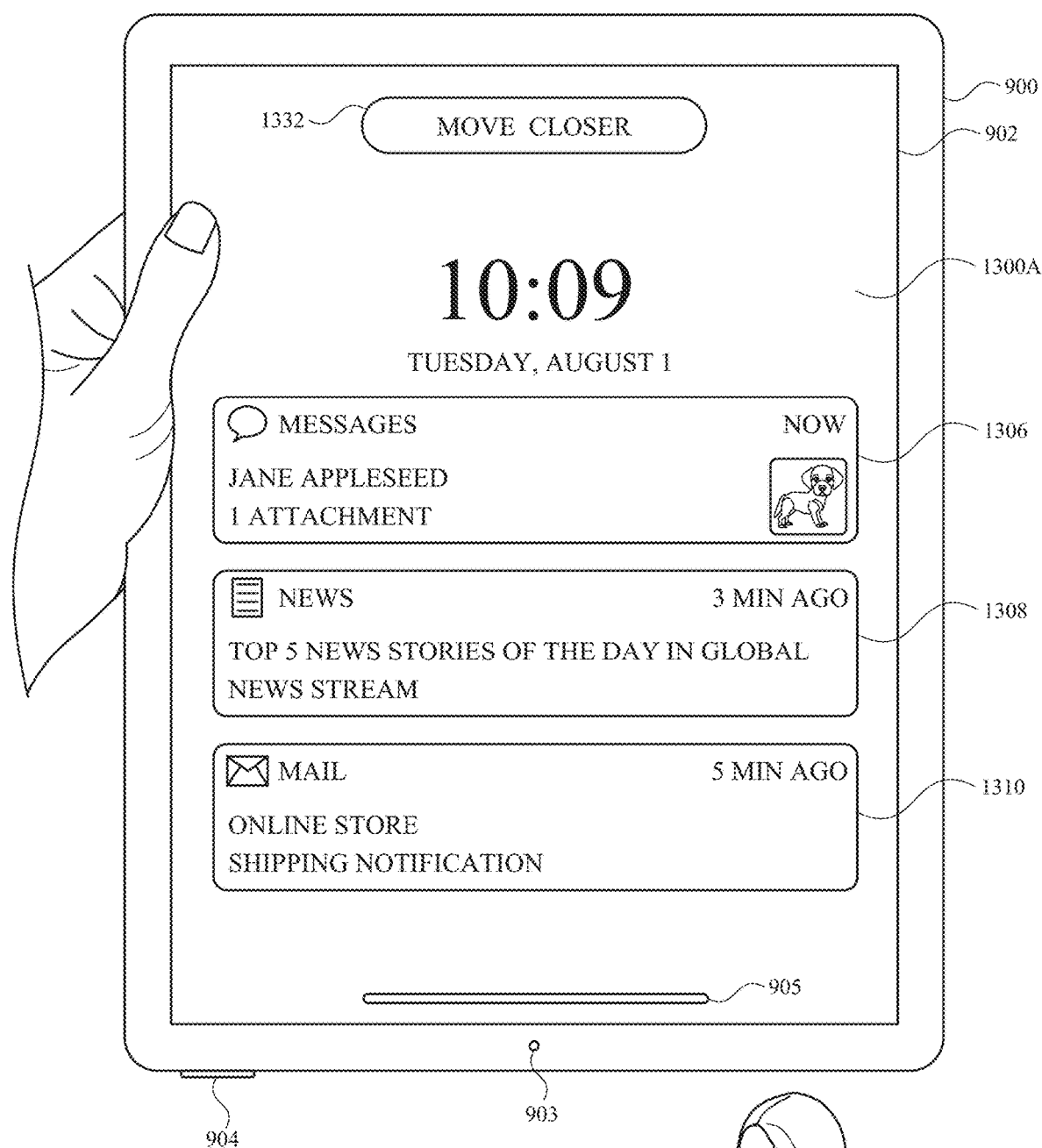
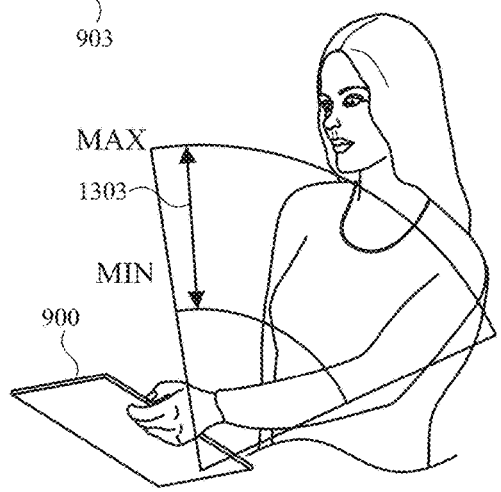
FIG. 13Q

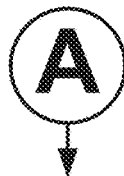

In response to detecting the request to unlock the electronic device using the biometric sensor:

1416
In accordance with a determination that the error condition is still occurring at a respective time that occurs after detecting the request to unlock the electronic device: cease to display the indication of the location of the biometric sensor; and display a touch-based user interface for entering touch-based authentication information.

1418
The respective time is a time that occurs after a predetermined delay time period from when the request to unlock the electronic device using the biometric sensor was detected.

1420
In accordance with a determination that the error condition is no longer occurring, attempting to unlock the electronic device using the biometric sensor.

1422
The determination that the error condition is no longer occurring is made subsequent to detecting the request to unlock the electronic device using the biometric sensor and while displaying the indication of the location of the biometric sensor.

*FIG. 14B*

IMPLEMENTATION OF BIOMETRIC AUTHENTICATION

CROSS-REFERENCE TO RELATED APPLICATIONS

This application is a continuation of U.S. patent application Ser. No. 16/369,355, titled "IMPLEMENTATION OF BIOMETRIC AUTHENTICATION," filed Mar. 29, 2019, which claims priority to U.S. Provisional Patent Application Ser. Nos. 62/679,955, titled "IMPLEMENTATION OF BIOMETRIC AUTHENTICATION," filed Jun. 3, 2018; and 62/752,234, titled "IMPLEMENTATION OF BIOMETRIC AUTHENTICATION," filed Oct. 29, 2018. All of these applications are incorporated by reference herein in their entirety.

This application is related to U.S. Provisional Patent Application Ser. Nos. 62/556,413, titled "FACE ENROLLMENT AND AUTHENTICATION," filed Sep. 9, 2017; 62/557,130, titled "IMPLEMENTATION OF BIOMETRIC AUTHENTICATION," filed Sep. 11, 2017; 62/581,025, titled "IMPLEMENTATION OF BIOMETRIC AUTHENTICATION," filed Nov. 2, 2017; and 62/679,955, titled "IMPLEMENTATION OF BIOMETRIC AUTHENTICATION," filed Jun. 3, 2018.

FIELD

The present disclosure relates generally to biometric authentication, and more specifically to interfaces and techniques for enrollment and authentication of biometric features.

BACKGROUND

Biometric authentication, for instance of a face, iris, or fingerprint, using electronic devices is a convenient and efficient method of authenticating users of the electronic devices. Biometric authentication allows a device to quickly and easily verify the identity of any number of users.

BRIEF SUMMARY

Some techniques for implementing biometric authentication using electronic devices, however, are generally cumbersome. When a user fails to enroll a biometric feature for biometric authentication or fails to perform biometric authentication, a user is often unaware of the underlying cause for the failure. Thus, the user can be discouraged from using biometric authentication altogether. Moreover, when the user performs additional attempts to enroll a biometric feature or biometrically authenticate after a failure, the user often does so without having the knowledge to correct the underlying cause of the failure. In view of the foregoing drawbacks, existing techniques require more time than necessary, wasting both user time and device energy. This latter consideration is particularly significant in the operation of battery-operated devices.

Accordingly, the present technique provides electronic devices with faster, more efficient methods and interfaces for implementing biometric authentication. Such methods and interfaces optionally complement or replace other methods for implementing biometric authentication. Such methods and interfaces reduce the cognitive burden on a user and produce a more efficient human-machine interface. For battery-operated computing devices, such methods and interfaces conserve power and increase the time between battery charges. Such methods and interfaces also reduce the number of unnecessary, extraneous, or repetitive input required at computing devices, such as smartphones and smartwatches.

In accordance with some examples, a method is described, the method comprising: at an electronic device with a display and one or more input devices: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, a non-transitory computer-readable medium is described, the non-transitory computer-readable storage medium comprising one or more programs configured to be executed by one or more processors of an electronic device with a display and one or more input devices, the one or more programs including instructions for: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, a transitory computer-readable medium is described, the transitory computer-readable storage medium comprising one or more programs configured to be executed by one or more processors of an electronic device with a display and one or more input devices, the one or more programs including instructions for: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, an electronic device is described, the electronic device comprising: one or more input devices; a display; one or more processors; and memory storing one or more programs configured to be executed by the one or more processors, the one or more programs including instructions for: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, an electronic device is described, the electronic device comprising: one or more input devices; a display; means for receiving, via the one or more input devices, a request to perform an operation that requires authentication; and means for, in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, a method is described, the method comprising: at an electronic device with a display and a biometric sensor at a first portion of the electronic device: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, a non-transitory computer-readable medium is described, the non-transitory computer-readable storage medium comprising one or more programs configured to be executed by one or more processors of an electronic device with a display and a biometric sensor at a first portion of the electronic device, the one or more programs including instructions for: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, a transitory computer-readable medium is described, the transitory computer-readable storage medium comprising one or more programs configured to be executed by one or more processors of an electronic device with a display and a biometric sensor at a first portion of the electronic device, the one or more programs including instructions for: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, an electronic device is described, the electronic device comprising: a biometric sensor at a first portion of the electronic device; a display; one or more processors; and memory storing one or more programs configured to be executed by the one or more processors, the one or more programs including instructions for: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, an electronic device is described, the electronic device comprising: a biometric sensor at a first portion of the electronic device; a display; means for detecting the existence of an error condition that prevents the biometric sensor from obtaining biometric information about a user of the device; means for, in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, a method is described, the method comprising: at an electronic device with a display and one or more biometric sensors: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, a non-transitory computer-readable medium is described, the non-transitory computer-readable storage medium comprising one or more programs configured to be executed by one or more processors of an electronic device with a display and one or more biometric sensors, the one or more programs including instructions for: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, a transitory computer-readable medium is described, the transitory computer-readable storage medium comprising one or more programs configured to be executed by one or more processors of an electronic device with a display and one or more biometric sensors, the one or more programs including instructions for: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, an electronic device is described, the electronic device comprising: one or more biometric sensors; a display; one or more processors; and memory storing one or more programs configured to be executed by the one or more processors, the one or more programs including instructions for: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, an electronic device is described, the electronic device comprising: one or more biometric sensors; a display; means for displaying, on the display, a biometric enrollment user interface for initiating biometric enrollment with the one or more biometric sensors; means for, while displaying the biometric enrollment user interface, receiving input corresponding for a request to initiate biometric enrollment; and means for, in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, a method is described, the method comprising: at an electronic device with a biometric sensor and a touch-sensitive display: detecting occurrence of an error condition for detecting biometric information at the biometric sensor; in response to detecting the occurrence of the error condition, displaying, on the touch-sensitive display, an indication of a location of the biometric sensor on the electronic device; while displaying the indication of the location of the biometric sensor on the electronic device, detecting a request to unlock the electronic device using the biometric sensor; and in response to detecting the request to unlock the electronic device using the biometric sensor: in accordance with a determination that the error condition is still occurring at a respective time that occurs after detecting the request to unlock the electronic device: ceasing to display the indication of the location of the biometric sensor; and displaying a touch-based user interface for entering touch-based authentication information; and in accordance with a determination that the error condition is no longer occurring, attempting to unlock the electronic device using the biometric sensor.

In accordance with some examples, a non-transitory computer-readable medium is described, the non-transitory computer-readable storage medium storing one or more programs configured to be executed by one or more processors of an electronic device with a biometric sensor and a touch-sensitive display, the one or more programs including instructions for: detecting occurrence of an error condition for detecting biometric information at the biometric sensor; in response to detecting the occurrence of the error condition, displaying, on the touch-sensitive display, an indication of a location of the biometric sensor on the electronic device; while displaying the indication of the location of the biometric sensor on the electronic device, detecting a request to unlock the electronic device using the biometric sensor; and in response to detecting the request to unlock the electronic device using the biometric sensor: in accordance with a determination that the error condition is still occurring at a respective time that occurs after detecting the request to unlock the electronic device: ceasing to display the indication of the location of the biometric sensor; and displaying a touch-based user interface for entering touch-based authentication information; and in accordance with a determination that the error condition is no longer occurring, attempting to unlock the electronic device using the biometric sensor.

In accordance with some examples, a transitory computer-readable medium is described, the transitory computer-readable storage medium storing one or more programs configured to be executed by one or more processors of an electronic device with a biometric sensor and a touch-sensitive display, the one or more programs including instructions for: detecting occurrence of an error condition for detecting biometric information at the biometric sensor; in response to detecting the occurrence of the error condition, displaying, on the touch-sensitive display, an indication of a location of the biometric sensor on the electronic device; while displaying the indication of the location of the biometric sensor on the electronic device, detecting a request to unlock the electronic device using the biometric sensor; and in response to detecting the request to unlock the electronic device using the biometric sensor: in accordance with a determination that the error condition is still occurring at a respective time that occurs after detecting the request to unlock the electronic device: ceasing to display the indication of the location of the biometric sensor; and displaying a touch-based user interface for entering touch-based authentication information; and in accordance with a determination that the error condition is no longer occurring, attempting to unlock the electronic device using the biometric sensor.

In accordance with some examples, an electronic device is described, the electronic device comprising: a biometric sensor; a touch-sensitive display; one or more processors; and memory storing one or more programs configured to be executed by the one or more processors, the one or more programs including instructions for: detecting occurrence of an error condition for detecting biometric information at the biometric sensor; in response to detecting the occurrence of the error condition, displaying, on the touch-sensitive display, an indication of a location of the biometric sensor on the electronic device; while displaying the indication of the location of the biometric sensor on the electronic device, detecting a request to unlock the electronic device using the biometric sensor; and in response to detecting the request to unlock the electronic device using the biometric sensor: in accordance with a determination that the error condition is still occurring at a respective time that occurs after detecting the request to unlock the electronic device: ceasing to display the indication of the location of the biometric sensor; and displaying a touch-based user interface for entering touch-based authentication information; and in accordance with a determination that the error condition is no longer occurring, attempting to unlock the electronic device using the biometric sensor.

In accordance with some examples, an electronic device is described, the electronic device comprising: a biometric sensor; a touch-sensitive display; means for detecting occurrence of an error condition for detecting biometric information at the biometric sensor; means, in response to detecting the occurrence of the error condition, for displaying, on the touch-sensitive display, an indication of a location of the biometric sensor on the electronic device; means, while displaying the indication of the location of the biometric sensor on the electronic device, for detecting a request to unlock the electronic device using the biometric sensor; and means, in response to detecting the request to unlock the electronic device using the biometric sensor, for: in accordance with a determination that the error condition is still occurring at a respective time that occurs after detecting the request to unlock the electronic device: ceasing to display the indication of the location of the biometric sensor; and displaying a touch-based user interface for entering touch-based authentication information; and in accordance with a determination that the error condition is no longer occurring, attempting to unlock the electronic device using the biometric sensor.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for implementing biometric authentication, thereby increasing the effectiveness, efficiency, and user satisfaction with such devices. Such methods and interfaces optionally complement or replace other methods for implementing biometric authentication.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 8A-8B are flow diagrams illustrating a method for providing indications of error conditions during biometric authentication, in accordance with some examples

FIGS. 10A-10C are flow diagrams illustrating a method for providing indications about the biometric sensor during biometric authentication, in accordance with some examples.

FIGS. 12A-12C are flow diagrams illustrating a method for orienting the device to enroll a biometric feature, in accordance with some examples.

FIGS. 14A-14B are flow diagrams illustrating a method for providing an indication of the location of the biometric sensor to correct a detected error condition, in accordance with some examples.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for implementing biometric authentication of biometric features. For example, there is a need for electronic devices that provide a convenient and efficient method for enrolling one or more portions of a biometric feature. For another example, there is a need for electronic devices that provide a quick and intuitive technique for selectively accessing secure data in accordance with biometric authentication. For another example, there is a need for electronic devices that provide a quick and intuitive technique for enabling a function of a device in accordance with biometric authentication. Such techniques can reduce the cognitive burden on a user who enrolls a biometric feature and/or biometrically authenticates with a device, thereby enhancing overall productivity. Further, such techniques can reduce processor and battery power otherwise wasted on redundant user inputs.

Figure 6:
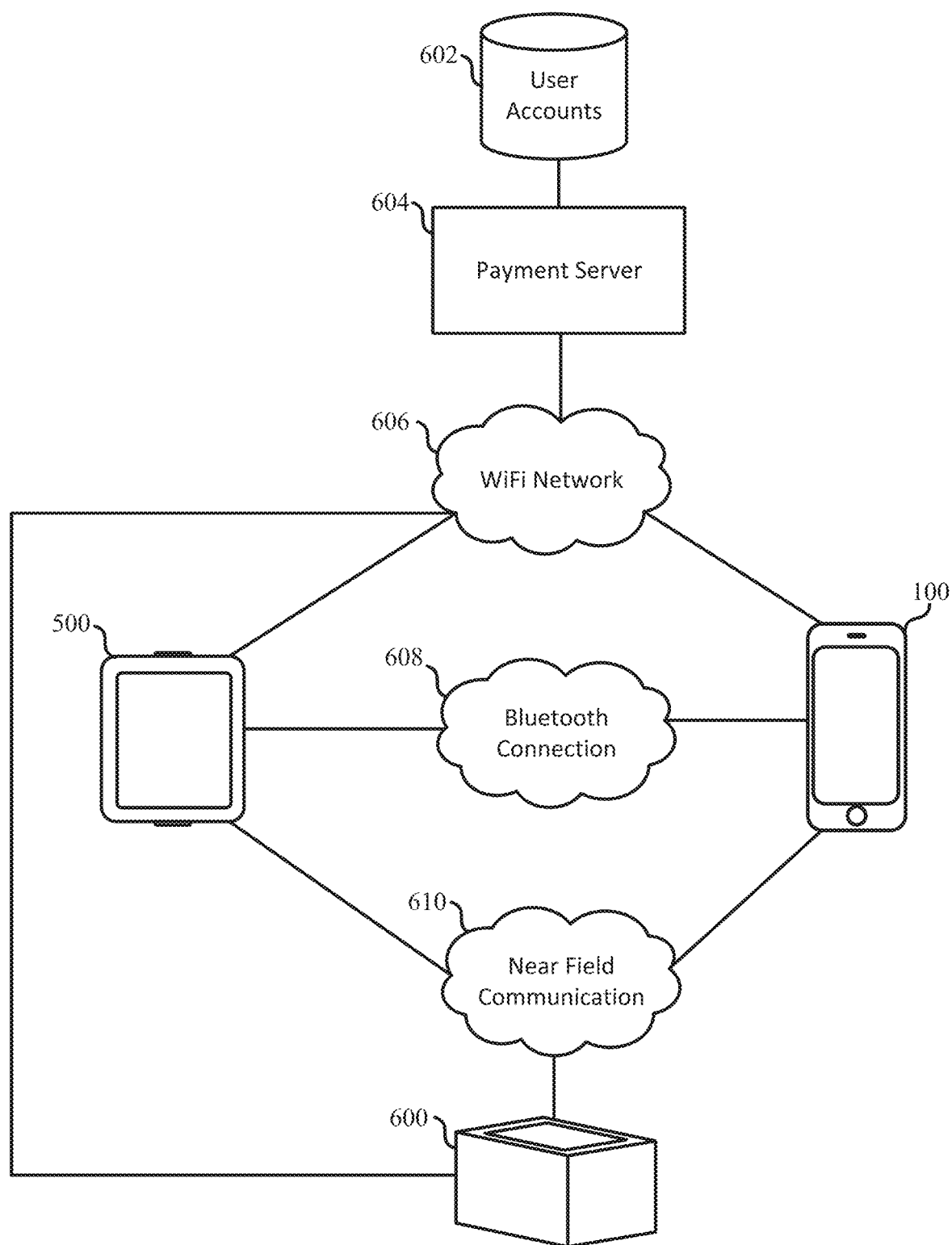
FIG. 6 illustrates exemplary devices connected via one or more communication channels, in accordance with some embodiments.
Figure 7A:
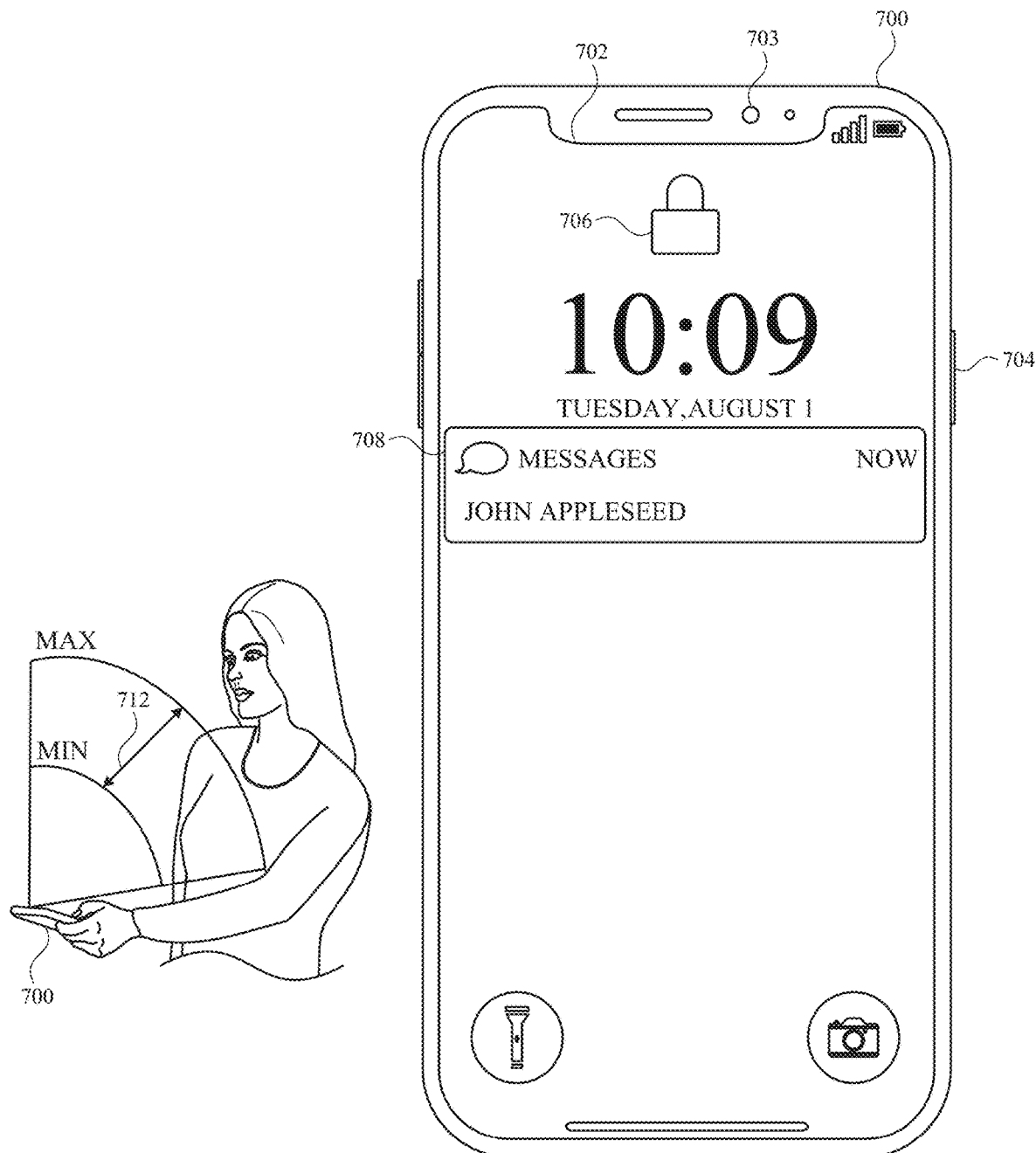
FIGS. 7A-7AD illustrate exemplary user interfaces for providing indications of error conditions during biometric authentication, in accordance with some examples.
Figure 8A:
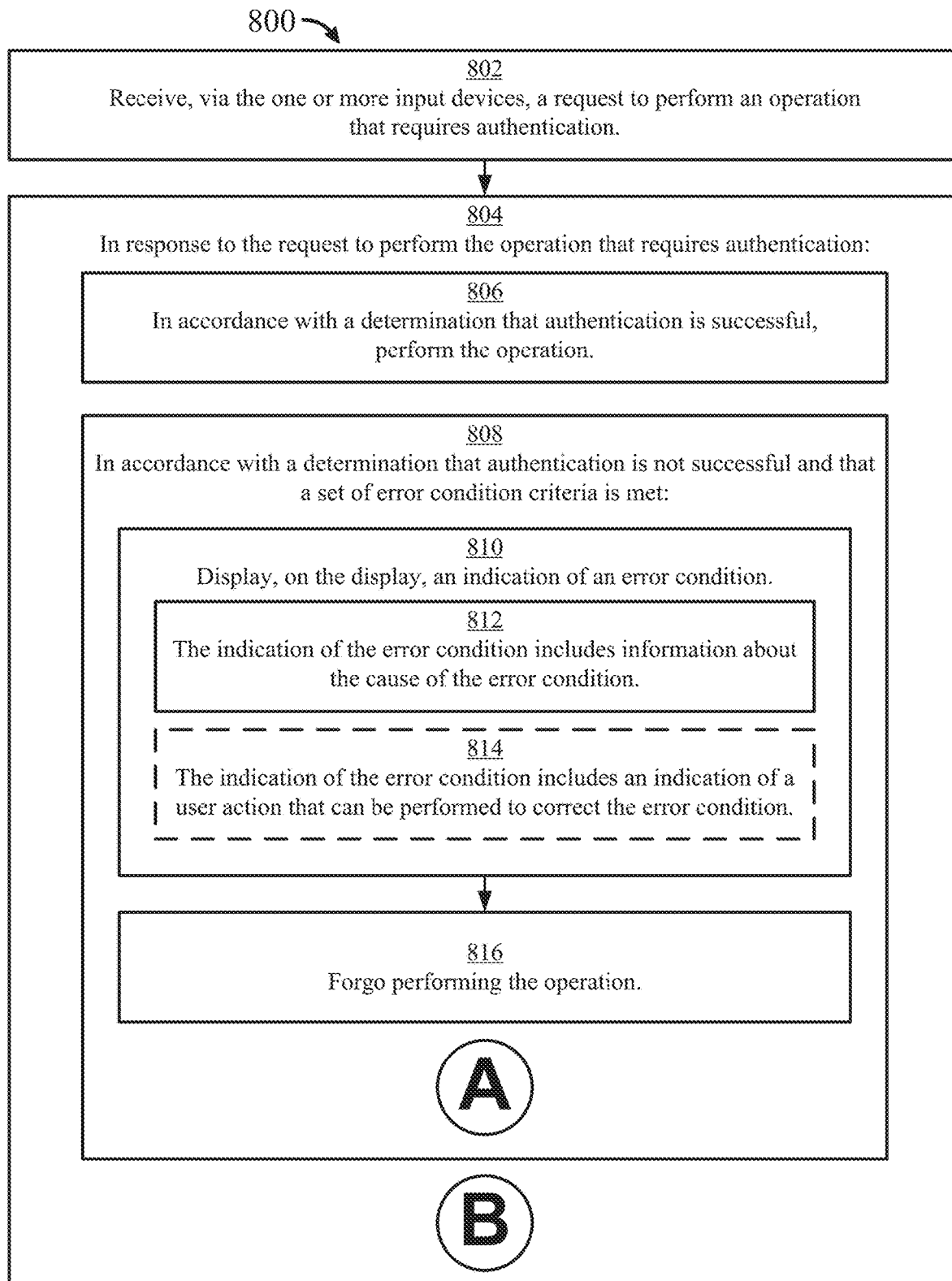
Figure 9A:
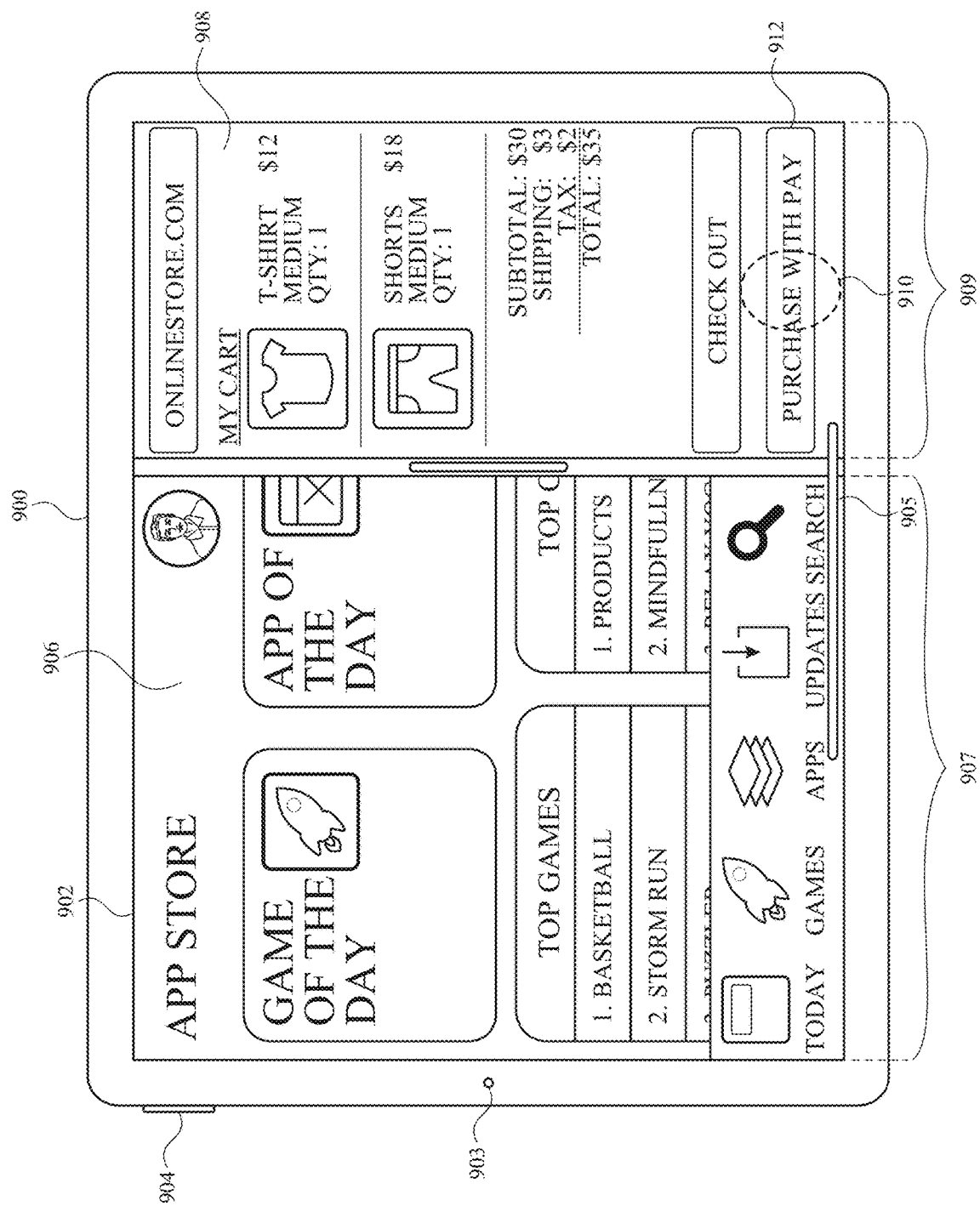
FIGS. 9A-9U illustrate exemplary user interfaces for providing indications about the biometric sensor during biometric authentication, in accordance with some examples.
Figure 9U:
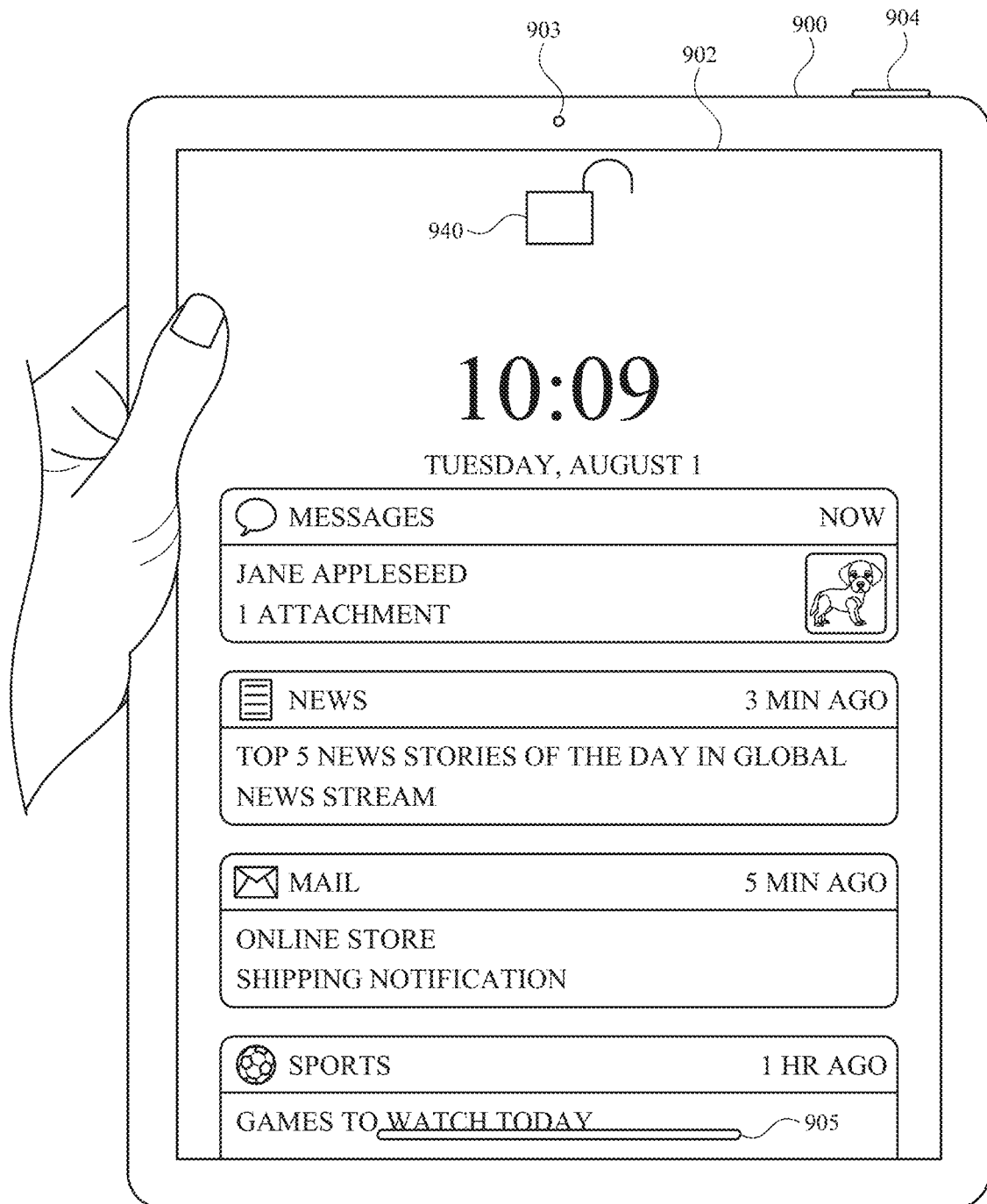
Figure 10A:
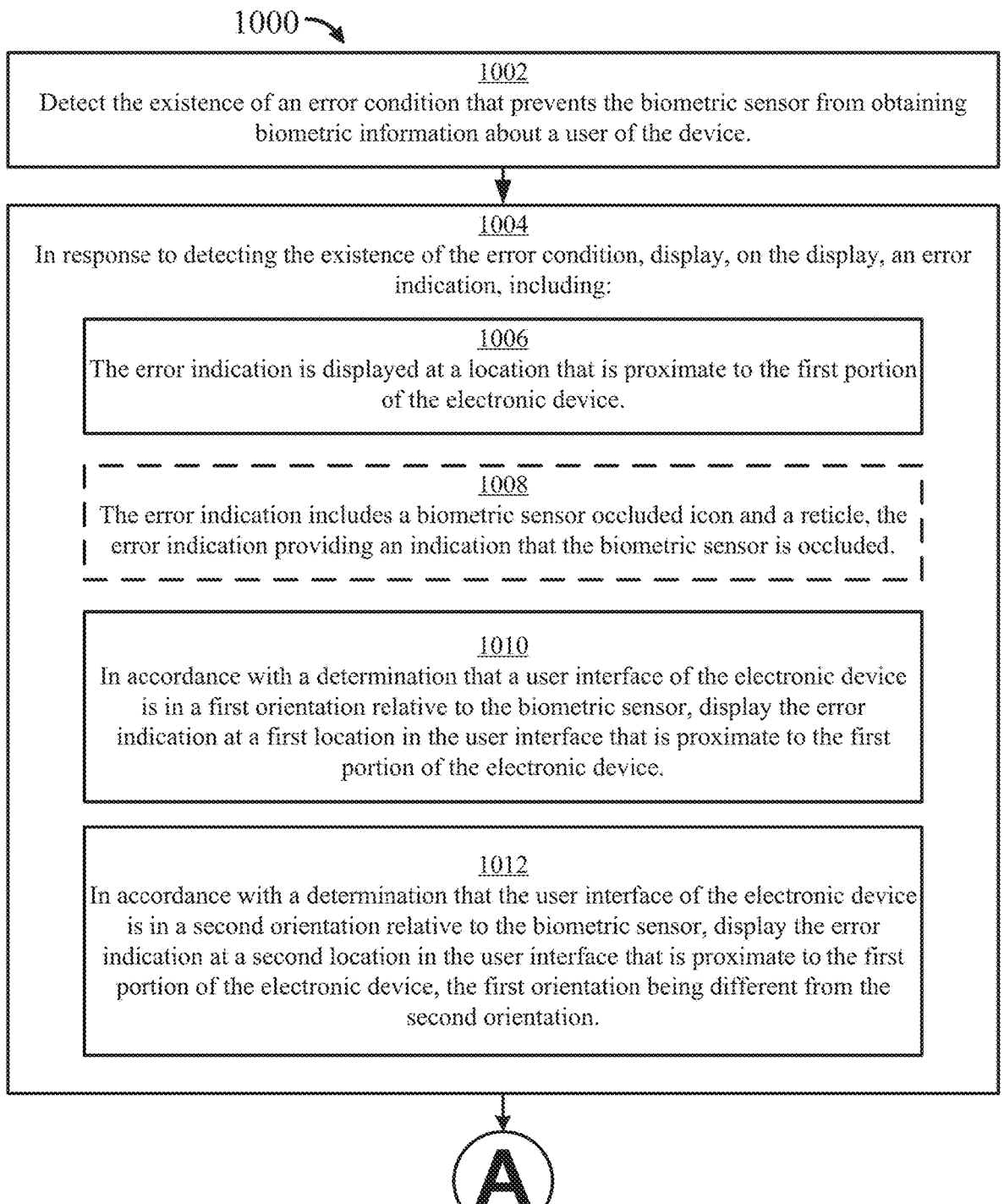
Figure 11A:
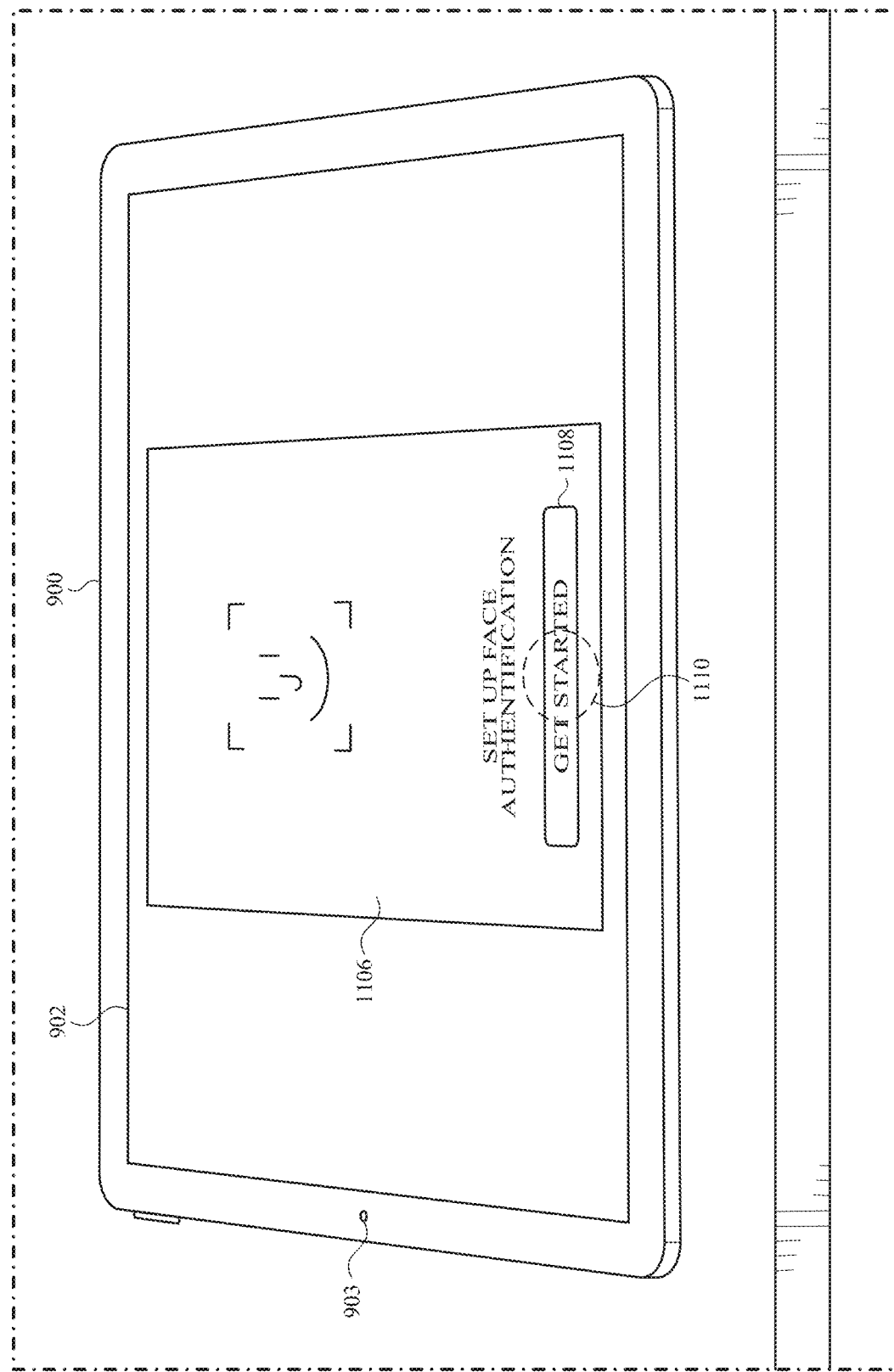
FIGS. 11A-11S illustrate exemplary user interfaces for orienting the device to enroll a biometric feature, in accordance with some examples
Figure 11S:
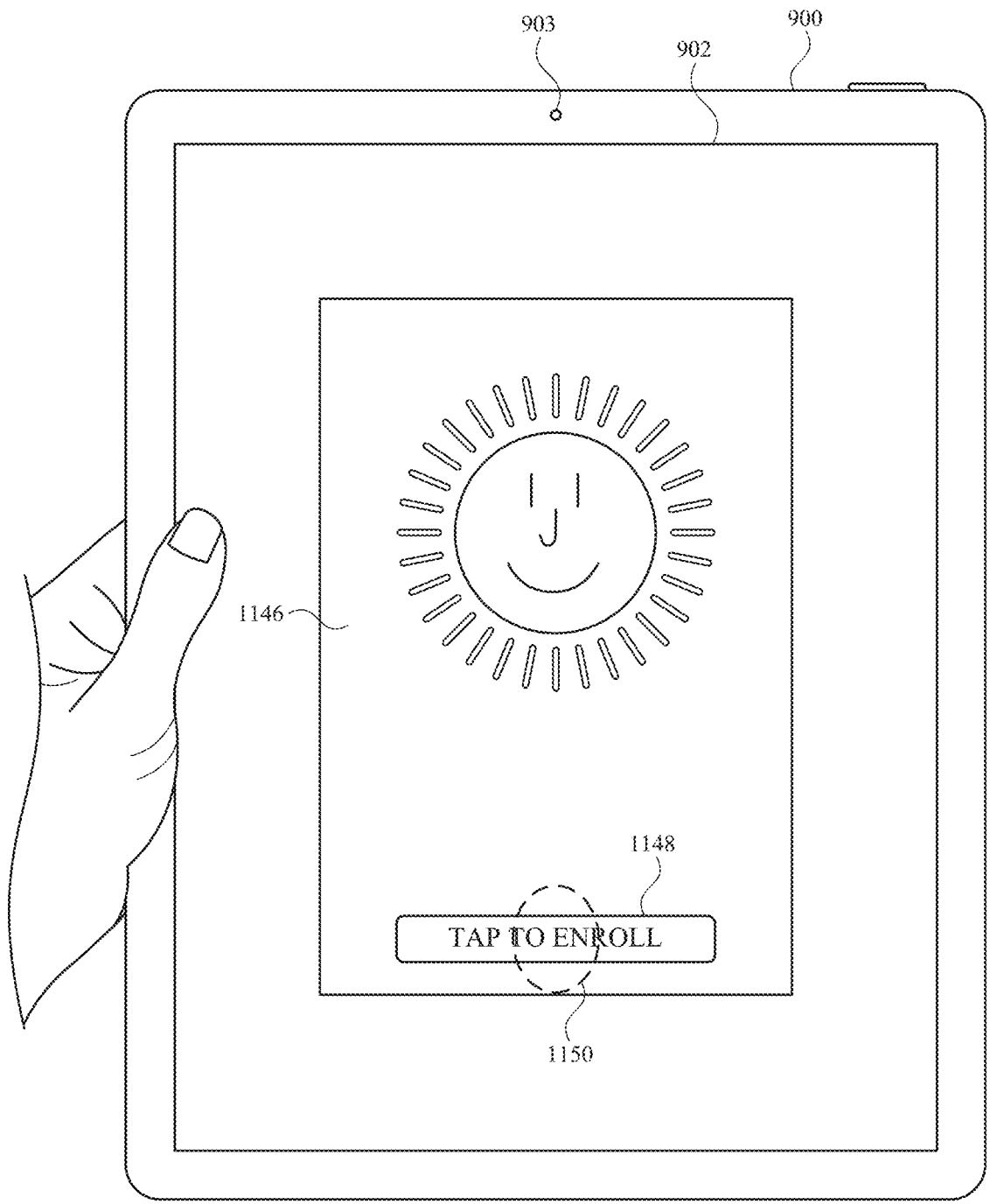
Figure 12A:
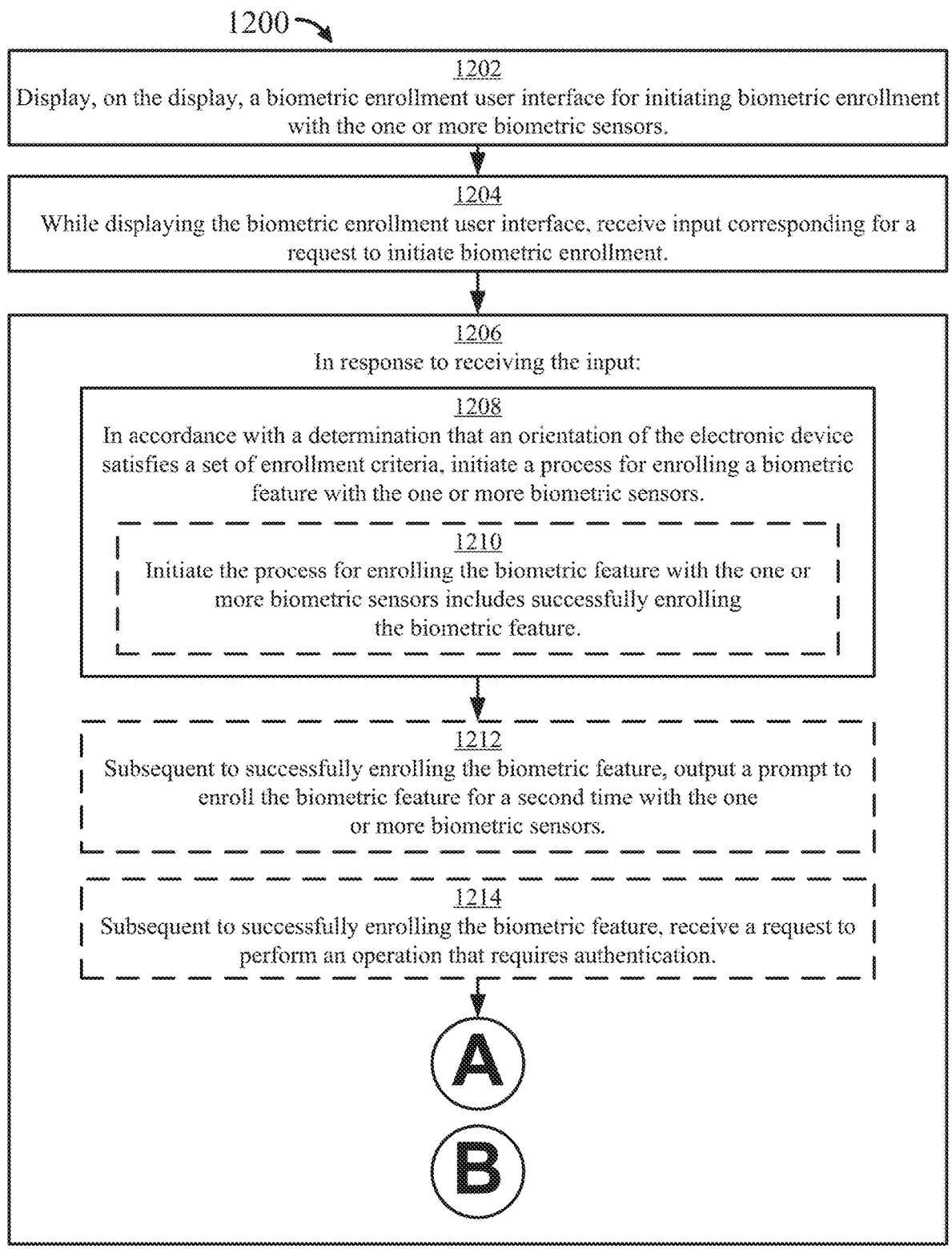
Figure 12C:
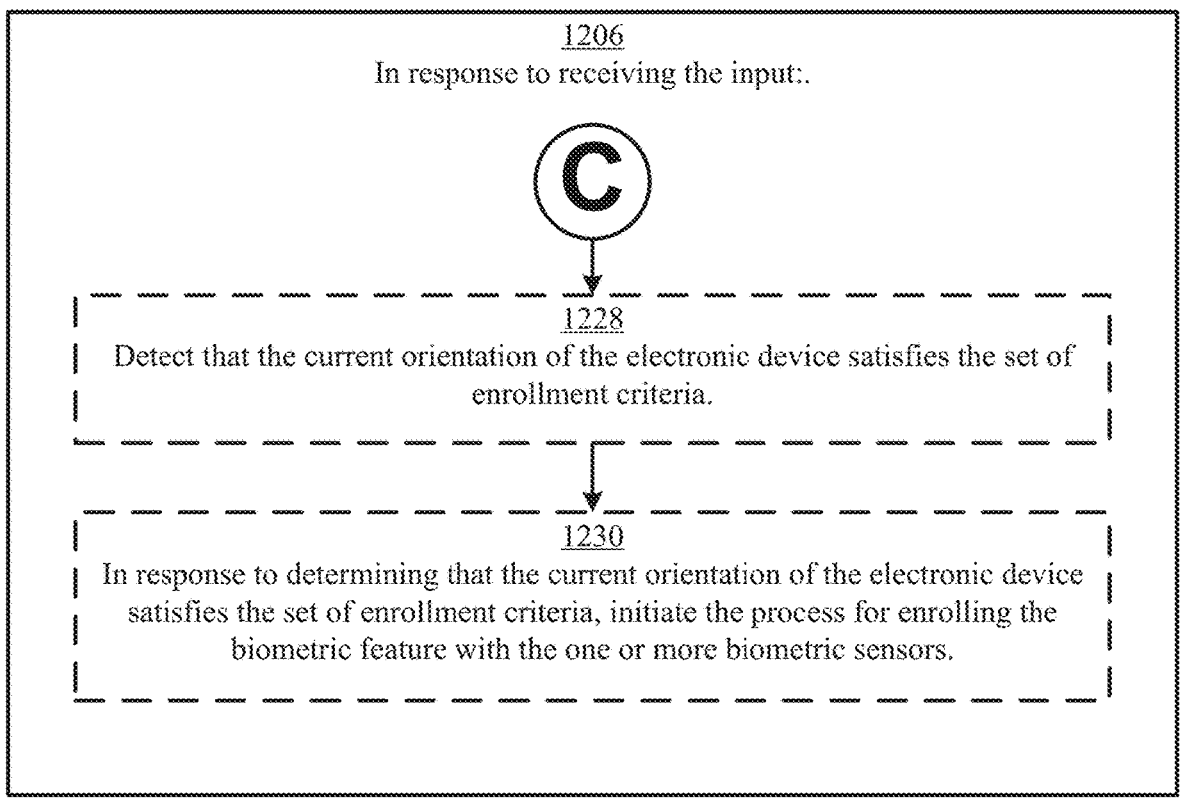
Figure 13A:
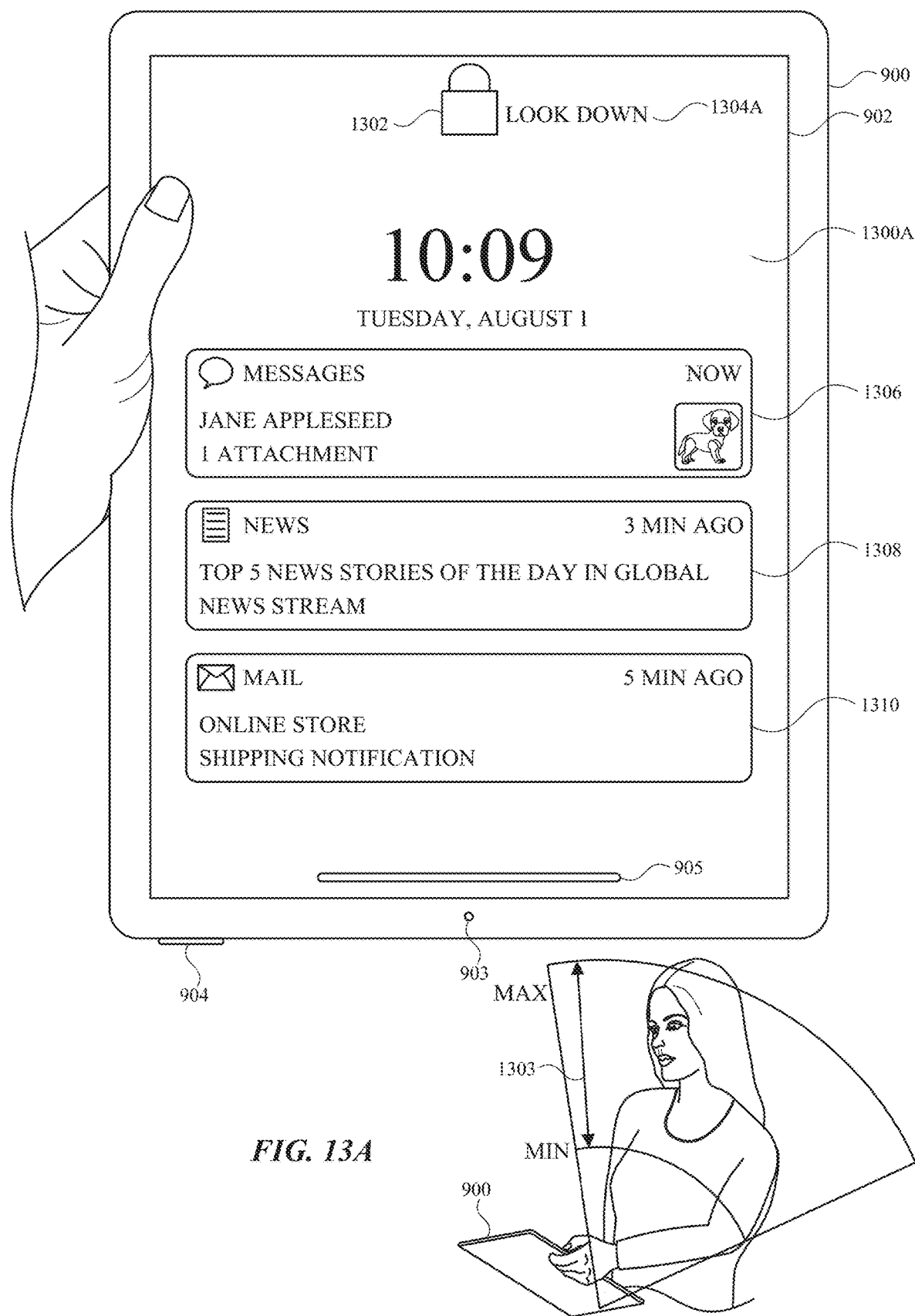
FIGS. 13A-13Z illustrate exemplary user interfaces for providing an indication of the location of the biometric sensor to correct a detected error condition, in accordance with some examples.
Figure 13Z:
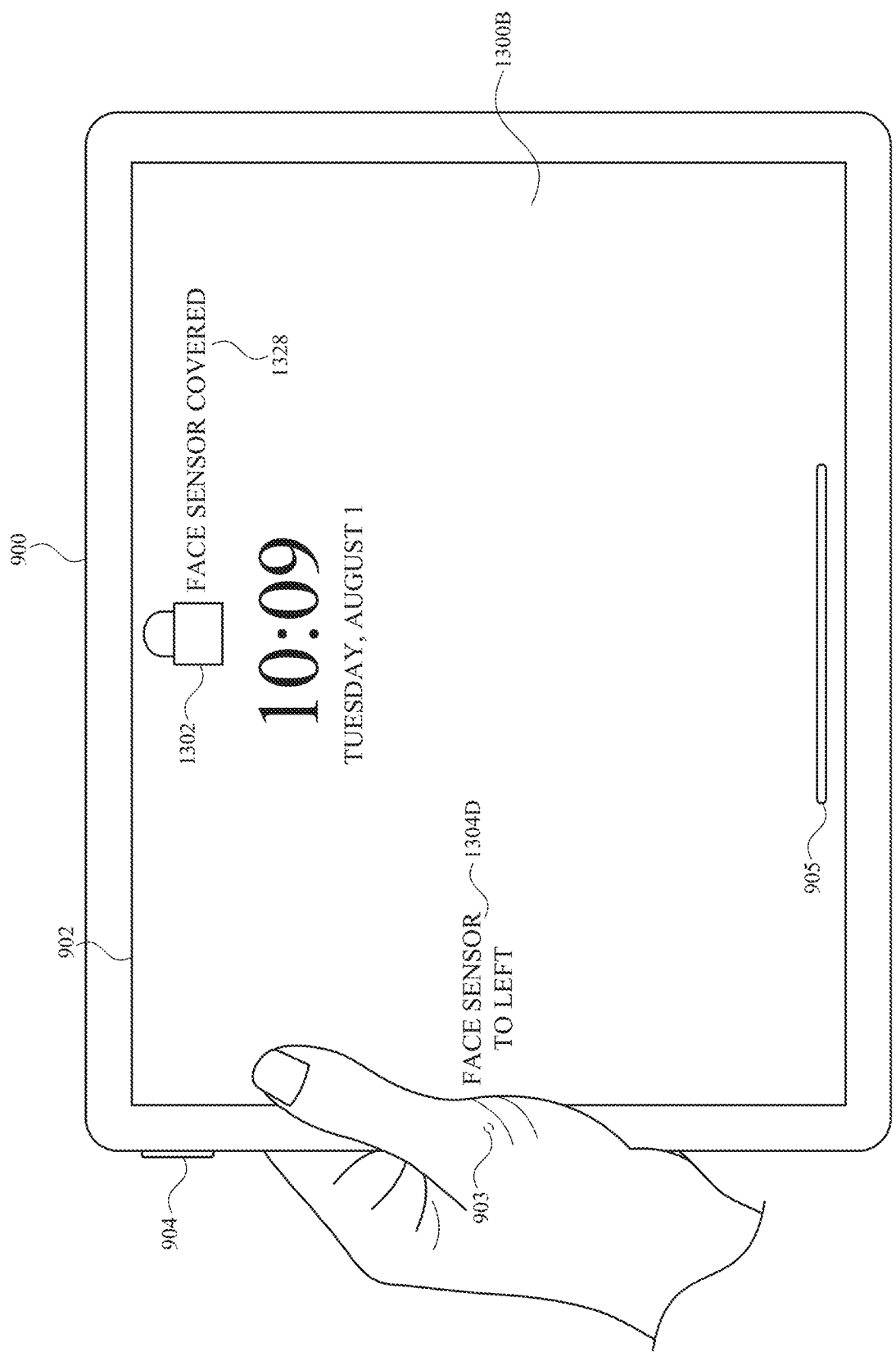
Figure 14A:
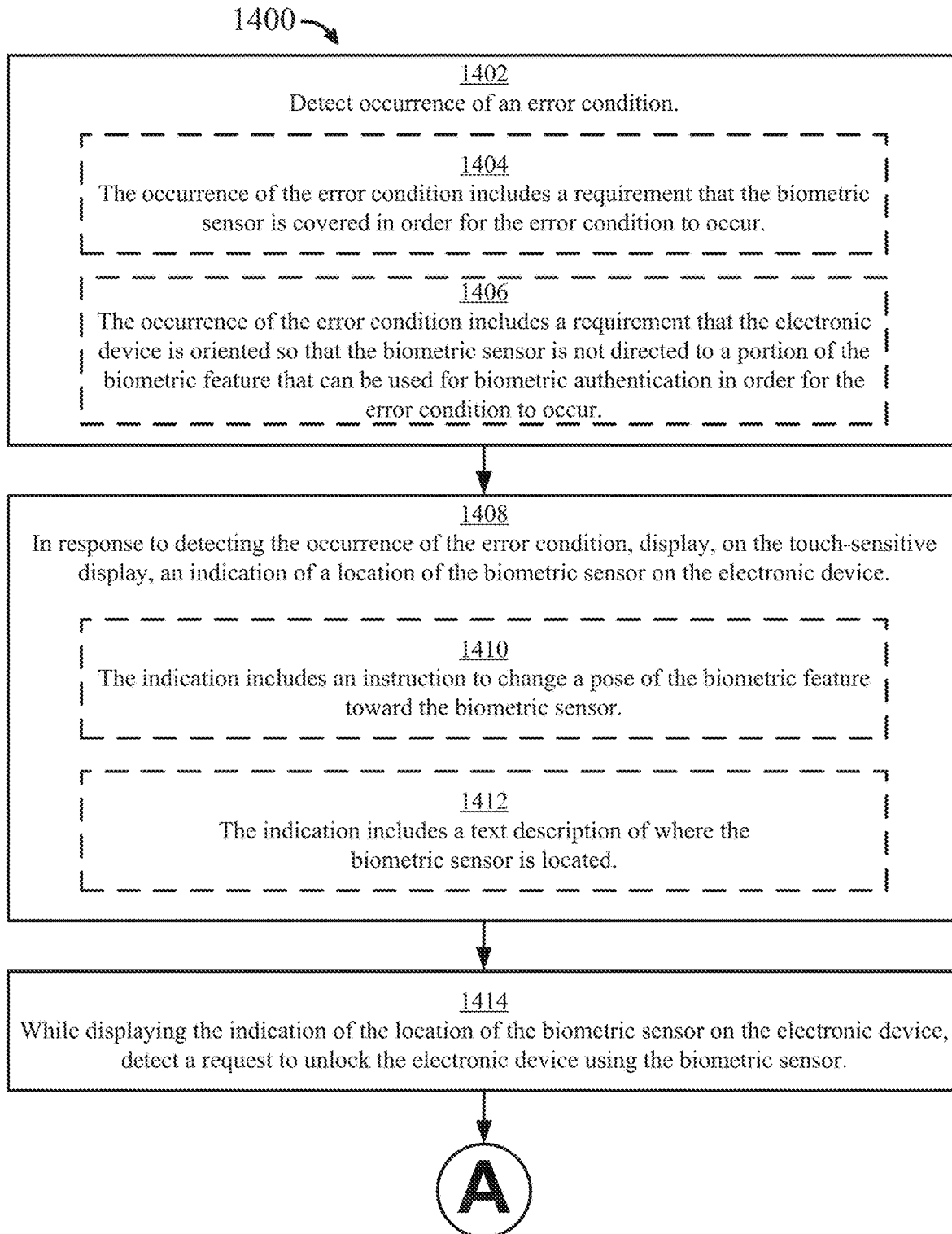

Below, FIGS. 1A-1C, 2, 3, 4A-4B, and 5A-5H provide a description of exemplary devices for performing the techniques for implementing biometric authentication. FIG. 6 illustrates exemplary devices connected via one or more communication channels, in accordance with some embodiments. FIGS. 7A-7AD illustrate exemplary user interfaces for providing indications of error conditions during biometric authentication. FIGS. 8A-8B are flow diagrams illustrating a method for providing indications of error conditions during biometric authentication. The user interfaces in FIGS. 7A-7AD are used to illustrate the processes described below, including the processes in 8A-8B. FIGS. 9A-9U illustrate exemplary user interfaces for providing indications about the biometric sensor during biometric authentication. FIGS. 10A-10C are flow diagrams illustrating a method for providing indications about the biometric sensor during biometric authentication. The user interfaces in FIGS. 9A-9U are used to illustrate the processes described below, including the processes in FIGS. 10A-10C. FIGS. 11A-11S illustrate exemplary user interfaces for orienting the device to enroll a biometric feature. FIGS. 12A-12C are flow diagrams illustrating a method for orienting the device to enroll a biometric feature. The user interfaces in FIGS. 11A-11S are used to illustrate the processes described below, including the processes in FIGS. 12A-12C. FIGS. 13A-13Z illustrate exemplary user interfaces for providing an indication of the location of the biometric sensor to correct a detected error condition. FIGS. 14A-14B are flow diagrams illustrating a method for providing an indication of the location of the biometric sensor to correct a detected error condition. The user interfaces in FIGS. 13A-13Z are used to illustrate the processes described below, including the processes in FIGS. 14A-14B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
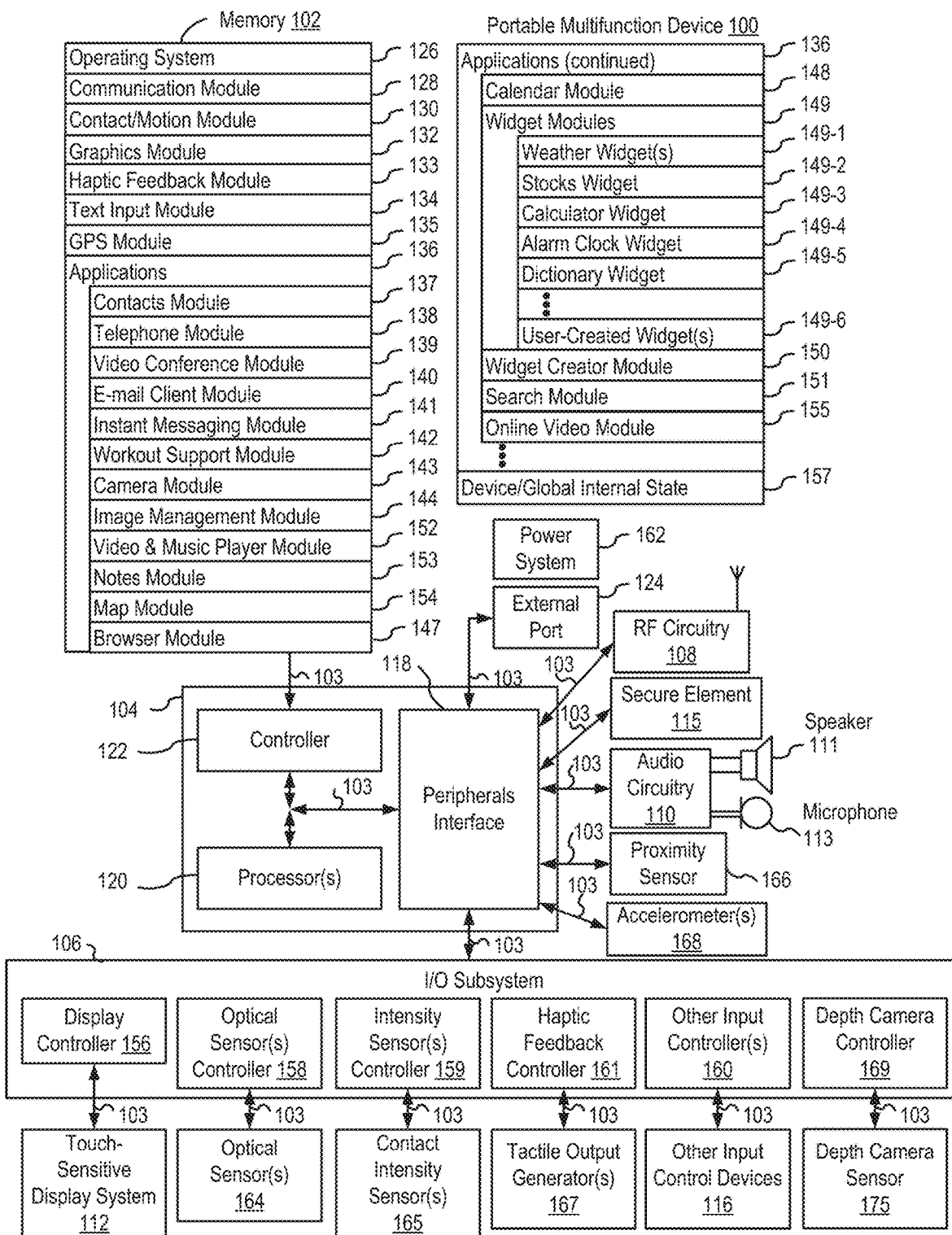
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that is, in some circumstances, otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs can invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
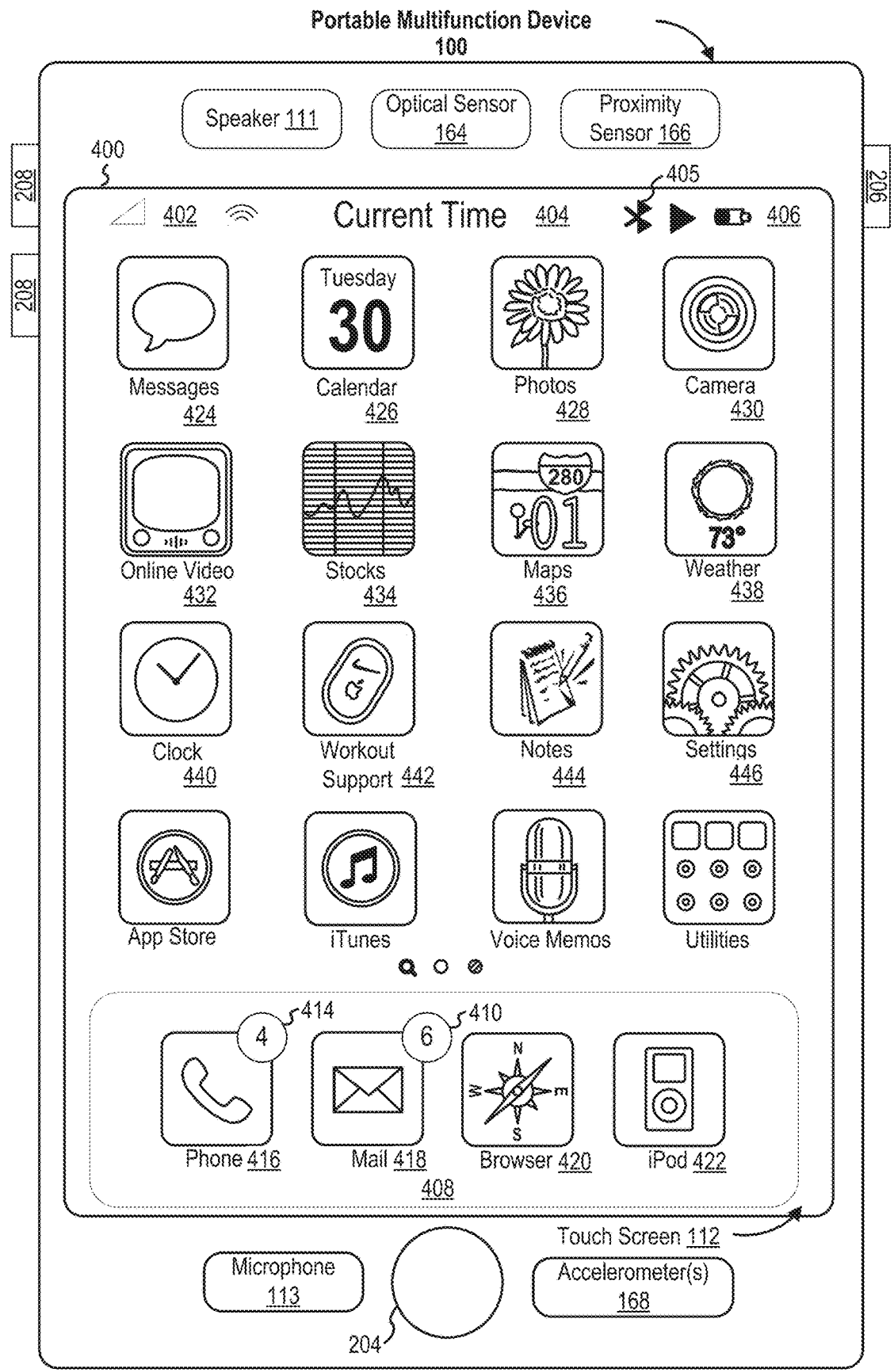
FIG. 4A illustrates an exemplary user interface for a menu of applications on a portable multifunction device in accordance with some embodiments.
Figure 4C:
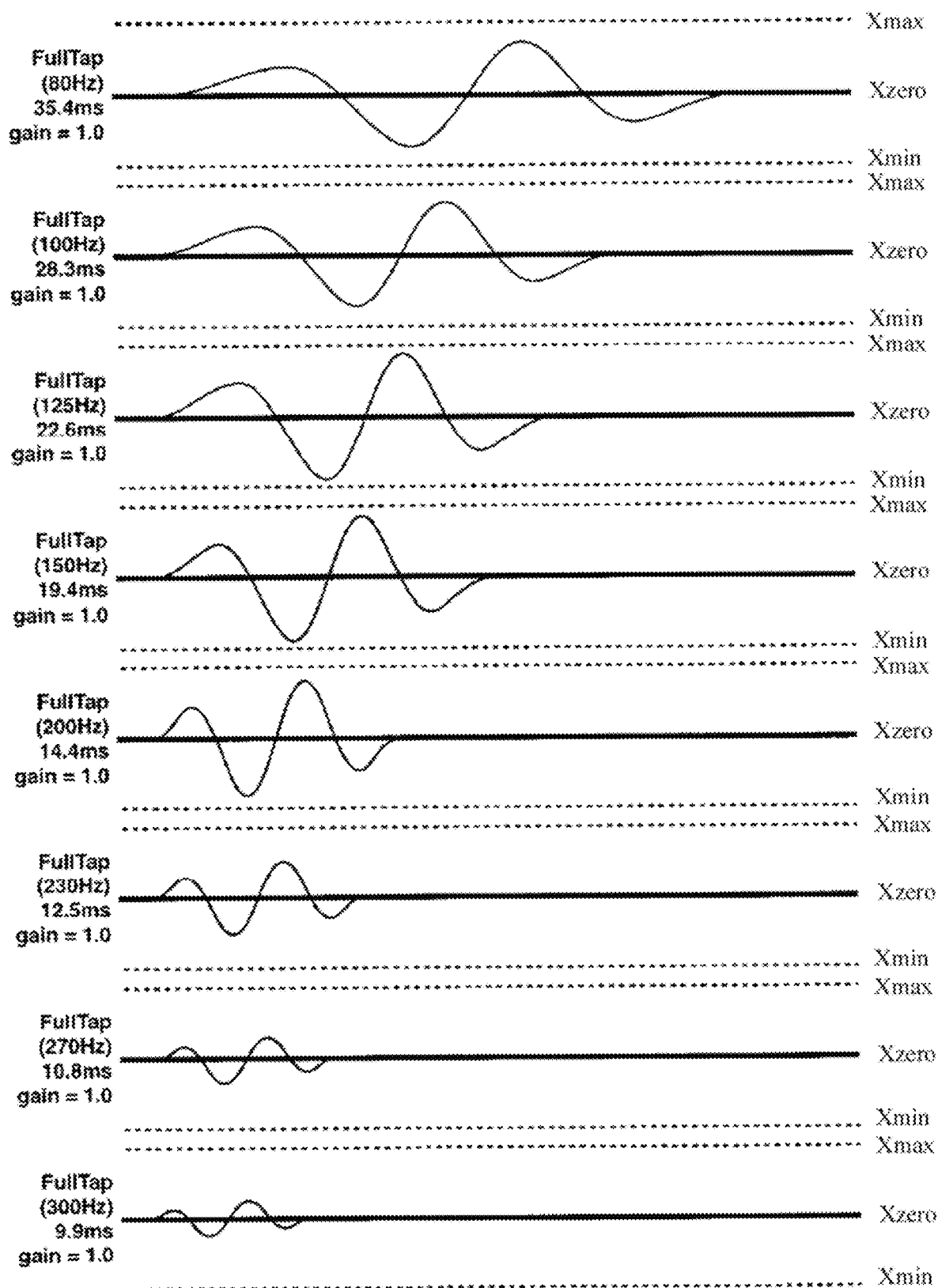
FIGS. 4C-4H illustrate exemplary tactile output patterns that have a particular waveform, in accordance with some embodiments.
Figure 4D:
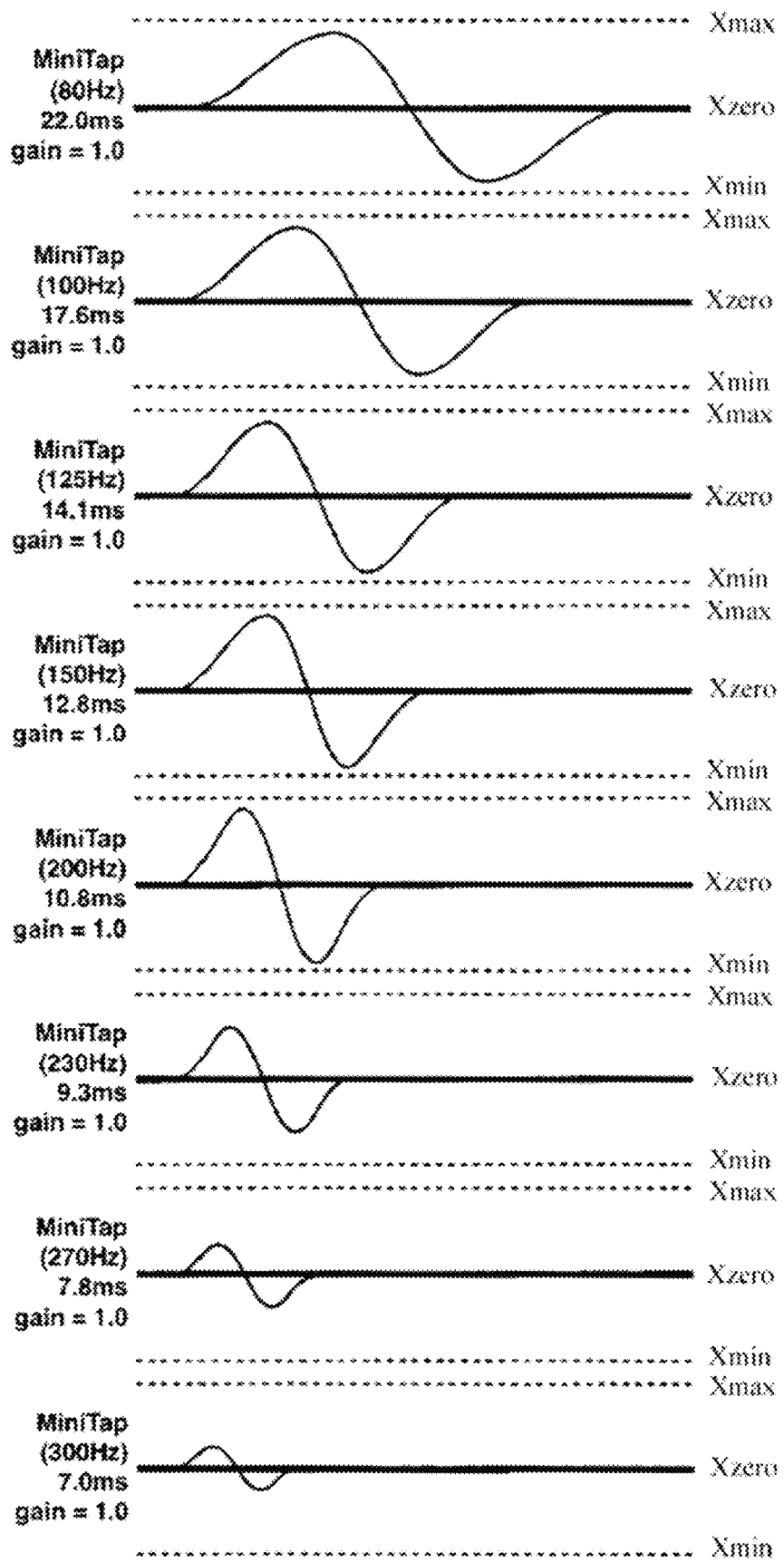
Figure 4E:
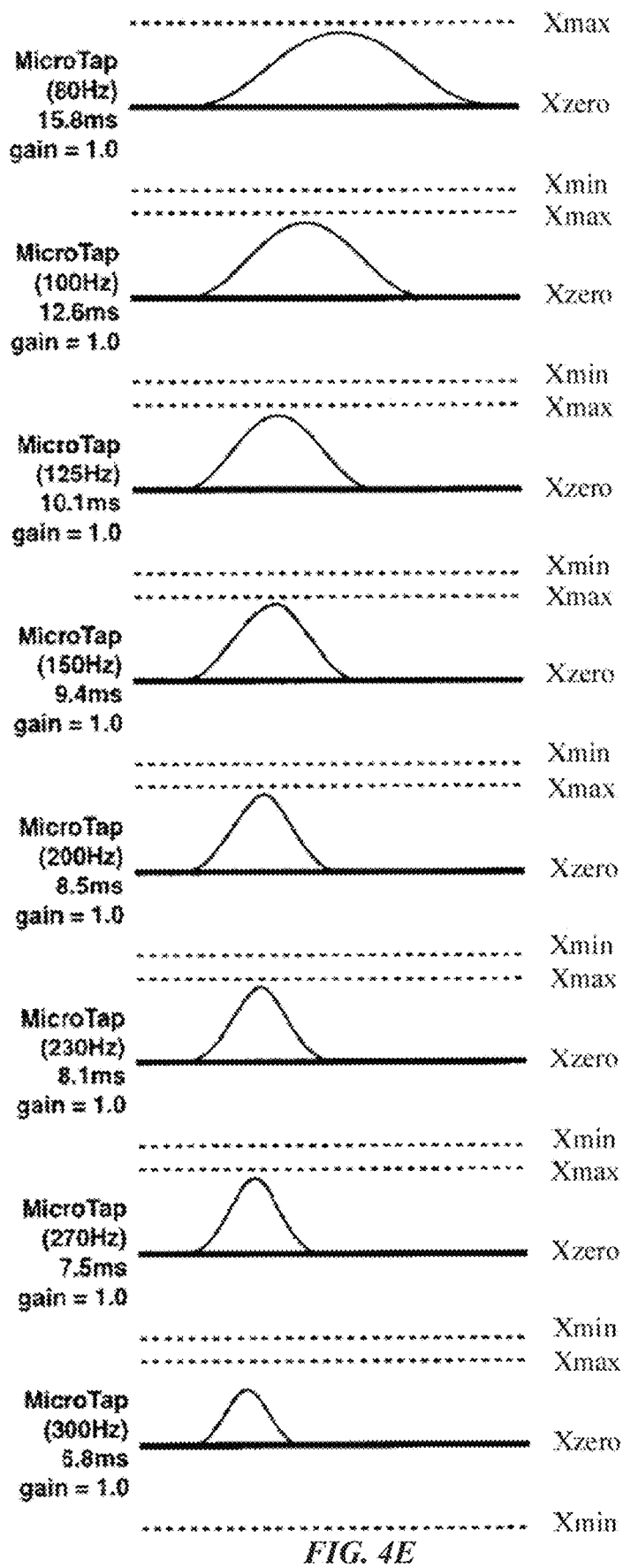
Figure 4F:
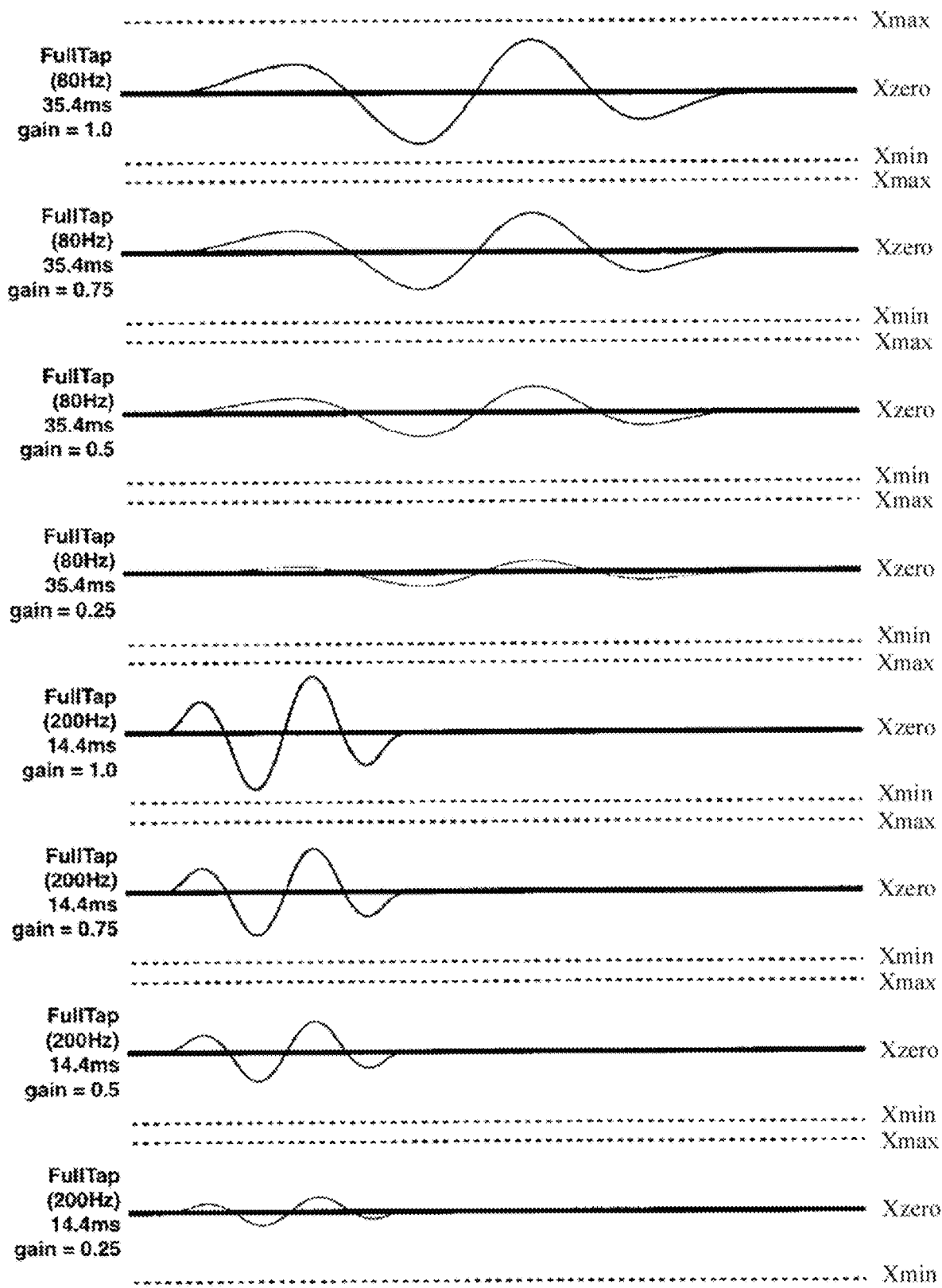
Figure 4G:
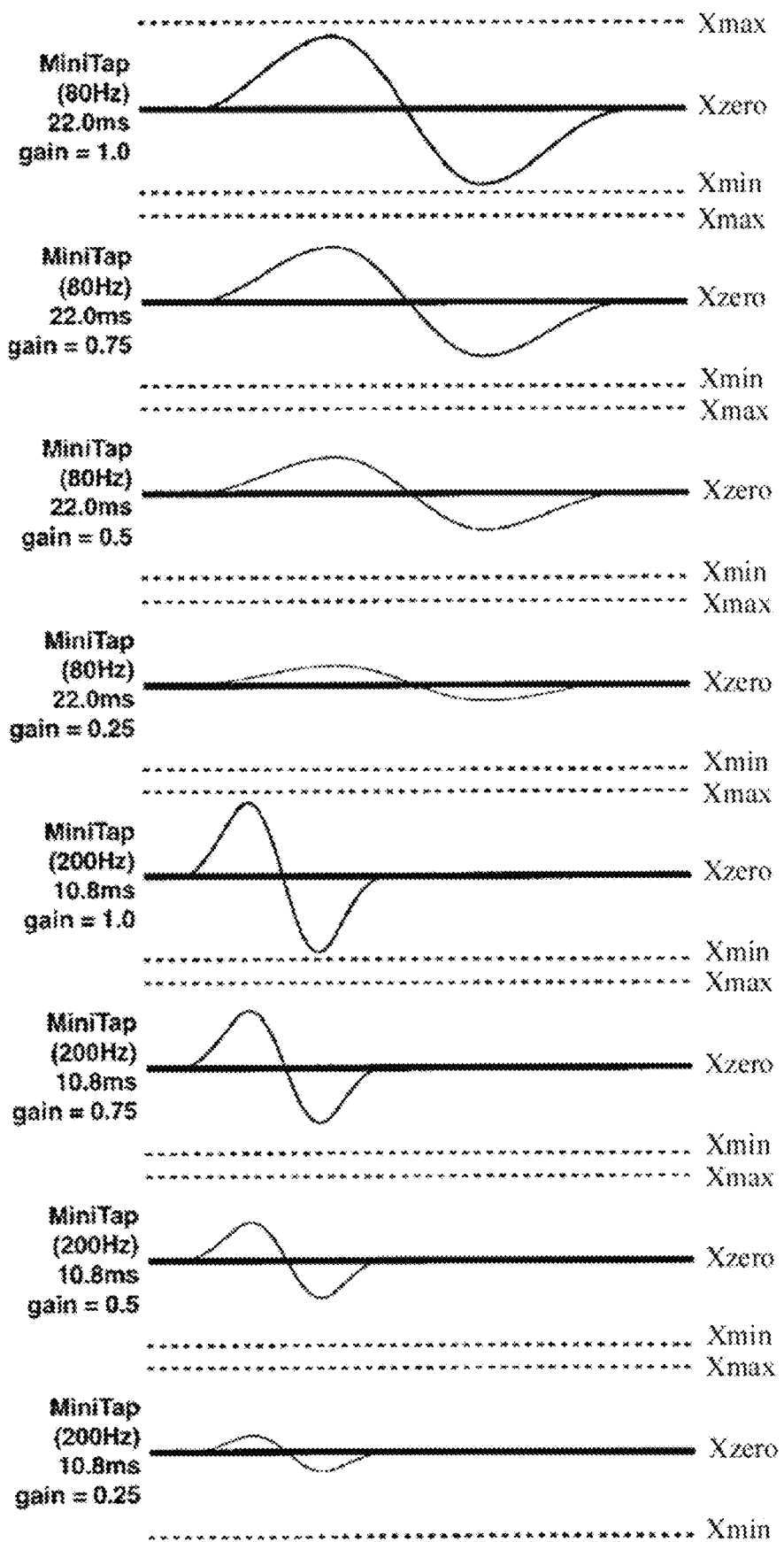
Figure 4H:
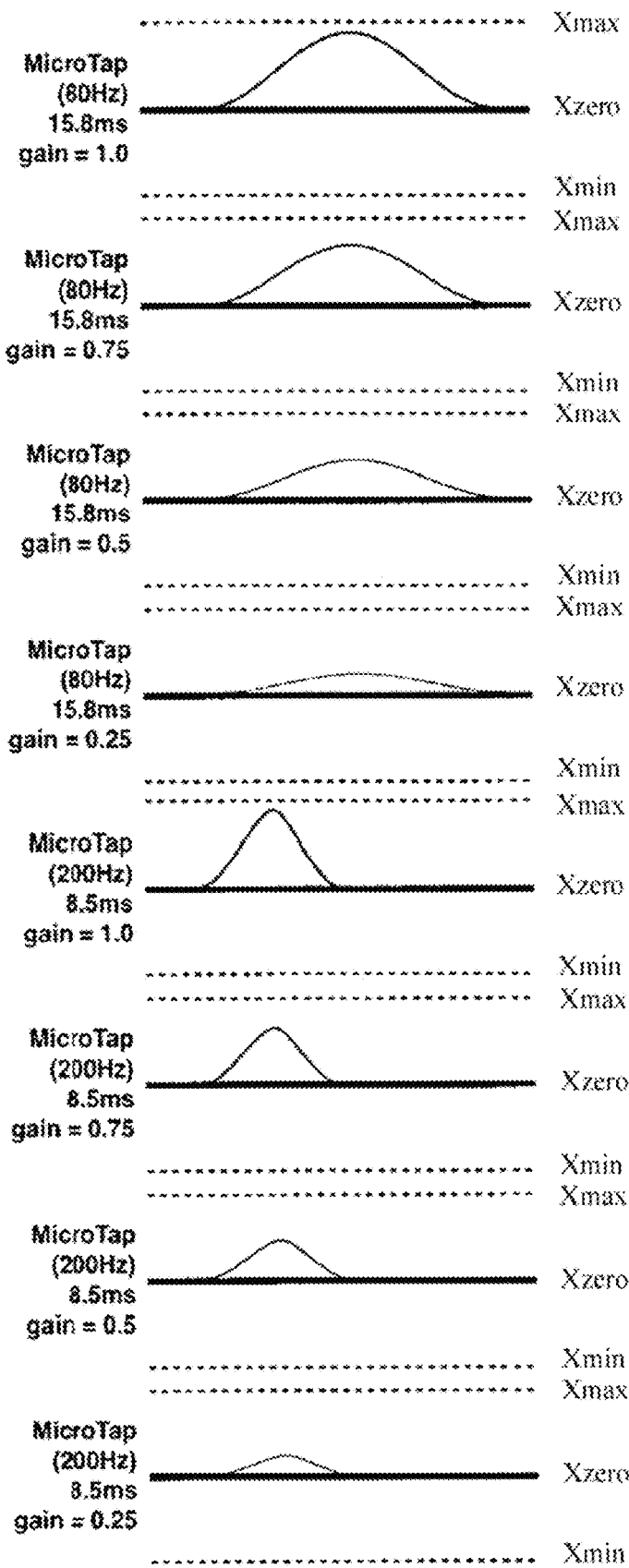

FIGS. 4C-4E provide a set of sample tactile output patterns that can be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4F-4H, which are each shown with variants having a gain of 1.0, 0.75, 0.5, and 0.25. As shown in FIGS. 4F-4H, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4C-4H show tactile output patterns that have a particular waveform. The waveform of a tactile output pattern represents the pattern of physical displacements relative to a neutral position (e.g., $x_{zero}$) versus time that an moveable mass goes through to generate a tactile output with that tactile output pattern. For example, a first set of tactile output patterns shown in FIG. 4C (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4D (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4E (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4C-4H include $x_{min}$ and $x_{max}$ values which represent the maximum and minimum extent of movement of the moveable mass. For larger electronic devices with larger moveable masses, there can be larger or smaller minimum and maximum extents of movement of the mass. The examples shown in FIGS. 4C-4H describe movement of a mass in 1 dimension, however similar principles would also apply to movement of a moveable mass in two or three dimensions.

As shown in FIGS. 4C-4E, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4C-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4C). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency can take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4C-4E, a tactile output pattern also has a characteristic amplitude that affects the amount of energy that is contained in a tactile signal, or a "strength" of a haptic sensation that can be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern can be modulated by an "envelope" and the peaks of adjacent cycles can have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 4C-4E for illustrative purposes, tactile output patterns with other frequencies, amplitudes, and waveforms can be used for similar purposes. For example, waveforms that have between 0.5 to 4 cycles can be used. Other frequencies in the range of 60 Hz-400 Hz can be used as well. Table 1 provides examples of particular haptic feedback behaviors, configurations, and examples of their use.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, depth camera controller 169, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, device 100 also includes (or is in communication with) one or more fingerprint sensors. The one or more fingerprint sensors are coupled to peripherals interface 118. Alternately, the one or more fingerprint sensors are, optionally, coupled to an input controller 160 in I/O subsystem 106. However, in one common embodiment, fingerprint identification operations are performed using secured dedicated computing hardware (e.g., one or more processors, memory and/or communications busses) that has additional security features so as to enhance security of the fingerprint information determined by the one or more fingerprint sensors. As used herein, a fingerprint sensor is a sensor that is capable of distinguishing fingerprint features (sometimes called "minutia features") of the ridges and valleys of skin such as those found on the fingers and toes of humans. A fingerprint sensor can use any of a variety of techniques to distinguish the fingerprint features, including but not limited to: optical fingerprint imaging, ultrasonic fingerprint imaging, active capacitance fingerprint imaging and passive capacitance fingerprint imaging. In addition to distinguishing fingerprint features in fingerprints, in some embodiments, the one or more fingerprint sensors are capable of tracking movement of fingerprint features over time and thereby determining/characterizing movement of the fingerprint over time on the one or more fingerprint sensors. While the one or more fingerprint sensors can be separate from the touch-sensitive surface (e.g., Touch-Sensitive Display System 112), it should be understood that in some implementations, the touch-sensitive surface (e.g., Touch-Sensitive Display System 112) has a spatial resolution that is high enough to detect fingerprint features formed by individual fingerprint ridges and is used as a fingerprint sensor instead of, or in addition to, the one or more fingerprint sensors. In some embodiments, device 100 includes a set of one or more orientation sensors that are used to determine an orientation of a finger or hand on or proximate to the device (e.g., an orientation of a finger that is over one or more fingerprint sensors). Additionally, in some embodiments, the set of one or more orientation sensors are used in addition to or instead of a fingerprint sensor to detect rotation of a contact that is interacting with the device (e.g., in one or more of the methods described below, instead of using a fingerprint sensor to detect rotation of a fingerprint/contact, the set of one or more orientation sensors is used to detect rotation of the contact that includes the fingerprint, with or without detecting features of the fingerprint).

In some embodiments, features of fingerprints and comparisons between features of detected fingerprints and features of stored fingerprints are performed by secured dedicated computing hardware (e.g., one or more processors, memory and/or communications busses) that are separate from processor(s) 120, so as to improve security of the fingerprint data generated, stored and processed by the one or more fingerprint sensors. In some embodiments, features of fingerprints and comparisons between features of detected fingerprints and features of enrolled fingerprints are performed by processor(s) 120 using a fingerprint analysis module.

In some embodiments, during an enrollment process, the device (e.g., a fingerprint analysis module or a separate secure module in communication with the one or more fingerprint sensors) collects biometric information about one or more fingerprints of the user (e.g., identifying relative location of a plurality of minutia points in a fingerprint of the user). After the enrollment process has been completed the biometric information is stored at the device (e.g., in a secure fingerprint module) for later use in authenticating detected fingerprints. In some embodiments, the biometric information that is stored at the device excludes images of the fingerprints and also excludes information from which images of the fingerprints could be reconstructed so that images of the fingerprints are not inadvertently made available if the security of the device is compromised. In some embodiments, during an authentication process, the device (e.g., a fingerprint analysis module or a separate secure module in communication with the one or more fingerprint sensors) determines whether a finger input detected by the one or more fingerprint sensors includes a fingerprint that matches a previously enrolled fingerprint by collecting biometric information about a fingerprint detected on the one or more fingerprint sensors (e.g., identifying relative locations of a plurality of minutia points in the fingerprint detected on the one or more fingerprint sensors) and comparing the biometric information that corresponds to the detected fingerprint to biometric information that corresponds to the enrolled fingerprints(s). In some embodiments, comparing the biometric information that corresponds to the detected fingerprint to biometric information that corresponds to the enrolled fingerprints(s) includes comparing a type and location of minutia points in the biometric information that corresponds to the detected fingerprint to a type and location of minutia points in the biometric information that corresponds to the enrolled fingerprints. However the determination as to whether or not a finger input includes a fingerprint that matches a previously enrolled fingerprint that is enrolled with the device is, optionally, performed using any of a number of well-known fingerprint authentication techniques for determining whether a detected fingerprint matches an enrolled fingerprint.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Figure 3:
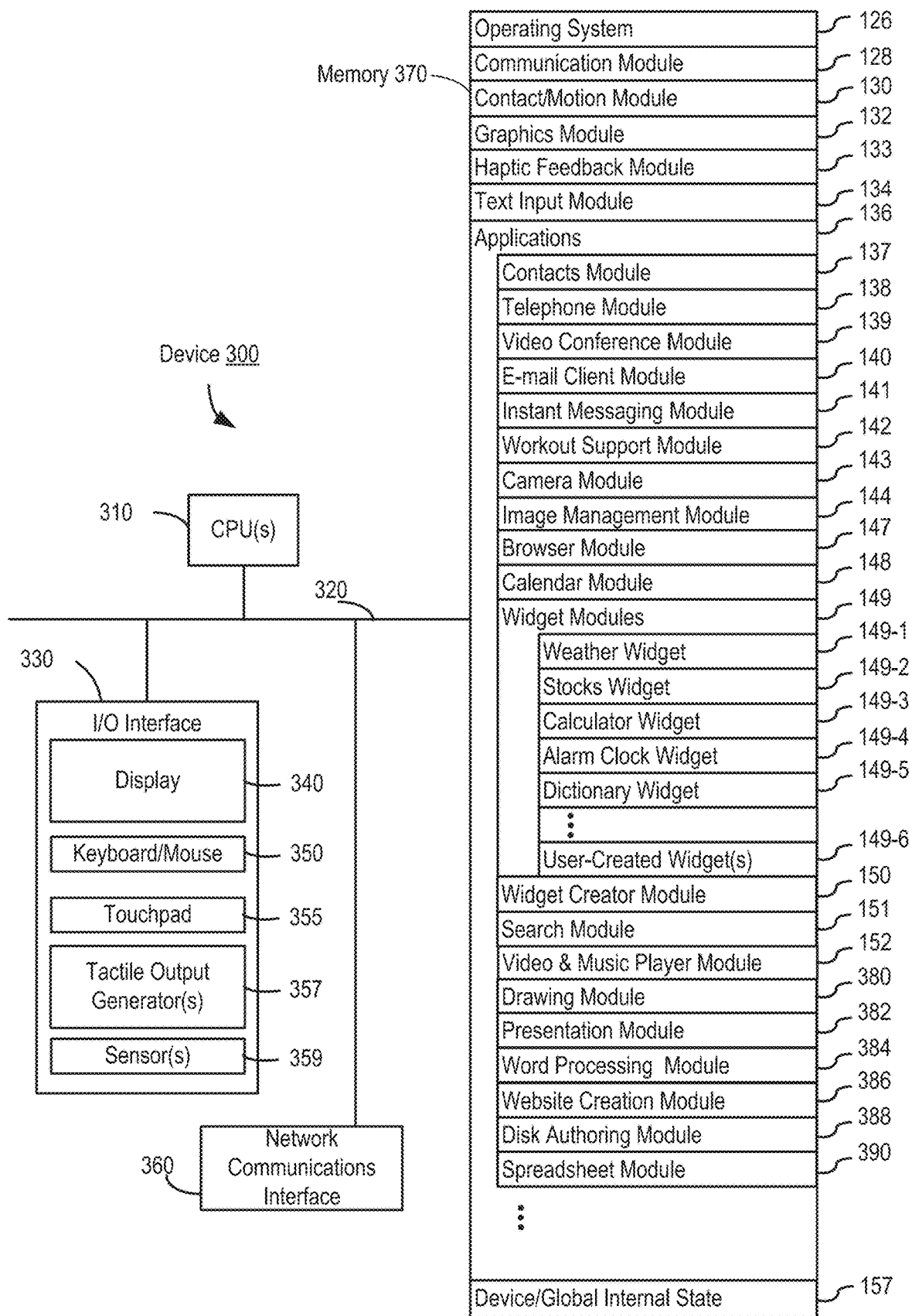
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
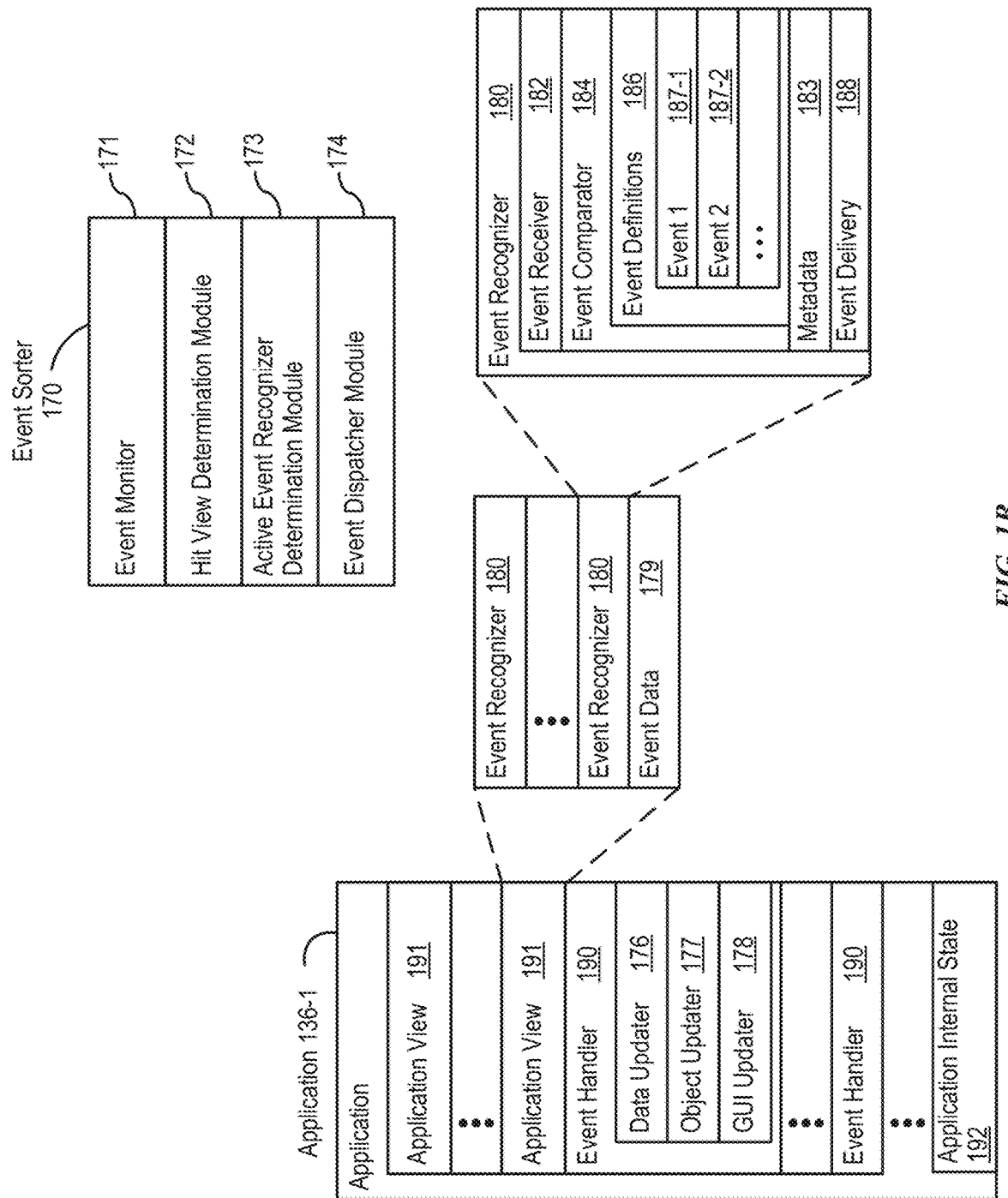
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

Figure 1C:
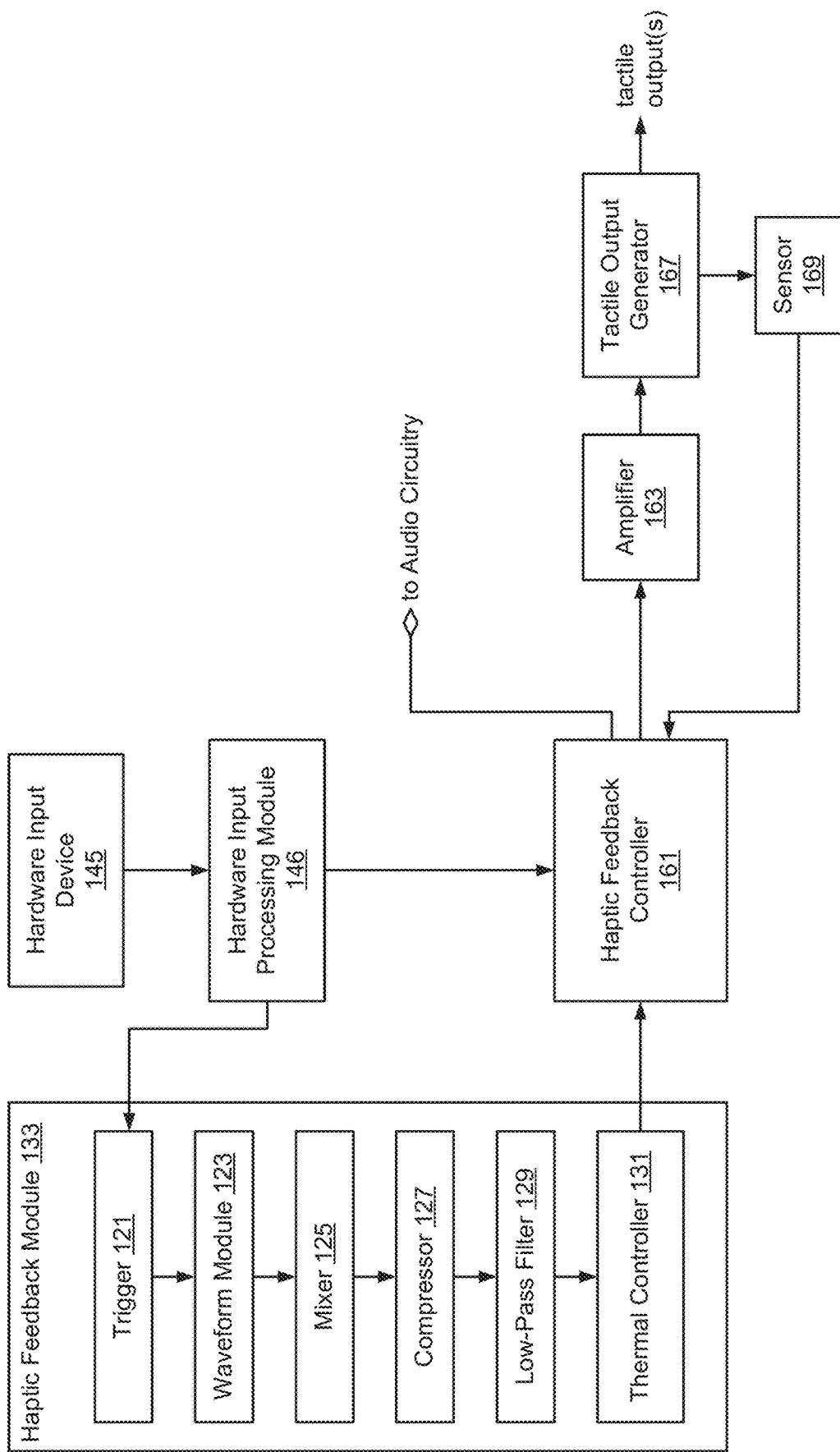
FIG. 1C is a block diagram illustrating exemplary components for generating a tactile output, in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4C-4D).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs can vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
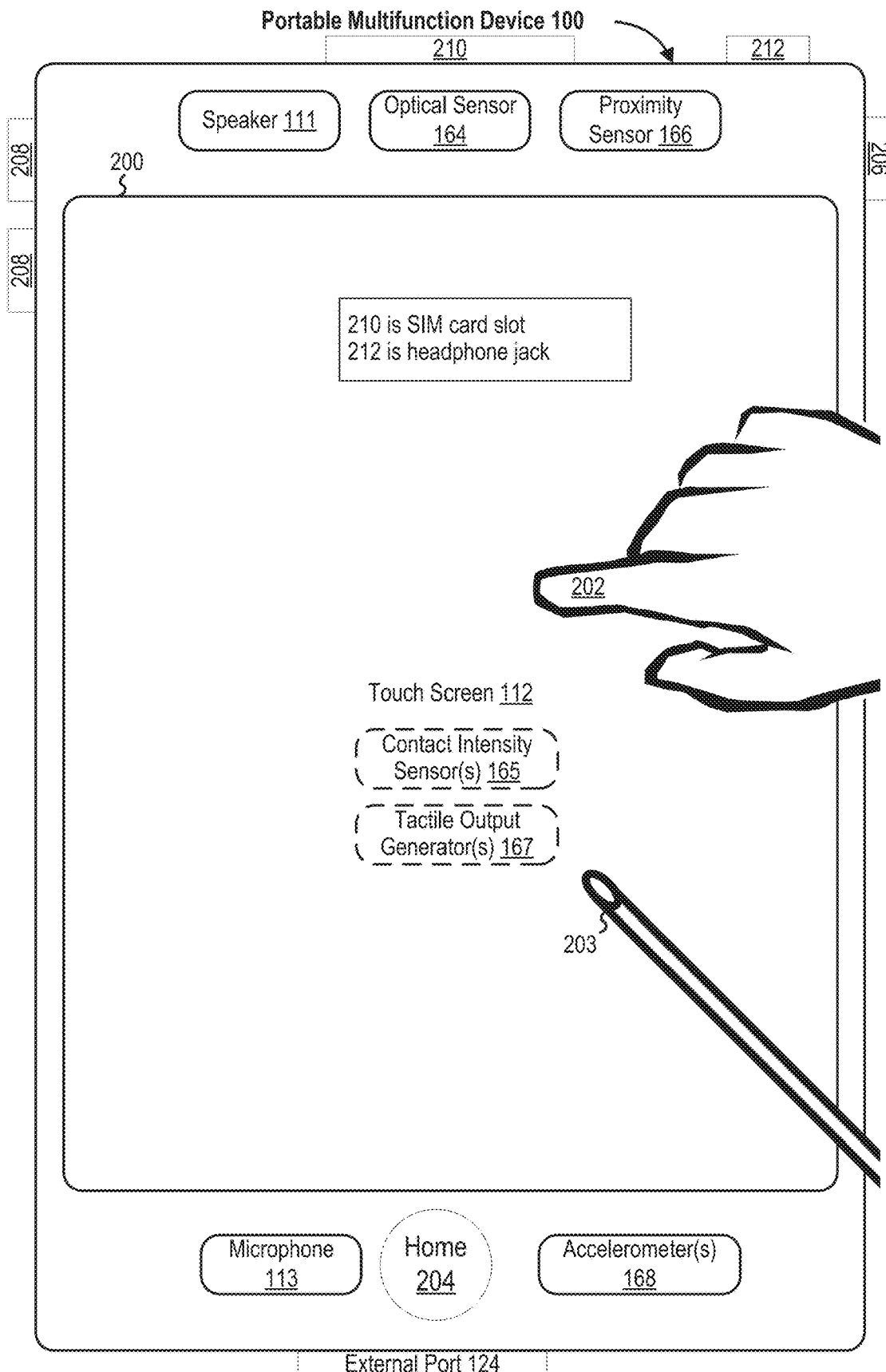
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
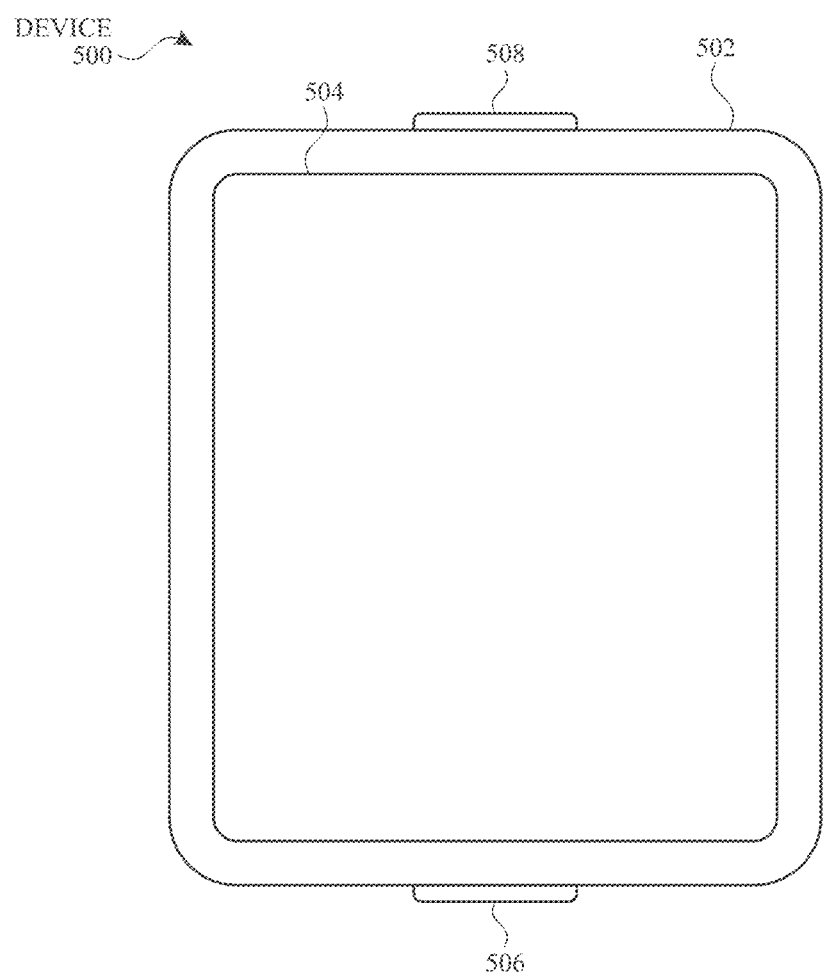
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
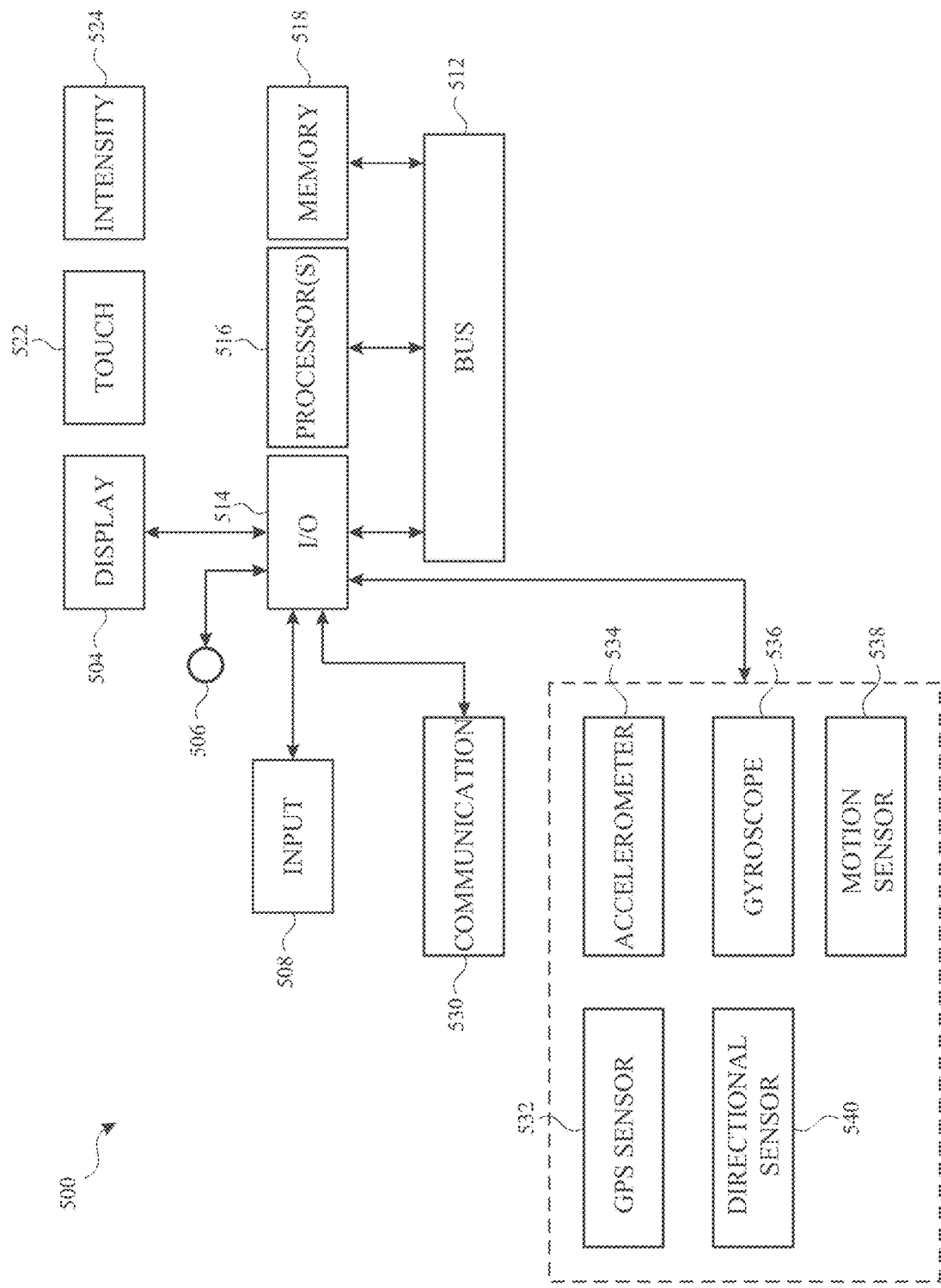
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 800, 1000, 1200, and 1400 (FIGS. 8, 10, 12, and 14). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
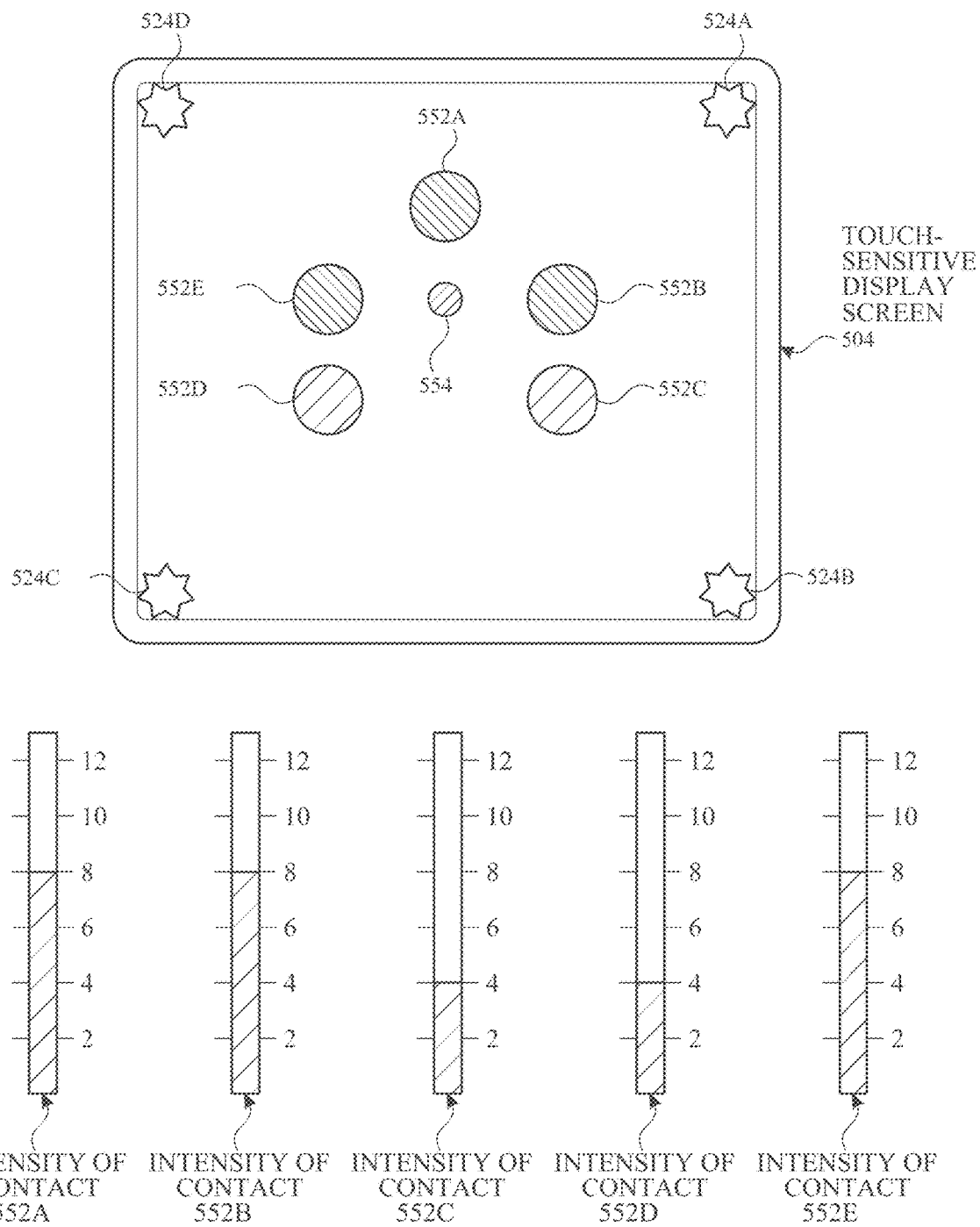

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some examples, electronic device (e.g., 100, 300, 500) communicates with payment terminal 600 using an NFC channel 610. In some examples, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 600) is established within a defined time period from detection of the input, the secure element releases payment information to be transmitted to the other device (e.g., payment terminal 600). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some examples, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some examples, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations optionally includes navigation between user interfaces, activation or deactivation of a predefined set of functions, and activation or deactivation of certain applications. The locked state can be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state optionally responds to a limited set of user inputs, including input that corresponds to an attempt to transition the device to the unlocked state or input that corresponds to powering the device off.

In some examples, a secure element (e.g., 115) is a hardware component (e.g., a secure microcontroller chip) configured to securely store data or an algorithm such that the securely stored data is not accessible by the device without proper authentication information from a user of the device. Keeping the securely stored data in a secure element that is separate from other storage on the device prevents access to the securely stored data even if other storage locations on the device are compromised (e.g., by malicious code or other attempts to compromise information stored on the device). In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7AD illustrate exemplary user interfaces for providing indications of error conditions during biometric authentication, in accordance with some examples. The user interfaces in these figures are used to illustrate the processes described below, including the processes in FIGS. 8A-8B.

FIG. 7A illustrates electronic device 700 (e.g., portable multifunction device 100, device 300, or device 500). In the exemplary example illustrated in FIGS. 7A-7AD, electronic device 700 is a smartphone. In other examples, electronic device 700 can be a different type of electronic device, such as a tablet (e.g., electronic device 900). Electronic device 700 includes display 702, one or more input devices (e.g., touchscreen of display 702, button 704, and a microphone), a wireless communication radio, and biometric sensor 703. Electronic device 700 includes biometric sensor 703. In some examples, biometric sensor 703 includes one or more biometric sensors that can include a camera, such as a depth camera (e.g., an infrared camera), a thermographic camera, or a combination thereof. In some examples, biometric sensor 703 includes a biometric sensor (e.g., facial recognition sensor), such as those described in U.S. Ser. No. 14/341,860, "Overlapping Pattern Projector," filed Jul. 14, 2014, U.S. Pub. No. 2016/0025993 and U.S. Ser. No. 13/810,451, "Scanning Projects and Image Capture Modules For 3D Mapping," U.S. Pat. No. 9,098,931, which are hereby incorporated by reference in their entirety for any purpose. In some examples, biometric sensor 703 includes one or more fingerprint sensors (e.g., a fingerprint sensor integrated into a button). In some examples, electronic device 700 further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by biometric sensor 703. In some examples, electronic device 700 includes a plurality of cameras separate from biometric sensor 703. In some examples, electronic device 700 includes only one camera separate from biometric sensor 703.

At FIG. 7A, a user learns from notification 708 that she has received a message from John Appleseed. The user wishes to view the restricted content of notification 708 (e.g., the message from John Appleseed), but is unable to do so, as electronic device 700 is currently in a locked state. Electronic device 700 displays a locked state user interface (UI) with lock icon 706, which provides an indication that electronic device 700 is in a locked state. Viewing the restricted content of notification 708 requires successful authentication (e.g., determining that information (or data) about a biometric feature obtained using biometric sensor 703 corresponds to (or matches) stored authorized credentials). To view the restricted content of notification 708, the user lifts (or raises) electronic device 700 (e.g., from a substantially horizontal orientation to the orientation of the device as depicted in the user's hand in FIG. 7A). Electronic device 700 detects the change in orientation of electronic device 700 and, in response, initiates biometric authentication. In some examples, after initiating biometric authentication, electronic device 700 determines that biometric authentication is successful. In some examples, upon determining that biometric authentication is successful, electronic device 700 transitions from a locked state to an unlocked state, and displays the restricted content of notification 708.

After initiating biometric authentication (e.g., prior to successful authentication), electronic device 700 determines whether a face is detected by biometric sensor 703. At FIG. 7B, upon determining that a face is detected, electronic device 700 displays authentication glyph 710, which includes a plurality of rings that rotate spherically. Authentication glyph 710 provides an indication that biometric authentication is being performed. In some examples, electronic device 700 displays an animation of lock icon 706 morphing into authentication glyph 710. In some examples, upon determining that no face is detected using biometric sensor 703, electronic device 700 maintains a locked state, and does not display authentication glyph 710.

Figure 7B:
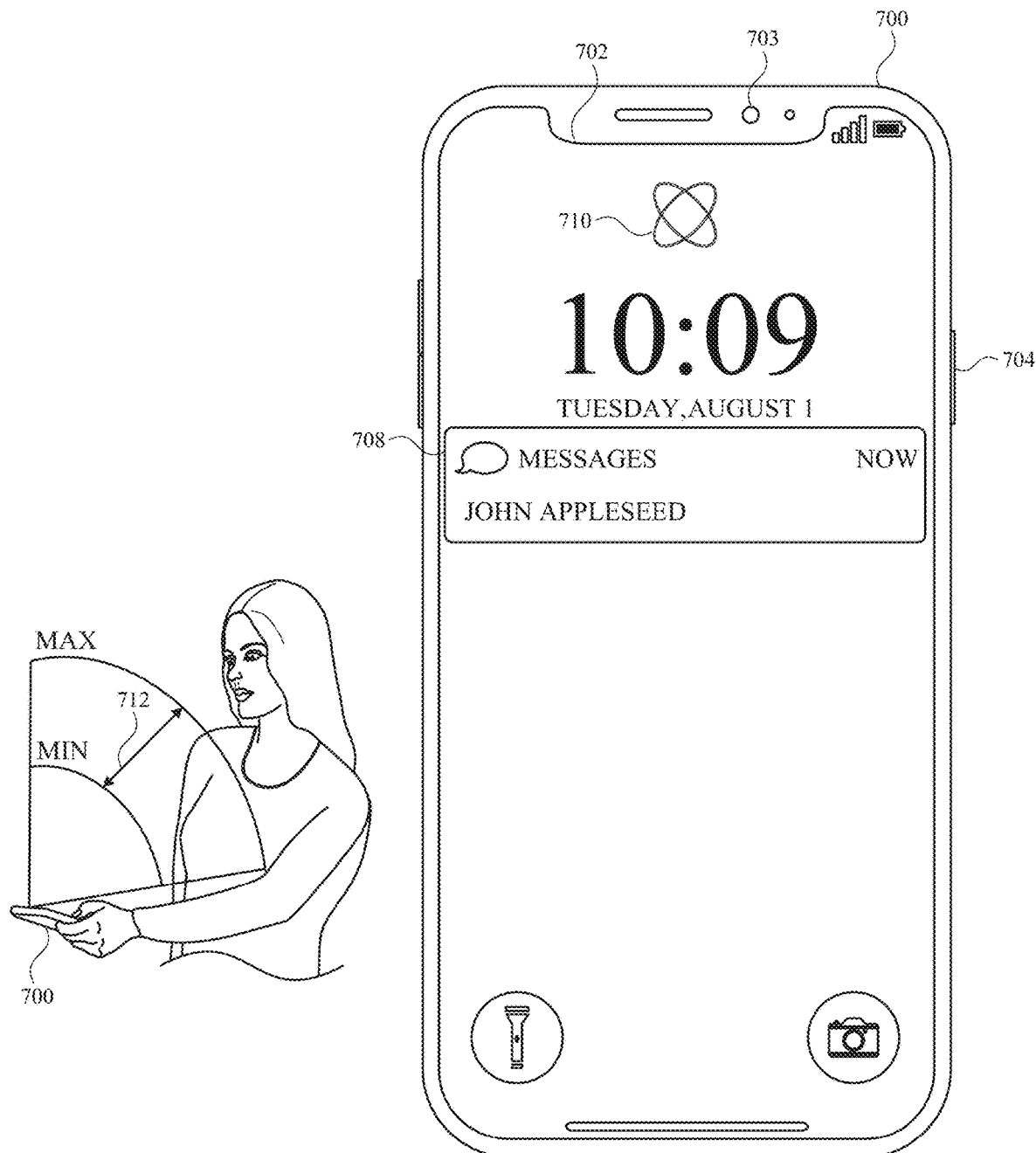
Figure 7C:
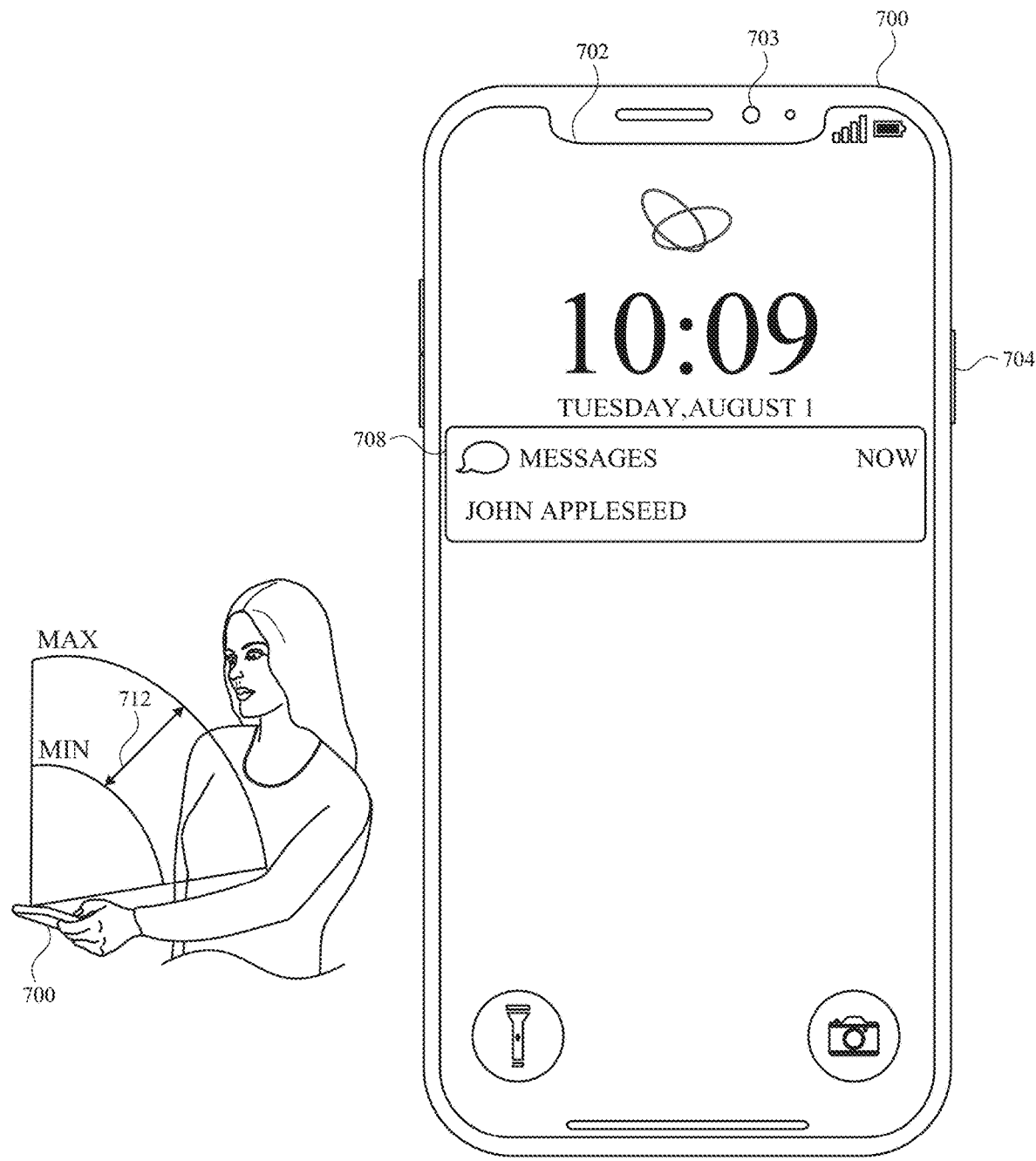
Figure 7D:
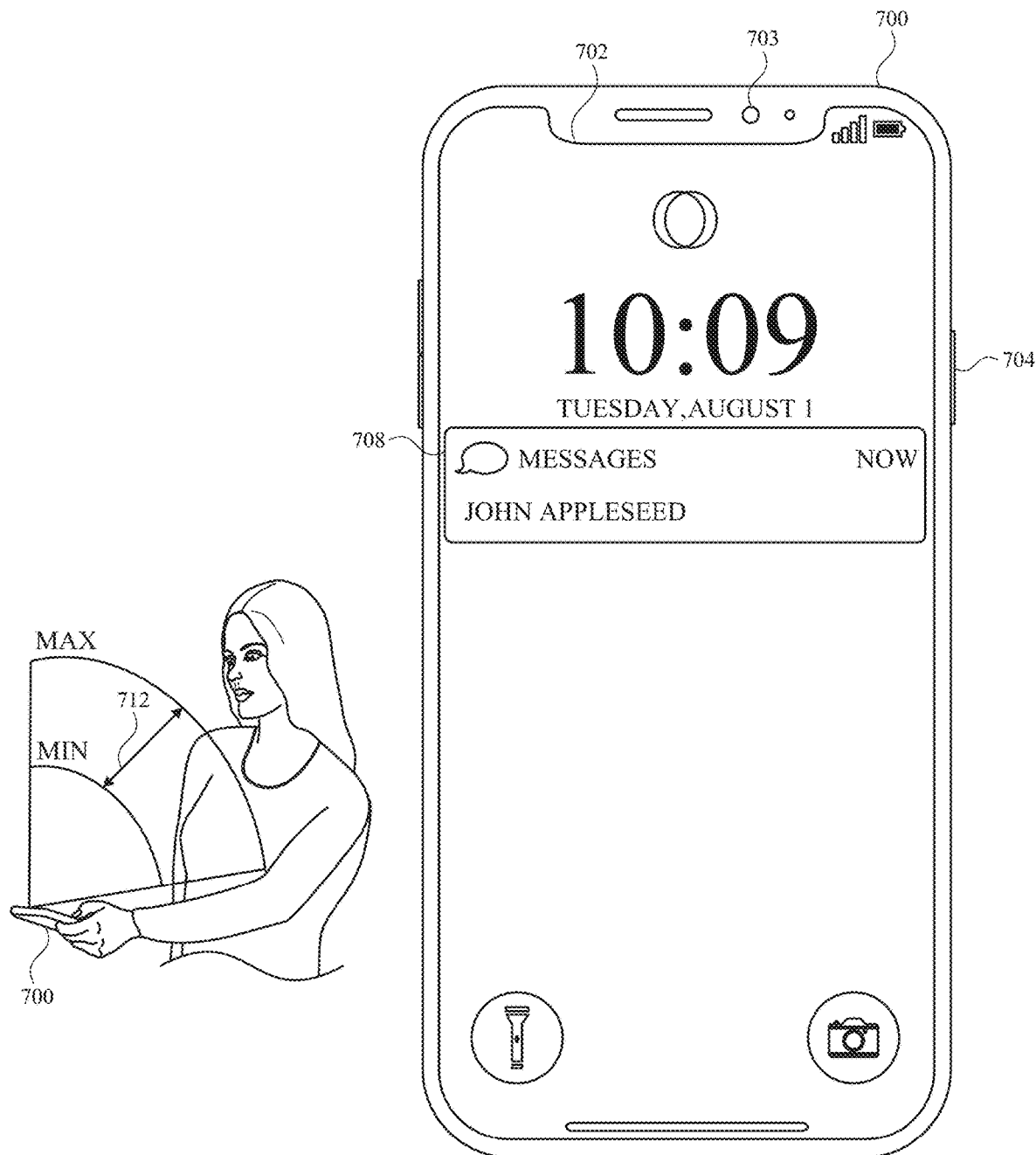
Figure 7E:
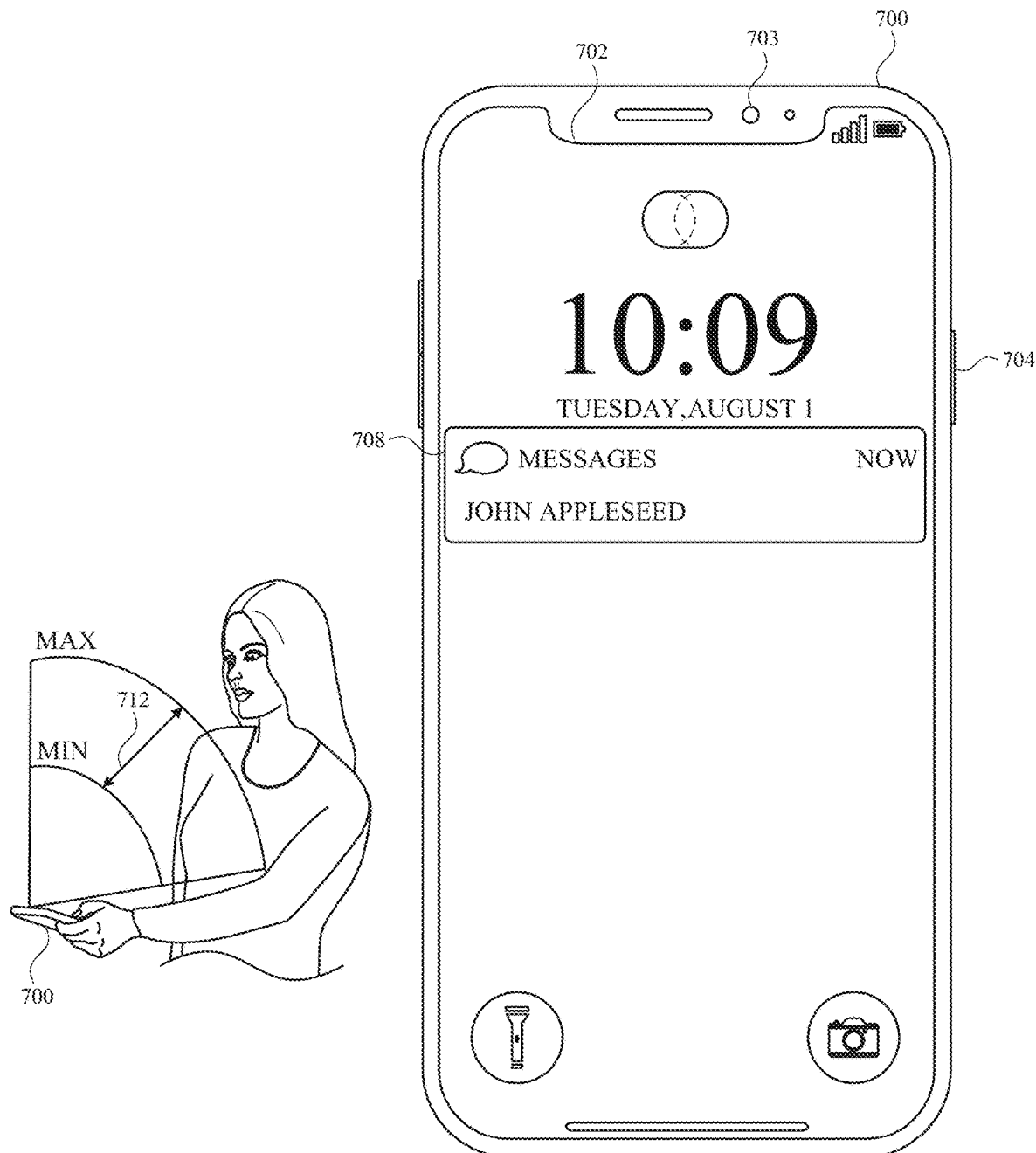
Figure 7F:
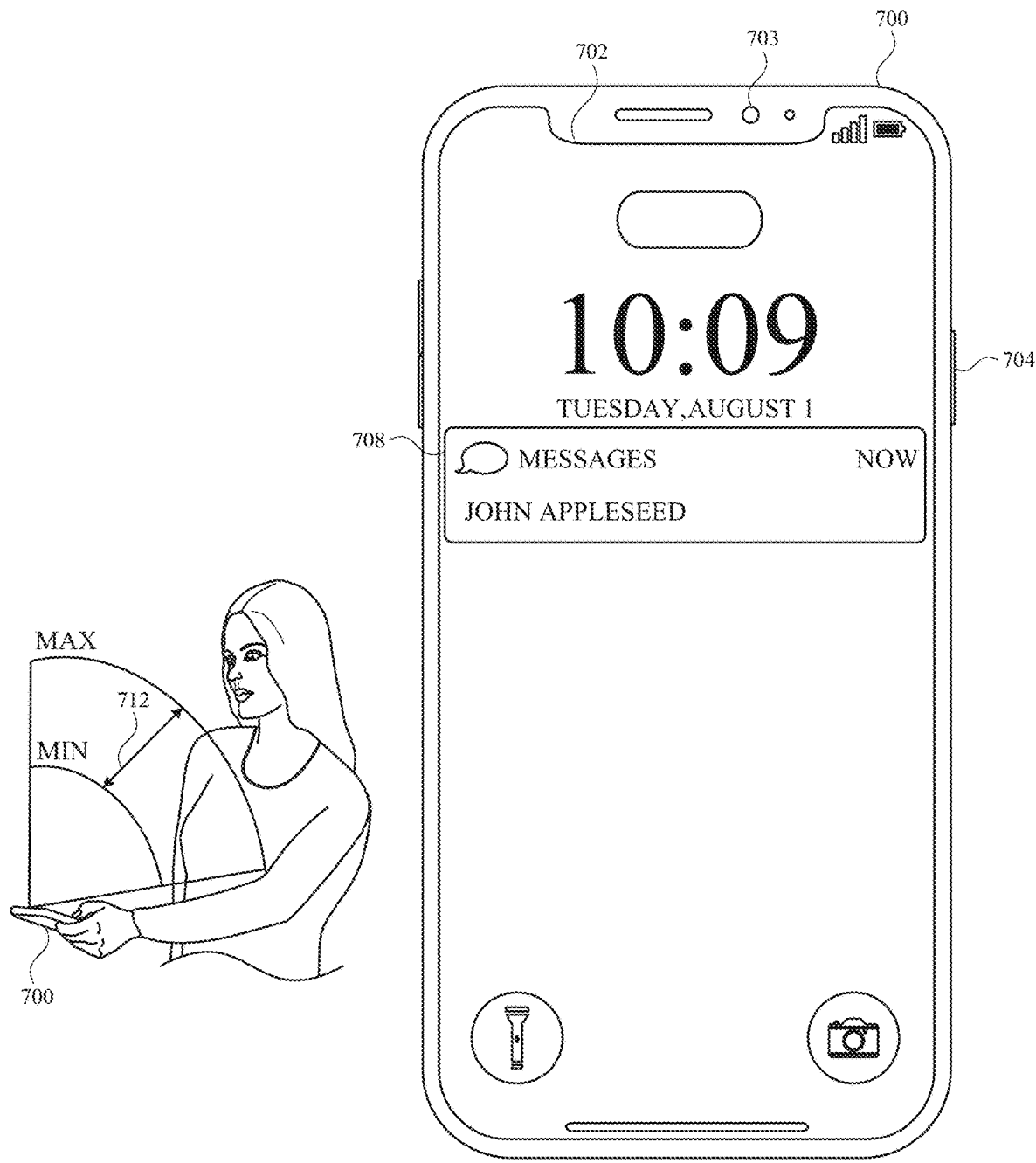
Figure 7G:
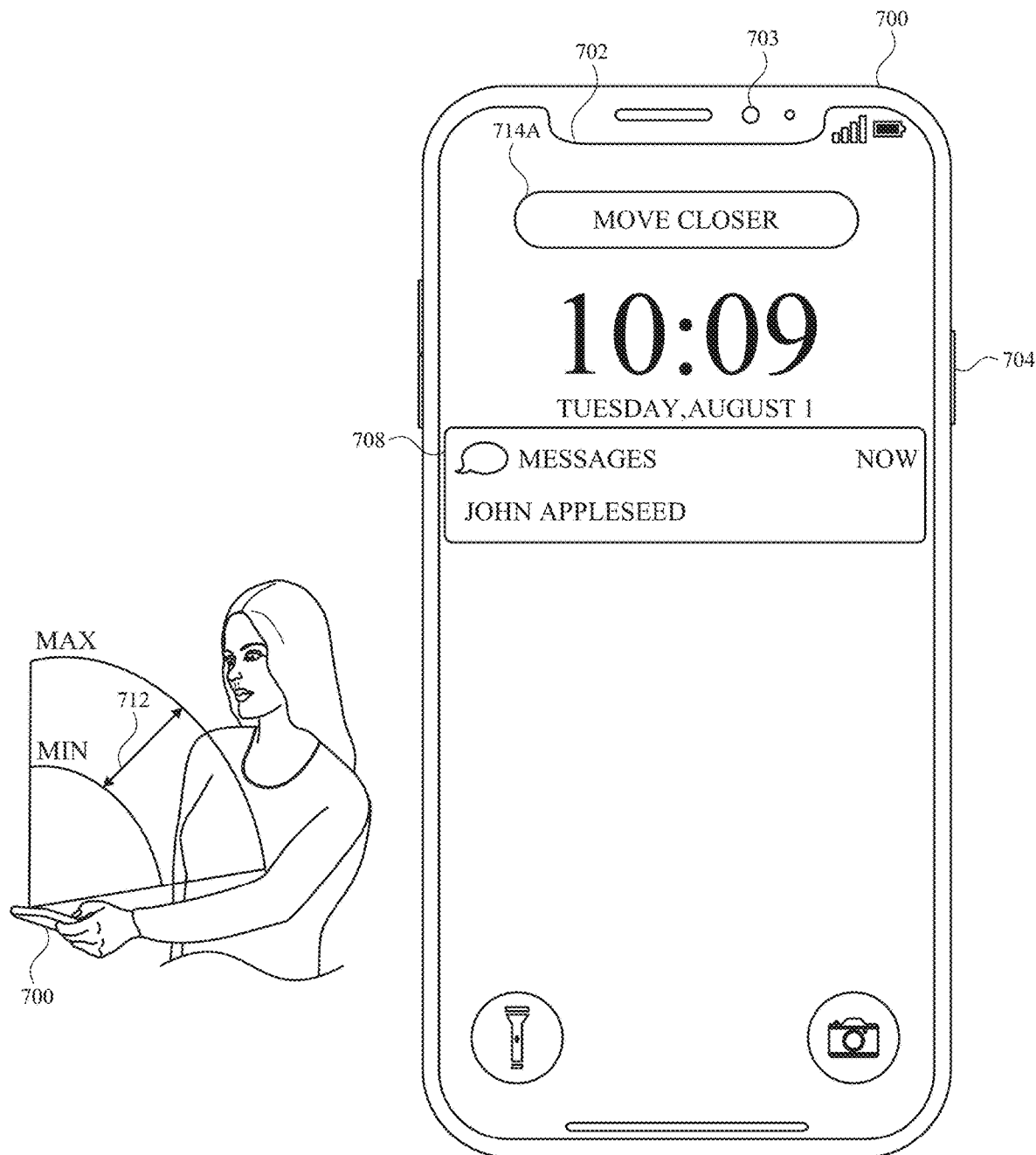

After detecting the presence of a face, electronic device 700 determines that authentication is unsuccessful due to failure to obtain sufficient information about the user's face using biometric sensor 703. Specifically, as depicted by FIG. 7B, biometric sensor 703 is positioned outside acceptable distance range 712 (e.g., above the maximum threshold range), resulting in a failure to obtain sufficient information about the user's face. Upon determining that biometric authentication is unsuccessful due to the user's face being outside acceptable distance range 712, electronic device 700 maintains the device in a locked state and does not display the restricted content of notification 708. In some examples, electronic device 700 maintains the device in a locked state and does not display the restricted content of notification 708 upon determining authentication is unsuccessful and that no error condition exists. In some examples, upon determining that authentication is unsuccessful (e.g., due to captured biometric information not matching an authorized biometric information profile (e.g., stored authorized credentials)) and that no error condition exists (e.g., no condition preventing capture of sufficient biometric information), electronic device 700 maintains a locked state and automatically retries biometric authentication. In some examples, while retrying biometric authentication, electronic device 700 continues to display authentication glyph 710 in FIG. 7B.

As depicted in FIGS. 7C-7G, upon determining that biometric authentication is unsuccessful due to the user's face being outside acceptable distance range 712, electronic device 700 displays an animation of authentication glyph 710 morphing into error indication 714A such that error indication 714A replaces the display of authentication glyph 710. At FIG. 7G, electronic device 700 displays error indication 714A, which prompts the user to take an action to correct the error condition underlying error indication 714A. Specifically, error indication 714A prompts the user to move her face closer to biometric sensor 703. Error indication 714A also suggests to the user that the user's face is too far away from biometric sensor 703, which is the cause of error indication 714A. As long as the user's face is outside acceptable distance range 712, electronic device 700 will continue to determine that error indication 714A exists. Upon determining that error indication 714A still exists, electronic device 700 does not attempt retrying biometric authentication. It is noted that electronic device 700 displays error indication 714A at a position coinciding with the position of lock icon 706 in FIG. 7A. Further, electronic device 700 displays error indication 714A on a portion of display 702 that is adjacent to biometric sensor 703 to suggest to the user that error indication 714A is associated with (or corresponds to) biometric sensor 703.

Figure 7H:
Figure 7I:
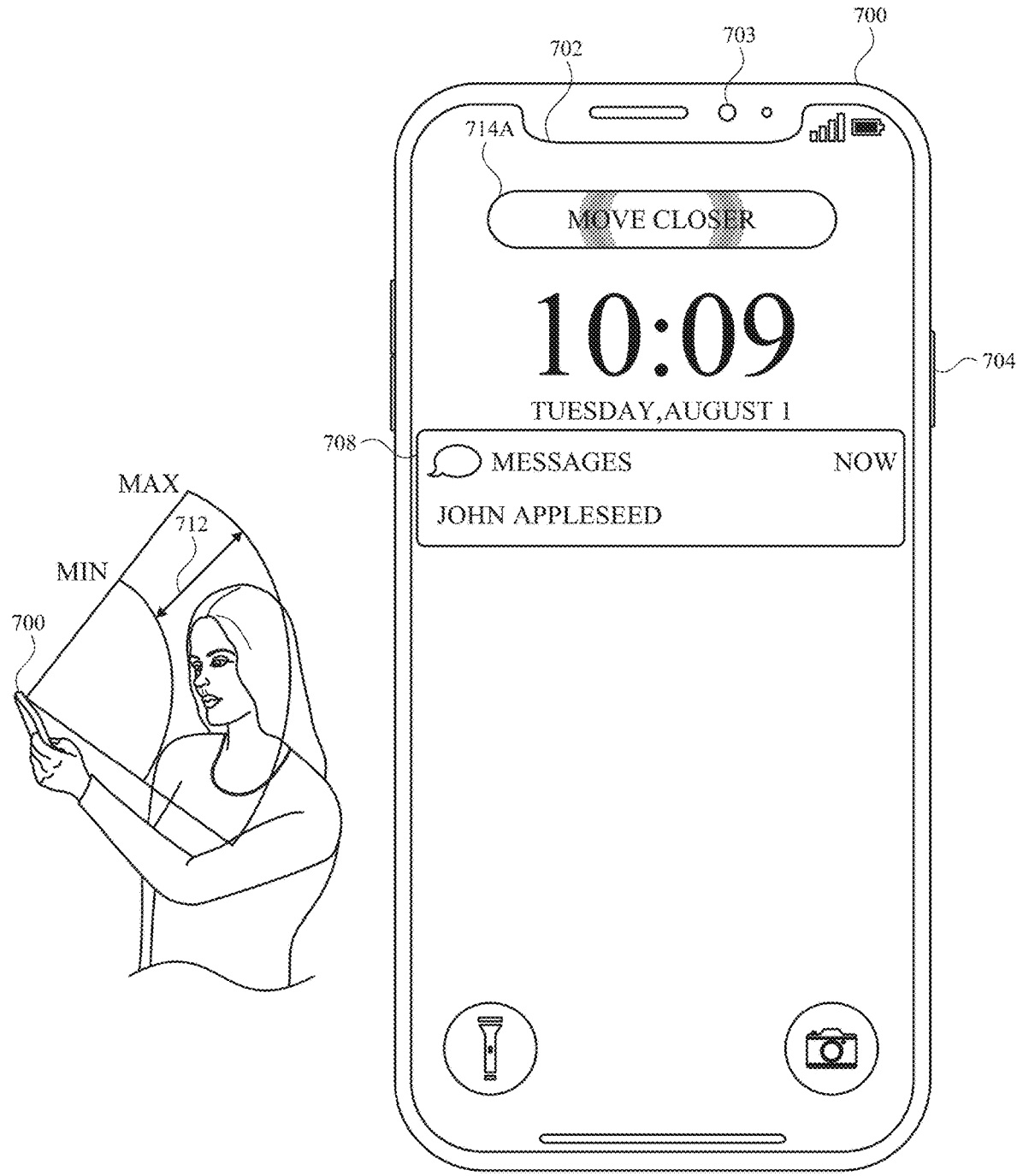
Figure 7J:
Figure 7K:
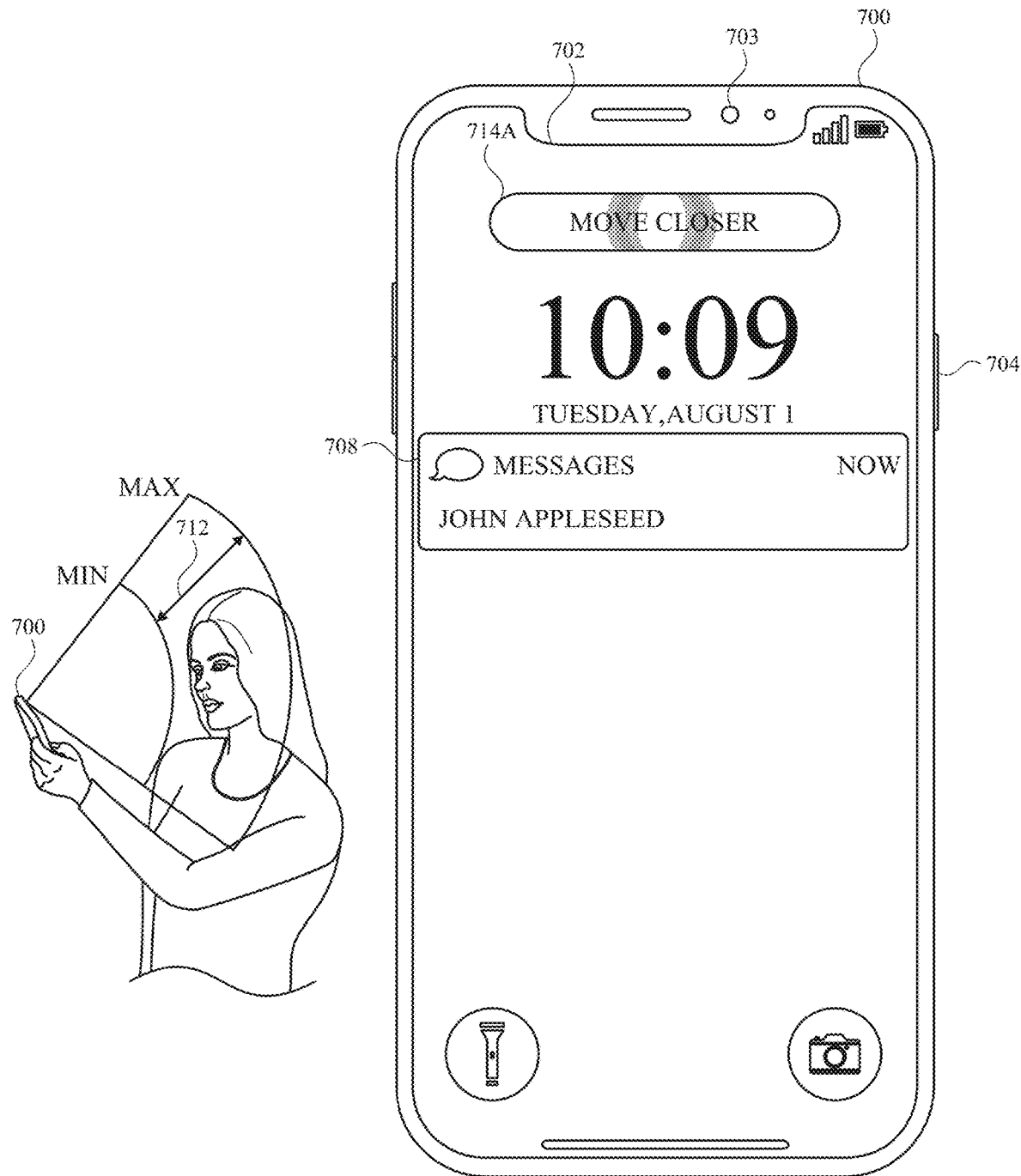

As depicted in FIG. 7H, after being prompted to correct error indication 714A, the user moves her face closer to biometric sensor 703 such that the user's face is within acceptable distance range 712. At FIG. 7H, electronic device determines that error indication 714A no longer exists. Upon determining that error indication 714A no longer exists, electronic device 700 enables biometric authentication on the device and automatically retries biometric authentication using biometric sensor 703.

In response to automatically retrying biometric authentication, electronic device 700 displays error indication 714A with a shimmer effect (e.g., animating the error indication such that one or more portions of the error indication moves side to side so as produce an effect where the error indication appears to shine) to indicate that electronic device 700 is attempting to biometrically authenticate the user again. FIGS. 7H-7L depict an animation of error indication 714A with the shimmer effect. In some examples, instead of displaying error indication 714A with a shimmer effect, electronic device 700 displays (e.g., replaces display of error indication 714A with) authentication glyph 710 to indicate that electronic device 700 is attempting to biometrically authenticate the user again. Accordingly, in some examples, electronic device 700 displays an animation of authentication glyph 710 morphing into lock icon 706 instead of error indication 714A morphing into lock icon 706.

Figure 7L:
Figure 7M:
Figure 7N:
Figure 7O:

At FIG. 7L, after retrying biometric authentication, electronic device 700 successfully biometrically authenticates the user. In response to successful biometric authentication, electronic device 700 transitions the device from a locked state to an unlocked state. While transitioning from a locked state to an unlocked state, electronic device 700 displays an animation of error indication 714A morphing into lock icon 706, as depicted in FIGS. 7L-7N. After displaying an animation of error indication 714A morphing into lock icon 706, electronic device 700 displays an animation of lock icon 706 transitioning to unlock icon 716, as depicted in FIGS. 7N-7O. Unlock icon 716 provides an indication that electronic device 700 is in an unlocked state. Additionally, as depicted in FIG. 7O, electronic device 700 displays the restricted content (e.g., "Hey, is our meeting still on?") of notification 708 in response to biometric authentication being successful.

Figure 7P:

At FIG. 7P, instead of determining that the user's face is outside acceptable distance range 712 as discussed above with respect to FIG. 7B, electronic device 700 determines that biometric authentication is not available on the device. Upon determining that biometric authentication is not available, electronic device 700 displays error indication 714B in FIG. 7P, which provides an indication that biometric authentication is not currently available on the device. Biometric authentication can be unavailable for a variety of reasons, including that biometric authentication has failed more than a predefined number of times (e.g., 5, 10, 15) since the last successful authentication.

Due to biometric authentication being unavailable, a user must use an alternative method to authenticate the user. For example, the user can authenticate by entering a passcode at electronic device 700. While displaying error indication 714B in FIG. 7P, electronic device 700 receives input 720 at error indication 714B.

Figure 7Q:
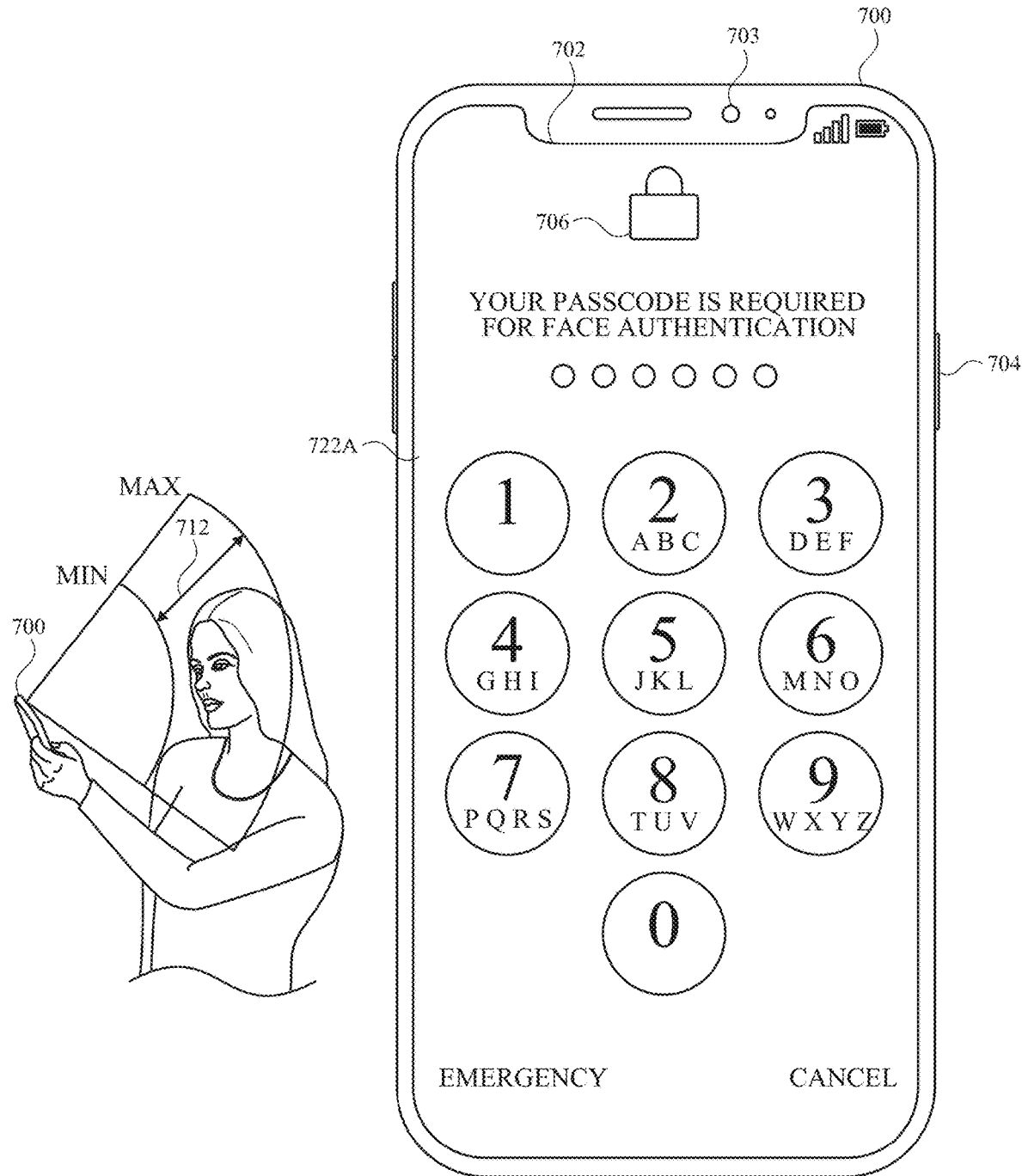

At FIG. 7Q, in response to receiving input 720 at error indication 714B, electronic device 700 displays passcode entry UI 722A with a plurality of entry affordances for entering a passcode (or password).

Figure 7R:

In some examples, instead of determining that authentication is successful as a result of retrying biometric authentication, as discussed above with respect to FIGS. 7L-7O, electronic device 700 determines that authentication is unsuccessful. In some examples, upon determining that authentication is unsuccessful, electronic device 700 maintains a locked state, and displays an animation of lock icon 706 in FIG. 7R alternating between different positions to simulate a "shake" effect. The shake animation provides an indication to the user that biometric authentication has failed and that electronic device 700 remains in a locked state.

After determining that authentication is unsuccessful, a user can perform an action at electronic device 700 to trigger retrying biometric authentication. At FIG. 7S, a user triggers retrying biometric authentication by swiping up starting from a region near the bottom edge of display 702. Electronic device 700 receives input 724, and in response, retries biometric authentication. In some examples, after retrying biometric authentication, electronic device 700 determines that authentication is successful. In some examples, upon determining that authentication is successful as a result of retrying biometric authentication, electronic device 700 transitions from a locked state to an unlocked state.

Figure 7S:
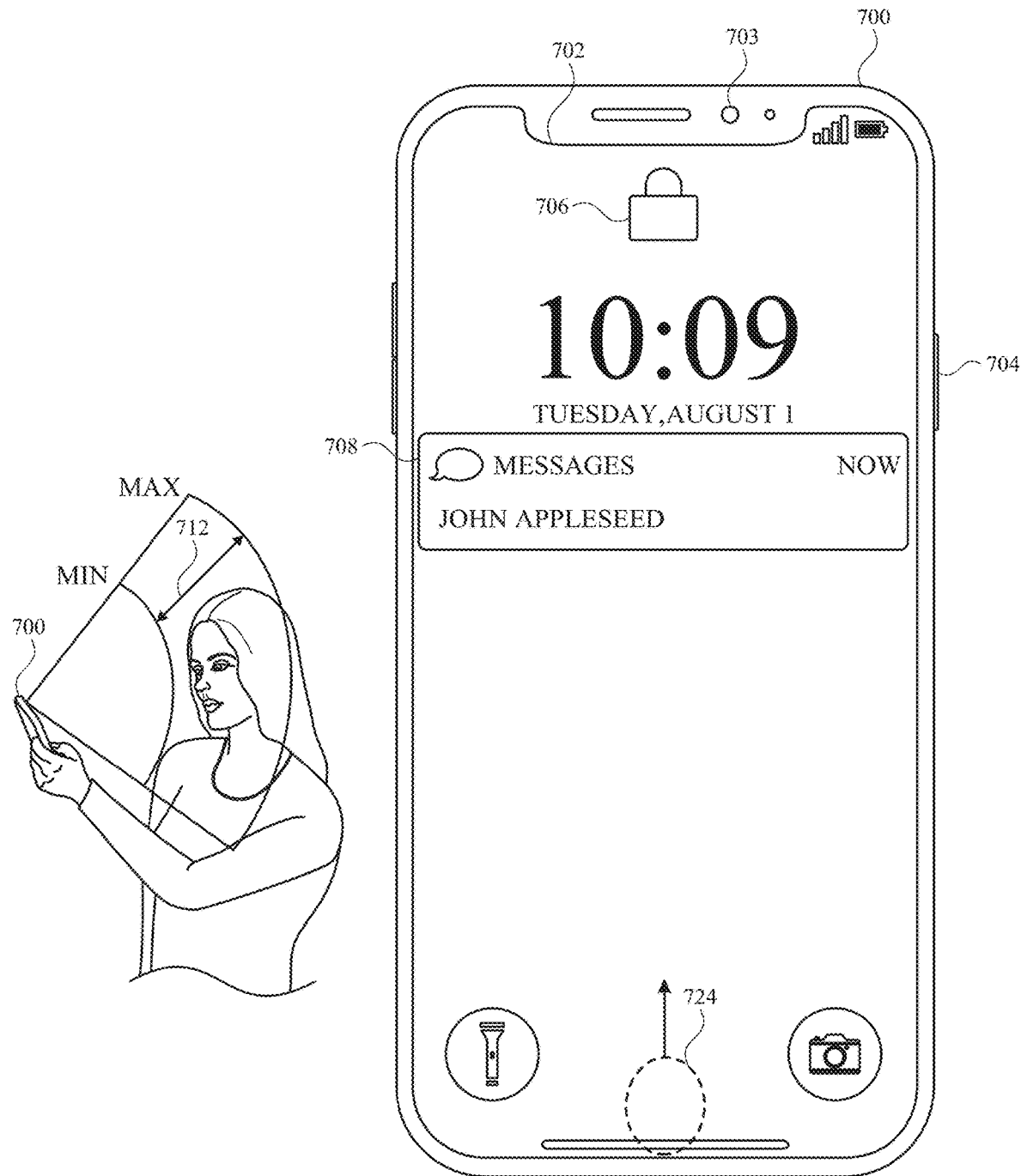
Figure 7T:
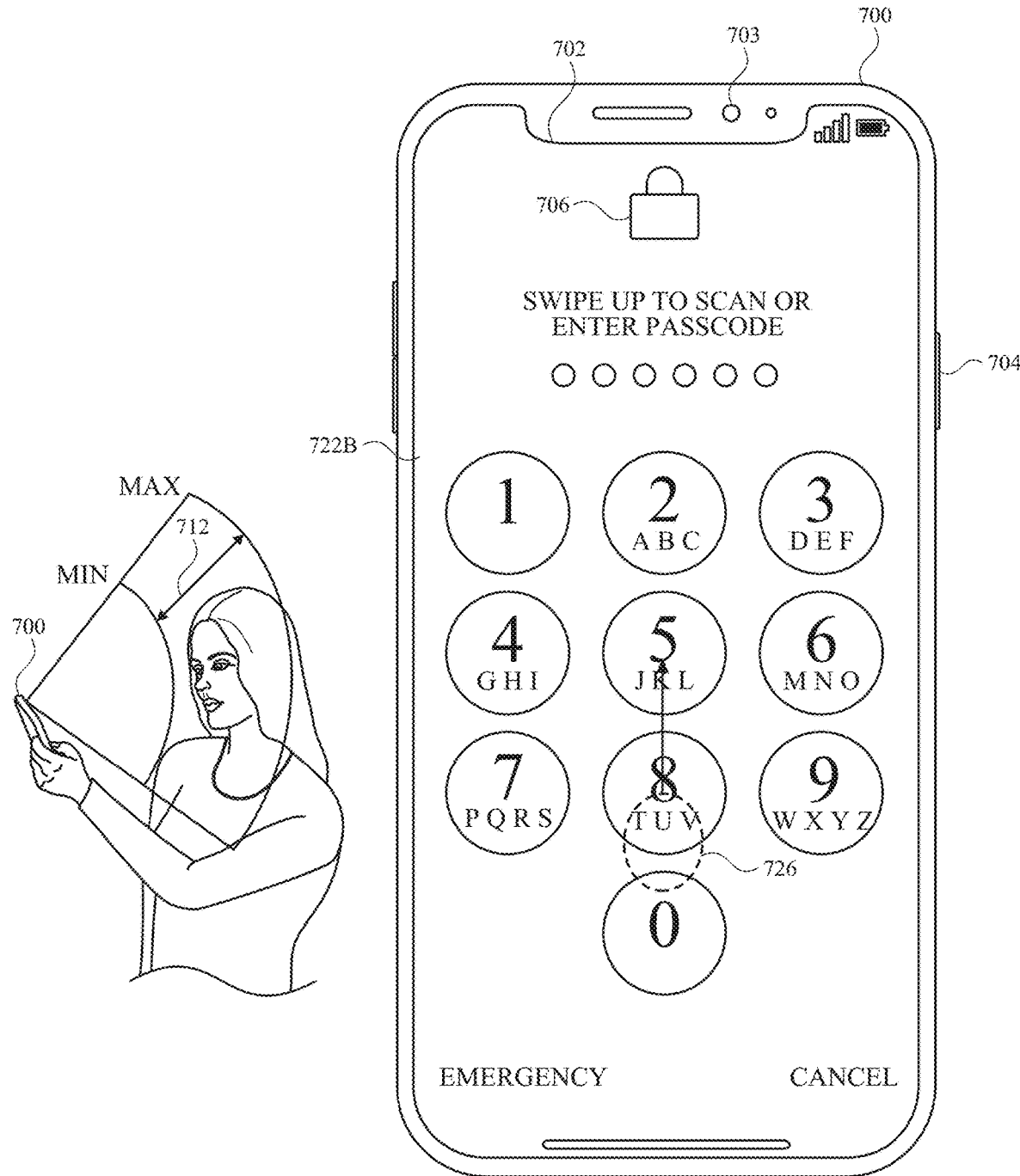

At FIGS. 7S-7T, electronic device 700 determines that authentication is unsuccessful as a result of retrying biometric authentication, in response to input 724. Upon determining that authentication is unsuccessful as a result of retrying biometric authentication, electronic device 700 displays passcode entry UI 722B in FIG. 7T and/or maintains a locked state.

Figure 7U:
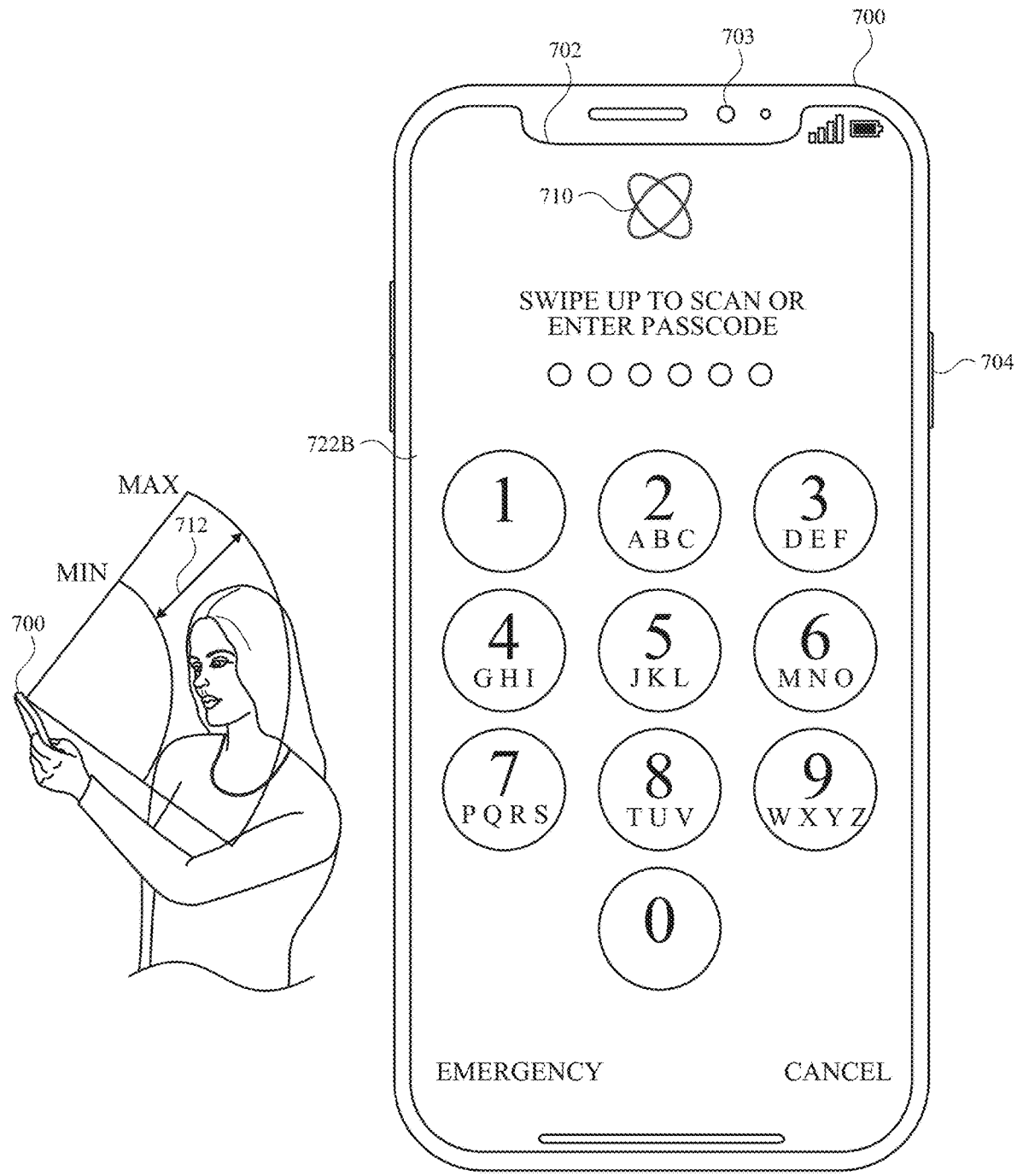
Figure 7V:
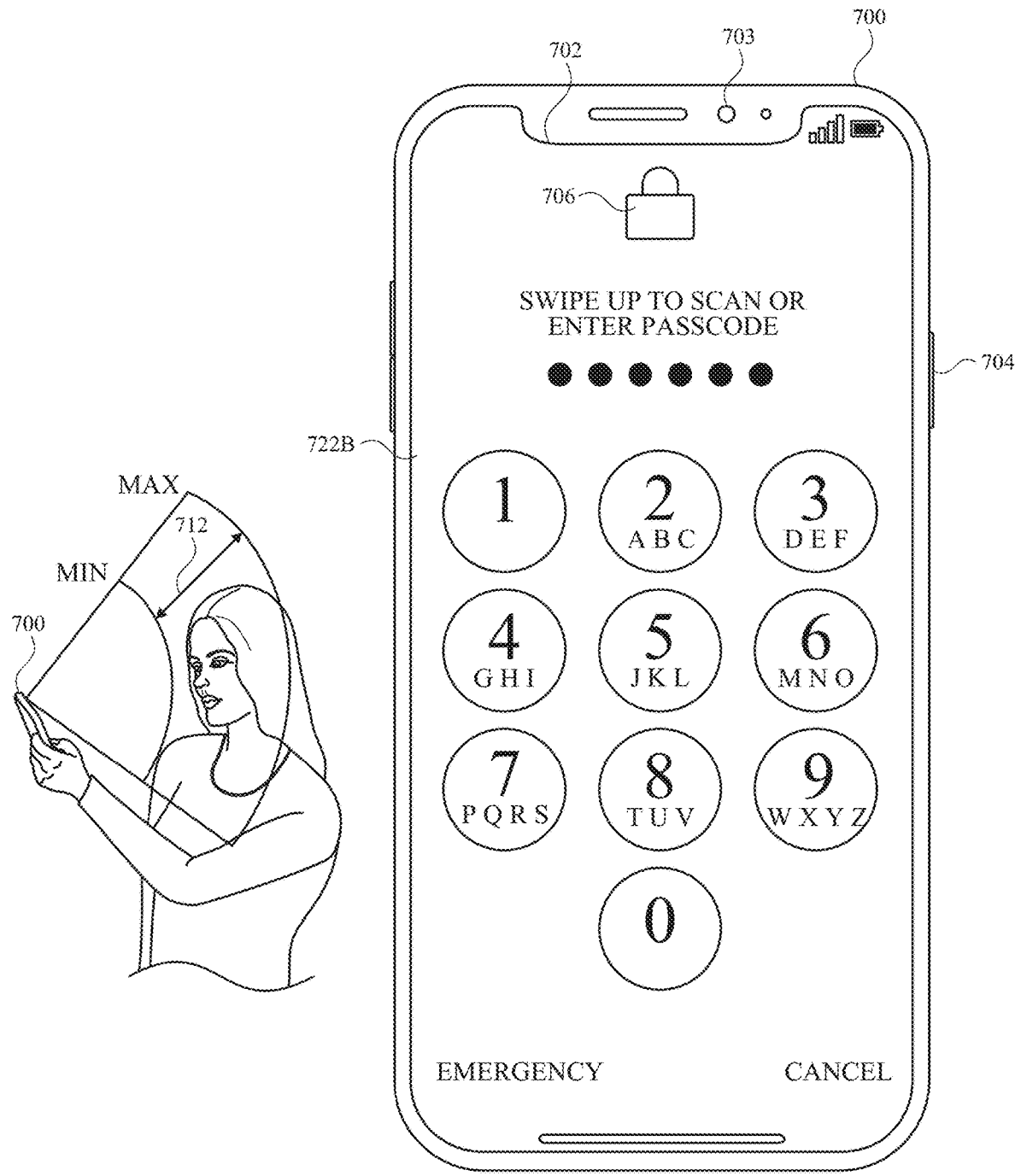
Figure 7W:
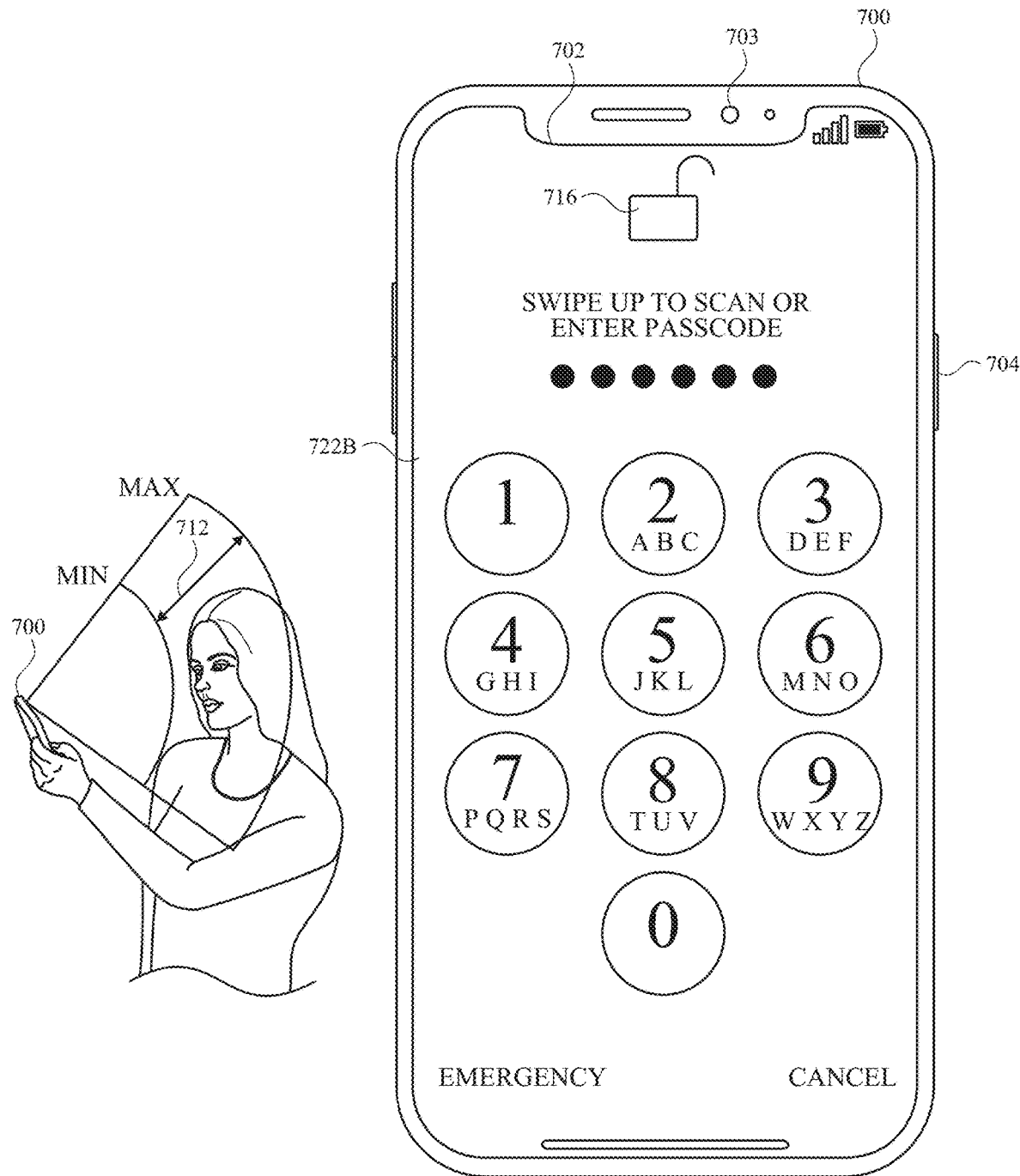

At FIG. 7U, electronic device 700 determines that authentication is successful as a result of retrying biometric authentication at passcode entry UI 722B. Upon determining that authentication is successful, electronic device transitions from a locked state to an unlocked state, as depicted in FIGS. 7U-7W. In some examples, at FIG. 7U, electronic device determines that authentication is not successful as a result of retrying biometric authentication at passcode entry UI 722B. In some examples, upon making this determination, electronic device maintains a locked state.

Figure 7X:

FIGS. 7X-7AD illustrate various error conditions that electronic device 700 can detect while attempting to biometrically authenticate a user. Instead of displaying error indication 714A as described above with respect to FIG. 7G, electronic device 700 can display any one of the error indications described below (e.g., error indication 714C-I). FIGS. 7X-7AD also depict electronic device 700 coaching a user (e.g., via error indication 714C-I) to take an action to correct the detected error condition so that electronic device 700 can retry biometrically authenticating the user.

At FIG. 7X, a user's face is positioned too close to biometric sensor 703. As a result, electronic device 700 determines that the user's face is positioned outside acceptable distance range 712 (e.g., below the minimum threshold range). Upon determining that the user's face is positioned outside acceptable distance range 712, electronic device 700 displays error indication 714C, which prompts the user to move her face farther away from biometric sensor 703. Error indication 714C also provides an indication of the cause of the error condition (e.g., an indication that the user's face is too close to biometric sensor 703.)

Figure 7Y:
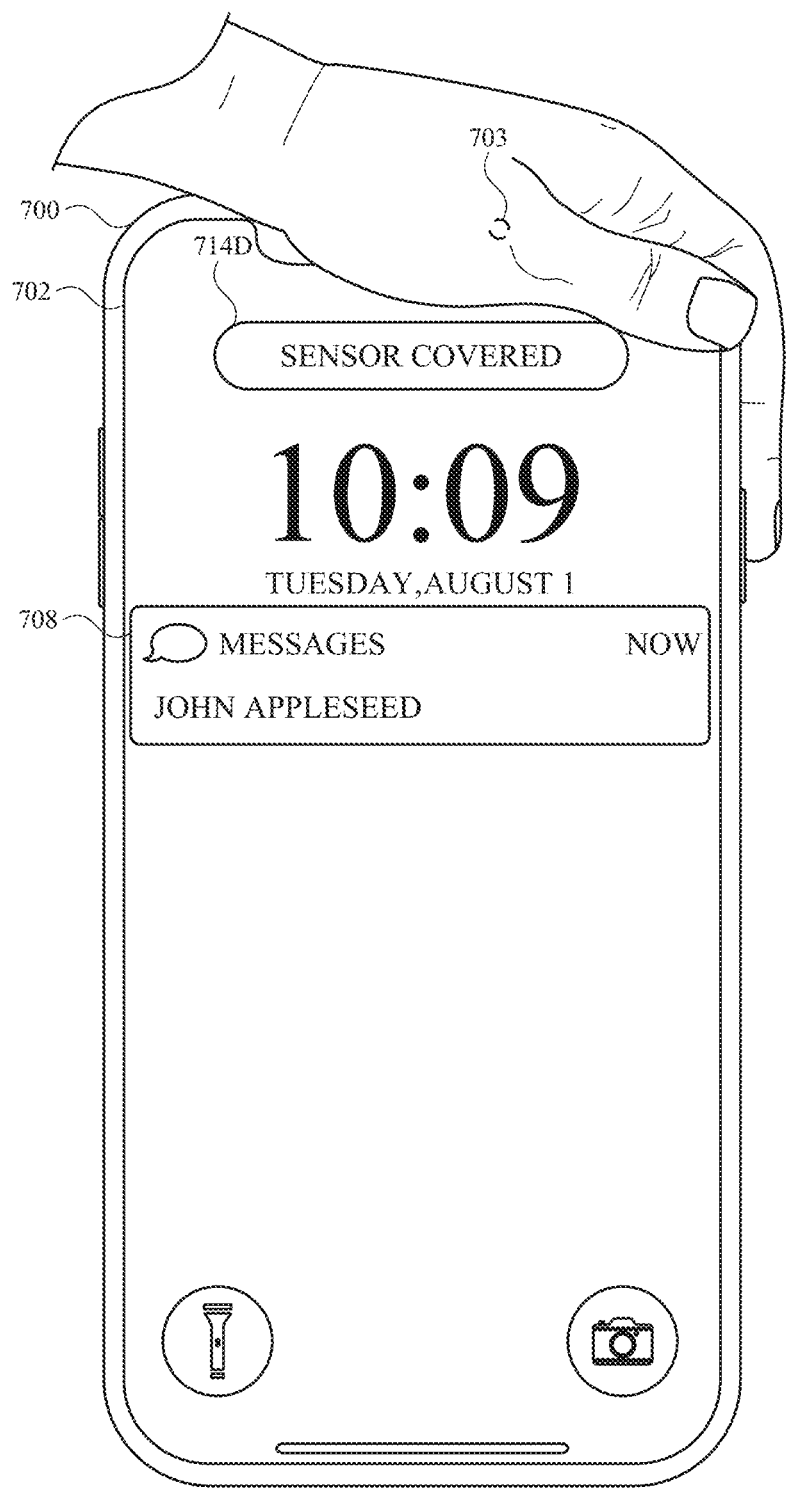

At FIG. 7Y, a user's hand is covering biometric sensor 703. As a result, electronic device 700 determines that an object (e.g., a user's hand) is covering biometric sensor 703 such that the sensor is unable to obtain any information about the user's face. Upon determining that an object is covering biometric sensor 703, electronic device 700 displays error indication 714D, which prompts the user to move the user to move her hand away from biometric sensor 703. Error indication 714D also provides an indication of the cause of the error condition (e.g., an indication that biometric sensor 703 is covered).

Figure 7Z:
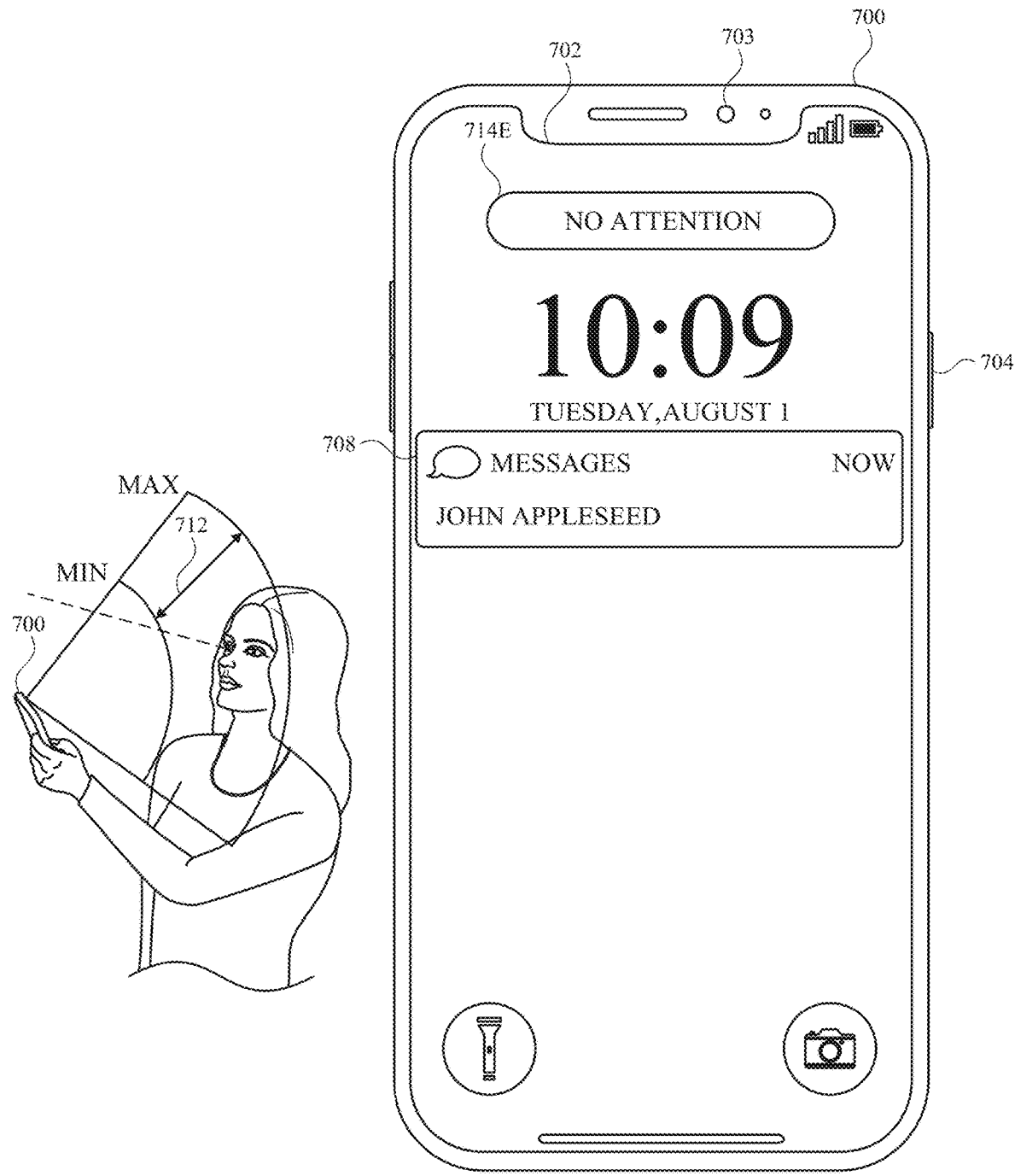
Figure 7A:
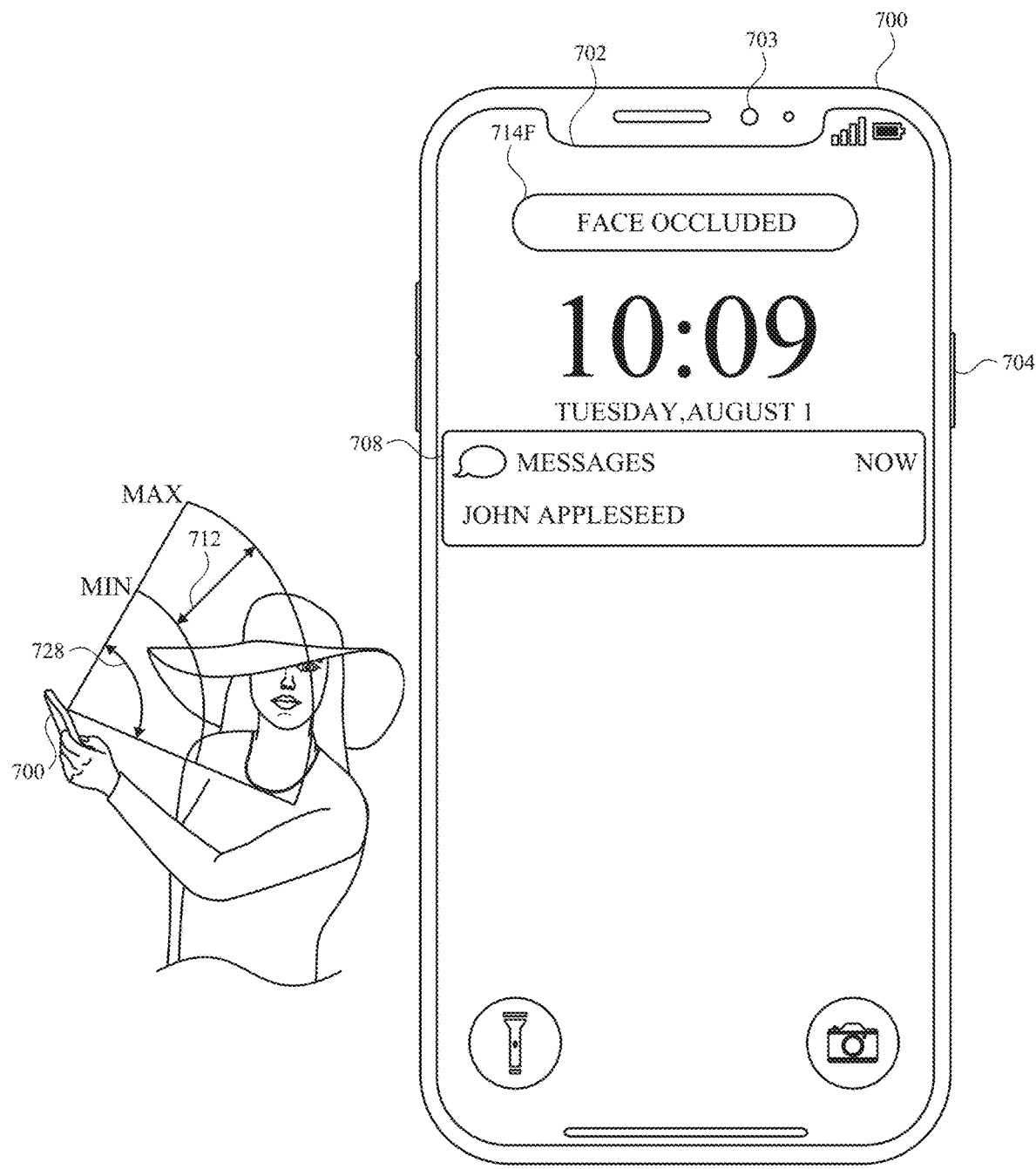
Figure 7A:
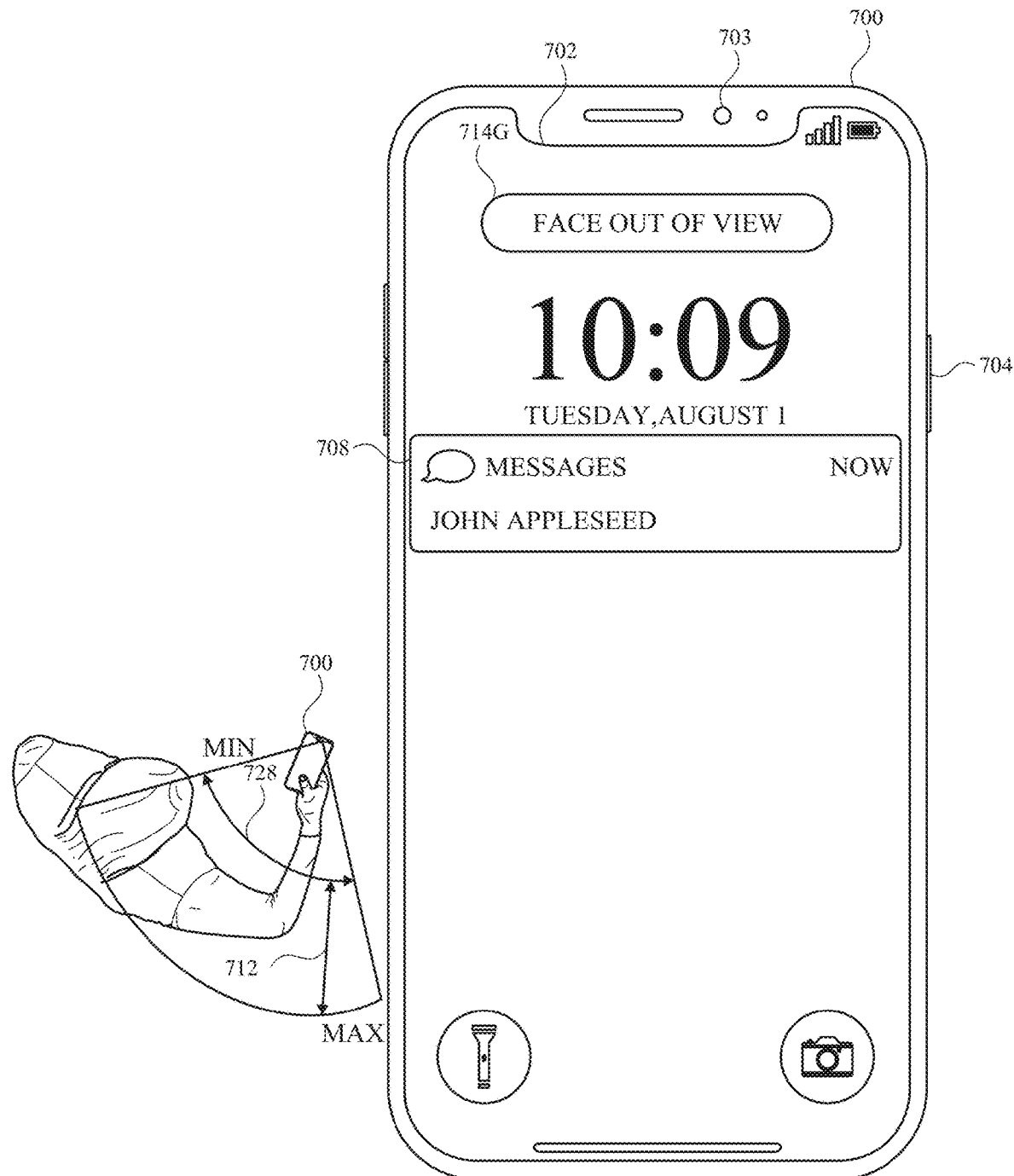
Figure 7A:
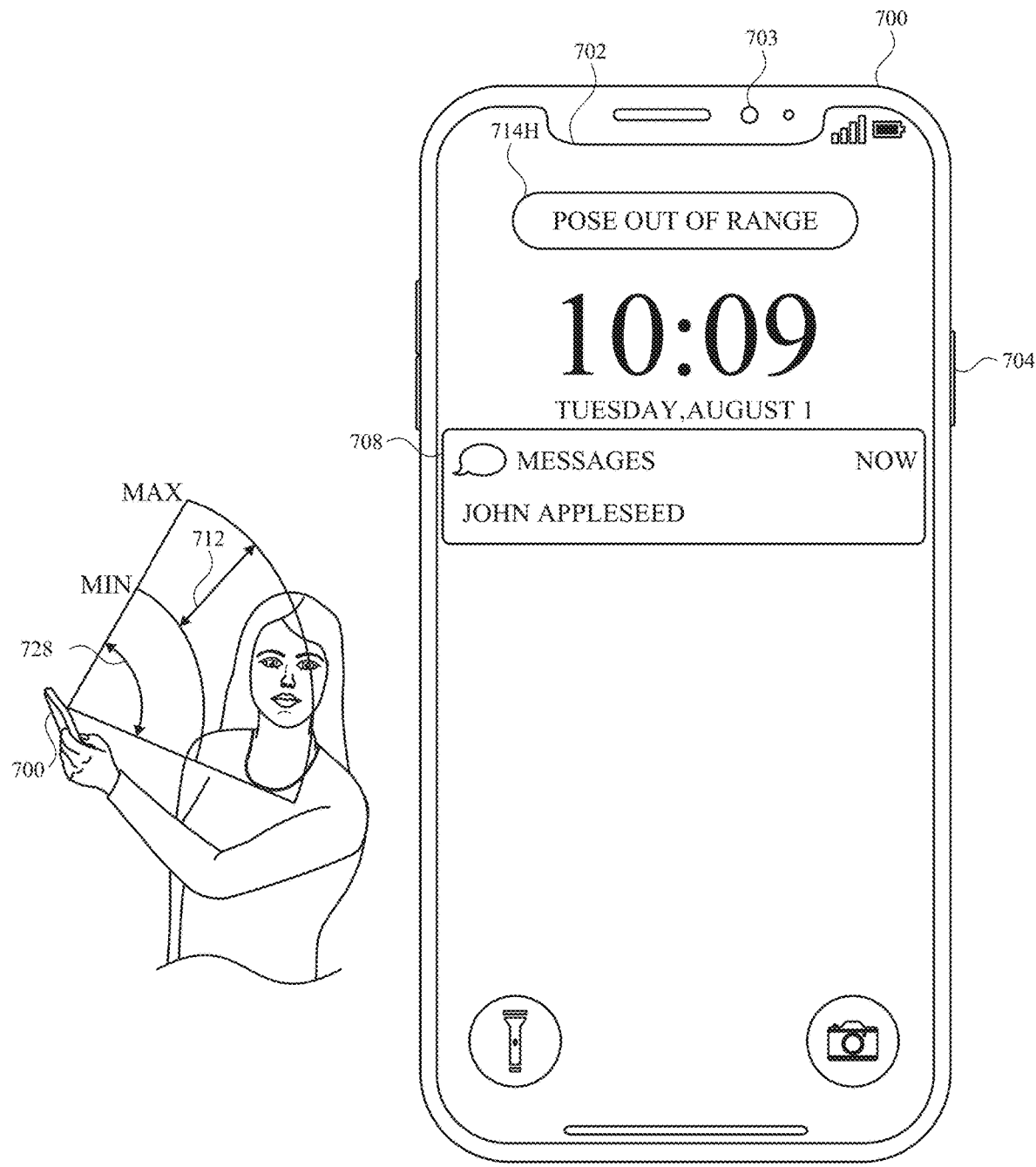
Figure 7A:

At FIG. 7Z, a user is not looking at electronic device 700. As a result, electronic device 700 determines that the user's eyes are not looking at the device. Upon determining that the user's eyes are not looking at the device, electronic device 700 displays error indication 714E, which prompts the user to look at the device to correct the error condition. Error indication 714E also provides an indication of the cause of the error condition (e.g., an indication that the user is not looking at the device.

At FIG. 7AA, a user's face is within field of view 728, but the user is wearing a hat. As a result, electronic device 700 determines that a portion of the user's face is obscured (or occluded). For example, electronic device 700 obtains partial information about a user's face using biometric sensor 703, where the partial information is below the threshold amount needed for comparison with the stored authorized credentials. Upon determining that a portion of the user's face is obscured, electronic device 700 displays error indication 714F, which prompts the user to remove the hat. Error indication 714F also provides an indication of the cause of the error condition (e.g., an indication that a portion of the user's face is obscured).

At FIG. 7AB, a user's face is outside field of view 728 of biometric sensor 703. As a result, electronic device 700 determines that the user's face is outside field of view 728 of biometric sensor 703. In some examples, the user's face is outside field of view 728 when more than a threshold portion of the face is outside the field of view. In some examples, the user's face is outside field of view 728 when no face is detected within the field of view. Upon determining that the user's face is outside field of view 728, electronic device 700 displays error indication 714G, which prompts the user to move her face to within field of view 728. Error indication 714G also provides an indication of the cause of the error condition (e.g., an indication that the user's face is outside field of view 728).

At FIG. 7AC, a user's face is within field of view 728, but is turned away from biometric sensor 703. As a result, electronic device 700 determines that the user's face is turned away from biometric sensor 703. Upon determining that the user's face is turned away from biometric sensor 703, electronic device 700 displays error indication 714H, which prompts the user to turn her face towards the sensor. Error indication 714H also provides an indication of the cause of the error condition (e.g., an indication that the user's face is turned away from biometric sensor 703).

At FIG. 7AD, a user's face is positioned appropriately within the field of view and acceptable distance range of biometric sensor 703. However, the lighting conditions of the environment in which the user is located are not suitable for performing biometric authentication. Specifically, the amount of light is so great that it interferes with performing biometric authentication. As a result, electronic device 700 determines (e.g., via one or more ambient light sensors) that the amount of light exceeds a predefined threshold. Upon determining that the amount of light exceeds the threshold, electronic device 700 displays error indication 714I, which prompts the user to seek improved lighting conditions with a lower amount of light. Error indication 714I also provides an indication of the cause of the error condition (e.g., an indication that the light conditions are not suitable for performing biometric authentication).

FIGS. 8A-8B are flow diagrams illustrating a method for providing indications of error conditions during biometric authentication, in accordance with some examples. Method 800 is performed at an electronic device (e.g., 100, 300, 500, 700) with a display (e.g., 702) and one or more input devices (e.g., an accelerometer (e.g., 168), a touchscreen of a display (e.g., 702)). In some examples, the electronic device includes one or more biometric sensors (e.g., a fingerprint sensor, a contactless biometric sensor (e.g., a biometric sensor that does not require physical contact, such as a thermal or optical facial recognition sensor), an iris scanner). In some examples, the one or more biometric sensors include one or more cameras. Some operations in method 800 are, optionally, combined, the orders of some operations are, optionally, changed, and some operations are, optionally, omitted.

As described below, method 800 provides an intuitive way for providing indications of error conditions during biometric authentication. The method reduces the cognitive burden on a user for performing biometric authentication, thereby creating a more efficient human-machine interface. For battery-operated computing devices, enabling a user to perform biometric authentication faster and more efficiently conserves power and increases the time between battery charges.

The electronic device (e.g., 100, 300, 500, 700) receives (802), via the one or more input devices (e.g., an accelerometer (e.g., 168), a touchscreen of a display (e.g., 702)), a request to perform an operation that requires authentication (e.g., biometric authentication). In some examples, the request to perform an operation that requires authentication includes a request to unlock the device (e.g., a swipe at a predefined location). In some examples, the request is triggered by lifting the device from a substantially horizontal position.

In response (804) to the request to perform the operation that requires authentication (e.g., biometric authentication) and in accordance (806) with a determination that authentication (e.g., biometric authentication) is successful, the electronic device performs the operation. In some examples, authentication is successful when a user input (e.g., data obtained from one or more biometric sensors that correspond to a biometric feature (e.g., face, finger) of a user, passcode) corresponds to (e.g., matches) an authorized credential (e.g., an enrolled fingerprint, face, or passcode). In some examples, a user input corresponds to an authorized credential when the user input matches the authorized credential.

In response (804) to the request to perform the operation that requires authentication (e.g., biometric authentication) and in accordance (808) with a determination that authentication (e.g., biometric authentication) is not successful and that a set of error condition criteria is met (e.g., an error condition exists), the electronic device (e.g., 100, 300, 500, 700) displays (810), on the display (e.g., 702), an indication of an error condition (e.g., 714A-I) (e.g., of the set of error condition criteria) and forgoes (816) performing the operation. The indication includes (812) information about the cause of the error condition. In some examples, authentication is not successful when a user input (e.g., data obtained from one or more biometric sensors that correspond to a biometric feature (e.g., face, finger) of a user, passcode) does not correspond to (e.g., match) an authorized credential (e.g., an enrolled fingerprint, face, or passcode). In some examples, a user input does not correspond to an authorized credential when the user input does not match the authorized credential. In some examples, the set of error condition criteria includes only one criterion. Displaying the indication of the error condition provides the user with feedback about the current state of the device (e.g., that an error condition is preventing successful biometric authentication) and prompts the user to take further action to correct the error condition. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Moreover, forgoing performing the operation when biometric authentication has failed and an error condition is detected enhances security and reduces the instances of multiple resource-intensive re-attempts of biometric authentication that is likely to fail due to the error condition. Providing improved security enhances the operability of the device and makes the user-device interface more efficient (e.g., by restricting unauthorized access) which, additionally, reduces power usage and improves battery life of the device by limiting the performance of restricted operations.

In some examples, in response (804) to the request to perform the operation that requires authentication and in accordance (826) with a determination that authentication (e.g., biometric authentication) is not successful and that the set of error condition criteria is not met, the electronic device (e.g., 100, 300, 500, 700) forgoes (828) displaying, on the display (e.g., 702), the indication of the error condition and forgoes (830) performing the operation.

In some examples, the indication (e.g., 714A-I) of the error condition includes (814) an indication of a user action (e.g., visible indication (e.g., graphic or text)) that can be performed to correct the error condition (e.g., for a subsequent authentication attempt). In some examples, the indication of the user action indicates how to correct the error condition for a subsequent authentication attempt. Displaying an indication of a user action that can be performed to correct the error condition provides feedback to the user as to what course of action to take so that the user can be biometrically authenticated in a subsequent authentication attempt. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, the indication (e.g., 714A-I) of the error condition includes information (e.g., an indication of a user action and/or device condition, visible indication (e.g., graphic or text)) about a cause of the error condition. Displaying an indication of the cause of the error condition provides feedback to the user as to what course of action to take so that the user can be biometrically authenticated in a subsequent authentication attempt. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, the set of error condition criteria includes a requirement that is met when a biometric feature (e.g., a fingerprint, a face) of a first type (e.g., a type that corresponds to authorized biometric features) is detected using one or more biometric sensors (e.g., 703) of the electronic device. In some examples, the indication of the error condition (e.g., 714A-I) is not displayed if a potentially valid biometric feature is not detected (e.g., signifying that a user is not currently engaging with the device). Forgoing displaying the indication of the error condition when no biometric feature is detected prevents potentially confusing the user, for it is likely that the user did not intend to perform biometric authentication if no biometric feature is detected. Thus, forgoing displaying the indication in this scenario makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, in accordance with a determination that authentication (e.g., biometric authentication) is successful, the electronic device (e.g., 100, 300, 500, 700) forgoes displaying, on the display (e.g., 702), the indication of the error condition (e.g., 714A-I).

In some examples, subsequent to displaying the indication of the error condition (e.g., 714A-I) and in accordance with a determination that the set of error condition criteria continues to be met, the electronic device (e.g., 100, 300, 500, 700) forgoes (818) attempting (and, optionally, disabling further attempts at) biometric authentication on the electronic device (e.g., biometric authentication functionality is not available on the device while the set of error conditions are met). In some examples, subsequent to displaying the indication of the error condition and in accordance with a determination that the set of error condition criteria is no longer met, the electronic device enables (822) retrying biometric authentication on the electronic device (e.g., the error condition is no longer present (e.g., has been corrected (e.g., due to the user taking an action to correct the error condition))). Automatically retrying biometric authentication when the set of error condition criteria is no longer met allows the user to quickly attempt to biometrically authenticate herself without requiring that the user explicitly request biometric authentication. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, subsequent to displaying the indication of the error condition and in response to the determination that the set of error condition criteria is no longer met, the electronic device retries (824) authentication (e.g., biometric authentication) (e.g., automatically retrying authentication). In some examples, retrying authentication includes attempting to match biometric information obtained by one or more biometric sensors with authorized credentials (e.g., stored data that has been authorized for use in biometric authentication). In some examples, the determination that the error condition is not met occurs subsequent to (or in response to) receiving an input to correct the error condition. In some examples, retrying authentication occurs (or only occurs) in accordance with a determination that the error condition is not met due to detecting a user input that causes the error condition to not be met.

In some examples, subsequent to the determination that the set of error condition criteria is no longer met (e.g., detecting that the error condition has been corrected), the electronic device (e.g., 100, 300, 500, 700) receives, via the one or more input devices, an input (e.g., 724, 726) corresponding to a request to retry authentication. In some examples, the input is a touch gesture input (e.g., tap, a swipe (e.g., an upward swipe)) or an activation of a hardware button (e.g., power button). In some examples, in response to receiving the input corresponding to the request to retry authentication, the electronic device retries authentication (e.g., biometric authentication) (e.g., automatically retrying authentication). In some examples, retrying authentication includes attempting to match biometric information obtained by one or more biometric sensors with authorized credentials (e.g., stored data that has been authorized for use in biometric authentication). In some examples, retrying authentication includes using one or more biometric sensors to obtain data of a biometric feature (e.g., face, fingerprint) of the user.

In some examples, displaying the indication of the error condition (e.g., 714A-I) includes an animation (e.g., shimmering) indicating that an attempt to authenticate is ongoing. In some examples, the attempt to authenticate includes attempting to detect biometric information using one or more biometric sensors. Displaying a shimmering animation indicating that an attempt to authenticate is ongoing provides feedback to the user as to the current state of the device and that no further action is required at this time. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication In some examples, subsequent to (or in response to) receiving the request to perform the operation that requires authentication and prior to displaying the indication of the error condition (e.g., 714A-I), the electronic device (e.g., 100, 300, 500, 700) performs authentication. In some examples, while performing authentication, electronic device 700 displays, on the display (e.g., 702), a first indication (e.g., 710, 714A-I) (e.g., rings that rotate around a sphere, a user interface object that shimmers, where the user interface object includes the indication of the error condition) that the electronic device is using one or more biometric sensors (e.g., 703) of the electronic device to obtain information about a biometric feature. In some examples, displaying the indication of the error condition includes replacing the display of the first indication with the display of the indication of the error condition. Displaying an indication that biometric authentication is occurring provides the user with feedback about the current state of the device (e.g., biometric authentication is being performed) and that the user does not need to take any action at this time. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, while performing the authentication, the electronic device (e.g., 100, 300, 500, 700) displays, on the display (e.g., 702), a first lock icon (e.g., 706) (e.g., an icon indicative of the locked state of the electronic device) and a first animation that transitions from the first lock icon to the first indication. In some examples, subsequent to displaying the indication of the error condition (e.g., and in accordance with a determination that authentication is successful) and subsequent to displaying the first animation, the electronic device displays, on the display (e.g., 702), a second animation that transitions from the indication of the error condition to an unlock icon (e.g., 716) (e.g., an icon indication of the locked state of the electronic device). In some examples, the first animation and the second animation show a morphing from one object to the next object. In some examples, the second animation includes displaying a first lock icon subsequent to the indication of the error condition and prior to the unlock icon.

In some examples, subsequent to displaying the indication of the error condition, the electronic device displays, on the display (e.g., 702), an animation that transitions from the indication of the error condition to a second lock icon (e.g., 706) or from a second indication (e.g., 710, 714A-I) (e.g., rings that rotate around a sphere) that the electronic device is using one or more biometric sensors of the electronic device to obtain information about a biometric feature to the second lock icon (e.g., an icon indicative of the locked state of the electronic device). In some examples, the second lock icon is the first lock icon. In some examples, the second indication is the first indication.

In some examples, while retrying authentication and subsequent to displaying the indication of the error condition and in accordance with a determination that the error condition is absent, the electronic device displays, on the display, a third indication (e.g., 710, 714A-I) (e.g., rings that rotate around a sphere, a user interface object that shimmers, where the user interface object includes the indication of the error condition) that the electronic device is using one or more biometric sensors of the electronic device to obtain information about a biometric feature. In some examples, the third indication is the first indication.

In some examples, prior to displaying the indication of the error condition, the electronic device (e.g., 100, 300, 500, 700) displays, on the display (e.g., 702), a third lock icon (e.g., 706) at a location on the display (e.g., an icon indicative of the locked state of the electronic device). In some examples, the indication of the error condition (e.g., 714A-I) is displayed proximate to (e.g., near, adjacent to, at, within a predetermined distance of) the location on the display. In some examples, the third lock icon is the first lock icon and/or the second lock icon.

In some examples, when the electronic device is in a locked state while receiving the request to perform the operation that requires authentication and in accordance with the determination that authentication is successful, the electronic device (e.g., 100, 300, 500, 700) transitions from the locked state to an unlocked state. In some examples, the operation that requires authentication is transitioning the electronic device from a locked state to an unlocked state. In some examples, when the electronic device is in a locked state while receiving the request to perform the operation that requires authentication and in accordance with the determination that authentication is not successful, the electronic device maintains the locked state. Maintaining the device in the locked state when authentication is unsuccessful enhances device security by preventing fraudulent and/or unauthorized access to the device. Improving security measures of the device enhances the operability of the device by preventing unauthorized access to content and operations and, additionally, reduces power usage and improves battery life of the device by enabling the user to use the device more efficiently.

In some examples, when the electronic device is in a locked state while receiving the request to perform the operation that requires authentication and in accordance with the determination that authentication is not successful, the electronic device (e.g., 100, 300, 500, 700) maintains the locked state and retries authentication (e.g., biometric authentication) (e.g., automatically retrying authentication). In some examples, retrying authentication includes attempting to obtain information about a biometric feature (e.g., face, fingerprint) using one or more biometric sensors of the electronic device. In some examples, retrying authentication includes attempting to match biometric information obtained by one or more biometric sensors with authorized credentials (e.g., stored data that has been authorized for use in biometric authentication). In some examples, after retrying authentication and in accordance with a determination that authentication resulting from retrying authentication is successful, the electronic device transitions from the locked state to an unlocked state. In some examples, after retrying authentication and in accordance with a determination that authentication resulting from retrying authentication is not successful, the electronic device maintains the locked state.

In some examples, subsequent to (or in response to) receiving the request to perform the operation that requires authentication, the electronic device (e.g., 100, 300, 500, 700) attempts authentication (e.g., biometric authentication). In some examples, while attempting authentication, the electronic device displays, on the display (e.g., 702), a third indication (e.g., 710, 714A-I) (e.g., rings that rotate around a sphere) that the electronic device is using one or more biometric sensors of the electronic device to obtain information about a biometric feature (e.g., face, fingerprint). In some examples, the indication is a scanning animation. In some examples, the third indication is the first indication and/or the second indication. In some examples, while retrying authentication, the electronic device maintains display of the third indication on the display (e.g., 702).

In some examples, in accordance with the determination that authentication resulting from retrying authentication is not successful, the electronic device displays, on the display (e.g., 702), an animation with a lock icon (e.g., 706) (e.g., an icon indicative of the locked state of the electronic device) alternating between a first position and a second position, the second position being different from the first position. In some examples, the animation with the lock icon is an animation of the lock icon shaking (e.g., side to side, rotating back and forth). In some examples, the electronic device displays an animation involving the lock icon to indicate that biometric authentication has failed. In some examples, a tactile output is provided in combination with the shaking lock icon. In some examples, no tactile output is provided. In some examples, in accordance with a determination that the biometric information captured using the one or more biometric sensors does not correspond to or does not match the authorization credentials, the electronic device (e.g., 100, 300, 500, 700) maintains the locked state of the electronic device. Displaying an animation of the lock icon shaking provides the user with feedback about the current state of the device (e.g., that biometric authentication has failed) and prompts the user to take further action. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 100, 300, 500, 700) includes a biometric sensor (e.g., 703) and the set of error condition criteria includes one or more of the following error condition criterions:

- A distance of the biometric feature from the biometric sensor exceeds a first predetermined threshold distance (e.g., the biometric feature (e.g., face) is too far from the biometric sensor) or exceeds the maximum of a distance range (e.g., 712). In some examples, exceeding the first predetermined threshold or the maximum of a distance range is highly correlated with degradation or reduced accuracy of the information about the biometric feature obtained by the biometric sensor). In some examples, the user can correct this error condition by moving the user's face closer to the biometric sensor.
- A distance of the biometric feature from the biometric sensor is below a second predetermined threshold distance (e.g., the biometric feature (e.g., face) is too close to the biometric sensor) or falls below the minimum of a distance range (e.g., 712). In some examples, falling below the second predetermined threshold or the minimum of a distance range is highly correlated with degradation or reduced accuracy of the information about the biometric feature obtained by the biometric sensor. In some examples, the user can correct this error condition by moving the user's face farther away from the biometric sensor.
- The biometric sensor (e.g., 703) is occluded (e.g., partially occluded, fully occluded, occluded to a degree sufficient to inhibit operation of the sensor) (e.g., occluded by a portion of the user (e.g., a hand), while interacting with the electronic device). In some examples, the user can correct this error condition by moving the user's hand away from the biometric sensor.
- A sub-portion of a detected biometric feature (e.g., eyes of a detected face) is not oriented towards the biometric sensor (e.g., one or more eyes are not focused on the electronic device (e.g., biometric sensor)). In some examples, the user can correct this error condition by opening the user's eyes or looking at the electronic device (e.g., biometric sensor).
- At least a portion of the detected biometric feature is occluded (e.g., partially occluded, fully occluded, occluded to a degree sufficient to result in incomplete information about the biometric feature). In some examples, the user can correct this error condition by removing the accessory (e.g., sunglasses) or article of clothing (e.g., scarf, hat) that is blocking the user's face.

No biometric feature is detected within a field of view (e.g., 728) of the biometric sensor.

A pose (e.g., an orientation with respect to the biometric sensor) of the detected biometric feature exceeds a threshold range (e.g., the biometric feature (e.g., face) is turned away from the biometric sensor). In some examples, exceeding the threshold range is highly correlated with degradation or reduced accuracy of the information about the biometric feature obtained by the biometric sensor. In some examples, the user can correct this error condition by turning the user's face toward the electronic device (e.g., biometric sensor).

The electronic device detects (e.g., via one or more ambient light sensors) an amount of light (e.g., ambient light) that exceeds a predetermined light threshold (e.g., exceeding the predetermined light threshold is highly correlated with degradation or reduced accuracy of the information about the biometric feature obtained by the biometric sensor). In some examples, the user can correct this error condition by turning the user's back towards the sun so as to reduce the amount of light detected by the electronic device or move to a new location that has less ambient light (e.g., indoors).

In some examples, the set of error condition criteria can be a first subset of the error conditions listed above. For example, the first subset can include one or more error condition criterion selected from the group consisting of: the distance of the biometric feature exceeds a first predetermined threshold distance, the distance of the biometric feature is below a second predetermined threshold distance, the biometric feature is out of the field of view of the biometric sensor, and the pose of the biometric feature exceeds a threshold range. The first subset is focused on guiding the user to correct error conditions involving the positioning and/or orientation of the face. As a further example, a second subset can include one or more error condition criterion selected from the group consisting of: the biometric sensor is occluded, and no biometric feature is detected within a field of view of the biometric sensor. The second subset is focused on guiding the user to correct error conditions where the biometric sensor is unable to obtain any information about the biometric feature of the user. For another example, a third subset can include one or more error condition criterion selected from the group consisting of: the pose of the detected biometric feature exceeds a threshold range and the biometric sensor is occluded. The third subset is focused on the error conditions that are likely to occur for devices of a certain form factor/size (e.g., a tablet device (e.g., iPad)).

In some examples, the electronic device (e.g., 100, 300, 500, 700) includes a biometric sensor (e.g., 703) at a portion (e.g., a location) of the electronic device (e.g., a portion that is not on the display). In some examples, in response to the request to perform the operation that requires authentication, the electronic device displays, on the display (e.g., 702), a progress indicator (e.g., 714A-I) proximate to (e.g., adjacent to, near, within a predetermined distance of) the portion of the electronic device, the progress indicator including the indication of the error condition. Displaying the progress indicator near the biometric sensor provides the user with feedback as to the association of the biometric sensor with the processes occurring at the device (e.g., attempted authentication). Specifically, the user becomes aware of the biometric sensor during biometric authentication such that the user is less likely to perform an action that interferes with the biometric sensor or alternatively, the user is prompted to take corrective action. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the indication of the error condition (e.g., 714B) includes an indication that biometric authentication is currently not enabled on the electronic device in accordance with a determination that biometric authentication is currently not enabled on the electronic device. In some examples, biometric authentication can become unavailable (or not enabled on the electronic device) when one or more of the following conditions have been met: the electronic device has not been successfully authenticated since being turned on or restarted; the electronic device has not been unlocked for more than a predetermined amount of time (e.g., 48 hours); the passcode has not been used to unlock the device for more than a predetermined amount of time (e.g., 156 hours); biometric authentication using a biometric feature (e.g., face, fingerprint) has not been used to unlock device for more than predetermined amount of time (e.g., 4 hours); the electronic device has received a remote lock command; biometric authentication has failed more than a predetermined number of times (e.g., 5, 10, 15) since the last successful authentication with the device; the electronic device has received a power off and/or emergency SOS command, and an explicit request by the user to disable biometric authentication has been detected. Displaying an indication that biometric authentication is currently not enabled provides feedback to the user of the current state of the device and prompts the user to pursue an alternative method to authenticate herself. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the indication that biometric authentication is currently not enabled includes an affordance (e.g., 714B) (e.g., the indication is an affordance). In some examples, the electronic device (e.g., 100, 300, 500, 700) receives an input (e.g., 720) corresponding to the affordance and in response to receiving the input corresponding to the affordance, the electronic device (e.g., 100, 300, 500, 700) displays, on the display (e.g., 702), a credential entry user interface (e.g., 722A) with a plurality of character entry keys. In some examples, the credential entry user interface includes a virtual keypad or virtual keyboard. In some examples, the virtual keypad or virtual keyboard includes a plurality of character entry keys.

In some examples, the electronic device (e.g., 100, 300, 500, 700) detects a condition that triggers attempting authentication (e.g., biometric authentication). In some examples, the request to perform an operation that requires authentication includes a request to unlock the device (e.g., a swipe at a predefined location). In some examples, in response to detecting the condition that triggers attempting authentication (e.g., biometric authentication) and in accordance with a determination that the condition corresponds to an alert (e.g., 708) generated by the device without user input directed to the device (e.g., based on the satisfaction of criteria other than detection of user input) while a biometric feature is available for detection by the one or more biometric sensors (e.g., a face is detected in the field of view of one or more face detection sensors such as a depth camera), the electronic device displays a fifth indication (e.g., 710) (e.g., rings that rotate around a sphere) that the electronic device is using the one or more biometric sensors of the electronic device to obtain information about a biometric feature. In some examples, in accordance with a determination that the condition corresponds to an alert generated by the device without user input directed to the device (e.g., based on the satisfaction of criteria other than detection of user input) while a biometric feature is not available for detection by the one or more biometric sensors (e.g., no face is detected in the field of view of one or more face detection sensors such as a depth camera), the electronic device forgoes displaying the fifth indication (e.g., rings that rotate around a sphere) that the electronic device is using the one or more biometric sensors of the electronic device to obtain information about a biometric feature. In some examples, in accordance with a determination that the condition corresponds to a user input directed to the device (e.g., a request that is not associated with a notification; a request that is a touch gesture input (e.g., tap, a swipe (e.g., 724) (e.g., an upward swipe) or an activation of a hardware button (e.g., power button) or sensor data indicative of movement (e.g., lifting) of the device)), the electronic device displays the fifth indication that the electronic device is using one or more biometric sensors of the electronic device to obtain information about a biometric feature (e.g., without regard to whether or not the biometric feature is available for detection by the one or more biometric sensors). Forgoing displaying the indication when no face is detected prevents potentially confusing the user, for it is likely that the user does not intend to initiate biometric authentication if no biometric feature is detected. Thus, forgoing displaying the indication in this scenario makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 800 (e.g., FIGS. 8A-8B) are also applicable in an analogous manner to the methods described below. For example, method 1000, method 1200, and/or method 1400 optionally include one or more of the characteristics of the various methods described above with reference to method 800. For example, the error indications (e.g., 714A-I) as described with respect to method 800 can be used to provide indications of error conditions during biometric authentication that is performed in processes described with respect to method 1000, method 1200, and method 1400. For brevity, these details are not repeated below.

FIGS. 9A-9U illustrate exemplary user interfaces for providing indications about the biometric sensor during biometric authentication, in accordance with some examples. The user interfaces in these figures are used to illustrate the processes described below, including the processes in FIGS. 10A-10C.

FIG. 9A illustrates electronic device 900 (e.g., portable multifunction device 100, device 300, device 500). In the exemplary examples illustrated in FIGS. 9A-9U, electronic device 900 is a tablet computer. In other examples, electronic device 900 can be a different type of electronic device, such as a smartphone (e.g., electronic device 700). Electronic device 900 includes display 902, one or more input devices (e.g., touchscreen of display 902, button 904, and a microphone), a wireless communication radio, and biometric sensor 903. Electronic device 900 includes biometric sensor 903. In some examples, biometric sensor 903 includes one or more biometric sensors that can include a camera, such as an infrared camera, a thermographic camera, or a combination thereof. In some examples, biometric sensor 903 includes some or all of the features of biometric sensor 703. In some examples, biometric sensor 903 includes one or more fingerprint sensors (e.g., a fingerprint sensor integrated into a button). In some examples, electronic device 900 further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by biometric sensor 903. In some examples, electronic device 900 includes a plurality of cameras separate from biometric sensor 903. In some examples, electronic device 900 includes only one camera separate from biometric sensor 903.

At FIG. 9A, a user wishes to purchase goods using payment information stored on electronic device 900. As depicted in FIG. 9A, electronic device 900 is in a split screen (e.g., multitasking) mode. While in the split screen mode, electronic device 900 concurrently displays app store user interface (UI) 906 in left region 907 of display 902 and browser UI 908 in right region 909 of display 902. While concurrently displaying app store UI 906 and browser UI 908, electronic device 900 receives input 910 at purchase affordance 912.

Figure 9B:
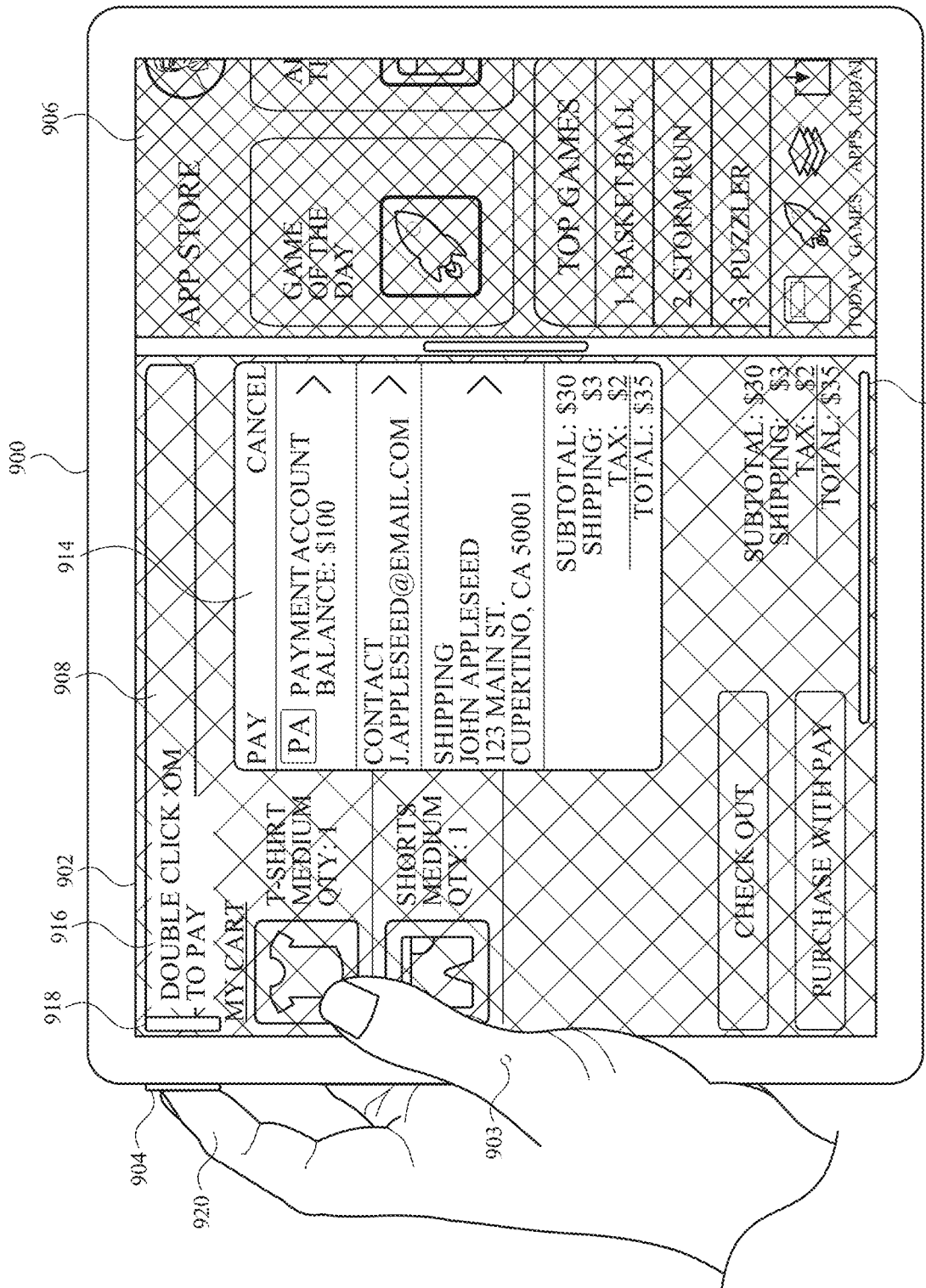

At FIG. 9B, in response to receiving input 910 at purchase affordance 912, electronic device 900 swaps the applications being displayed in left region 907 and right region 909 of display 902. Specifically, electronic device 900 displays browser UI 908 in left region 907, and displays app store UI 906 in right region 909. Electronic device 900 swaps the applications in order to place the application associated with the goods being purchased in the region that is closer to biometric sensor 903. By placing browser UI 908 in left region 907, electronic device 900 provides an indication to the user of the location of biometric sensor 903, which is used to authenticate the user prior to authorizing payment for purchasing the goods. As shown in FIG. 9B, swapping the applications also places the application associated with the goods being purchased in the region that is closer to button 904. In some examples, when the button 904 and the biometric sensor 903 are not in close proximity (e.g., on the same side), electronic device 900 swaps applications, when necessary, to place the application associated with the goods being purchased in the region that is closer to the biometric sensor 903. In some examples, when button 904 and biometric sensor 903 are not in close proximity (e.g., on the same side), electronic device 900 swaps applications, when necessary, to place the application associated with the goods being purchased in the region that is closer to the button 904.

Additionally, as depicted in FIG. 9B, in response to receiving input 910 at purchase affordance 912, electronic device 900 darkens browser UI 908 while darkening app store UI 906 to a greater degree than that of browser UI 908. By darkening browser UI 908 less than app store UI 906, electronic device 900 indicates to the user which application is associated with pay sheet interface 914 and the goods the user wishes to purchase.

Moreover, in response to receiving input 910 at purchase affordance 912, electronic device 900 concurrently displays pay sheet interface 914 with information about the goods being purchased and prompt 916 to prompt the user to double-click button 904 to initiate a process for authorizing payment for the goods. Further in response to receiving input 910 at purchase affordance 912, electronic device 900 displays dynamic indication 918 to emphasize the location of button 904. While displaying pay sheet interface 914, electronic device receives input 920 at button 904 (e.g., double-press of button 904). Prompt 916 instructs the user to provide one or more activations of button 904 (e.g., a double press of button 904). In some examples, prompt 916 is emphasized relative to one or more other displayed objects (on pay sheet interface 914). In some examples, dynamic indication 918 emphasizes the location of button 904 on the device by continuously changing in size (e.g., continuously alternating between becoming wider and becoming narrower, or otherwise continuously changing in size) adjacent to the location of button 904 on the display, thereby allowing the user to more easily locate the button corresponding to the request of prompt 916. In some examples, pay sheet interface 914 includes the name of the application to which it corresponds (e.g., the name of the application from which the user initiated the process for authorizing payment).

Figure 9C:
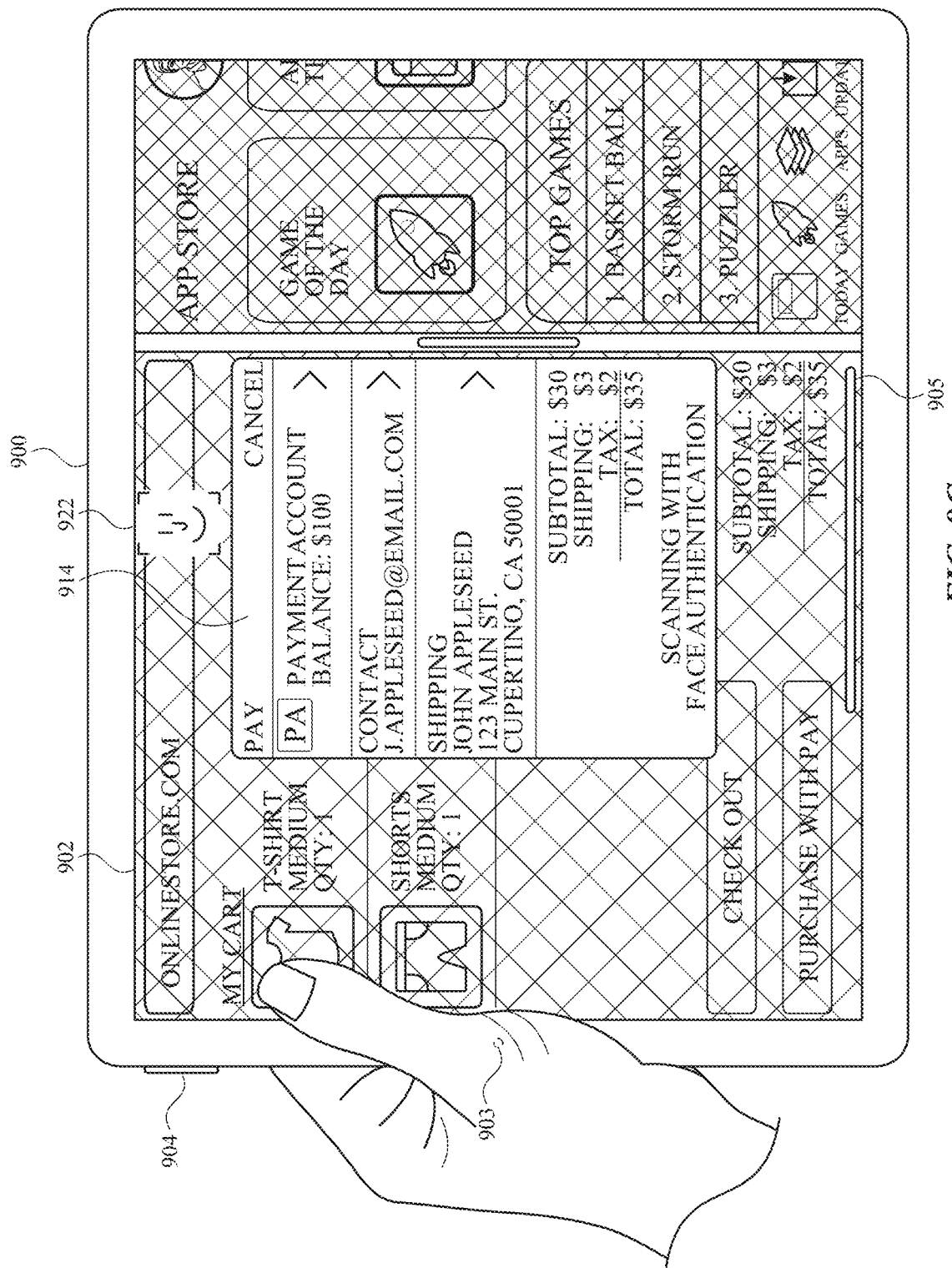

At FIG. 9C, in response to receiving input 920 at button 904, electronic device 900 initiates a process for authorizing payment for the goods. Authorizing payment for the goods requires successfully authenticating the user. As a result, in response to receiving input 920, electronic device 900 initiates biometric authentication using biometric sensor 903. After initiating biometric authentication, electronic device 900 displays face glyph 922, which provides an indication that electronic device 900 is attempting to biometrically authenticate the user (e.g., attempting to obtain biometric information about the user using biometric sensor 903). In some examples, face glyph 922 includes a simulation of a representation of a biometric feature. In some examples, in response to receiving input 920 at button 904, electronic device displays an animation of face glyph 922 moving from the location of prompt 916 to the location of face glyph 922, as depicted in FIG. 9C. In some examples, the animation is such that face glyph 922 appears to slide out of prompt 916.

Figure 9D:
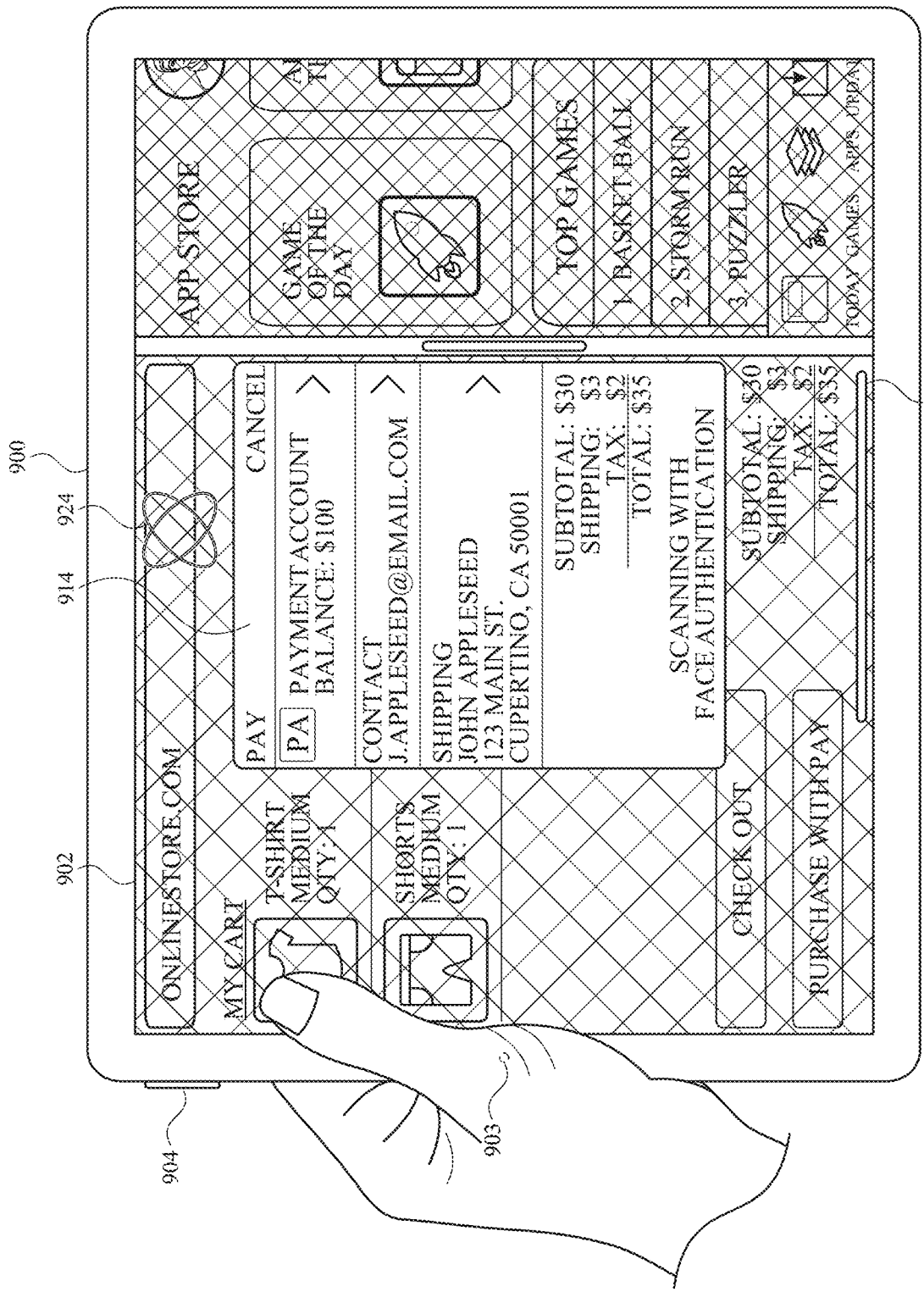

At FIG. 9D, after displaying face glyph 922, electronic device transitions to displaying authentication glyph 924, which provides an indication that electronic device 900 is attempting to biometrically authenticate the user (e.g., continuing to try to obtain biometric information, attempting to match obtained information with stored authorized credentials). Authentication glyph 924 includes a plurality of rings that rotate spherically. In some examples, authentication glyph 924 provides an indication that biometric data is being processed (e.g., compared against stored authorized credentials).

While displaying authentication glyph 924, electronic device 900 detects that an error condition exists (e.g., a condition that prevents biometric sensor 903 from obtaining sufficient information about the user's face). Specifically, electronic device 900 detects that biometric sensor 903 is covered by a physical object (e.g., the user's hand)). In some examples, electronic device 900 does not detect an error condition, and is able to obtain sufficient information about the user's face. In some examples, after obtaining sufficient information about the user's face and while displaying authentication glyph 924, electronic device 900 determines whether the obtained information satisfies biometric authentication criteria (e.g., determines whether the obtained biometric information matches, within a threshold, a biometric template associated with the user (e.g., stored authorized credentials)). In some examples, upon determining that biometric authentication is successful (e.g., biometric authentication criteria is satisfied), electronic device 900 transitions to an unlocked state.

Figure 9E:
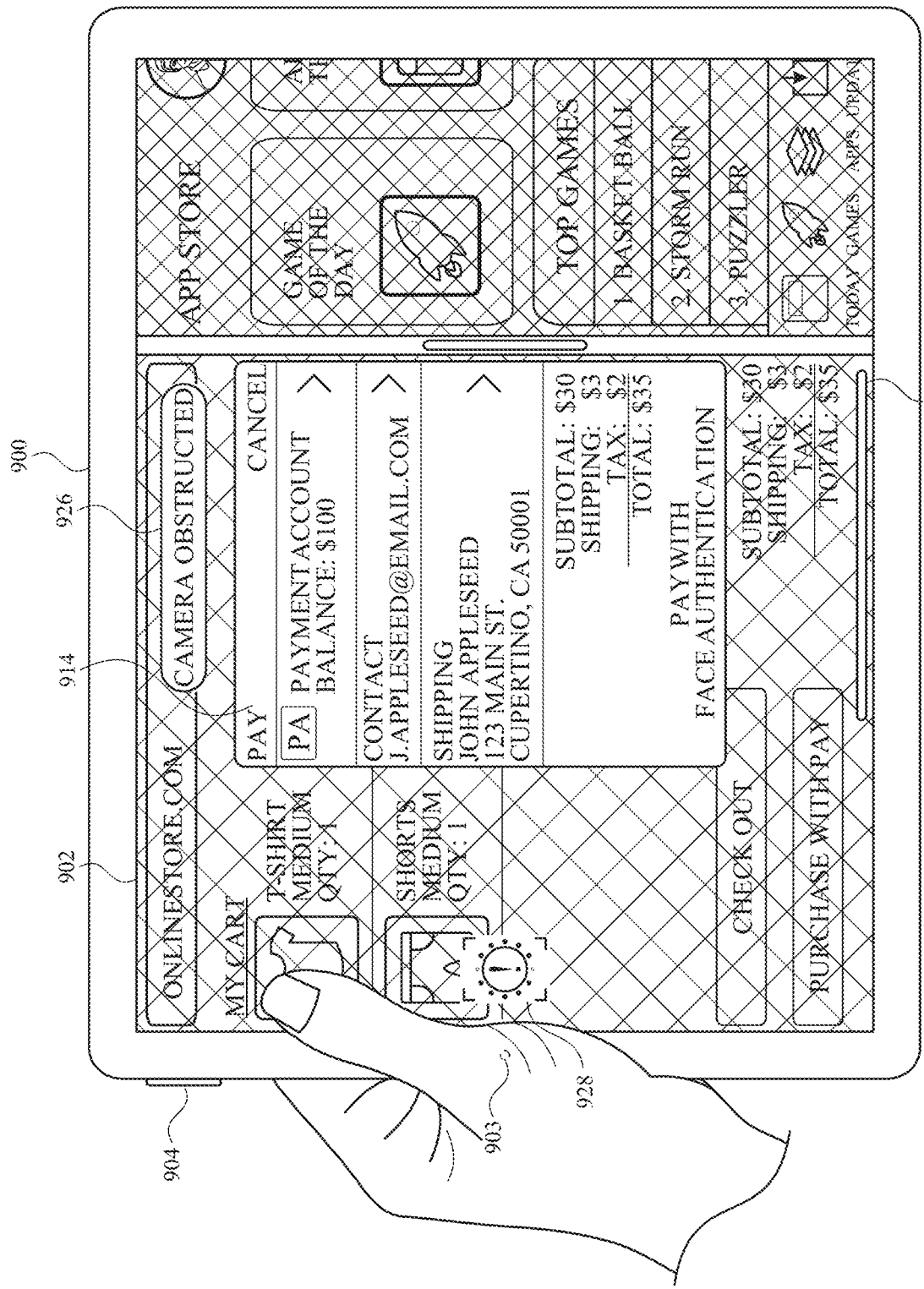

At FIG. 9E, in response to detecting that an error condition exists, electronic device 900 displays error indication 926 at a location at the top of display 902 (e.g., with respect to the ground, with respect to the user). Error indication 926 provides an indication of the error condition that currently exists. Further in response to detecting that an error conditions exists, electronic device 900 displays error icon 928 at a location of display 902 that is adjacent to biometric sensor 903, thereby providing an indication of the location of biometric sensor 903. By providing an indication of the location of biometric sensor 903, error icon 928 suggests to the user the cause of the error condition. In some examples, in response to detecting that an error condition exists, electronic device 900 displays error indication 926 at a location adjacent to biometric sensor 903. In some examples, error indication 926 includes some or all of the features of error indication 714A, including a shimmer effect.

Figure 9F:
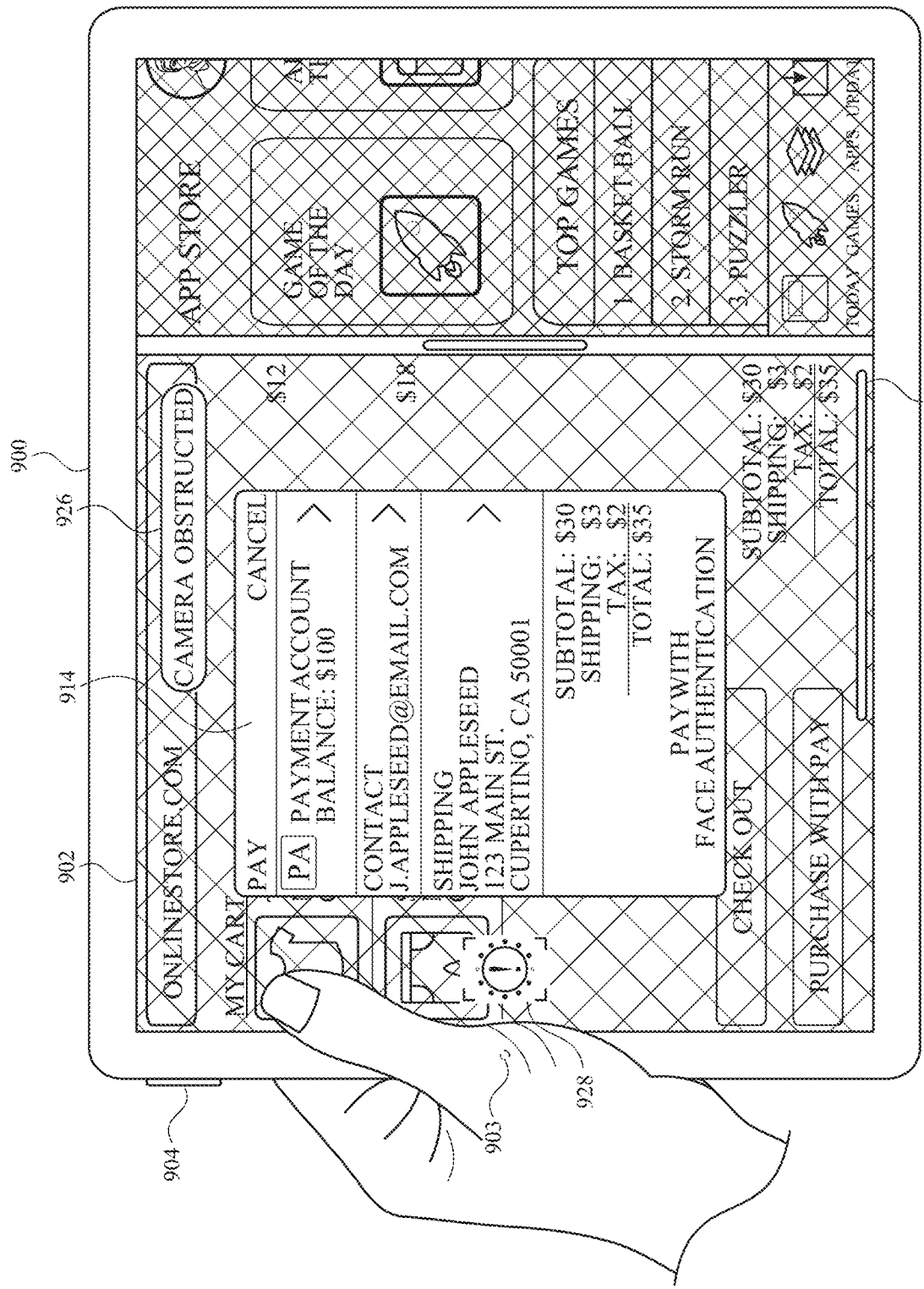

At FIG. 9F, further in response to detecting that an error condition exists, electronic device 900 displays an animation of pay sheet interface 914 moving from its initial location in FIG. 9E to the location in FIG. 9F, which is closer to biometric sensor 903. By moving pay sheet interface towards biometric sensor 903, electronic device 900 indicates to the user the existence of error icon 928 in addition to indicating the location of biometric sensor 903 (and thus suggesting to the user the cause of the error condition).

Figure 9G:
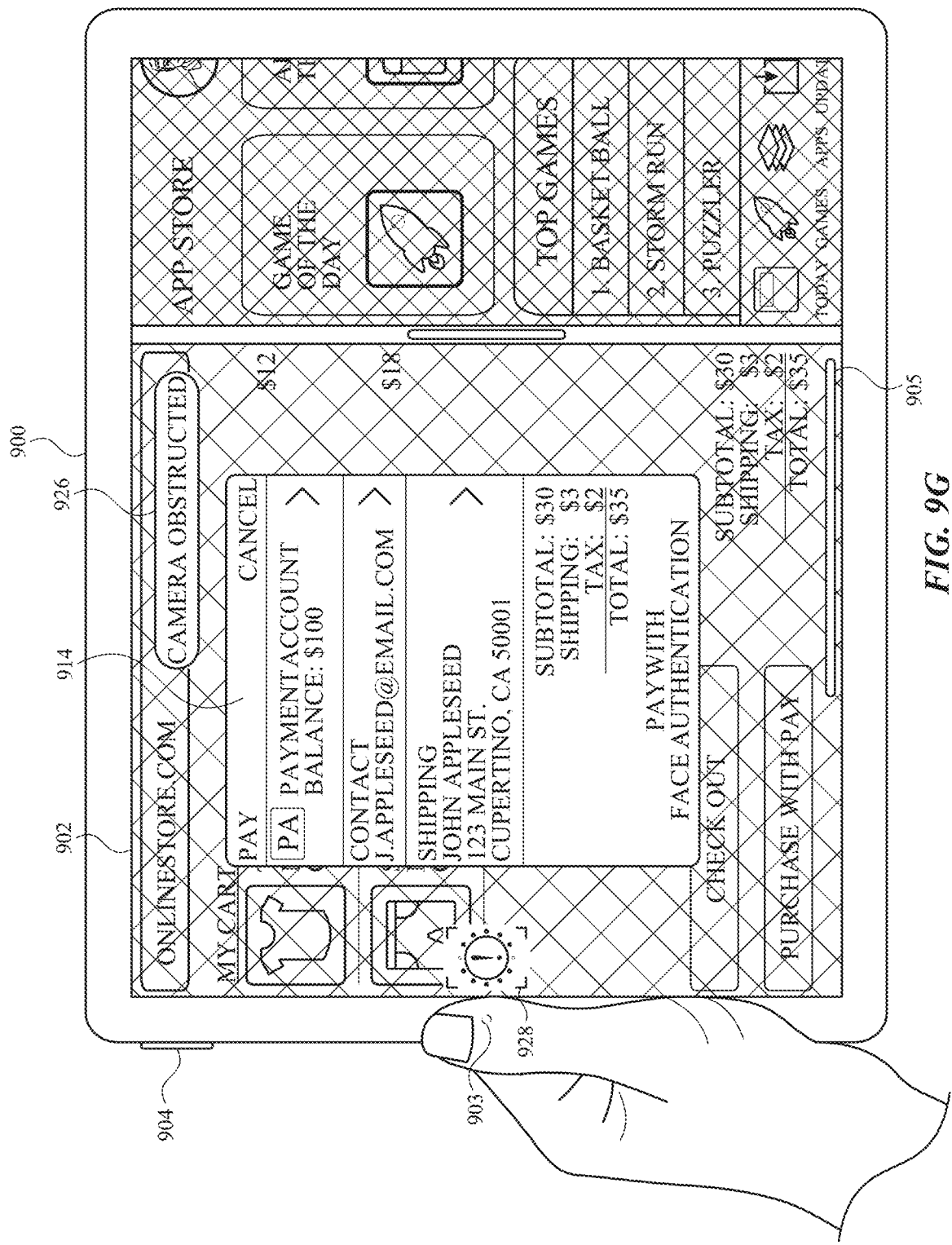
Figure 9H:
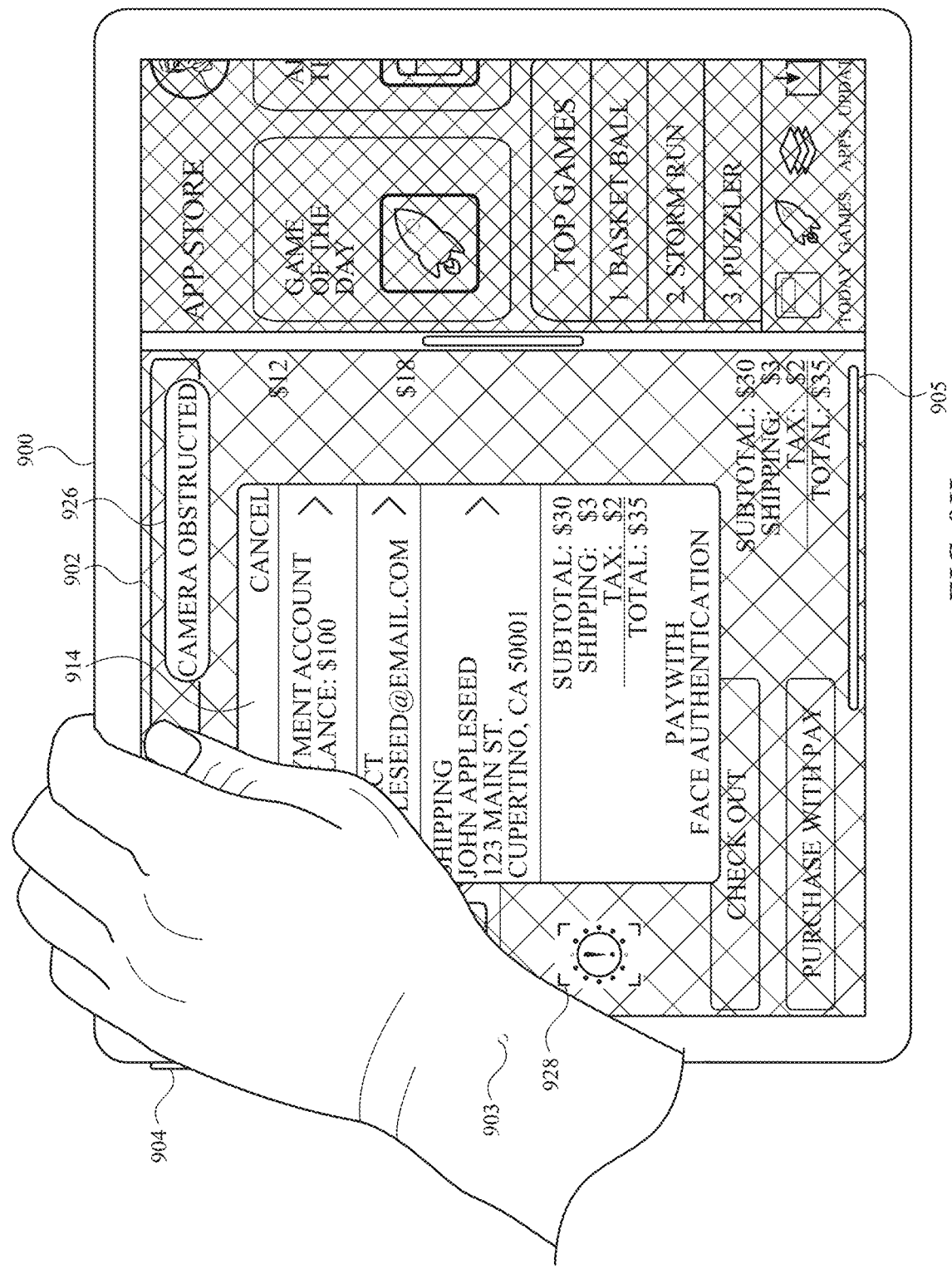

In some examples, error icon 928 is displayed at different location of display 902 depending on the positioning of the user's hand on display 902. As illustrated in FIG. 9F, the user's hand is covering a portion of display 902 that is adjacent to biometric sensor 903. While the user's hand is in contact with display 902, electronic device 900 detects an input as a result of the contact from the user's hand. In response to detecting this input, electronic device 900 displays error icon 928 at a location at which the input is not detected. As another example, in FIG. 9G, the user's hand is covering less of display 902 than the user's hand in FIG. 9F. In some examples, in response to detecting the input of the user's hand in FIG. 9G, electronic device 900 displays error icon 928 at a location that is different from the location in FIG. 9F, where the location in FIG. 9G is closer to biometric sensor 903 than that of FIG. 9F. As yet another example, in FIG. 9H, the user's hand is covering a large portion of the upper-left side of display 902. In some examples, in response to detecting the input of the user's hand in FIG. 9H, electronic device 900 displays error icon 928 at a location that is different from the locations in FIGS. 9F-9G. Specifically, in some examples, electronic device 900 displays error icon 928 at a location that is close to (or substantially near) biometric sensor 903 without being at a location where the input of the user's hand is detected.

Figure 9I:
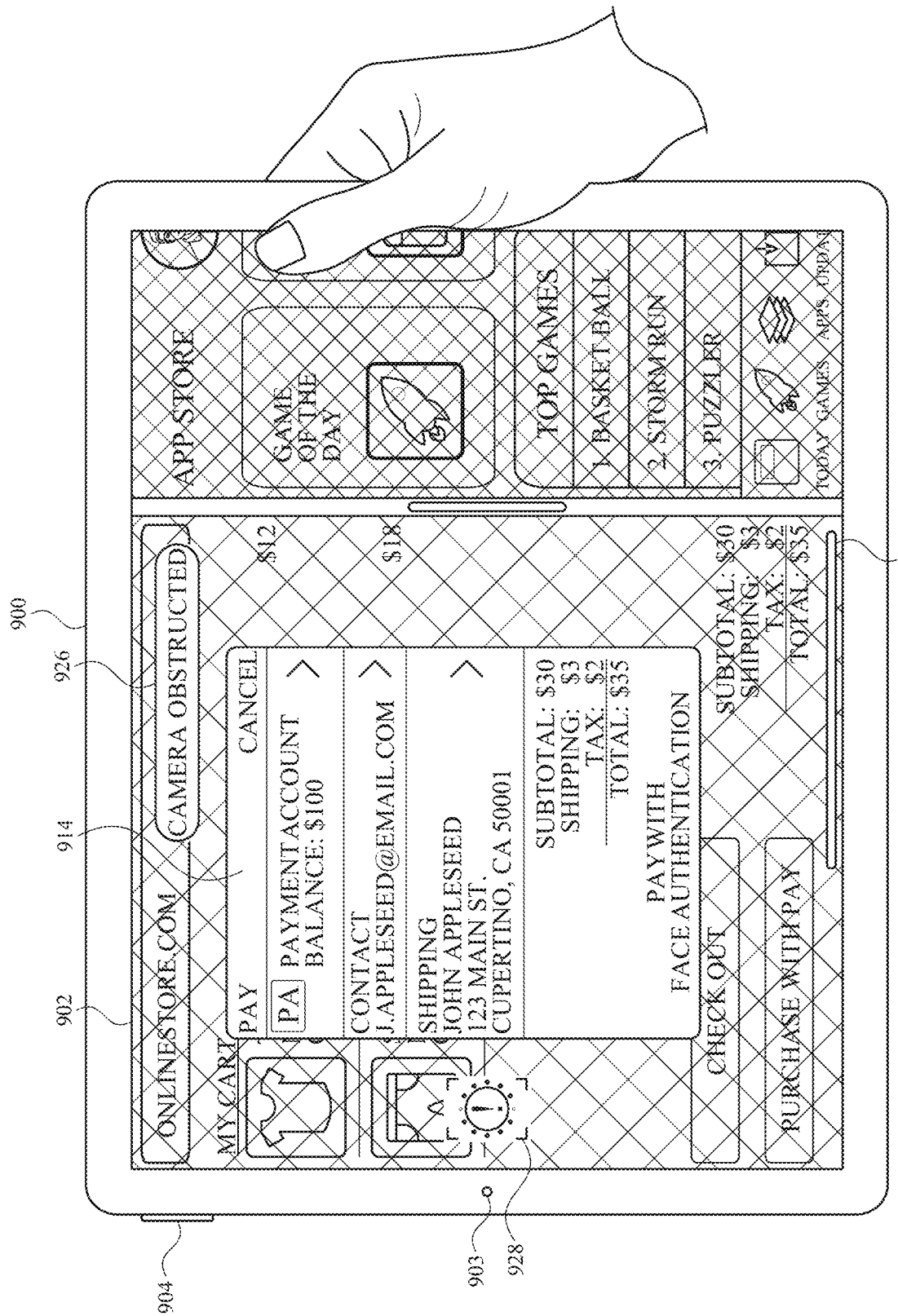

At FIG. 9I, the user removes her hand such that it no longer covers biometric sensor 903. While displaying error indication 926 and error icon 928, electronic device 900 detects that the error condition no longer exists.

Figure 9J:
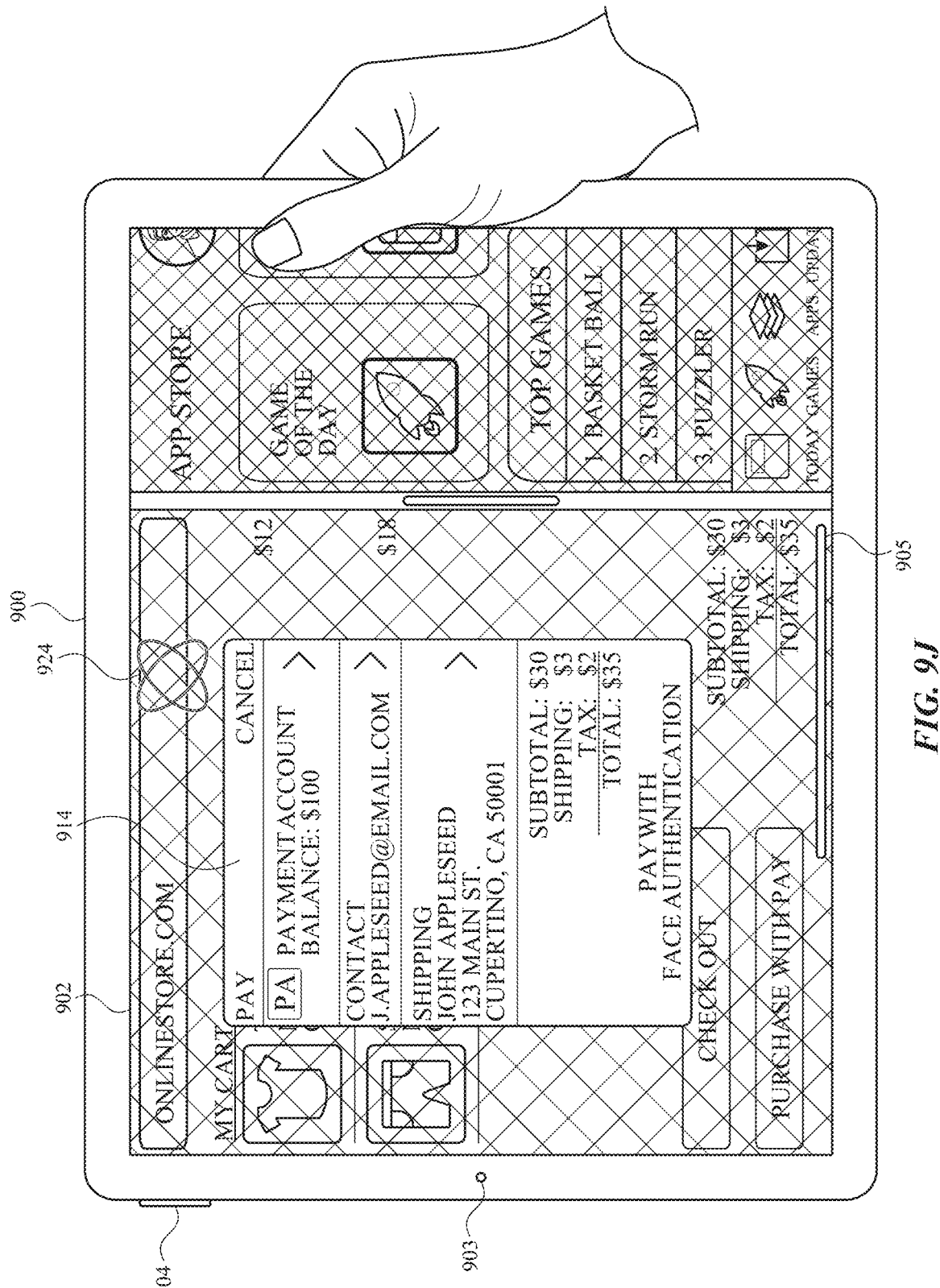

At FIG. 9J, in response to detecting that the error condition no longer exists, electronic device 900 automatically retries biometric authentication. While retrying biometric authentication, electronic device 900 displays authentication glyph 924. While displaying authentication glyph 924, electronic device 900 attempts to biometrically authenticate the user. Specifically, electronic device 900 obtains information about the user's face using biometric sensor 903, and determines whether biometric authentication is successful (e.g., the obtained information matches stored authorized credentials).

Figure 9K:
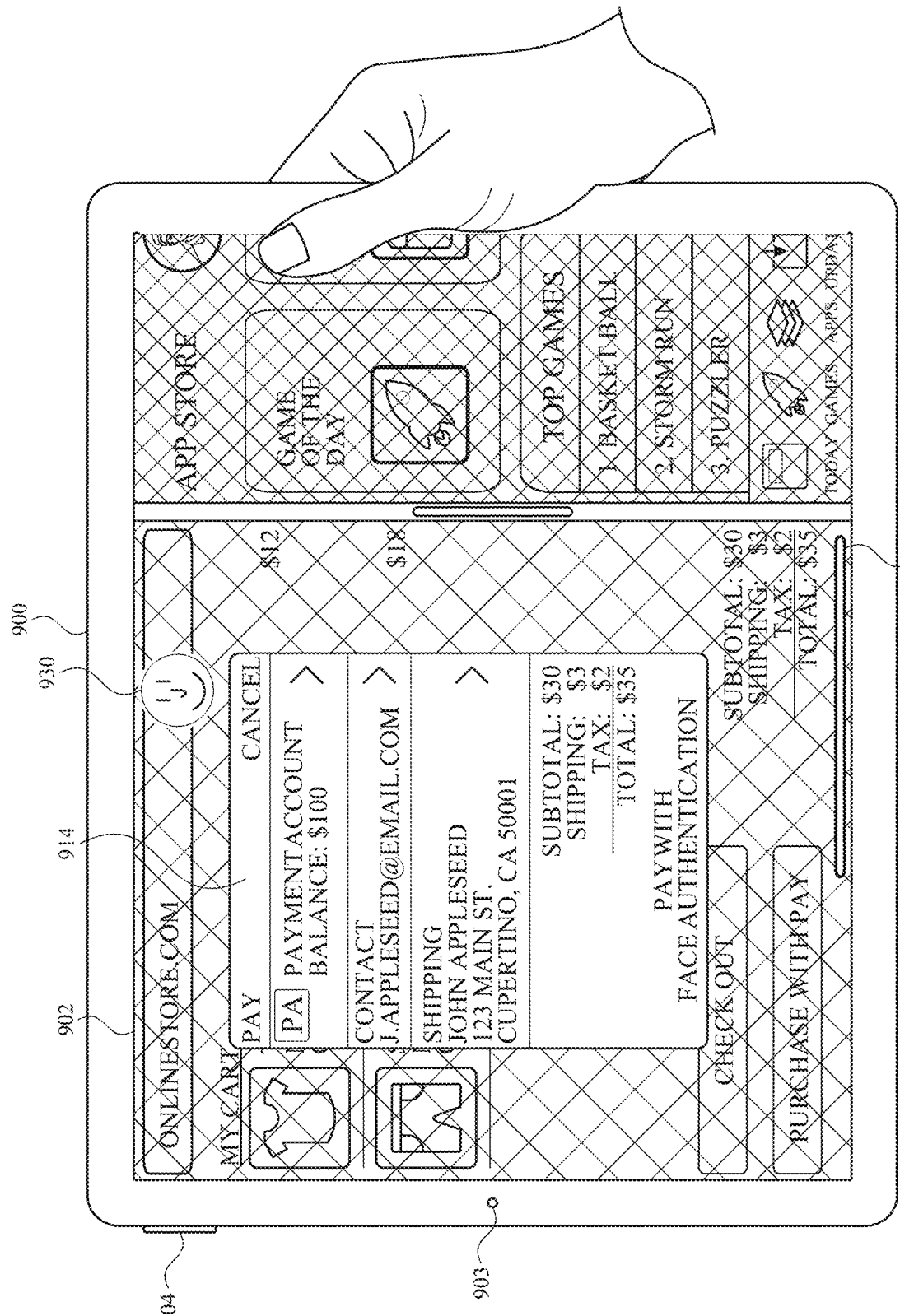

While retrying biometric authentication, electronic device 900 determines that biometric authentication is successful. At FIG. 9K, upon determining biometric authentication is successful, electronic device 900 displays success glyph 930, which provides an indication that biometric authentication was successful. In some examples, success glyph 930 replaces authentication glyph 924.

At FIG. 9L, further in response to determining that biometric authentication is successful, electronic device 900 displays processing indicator 932, which provides an indication that the payment transaction is being processed (e.g., electronic device 900 is transmitting payment information (e.g., credentials) to an external device (e.g., server) to authorize payment). In some examples, processing indicator 932 has a similar or identical pattern to authentication glyph 924.

Figure 9M:
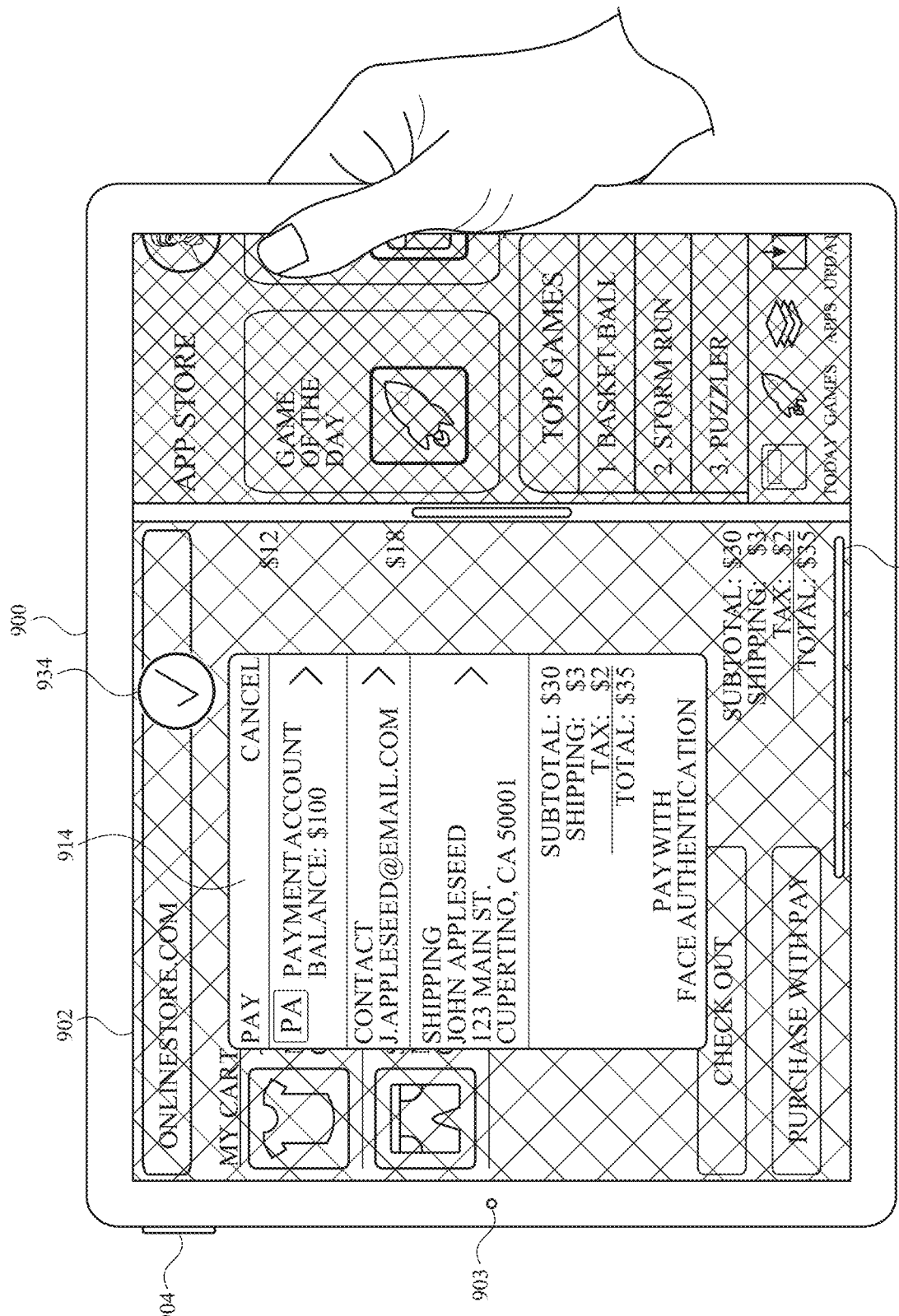

At FIG. 9M, upon receiving an indication that payment has been completed (e.g., authorized), electronic device 900 displays completed indication 934, which provides an indication that payment has been completed. Completed indication 934 includes a checkmark to indicate completion.

Figure 9N:
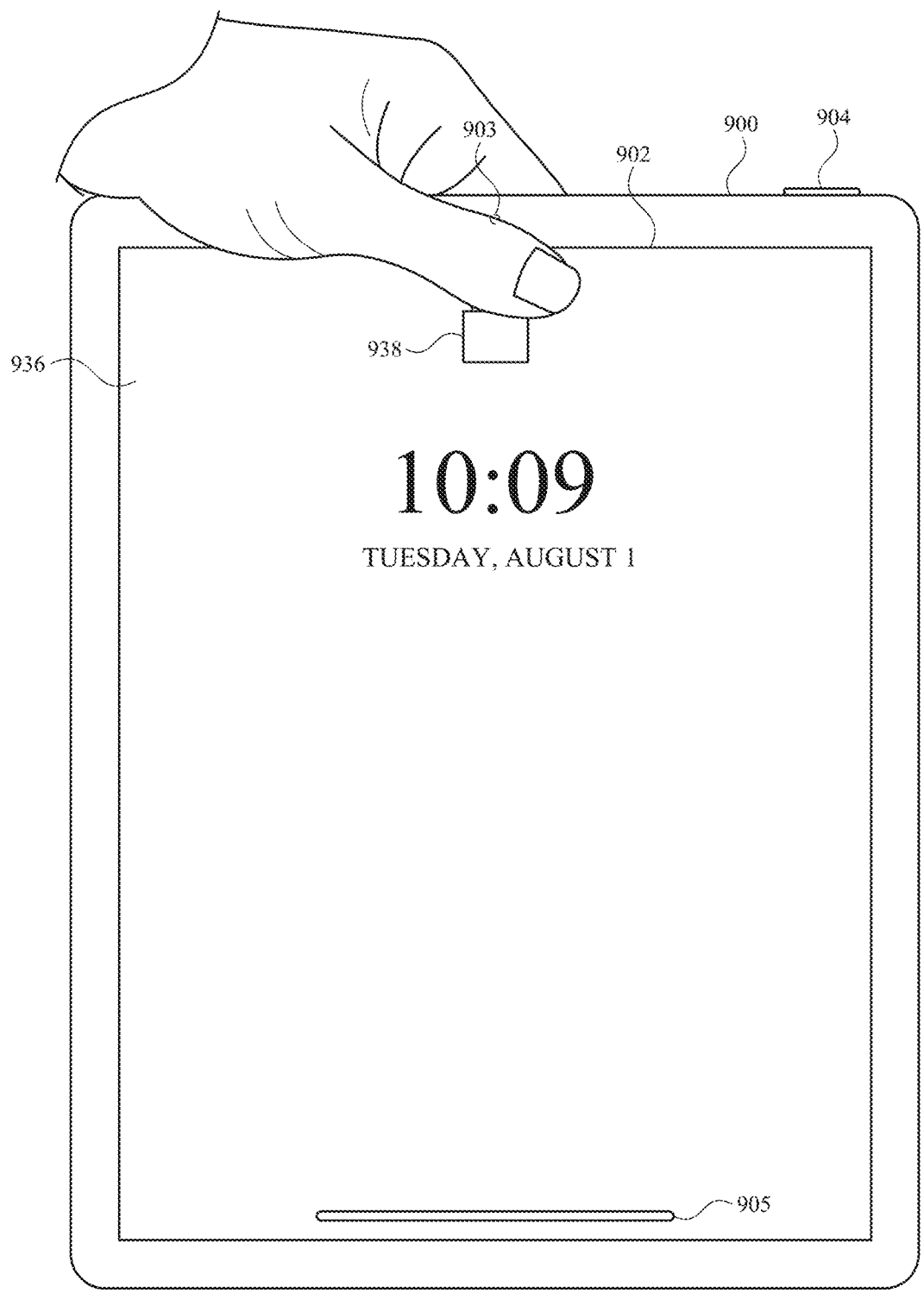

FIGS. 9N-9S illustrate a technique for displaying error indication 926 and error icon 928 when error indication 926 and error icon 928 are to be displayed in approximately the same location. At FIG. 9N, a user wishes to unlock the device to access restricted content (e.g., a home screen, a most recently used application). FIG. 9N depicts electronic device 900 in a portrait orientation with respect to the ground, where a user is covering biometric sensor 903 with her hand. Additionally, electronic device 900 displays locked state UI 936 with lock icon 938. Lock icon 938 provides an indication that electronic device 900 is in a locked state.

While displaying locked state UI 936, electronic device 900 receives a request to unlock the device. For example, electronic device 900 detects the user lifting the device from a substantially horizontal position.

Figure 9O:
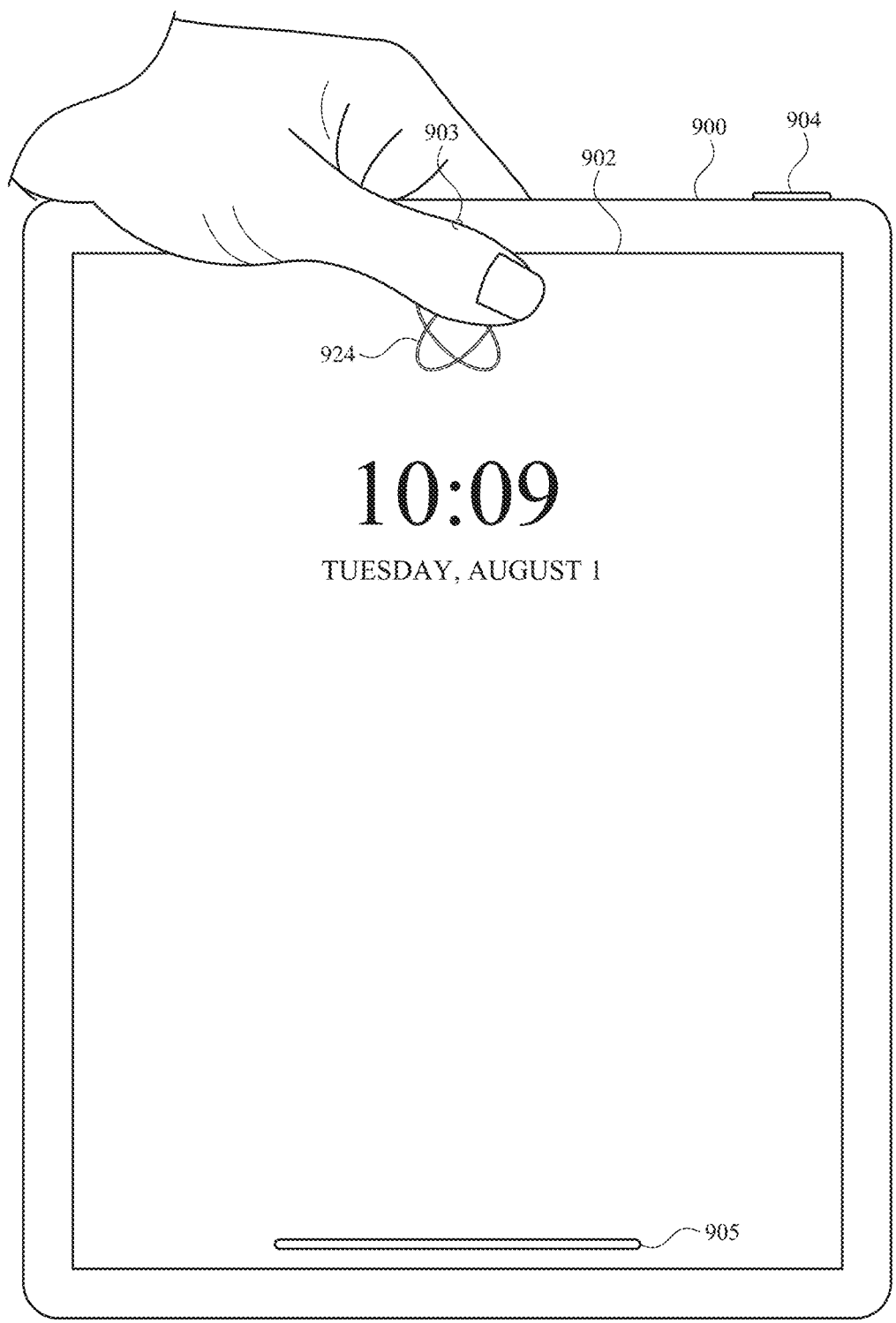

At FIG. 9O, in response to receiving the request to unlock the device, electronic device 900 attempts to biometrically authenticate the user. While attempting to biometrically authenticate the user, electronic device 900 displays authentication glyph 924. Additionally, while attempting to biometrically authenticate the user, electronic device 900 detects that an error condition exists (e.g., a condition that prevents biometric sensor 903 from obtaining sufficient information about the user's face). Specifically, electronic device 900 detects that biometric sensor 903 is covered by a physical object (e.g., the user's hand).

Figure 9P:

At FIG. 9P, in response to detecting that an error condition exists, electronic device 900 displays error icon 928 at a location of display 902 that is near biometric sensor 903 (e.g., at the top of display 902). Further in response to detecting that an error condition exists, electronic device 900 determines that error indication 926 is to be displayed at approximately the same location as error icon 928. Upon determining that error indication 926 is to be displayed at approximately the same location, electronic device 900 does not immediately display error indication 926, and instead displays error indication 926 as part of an animation that transitions from error icon 928 to error indication 926 to lock icon 938, as described below with respect to FIGS. 9Q-9R.

Figure 9Q:
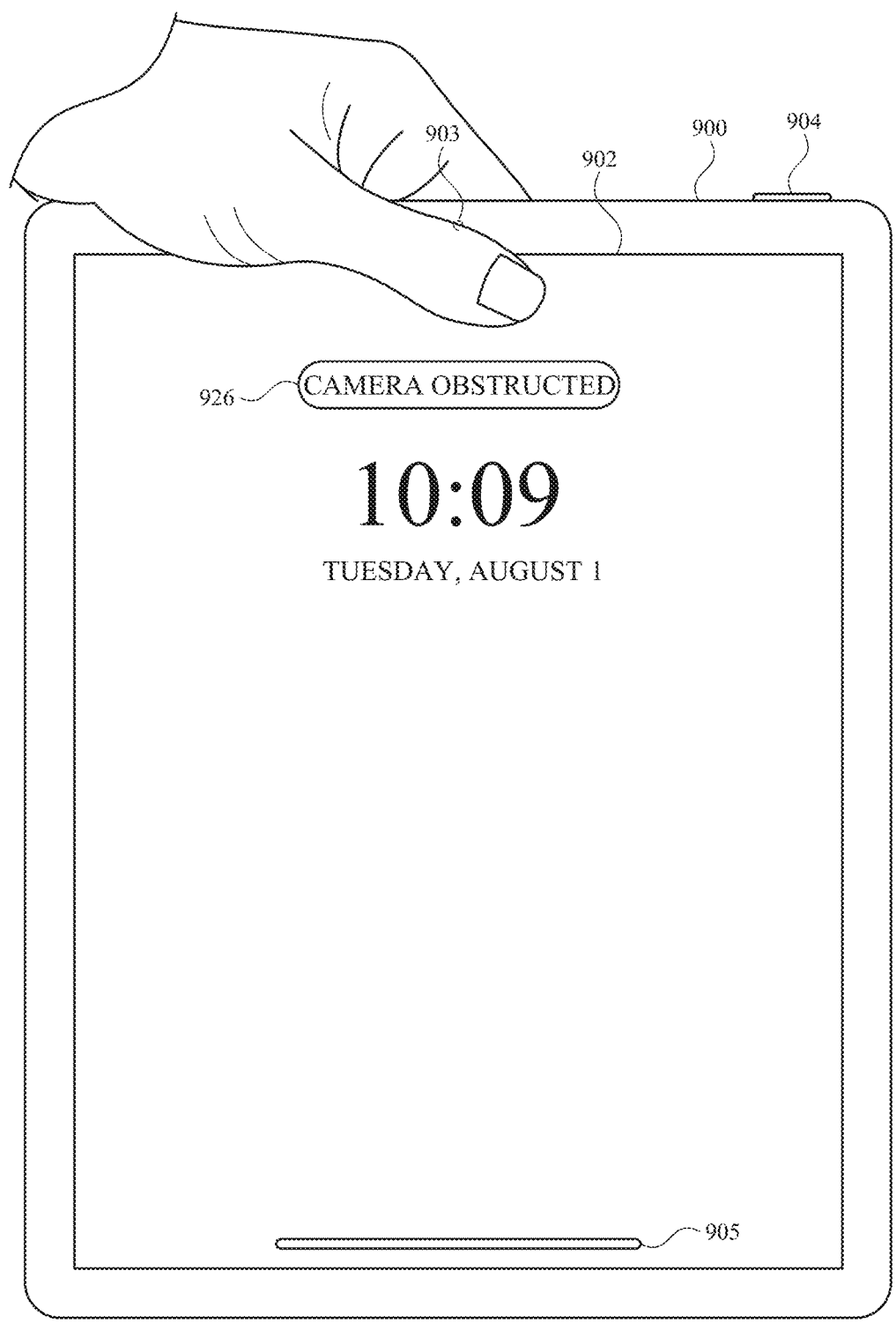

At FIG. 9Q, after displaying error icon 928, electronic device 900 displays (e.g., replaces display of error icon 928 with) error indication 926, which as discussed above, provides an indication of the cause of the error condition.

While displaying error indication 926, the user removes her hand from biometric sensor 903 such that it no longer covers biometric sensor 903. In response to detecting that the error condition no longer exists, electronic device 900 automatically retries biometric authentication.

Figure 9R:
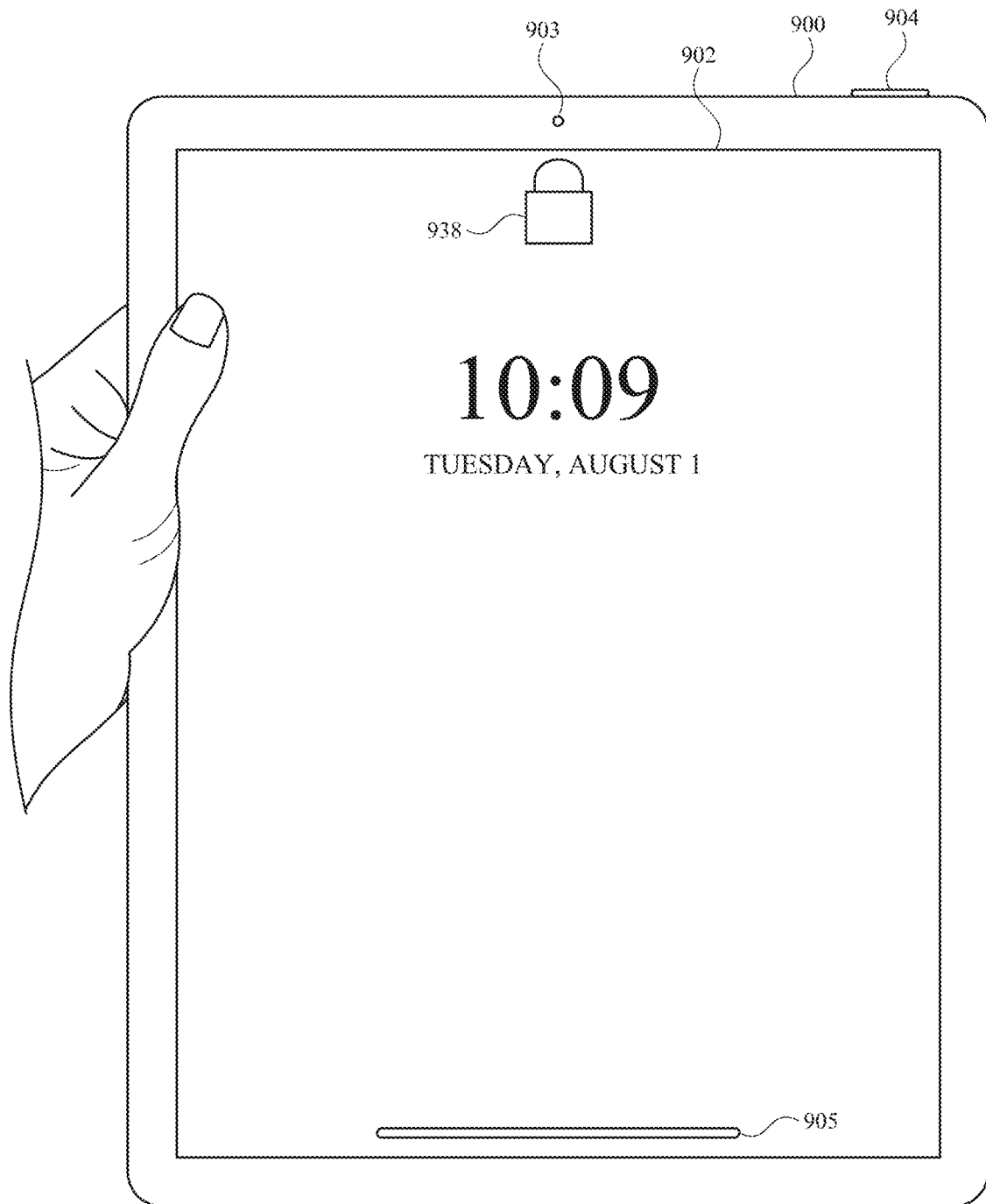
Figure 9S:
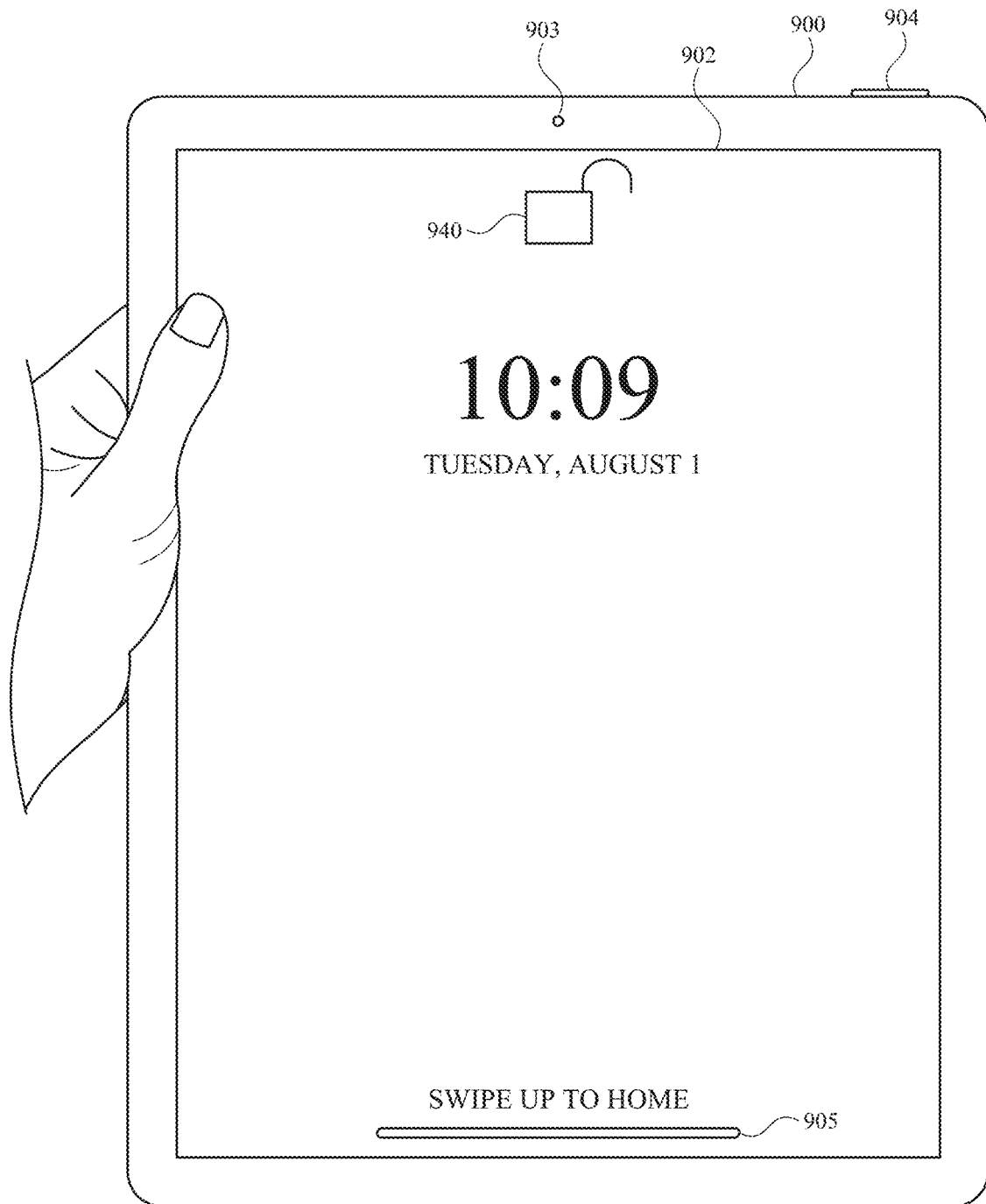

At FIGS. 9R-9S, upon determining that authentication is successful as a result of retrying biometric authentication, electronic device 900 transitions from a locked state to an unlocked state. Specifically, electronic device 900 displays (e.g., replaces display of error indication 926 with) an animation of lock icon 938 transitioning to unlock icon 940, which provides an indication to the user that electronic device 900 has transitioned to an unlocked state. In some examples, instead of successful biometric authentication, electronic device 900 determines that authentication is unsuccessful as a result of retrying biometric authentication. In some examples, upon determining that authentication is unsuccessful, electronic device 900 displays a passcode entry UI with an affordance which, when activated, triggers retrying biometric authentication. In some examples, while retrying biometric authentication, electronic device 900 darkens all portions of display 902 except for the user interface associated with retrying biometric authentication.

Figure 9T:
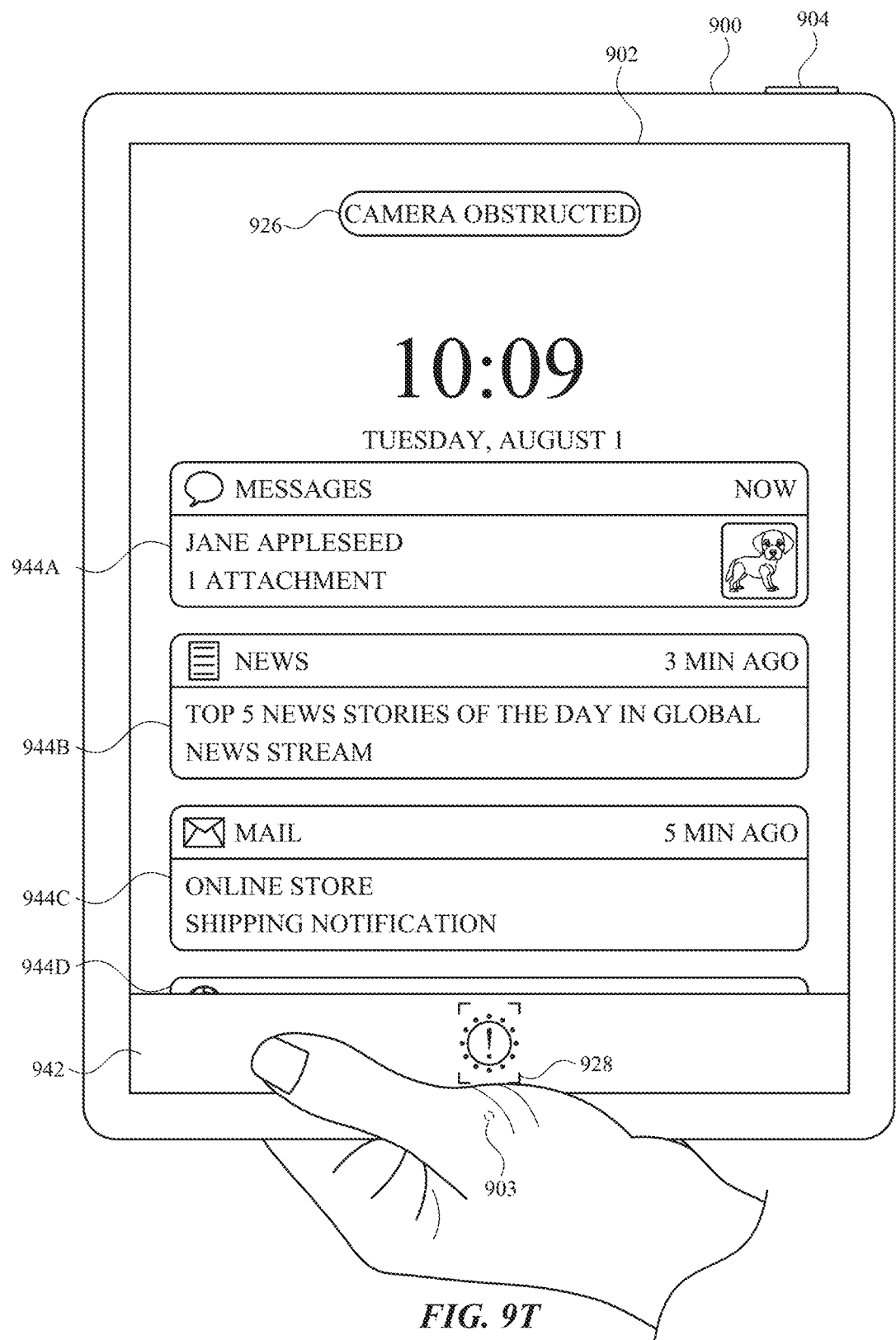

FIG. 9T illustrates a technique for displaying error icon 928 when error icon 928 is to be displayed at approximately the same location as one of the notifications being displayed (e.g., 944A-D). In some examples, a user wishes to view the restricted content of one or more of the notifications (e.g., 944A-D) that are displayed while electronic device 900 is in a locked state. As depicted in FIG. 9T, a user is covering biometric sensor 903 with her hand when the electronic device is a portrait orientation, where biometric sensor 903 is located near the bottom of the device. In some examples, while attempting to biometrically authenticate a user to access the restricted content of the notifications, electronic device 900 detects that an error condition exists as a result of the user covering biometric sensor 903 with her hand. In response to detecting that an error condition exists, electronic device 900 determines that error icon 928 is to be displayed at approximately the same location as one of the notifications (e.g., 944A-D). Upon making this determination and in response to detecting that the error condition exists, electronic device 900 displays UI element 942 (e.g., a background) concurrently with error icon 928 to provide a background on which to overlay the display of error icon 928. As depicted in FIG. 9T, UI element 942 is opaque such that the notification on which error icon 928 is overlaid (e.g., 944D) is not visible to the user. In some examples, UI element 942 is transparent such that the notification on which error icon 928 is overlaid is visible to the user.

FIG. 9T also illustrates a technique for hiding unlock indication 905 of FIG. 9U when error icon 928 is to be displayed at approximately the same location as unlock indication 905. In some examples, electronic device 900 displays unlock indication 905, which provides an indication of an approximate location on display 902 from which a user can start an upward swipe to initiate biometric authentication. In some examples, while displaying unlock indication 905, electronic device 900 detects that an error condition exists as a result of the user covering biometric sensor 903 with her hand. In some examples, in response to detecting that an error condition exists, electronic device 900 determines that error icon 928 is to be displayed at approximately the same location as unlock indication 905. In some examples, upon making this determination and in response to detecting that the error condition exists, electronic device 900 ceases to display unlock indication 905, and displays error icon 928 at approximately the same location at which unlock indication 905 was displayed.

While displaying error icon 928, electronic device 900 detects that the error condition no longer exists (e.g., due to the user removing her hand from biometric sensor 903). As depicted in FIG. 9U, the user has removed her hand from biometric sensor 903. At FIG. 9U, upon detecting that the error condition no longer exists, electronic device 900 ceases to display error icon 928, and re-displays unlock indication 905 at the location at which it was previously displayed.

FIGS. 10A-10C are flow diagrams illustrating a method for providing indications about the biometric sensor during biometric authentication, in accordance with some examples. Method 1000 is performed at an electronic device (e.g., 100, 300, 500, 900) with a display (e.g., 902) and a biometric sensor (e.g., 903) (e.g., a first biometric sensor of a device with a plurality of biometric sensors) (e.g., a fingerprint sensor, a contactless biometric sensor (e.g., a biometric sensor that does not require physical contact, such as a thermal or optical facial recognition sensor), an iris scanner) at a first portion of the electronic device (e.g., a portion that is not a part of the display). In some examples, the biometric sensor includes one or more cameras. Some operations in method 1000 are, optionally, combined, the orders of some operations are, optionally, changed, and some operations are, optionally, omitted.

As described below, method 1000 provides an intuitive way for providing indications about the biometric sensor during biometric authentication. The method reduces the cognitive burden on a user for performing biometric authentication, thereby creating a more efficient human-machine interface. For battery-operated computing devices, enabling a user to perform biometric authentication faster and more efficiently conserves power and increases the time between battery charges.

The electronic device (e.g., 100, 300, 500, 900) detects (1002) (e.g., detects in response to a request to perform an operation that requires authentication) the existence of an error condition that prevents the biometric sensor from obtaining biometric information about a user of the device (e.g., a contactless biometric sensor such as a thermal or optical facial recognition sensor) is occluded (e.g., partially occluded, fully occluded, occluded to a degree sufficient to inhibit operation of the sensor) (e.g., occluded by a portion of the user (e.g., a hand), while interacting with the electronic device).

In response (1004) to detecting the existence of the error condition, the electronic device (e.g., 100, 300, 500, 900) displays, on the display (e.g., 902), an error indication (e.g., 928) (e.g., a graphical icon). In some examples, the error indication includes text (e.g., indicating that the sensor is occluded. In some examples, the error indication does not include text. The error indication is displayed (1006) at a location that is proximate to the first portion of the electronic device. In some examples, the location is at or near the portion of the display that is closest to the location of the biometric sensor (e.g., 903). Displaying the error indication provides the user with feedback about the current state of the device (e.g., that an error condition is preventing successful biometric authentication) and prompts the user to take further action to correct the error condition. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying the error indication near the biometric sensor provides the user with feedback as to the association of the biometric sensor with the processes occurring at the device (e.g., attempted authentication). Specifically, the user becomes aware of the biometric sensor during biometric authentication such that the user is less likely to perform an action that interferes with the biometric sensor or alternatively, the user is prompted to take corrective action. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the error indication (e.g., 928) includes (1008) a biometric sensor occluded icon and a reticle, the error indication providing an indication that the biometric sensor is occluded. In some examples, the error indication is associated with the electronic device performing biometric authentication (e.g., using the biometric sensor to obtain biometric information about a biometric feature (e.g., face, fingerprint). Providing an indication that the biometric sensor is occluded provides the user with feedback about the current state of the device (e.g., that the biometric sensor is occluded) and prompts the user to take further action to correct the error condition. Providing improved feedback with instructions on proper movements of the biometric feature therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In accordance (1010) with a determination that a user interface of the electronic device is in a first orientation relative to the biometric sensor, the electronic device (e.g., 100, 300, 500, 900) displays the error indication at a first location in the user interface that is proximate to (e.g., adjacent to, near to, within a predetermined distance of) the first portion of the electronic device.

In accordance (1012) with a determination that the user interface of the electronic device is in a second orientation relative to the biometric sensor, the electronic device (e.g., 100, 300, 500, 900) displays the error indication (e.g., 928) at a second location in the user interface that is proximate to (e.g., adjacent to, near to, within a predetermined distance of) the first portion of the electronic device, the first orientation being different from the second orientation.

In some examples, while attempting (1014) to obtain biometric information using the biometric sensor (e.g., 903), the electronic device (e.g., 100, 300, 500, 900) displays (1016), on the display (e.g., 902), a first progress indicator (e.g., 924, 926, 938, 940). In some examples, the first progress indicator provides an indication of the current state of the electronic device (e.g., locked state, unlocked state, performing biometric authentication, error state, error condition). In some examples, in accordance (1018) with a determination that the user interface (e.g., 906, 908) of the electronic device is in a third orientation relative to the biometric sensor, the user interface in the third orientation having a first top side, the electronic device displays the first progress indicator proximate to (e.g., adjacent to, near to, within a predetermined distance of) the first top side of the user interface in the third orientation. In some examples, in accordance (1020) with a determination that the user interface of the electronic device is in a fourth orientation relative to the biometric sensor, the user interface in the fourth orientation having a second top side, the electronic device displays the first progress indicator proximate to (e.g., adjacent to, near to, within a predetermined distance of) the second top side of the user interface in the fourth orientation, the third orientation being different from the fourth orientation. In some examples, the first progress indicator is displayed on the display at a location that is closest to or proximate to (e.g., adjacent to, near to, within a predetermined distance of) the biometric sensor. Displaying the first progress indicator near the top of the display regardless of orientation ensures that the user is more likely to be aware of the provided feedback to the user (e.g., the progress indicator). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, the electronic device (e.g., 100, 300, 500, 900) displays, on the display (e.g., 902), a second progress indicator (e.g., 924, 926, 938, 940) of the electronic device. In some examples, the second progress indicator provides an indication of the current state of the electronic device (e.g., locked state, unlocked state, performing biometric authentication, error state). In some examples, the first progress indicator is the second progress indicator. In some examples, the second progress indicator is an animation with a first portion (e.g., an indication that the electronic device is performing biometric authenticating using the biometric sensor (e.g., 924) (e.g., rotating rings)) and a second portion (e.g., an indication of an error condition or error state (e.g., 926), an indication of the current lock or unlock state of the electronic device (e.g., lock icon (e.g., 938), unlock icon (e.g., 940))) that is different from the first portion. In some examples, in accordance with a determination that the second progress indicator is displayed at the location that is proximate to the first portion of the electronic device, the electronic device displays the error indication (e.g., 928) as part of the animation subsequent to the first portion and prior to the second portion.

In some examples, the electronic device (e.g., 100, 300, 500, 900) displays, on the display (e.g., 902), a home affordance (e.g., 905) (e.g., an indication of a location of a gesture that when performed, results in displaying a home screen such as a swipe up gesture from an edge of the display or a tap gesture on the affordance) at a third location (e.g., a location proximate to a side (e.g., bottom side) of the user interface) in the user interface. In some examples, in accordance with a determination that the error indication (e.g., 928) is displayed at the third location, the electronic device ceases to display the home affordance (e.g., 905) while displaying the error indication at the third location. Ceasing display of the home affordance while displaying an error indication allows the user to quickly realize the home affordance is not accessible because there is an error and prompts the user to take further action to correct the error condition. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, after ceasing to display the home affordance (e.g., 905), the electronic device (e.g., 100, 300, 500, 900) detects a correction of the error condition that prevents the biometric sensor (e.g., 903) from obtaining biometric information about the user of the device. In some examples, the electronic device detects the absence of the error condition subsequent to displaying the error indication (e.g., 928) at the third location. In some examples, in response to detecting the correction of the error condition, the electronic device displays, on the display (e.g., 902), the home affordance at the third location in the user interface (e.g., and ceases to display the error indication (e.g., 928)).

In some examples, the electronic device (e.g., 100, 300, 500, 900) detects an input (e.g., palm, finger) at the location that is proximate to (e.g., adjacent to, near to, within a predetermined distance of) the first portion of the electronic device. In some examples, in response to detecting the input at the location that is proximate to the first portion of the electronic device, the electronic device displays, on the display, the error indication (e.g., 928) at a different location. In some examples, the different location is a location at which the input is not detected. In some examples, prior to displaying the error indication at the new location, the electronic device determines the different location based on the location of the input with respect to the display. In some examples, the different location is proximate to the location that is proximate to the first portion of the electronic device. In some examples, the error indication is moved to the different location after being initially displayed at a first location that is proximate to the first portion of the electronic device. In some examples, the error indication is initially displayed at a location selected so as to be away from any regions of the display that are known to be occluded (e.g., occluded by a detected touch input). Displaying the error indication at a different location depending on the location of the input (e.g., a user's hand) provides the user with feedback about the current state of the device (e.g., that an error condition is preventing successful biometric authentication) and prompts the user to take further action to correct the error condition. Further, by adjusting the location, the device ensures that the error indication is visible to the user and thus, the user is more likely to take corrective action at the device. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 100, 300, 500, 900) displays, on the display (e.g., 902), a first transaction interface (e.g., 914) (e.g., a transaction (or payment) interface that is separate from (or overlaid on top of) the user interface and includes transaction information such as a credit card number, billing address, etc.) at a position that is proximate to (e.g., adjacent to, near to, within a predetermined distance of) the first portion of the electronic device. In some examples, the first transaction interface is displayed in response to receiving an input (e.g., 910) corresponding to an affordance (e.g., 912) of the user interface (e.g., 908) (e.g., an affordance for making a payment or completing a transaction).

In some examples, displaying the first transaction interface (e.g., 914) includes displaying an animation of the first transaction interface transitioning (e.g., translating) from an initial position that is substantially centered with respect to the display to the position that is proximate to the first portion of the electronic device. In some examples, the animation includes displaying (e.g., maintaining the display of) the first transaction interface while the first transaction interface transitions (e.g., translates) from the initial position to the position that is proximate to the first portion of the electronic device. In some examples, the animation includes a visual effect where the first transaction interface appears to float while transitioning.

In some examples, the electronic device (e.g., 100, 300, 500, 900) displays, on the display (e.g., 902), a prompt (e.g., 916) to provide one or more activations of a hardware button (e.g., 904) of the electronic device. In some examples, the electronic device prompts the user by displaying "double click for Apple Pay". In some examples, the prompt is displayed adjacent to the button. In some examples, the prompt is displayed when the device is displaying a transaction user interface region (e.g., 914) but without receiving any indication that a transaction terminal is nearby and is requesting transaction credentials (e.g., the prompt to provide the one or more activations of the button are displayed before the device has been placed in an NFC field of an NFC reader that is requesting payment information). In some examples, the hardware button is a mechanical button or a solid state button. In some examples, the button is a switch or any other type of toggle. In some examples, the button has a fixed position relative to the electronic device, and in particular, relative to the display of the electronic device such that the electronic device may display prompts based on a position of the button. In some examples, the button is a solid-state button that operates according to capacitive and/or resistive touch, and/or is responsive to changes in the intensity of input without having a mechanical switch that is depressed to activate the button and instead monitors whether an intensity of the input is above an intensity threshold that corresponds to activation of the solid-state button. In some examples, the electronic device (e.g., 100, 300, 500, 900) receives one or more activations (e.g., 920) of the hardware button of the electronic device, and in response to receiving the one or more activations of the hardware button, the electronic device displays, on the display (e.g., 902), an authentication progress indicator (e.g., 922, 924, 930, 932, 934). In some examples, displaying the authentication progress indicator includes displaying an animation of the authentication progress indicator transitioning from a location of the prompt (e.g., 916) to a final position of the authentication progress indicator. In some examples, the authentication indicator provides a status of the authentication (e.g., in progress, successful, unsuccessful). In some examples, the animation includes displaying (e.g., maintaining the display of) the authentication progress indicator while the authentication progress indicator transitions (e.g., translates) from the location of the prompt to the final position. In some examples, the animation includes a visual effect where the authentication progress indicator appears to slide out of the prompt. In some examples, the authentication progress indicator is displayed with (or overlaid on) the user interface (e.g., 914) (or the transaction user interface region). Prompting the user to activate a hardware button guides the user to perform an action at the device in order to complete a transaction. Prompting the user in this manner enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently. Displaying an authentication progress indicator provides feedback to the user regarding the status of the authentication. Improved feedback enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the electronic device (e.g., 100, 300, 500, 900) concurrently displays (1022), on the display (e.g., 902), a first application (e.g., corresponding to 906, 908) in a first region (e.g., 907, 909) and a second application (e.g., corresponding to 906, 908) in a second region (e.g., 907, 909), the second application being adjacent to (e.g., next to, proximate to, within a predetermined distance of) the first application. In some examples, the electronic device displays (1024), on the display, a second transaction interface (e.g., 914). In some examples, the second transaction interface is the first transaction interface. In some examples, the second transaction interface is displayed overlaid on the first application and/or the second application. In some examples, in accordance (1026) with a determination that the second transaction interface corresponds to the first application, the electronic device modifies a first visual characteristic (e.g., obscure, darken, blur) of the first application. In some examples, the second transaction interface corresponds to the first application when the first application includes information about the good or service (or transaction) that is being purchased (or completed) using (or via) the second transaction interface. In some examples, this determination is made while displaying the second transaction interface. In some examples, in accordance (1030) with a determination that the second transaction interface corresponds to the second application, the electronic device (e.g., 100, 300, 500, 900) modifies a first visual characteristic (e.g., obscure, darken, blur) of the second application. In some examples, the second transaction interface corresponds to the first application when the first application includes information about the good or service (or transaction) that is being purchased (or completed) using (or via) the second transaction interface. In some examples, this determination is made while displaying the second transaction interface.

In some examples, modifying the first visual characteristic of the first application includes modifying a second visual characteristic of the second application. In some examples, modifying the second visual characteristic of the second application includes increasing darkening and/or increasing blur radius of a blur effect applied to the second application to a greater degree (or amount) than with respect to the first application. In some examples, modifying the first visual characteristic of the second application includes modifying a second visual characteristic of the first application. In some examples, modifying the second visual characteristic of the first application includes increasing darkening and/or increasing blur radius of a blur effect applied to the first application to a greater degree (or amount) than with respect to the second application. Modifying the visual characteristic of one application to a greater degree than with respect to another application provides feedback to the user as to which application is more relevant at the time. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, modifying the first visual characteristic of the first application includes displaying (1028) the first application in the second region in accordance with a determination that the second region is closer (e.g., nearer) to the first portion of the electronic device (e.g., biometric sensor) than the first region. In some examples, displaying the first application in the second region includes ceasing to display the first application in the first region. In some examples, modifying the first visual characteristic of the second application includes displaying (1032) the second application in the first region in accordance with a determination that the first region is closer (e.g., nearer) to the first portion of the electronic device (e.g., biometric sensor) than the second region. In some examples, displaying the second application in the first region includes ceasing to display the second application in the second region. In some examples, the electronic device displays an animation of the first application swapping places with the second application.

In some examples, in accordance with the determination that the second transaction interface (e.g., 914) corresponds to the first application, the second transaction interface includes an indication of the first application (e.g., the name of the first application). In some examples, in accordance with the determination that the second transaction interface corresponds to the second application, the second transaction interface includes an indication of the second application (e.g., the name of the second application).

Note that details of the processes described above with respect to method 1000 (e.g., FIGS. 10A-10C) are also applicable in an analogous manner to the methods described below/above. For example, method 800, method 1200, and/or method 1400 optionally include one or more of the characteristics of the various methods described above with reference to method 1000. For example, error icon 928, as described in method 1000, can be used to indicate that the biometric sensor is obstructed when biometric authentication is being performed in the processes described with respect to method 800, method 1200, and method 1400. For brevity, these details are not repeated below.

FIGS. 11A-11S illustrate exemplary user interfaces for orienting the device to enroll a biometric feature (e.g., a face for later use in biometric authentication), in accordance with some examples. The user interfaces in these figures are used to illustrate the processes described below, including the processes in FIGS. 12A-12C.

FIG. 11A illustrates electronic device 900 (e.g., portable multifunction device 100, device 300, device 500). In the exemplary examples illustrated in FIGS. 11A-11S, electronic device 900 is a tablet computer. In other examples, electronic device 900 can be a different type of electronic device, such as a smartphone (e.g., electronic device 700). Electronic device 900 includes display 902, one or more input devices (e.g., touchscreen of display 902, button 904, and a microphone), a wireless communication radio, and biometric sensor 903. Electronic device 900 includes biometric sensor 903. In some examples, biometric sensor 903 includes one or more biometric sensors that can include a camera, such as an infrared camera, a thermographic camera, or a combination thereof. In some examples, biometric sensor 903 includes some or all of the features of biometric sensor 703. In some examples, biometric sensor 903 includes one or more fingerprint sensors (e.g., a fingerprint sensor integrated into a button). In some examples, electronic device 900 further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by biometric sensor 903. In some examples, electronic device 900 includes a plurality of cameras separate from biometric sensor 903. In some examples, electronic device 900 includes only one camera separate from biometric sensor 903.

At FIG. 11A, a user wishes to set up biometric (e.g., face) authentication on electronic device 900. Successfully setting up biometric authentication on the device enables a user to perform operations on the device that require authentication (e.g., unlocking the device) by presenting the user's face for biometric authentication. To set up biometric authentication on the electronic device, a user must first enroll her face. The process for enrolling the face can include some or all of the features (or processes) of FIGS. 11A-11O.

As illustrated in FIG. 11A, electronic device 900 displays introduction user interface (UI) 1106 with initiate affordance 1108. Electronic device 900 receives input 1110 at initiate affordance 1108 to start the process of enrolling the user's face for biometric authentication.

Figure 11B:
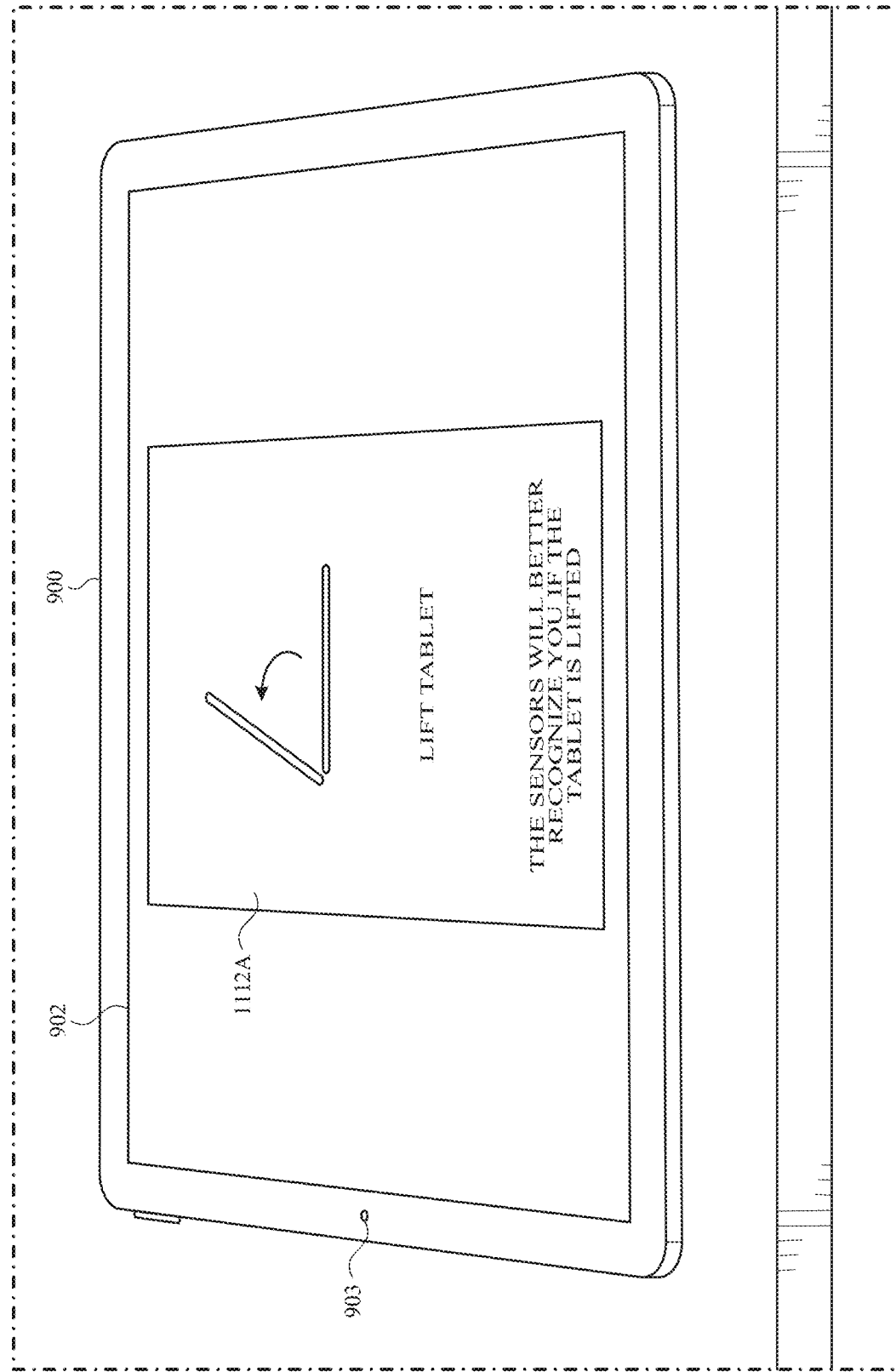

At FIG. 11B, in response to receiving input 1110 at initiate affordance 1108, electronic device 900 determines that the orientation of the device is not suitable for enrolling the user's face. In some examples, a suitable orientation for enrolling the user's face is a portrait orientation that is upright (e.g., vertical), where the portrait orientation is such that biometric sensor 903 is at the top of the device (e.g., the side of the device that is farthest away from the ground). In response to determining that the orientation of the device is not suitable for enrolling the user's face, electronic device 900 displays (e.g., replaces display of introduction UI 1106 with) one or more prompts to prompt the user to orient electronic device 900 to a suitable orientation. More specifically, electronic device 900 determines that electronic device 900 is in a substantially horizontal orientation (e.g., approximately parallel to the ground). As a result, as depicted in FIG. 11B, electronic device 900 displays prompt 1112A to prompt the user to lift electronic device 900 to an upright position.

In some examples, in response to receiving input 1110 at initiate affordance 1108, electronic device determines that the orientation of the device is suitable for enrolling the user's face. In some examples, upon determining that the orientation is suitable for enrolling the user's face, electronic device 900 automatically initiates a process for enrolling the user's face, as described below with respect to FIG. 11D.

Figure 11C:
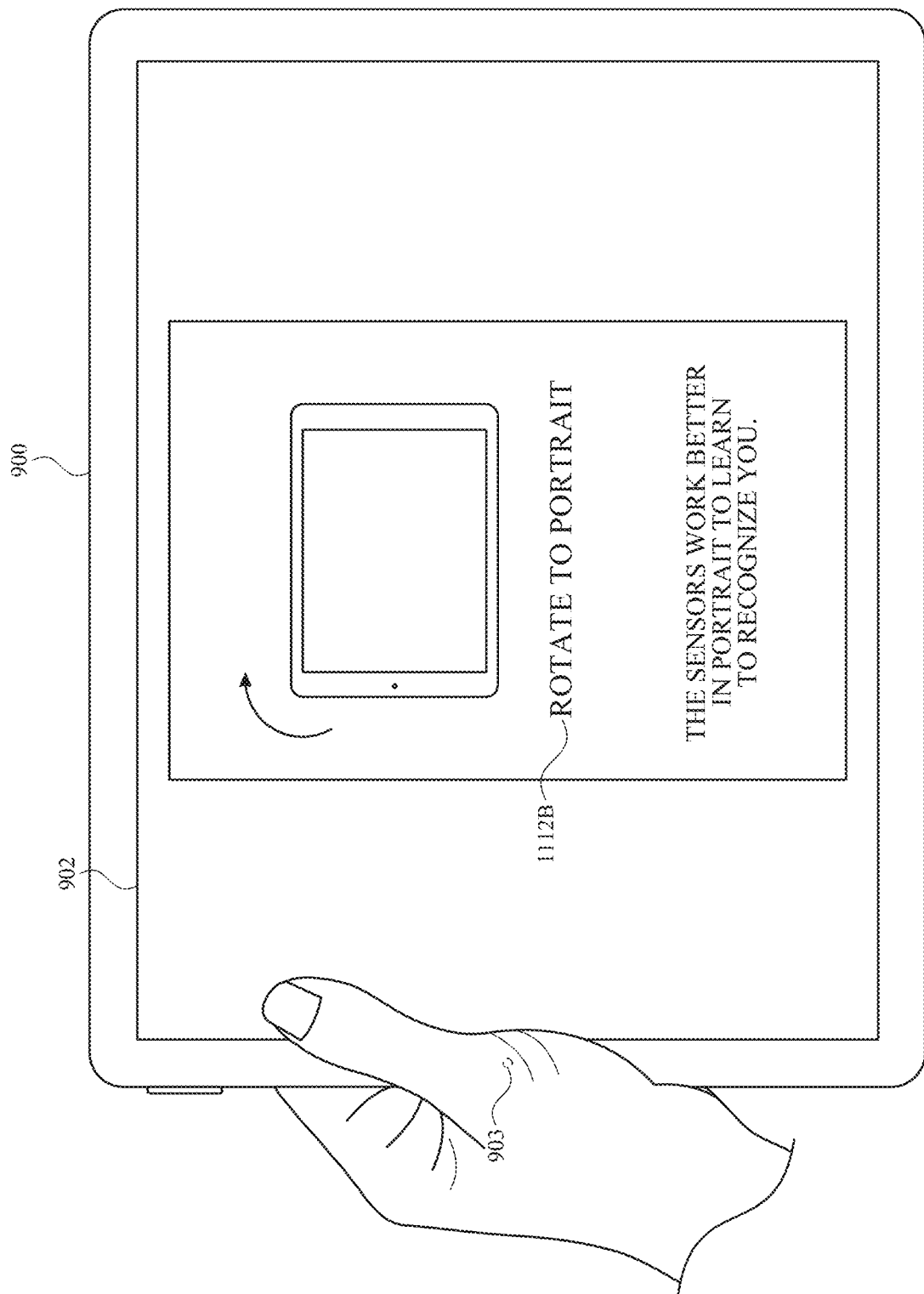

At FIG. 11C, in response to determining that electronic device 900 is in an upright position but not in a portrait orientation (e.g., the user has lifted the device off the table in response to prompt 1112A), electronic device 900 displays (e.g., replaces display of prompt 1112A with) prompt 1112B to prompt the user to rotate electronic device 900 to a portrait orientation (e.g., with the biometric sensor 903 at the top). Specifically, prompt 1112B prompts the user to rotate in a specific direction (e.g., using text and/or an arrow)

such that minimal rotation is required to achieve the desired (or suitable) orientation. For example, prompt 1112B prompts the user to rotate electronic device 900 clockwise because rotating clockwise requires less rotation to achieve the desired orientation than rotating the device counterclockwise. In some examples, prompt 1112B includes an animation of a representation of electronic device 900 rotating clockwise 90 degrees to indicate to the user the action needed to orient the device to a suitable orientation for enrolling the user's face.

In some examples, electronic device 900 displays a different prompt based on the orientation of the device. For example, if biometric sensor 903 is located adjacent to the right edge of the device (e.g., with respect to the user), electronic device 900 displays prompt 1112C in FIG. 11Q. In some examples, prompt 1112C prompts the user to rotate the device counterclockwise (e.g., via text and/or a pictorial illustration of the direction in which to rotate the device). In some examples, prompt 1112C includes an animation of a representation of electronic device 900 rotating counterclockwise 90 degrees to indicate to the user the action needed to orient the device to a suitable orientation for enrolling the user's face. As another example, if biometric sensor 903 is located adjacent to the bottom edge of the device (e.g., with respect to the user), electronic device 900 displays prompt 1112D in FIG. 11R. In some examples, prompt 1112D prompts the user to rotate the device 180 degrees (e.g., via text and/or a pictorial illustration of the direction in which to rotate the device). In some examples, prompt 1112D includes an animation of a representation of electronic device 900 rotating clockwise or counterclockwise 180 degrees to indicate to the user the action needed to orient the device to a suitable orientation for enrolling the user's face.

Figure 11D:
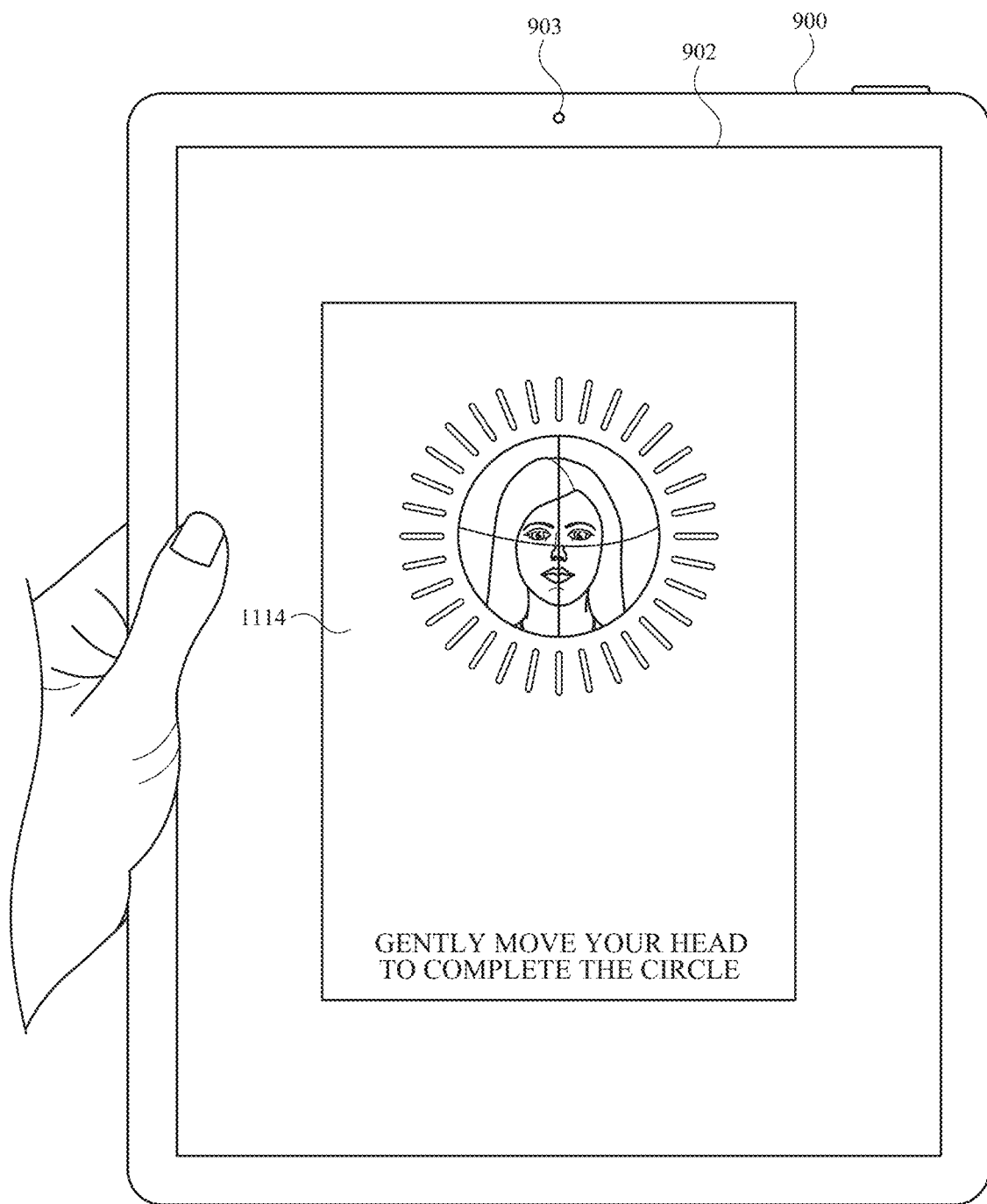
Figure 11E:
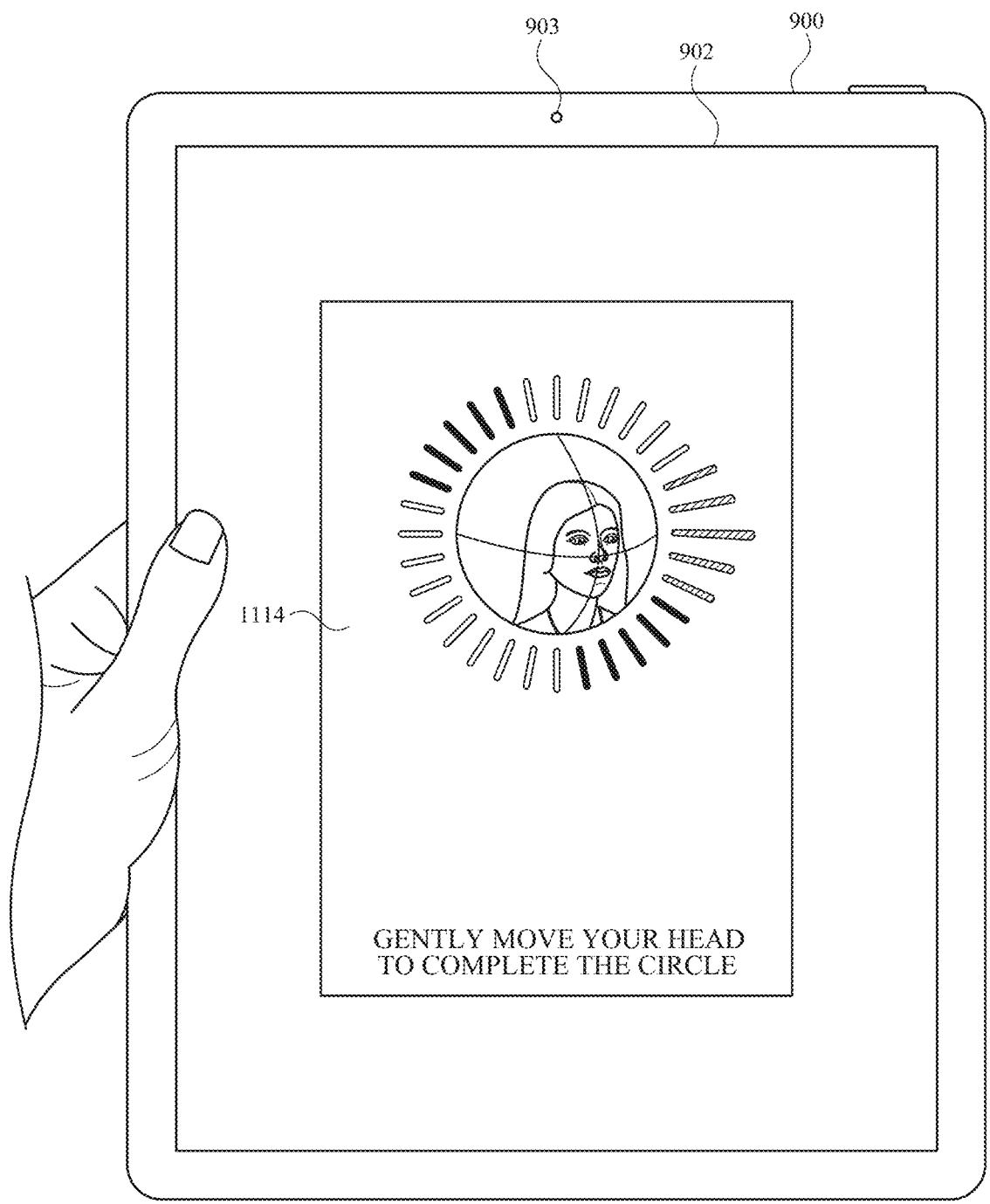
Figure 11F:

At FIG. 11D, in response to determining that electronic device 900 is in a suitable orientation, electronic device 900 automatically initiates a process for enrolling the user's face. As illustrated in FIGS. 11D-11F, after initiating the process for enrolling the user's face, electronic device 900 displays face enrollment UI 1114. Face enrollment UI 1114 includes a facial image of the user. In some examples, the facial image is an image of the user captured by one or more cameras on device 900. For example, the facial image optionally is live preview of the image data captured by the one or more cameras (e.g., a digital viewfinder) that updates continuously as the field of view of the camera and/or the field of view's contents change. In some examples, background content is removed such that only the user's face is visible in the facial image. Face enrollment UI 1114 also optionally includes an orientation guide that is superimposed (e.g., overlaid) on the facial image. The orientation guide is, optionally, a set of curved lines that extend into a virtual z-dimension (e.g., along an axis normal to the plane of the display) and intersect over the center of the facial image. Thus, the curved lines of the orientation guide appear to bulge outwards relative to the plane of display 902 to give a sense of the position of the user's head in three-dimensional space.

Face enrollment UI 1114 also includes an enrollment progress meter. The enrollment progress meter includes a set of display elements (e.g., progress elements) that are arranged around the facial image and the orientation guide. In the example of FIG. 11D, the progress elements are a set of lines that extend radially outward from the facial image arranged in a circular pattern. In some examples, the progress elements indicate an orientation of the user's face needed to enroll corresponding facial features. For example, progress elements in the upper portion of the enrollment progress meter optionally move, fill in, elongate, and/or change color when the user's head is tilted upwards, which allows the one or more cameras on device 900 to capture image data of the under-side of the user's face. In some examples, device 900 displays progress elements in the enrollment progress meter in an unenrolled state (e.g., the progress elements are greyed out, unchanged).

Face enrollment UI 1114 also includes a text prompt, which instructs the user to move (e.g., rotate and/or tilt) their head in a circular motion during the enrollment process. In some examples, the text prompt is optionally accompanied by tactile and/or auditory prompt depending on device settings and/or user selections. In some examples, device 900 displays the text prompt on face enrollment UI 1114 through the facial enrollment process.

In some examples, instead of automatically initiating a process for enrolling the user's face (and displaying face enrollment UI 1114), electronic device 900 displays enrollment introduction UI 1146 in FIG. 11S in response to determining that electronic device 900 is in a suitable orientation. Enrollment introduction UI 1146 includes a face glyph (e.g., a representation of a biometric feature (e.g., face)), and an enrollment progress meter. The enrollment progress meter includes a set of display elements (e.g., progress elements) that are arranged around the glyph. In some examples, the progress elements includes some or all of the features of the progress elements described above with respect to FIG. 11D. In some examples, to trigger display of face enrollment UI 1114 and proceed with enrollment of the user's face, the user activates continue affordance 1148 on enrollment introduction UI 1146. For example, as shown in FIG. 11S, electronic device 900 detects activation (e.g., selection) of continue affordance 1148 via input 1150 (e.g., tap gesture). In some examples, in response to detecting activation of continue affordance 1148, electronic device 900 initiates the process for enrolling the user's face, as described above with respect to FIG. 11D.

Figure 11G:
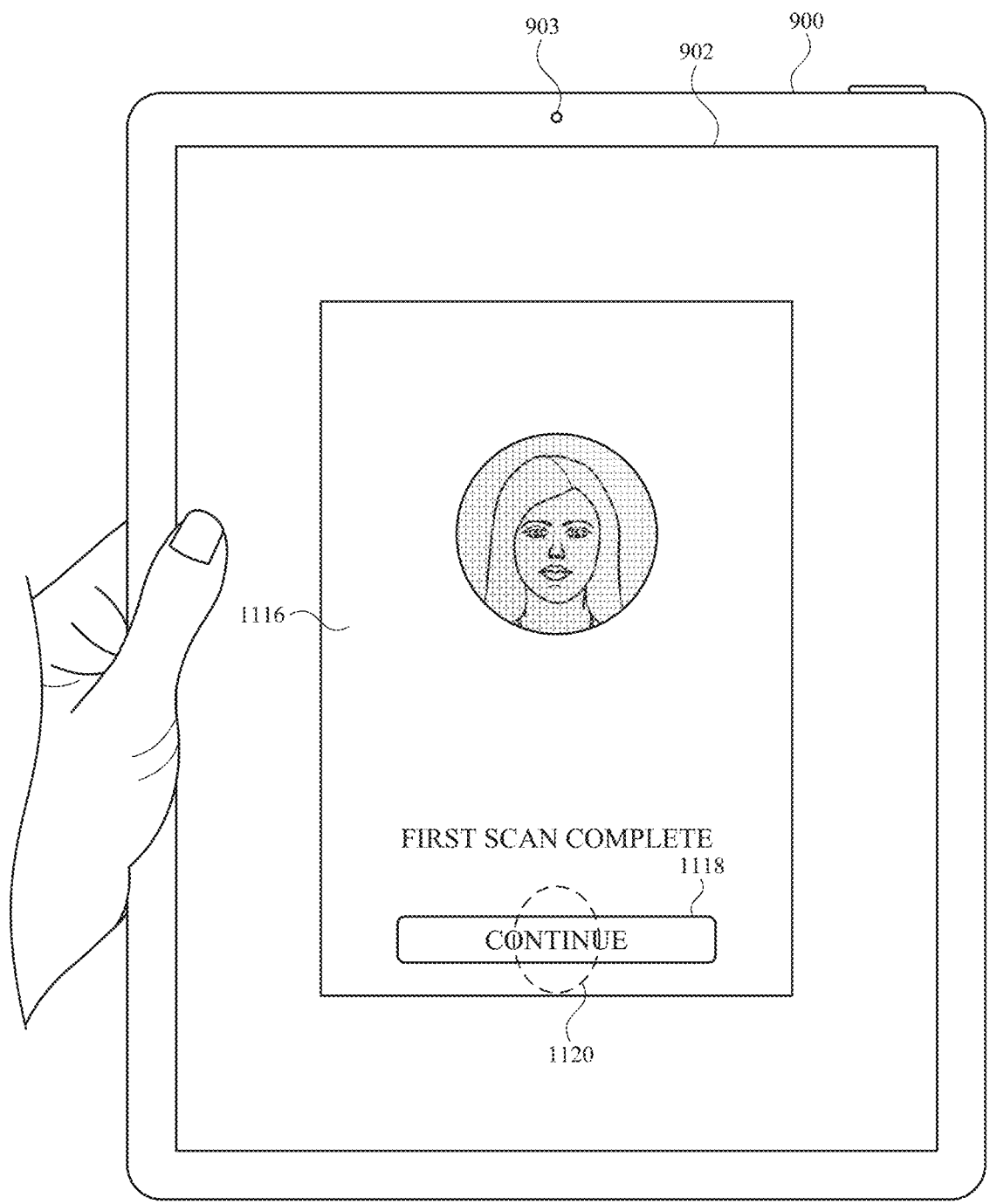

At FIG. 11G, after successfully completing the enrollment of the user's face, electronic device 900 displays (e.g., replaces display of face enrollment UI 1114 with) scan completion interface 1116, which includes continue affordance 1118. Scan completion interface 1116 includes a facial image and a success-state meter. In the example of FIG. 11G, the facial image is blurred, faded, darkened or otherwise obscured to indicate that additional image data is no longer being collected as part of the facial scan. In some examples, the success-state meter is a solid, continuous green circle surrounding the facial image that provides a visual indication that the first scan is complete. To provide a further visual notification, scan completion interface 1116 also includes a text prompt (e.g., a completion message).

After completing enrollment of the user's face, a second iteration of the enrollment process is performed without requiring that the user re-orient the device. As depicted in FIG. 11G, while displaying scan completion interface 1116, electronic device 900 receives input 1120 at continue affordance 1118 to initiate the second iteration of the enrollment process.

Figure 11H:
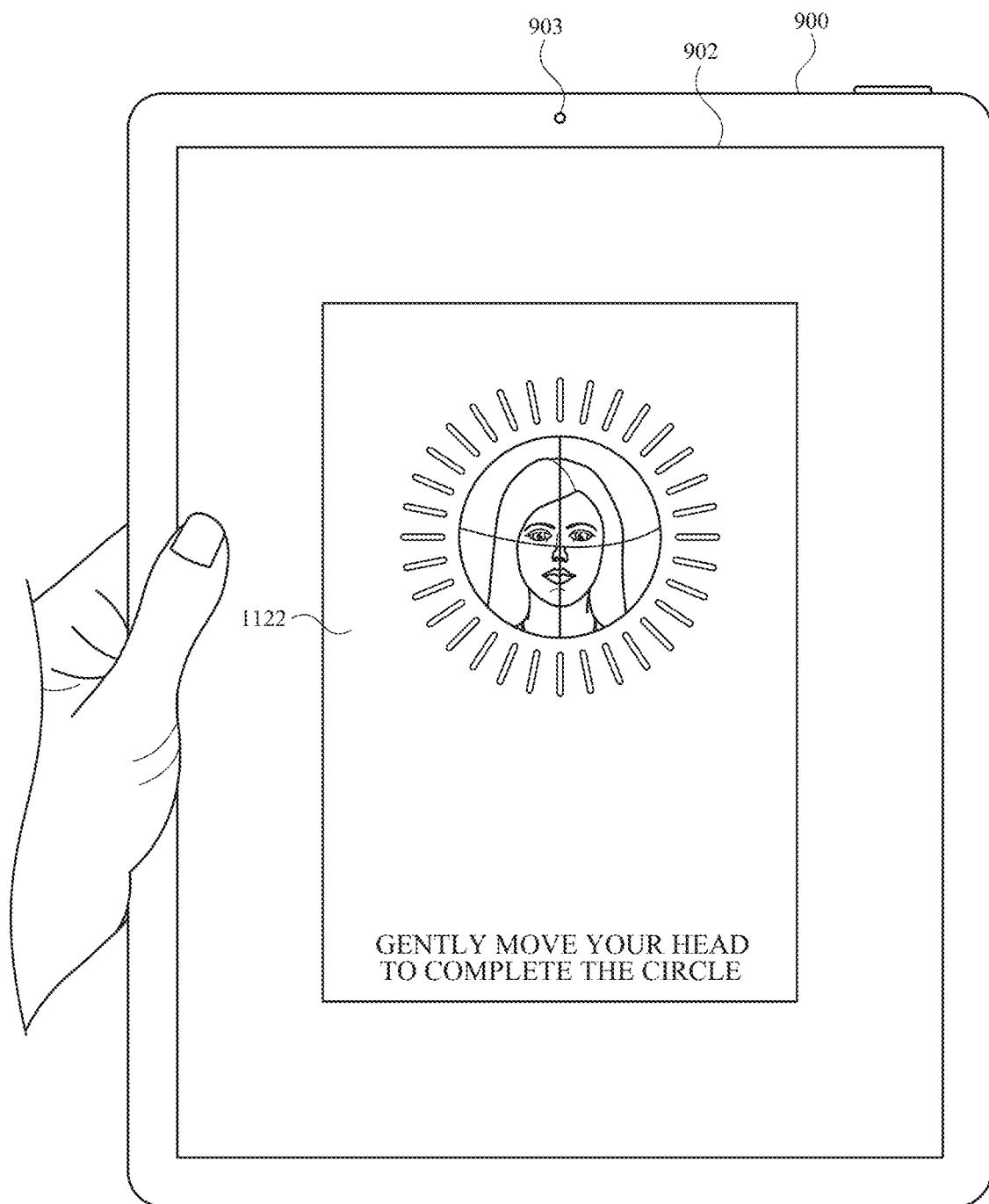

At FIG. 11H, in response to receiving input 1120 at continue affordance 1118, electronic device 900 initiates a second iteration of the enrollment process, analogous to the processes described above with respect to FIGS. 11D-11F. Electronic device 900 initiates the second iteration without prompting the user to re-orient the device to an orientation different from its current orientation. Initiating the second iteration of the enrollment process includes displaying second face enrollment UI 1122. Second face enrollment UI 1122 includes some or all of the features of face enrollment UI 1114.

Figure 11I:
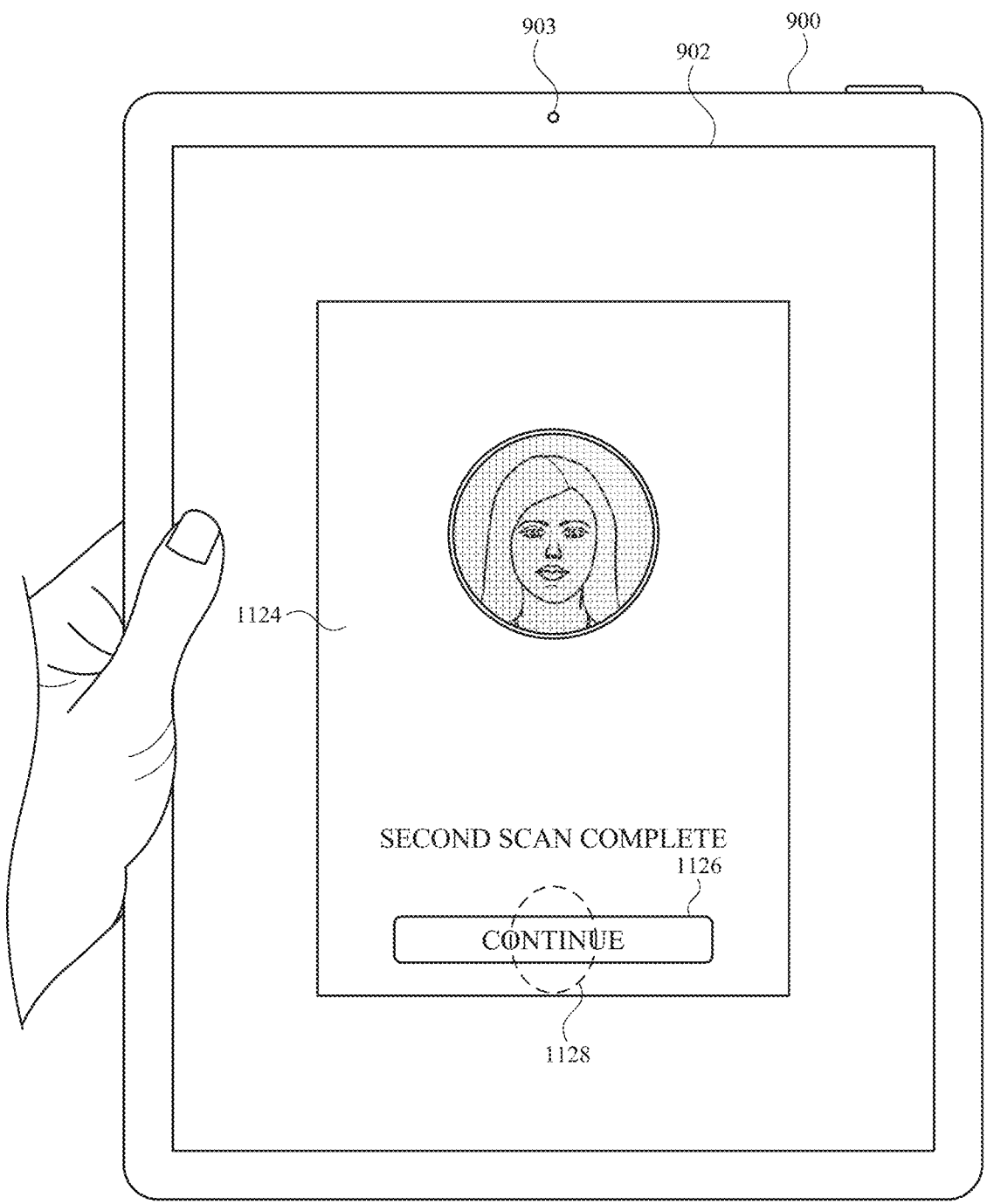

At FIG. 11I, after successfully completing the second iteration of the enrollment process, electronic device 900 displays (e.g., replaces display of second face enrollment UI 1122 with) second scan completion interface 1124, which includes continue affordance 1126. Second scan completion interface 1124 includes some or all of the features of scan completion interface 1116. As illustrated in FIG. 11I, electronic device 900 receives input 1128 at continue affordance 1126.

Figure 11J:
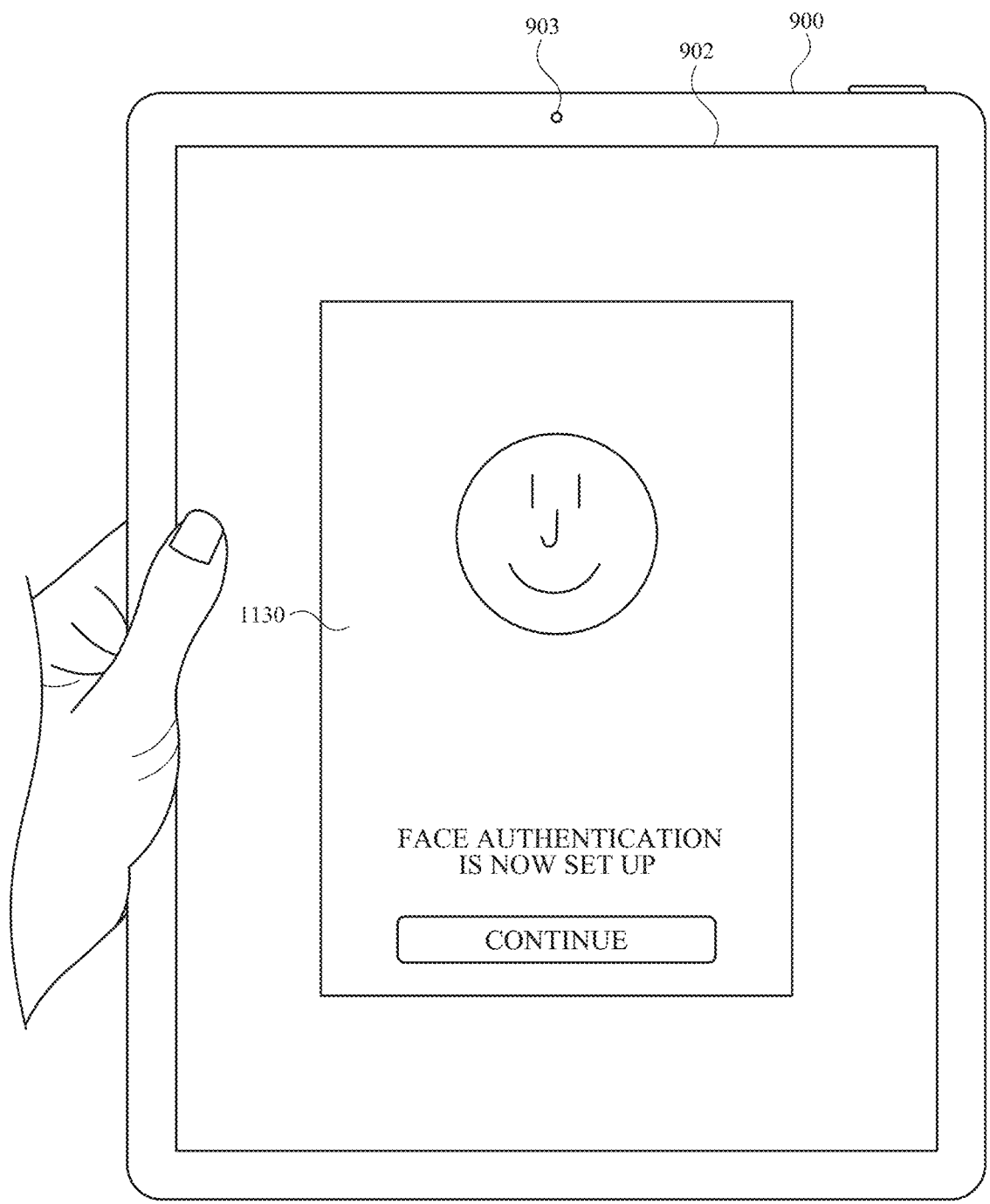

At FIG. 11J, in response to receiving input 1128 at continue affordance 1126, electronic device 900 displays (e.g., replaces display of second scan completion interface 1124 with) enrollment completion interface 1130, providing an indication to the user that biometric authentication has been successfully set up on electronic device 900. Enrollment completion interface 1130 includes a biometric authentication glyph. For example, the biometric authentication glyph is, optionally, a line drawing of all or part of a face (e.g., a stylized face graphic). In the example of FIG. 11J, enrollment completion interface 1130 also includes a text prompt indicating that the enrollment process is complete and face authentication at the device is set-up and/or enabled. In some examples, enrollment completion interface 1130 also includes a completion affordance, activation of which causes device 900 to exit face authentication set-up. In some examples, enrollment completion interface 1130 includes a visual indication (e.g., checkmark) that the enrollment process is complete.

Figure 11K:
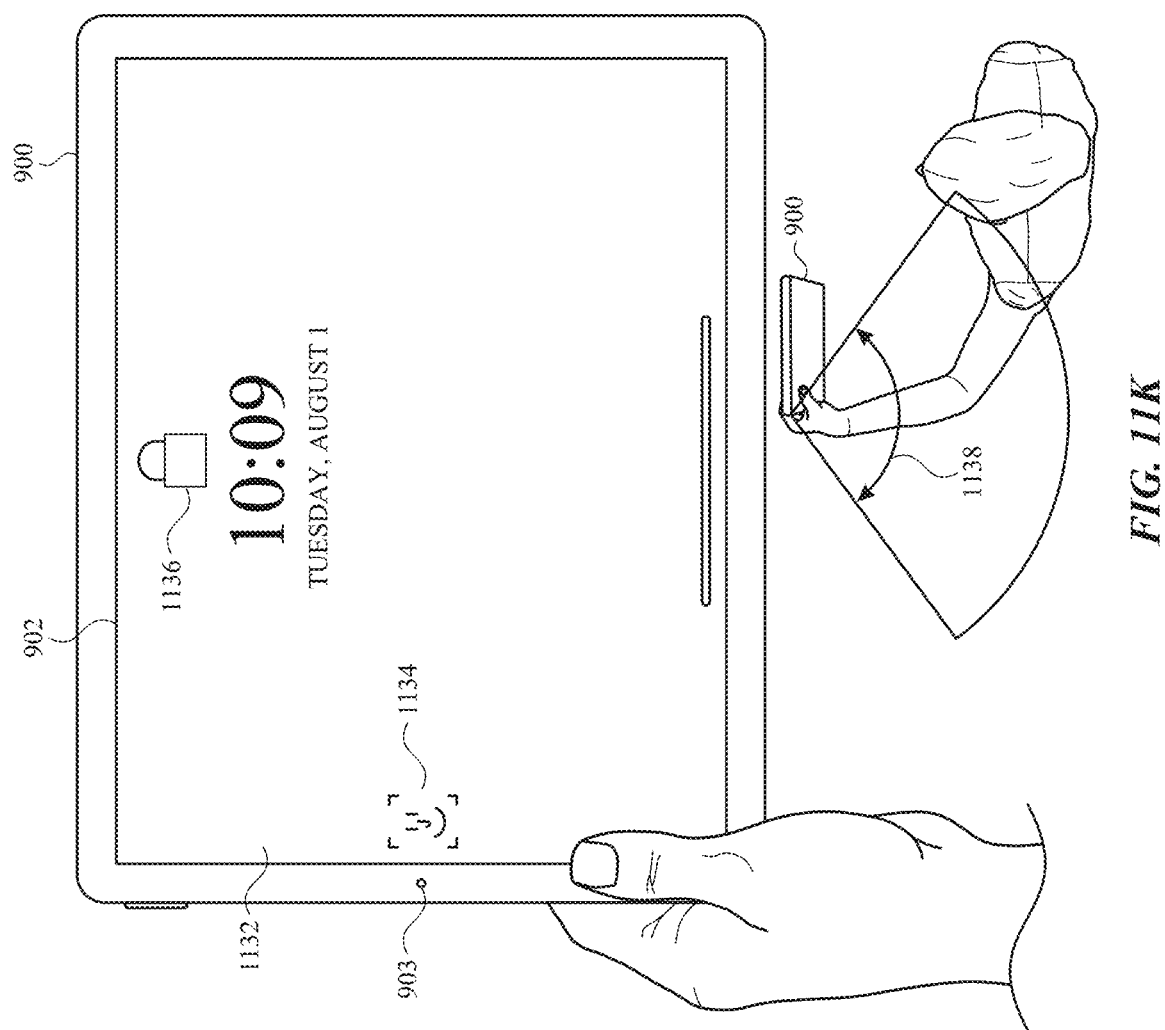

At FIG. 11K, after biometric authentication has been set up on electronic device 900, a user can unlock electronic device 900 (e.g., transition the device from a locked state to an unlocked state) using biometric authentication by presenting the user's face to biometric sensor 903. In some examples, the user initiates biometric authentication to unlock the device by lifting (or raising) electronic device 900 (e.g., from a substantially horizontal orientation). While electronic device 900 is being lifted, electronic device 900 detects a change in orientation of the device, and in response, initiates biometric authentication to unlock the device. It is noted that while electronic device 900 is in a locked state, electronic device 900 displays locked state interface 1132 including biometric sensor indicator 1134, which provides an indication to the user of the location of biometric sensor 903, and lock icon 1136, which provides an indication that electronic device 900 is in a locked state. In some examples, electronic device 900 does not display biometric sensor indicator 1134 while electronic device 900 is in a locked state.

Figure 11L:
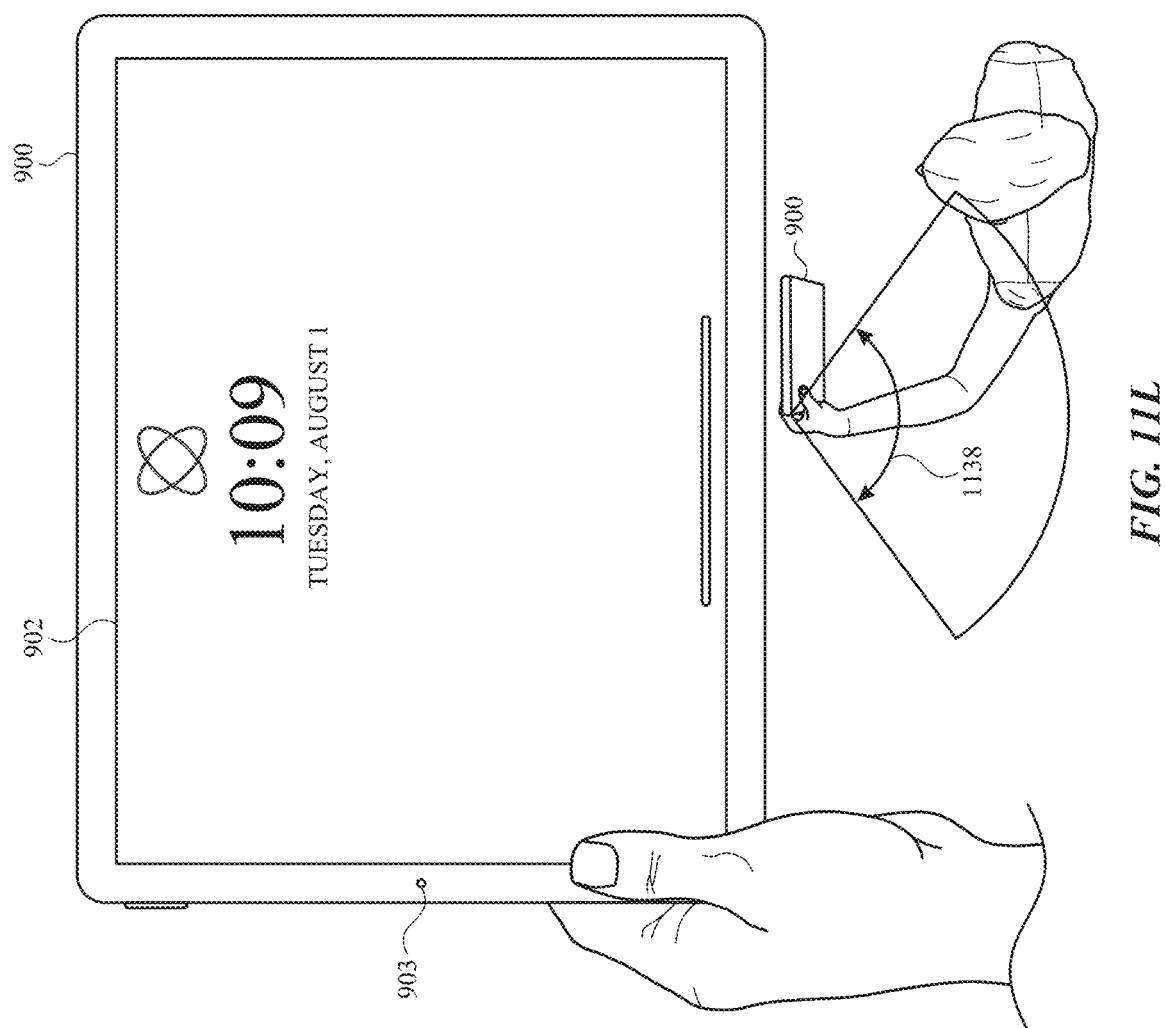

As depicted in FIG. 11L, when electronic device 900 initiates biometric authentication, the user is holding electronic device 900 such that the user's face is outside field of view 1138 of biometric sensor 903. In some examples, the user's face is outside field of view 1138 when more than a threshold portion of the face is outside the field of view. In some examples, the user's face is outside field of view 1138 when no face is detected within the field of view. While attempting to biometrically authenticate the user's face, electronic device 900 is unable to obtain sufficient information about the user's face using biometric sensor 903. As a result, electronic device 900 does not have sufficient information for comparison with the stored authorized credentials, which were generated from the enrollment process described above with respect to FIGS. 11D-11J.

Figure 11M:
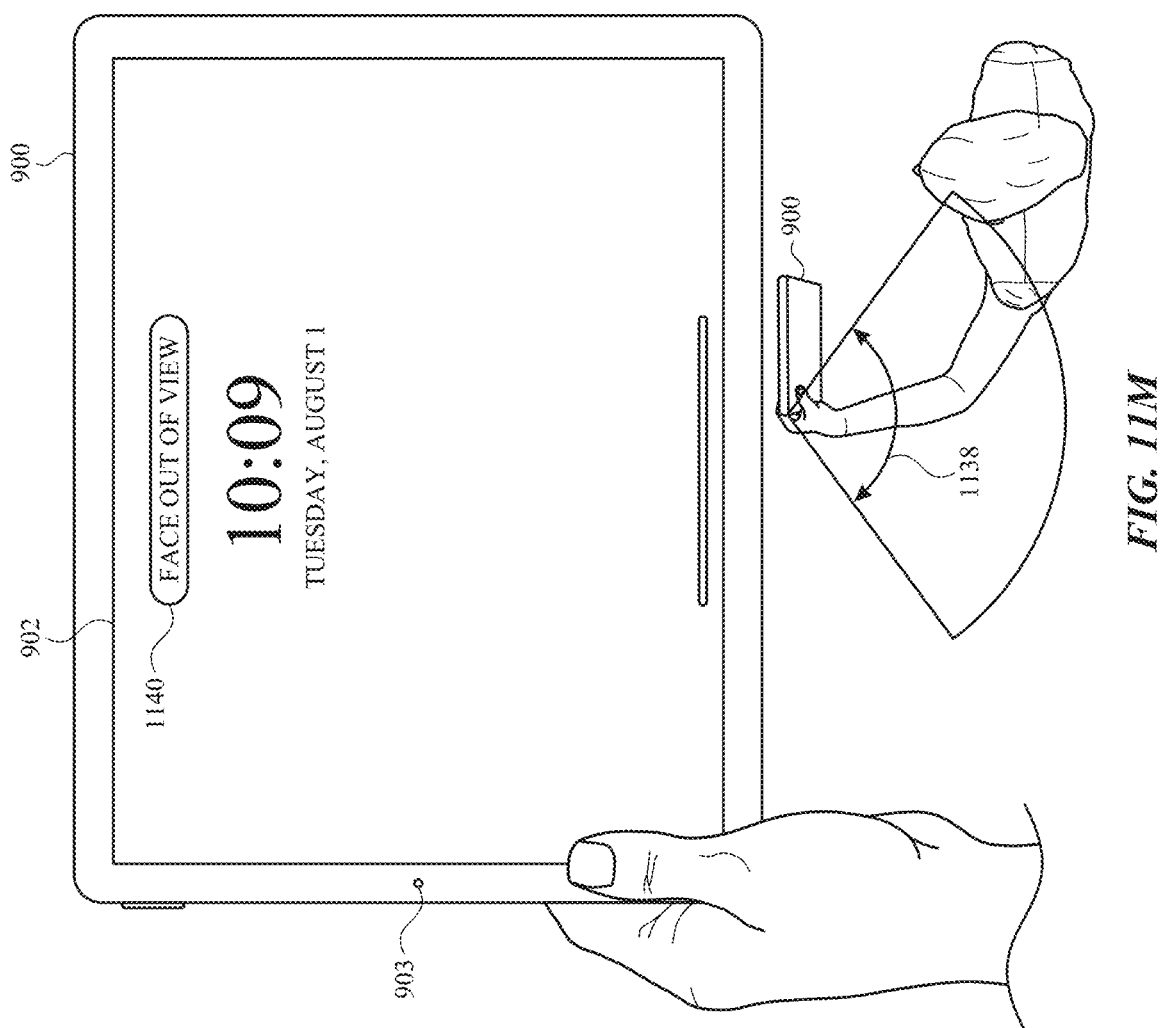

At FIG. 11M, upon determining that the user's face is outside field of view 1138, electronic device 900 displays error indication 1140, which provides an indication to the user that the user's face is outside field of view 1138. (Error indication 1140 includes some or all of the features of error indication 714G.) Additionally, upon determining that the user's face is outside field of view 1138, electronic device 900 does not automatically retry authentication. In some examples, electronic device 900 also displays biometric sensor indicator 1134. In some examples, if sufficient information had been obtained but authentication nevertheless failed (e.g., the obtained information did not match the stored authorized credentials), electronic device 900 automatically retries biometric authentication.

Figure 11N:
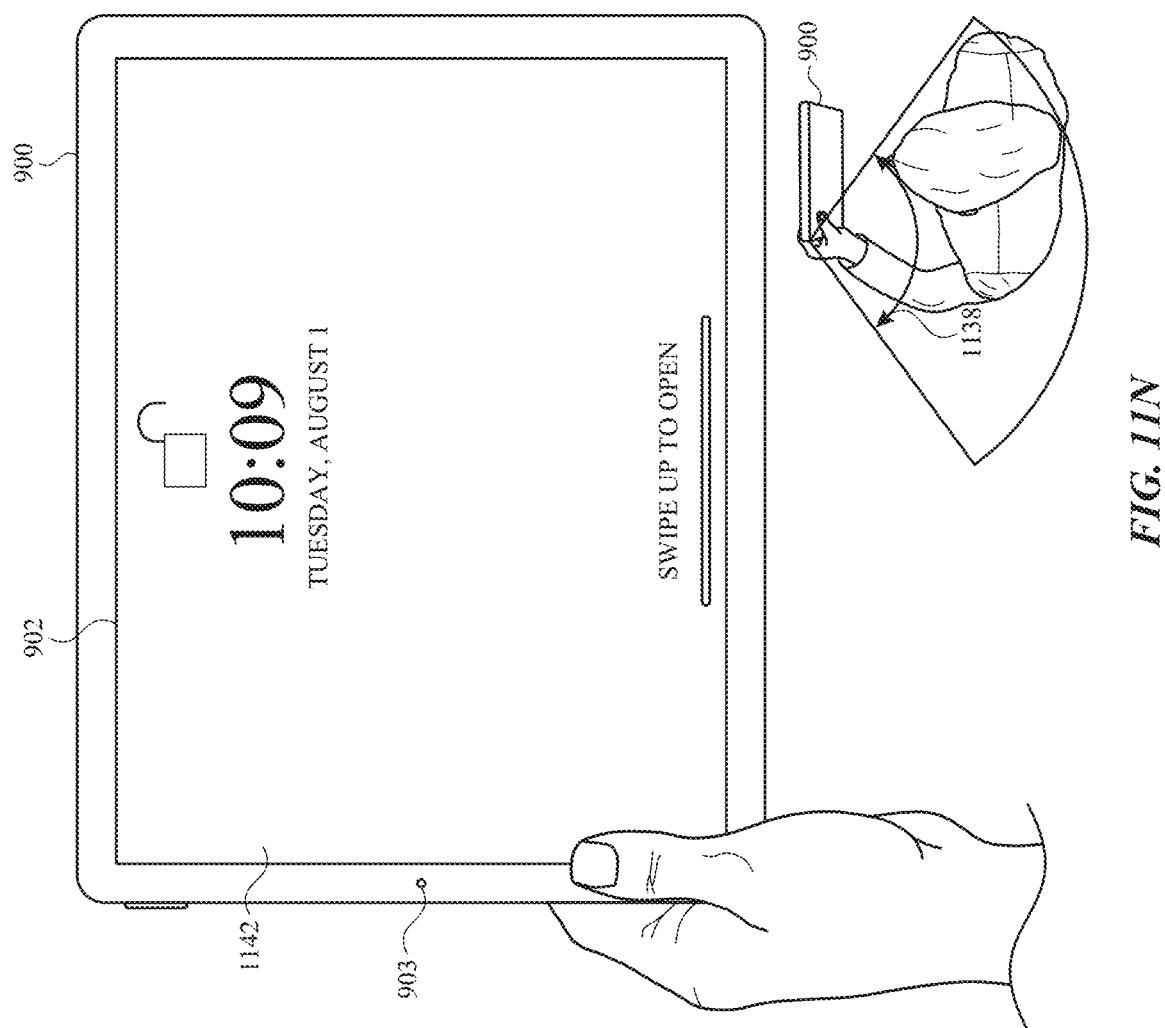
Figure 110:
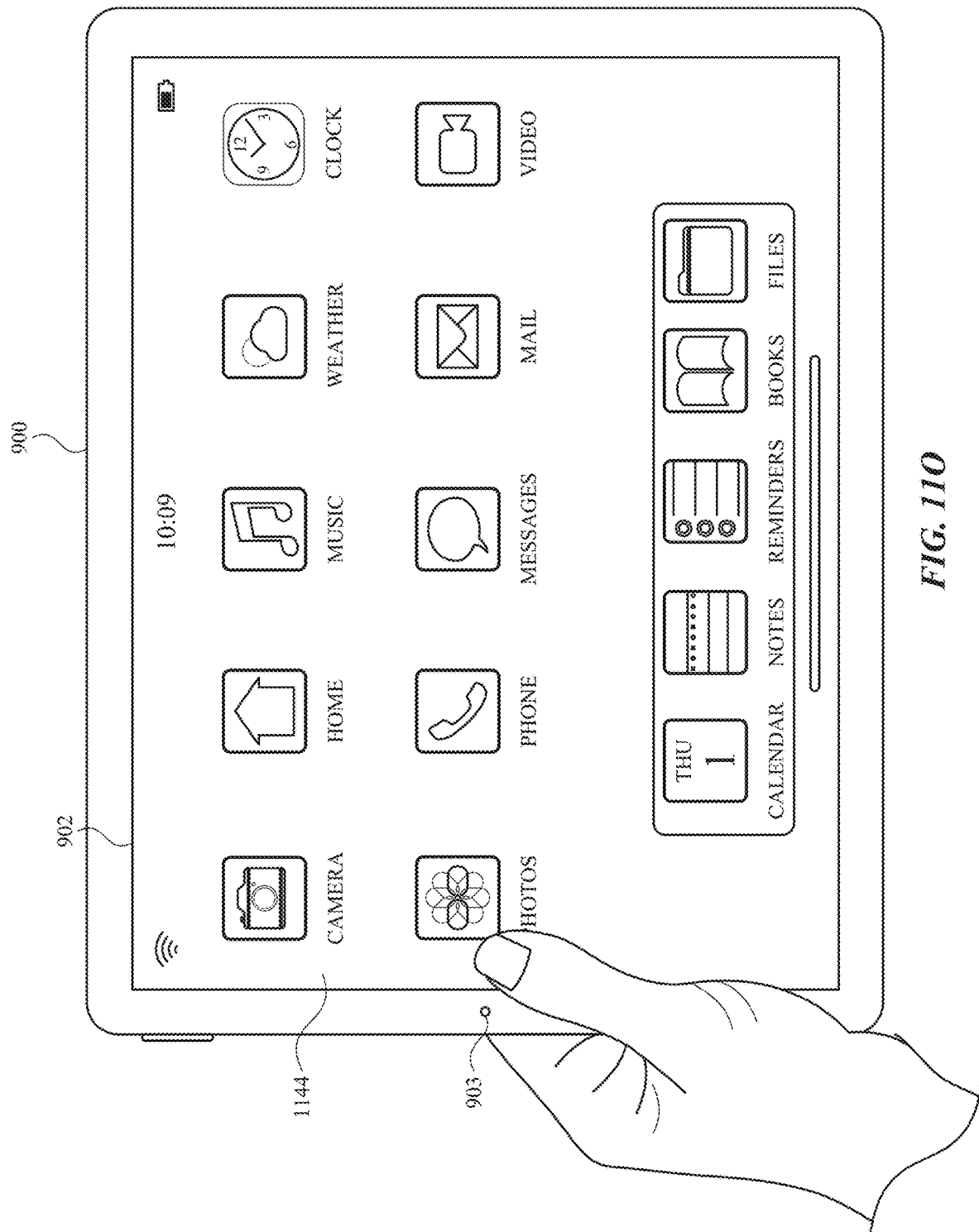

As depicted in FIG. 11N, after learning from error indication 1140 that the user's face is outside field of view 1138 of biometric sensor 903, the user moves her face into field of view 1138 such that the user's face is within field of view 1138. In response to detecting that the cause of error indication 1140 has been corrected (e.g., detects more than a threshold amount of the user's face), electronic device 900 automatically retries biometric authentication. Upon determining that authentication is successful as a result of retrying biometric authentication (e.g., the information obtained using biometric sensor 903 matches the stored authorized credentials), electronic device 900 transitions from a locked state to an unlocked state. After transitioning to the unlocked state, electronic displays unlocked state interface 1142.

In some examples, while displaying unlocked state interface 1142, electronic device 900 receives a request (e.g., an upward swipe starting from within a region adjacent to the bottom edge of display 902) to access restricted content on the device (e.g., home screen 1144 of FIG. 11O, the most recently used application). In response to receiving the request to access restricted content, electronic device 900 displays home screen 1144, including a plurality of icons that, when activated, result in launching an application corresponding to the activated icon. In some examples, instead of displaying home screen 1144, electronic device 900 displays the most recently used application (e.g., a user interface of the application). It is noted that the above processes described above with respect to FIGS. 11K-11O are performed when electronic device 900 is in a landscape orientation. However, in some examples, some or all of the processes described above with respect to FIGS. 11K-11N can be performed when electronic device 900 is in a portrait orientation.

Figure 11P:
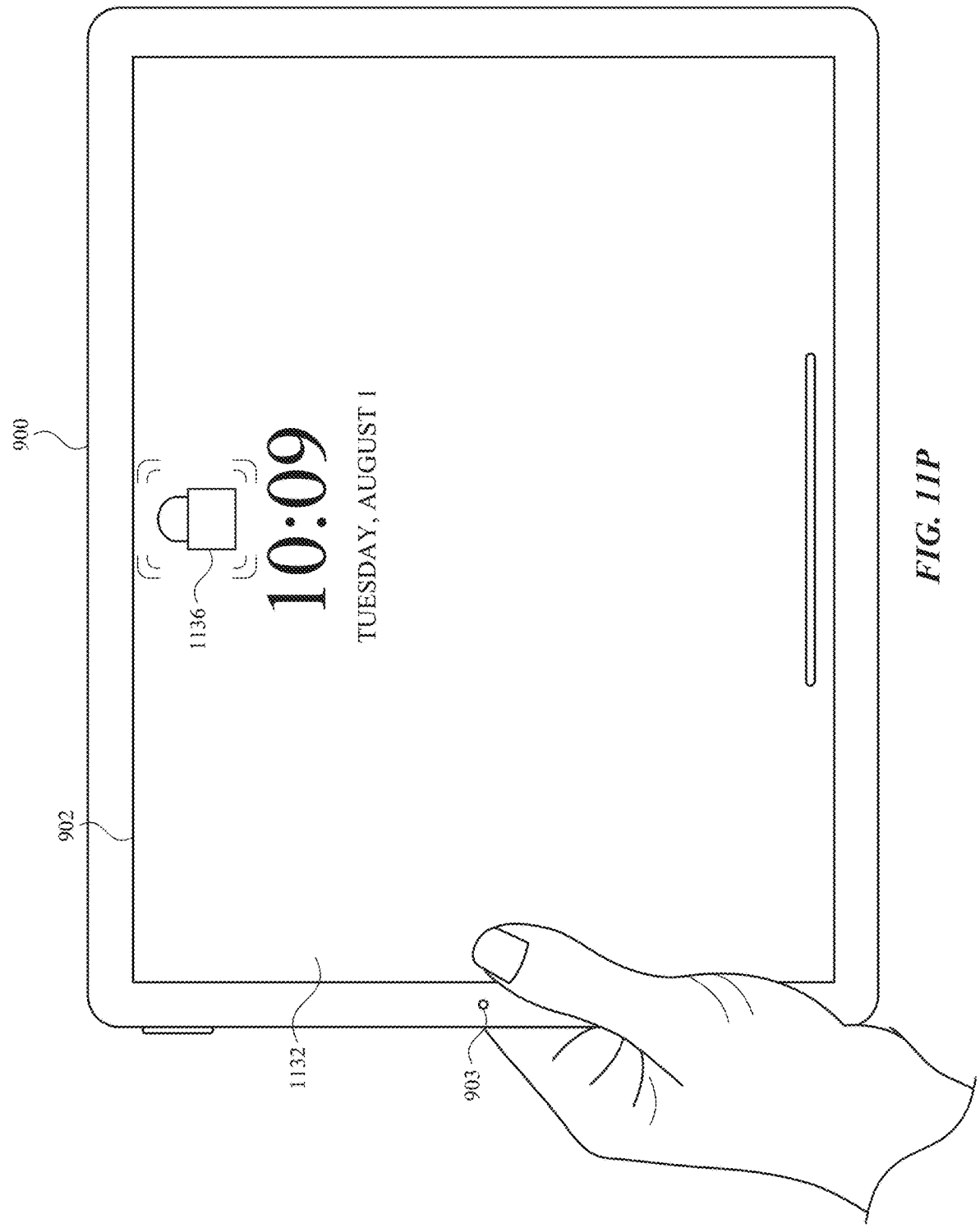
Figure 11Q:
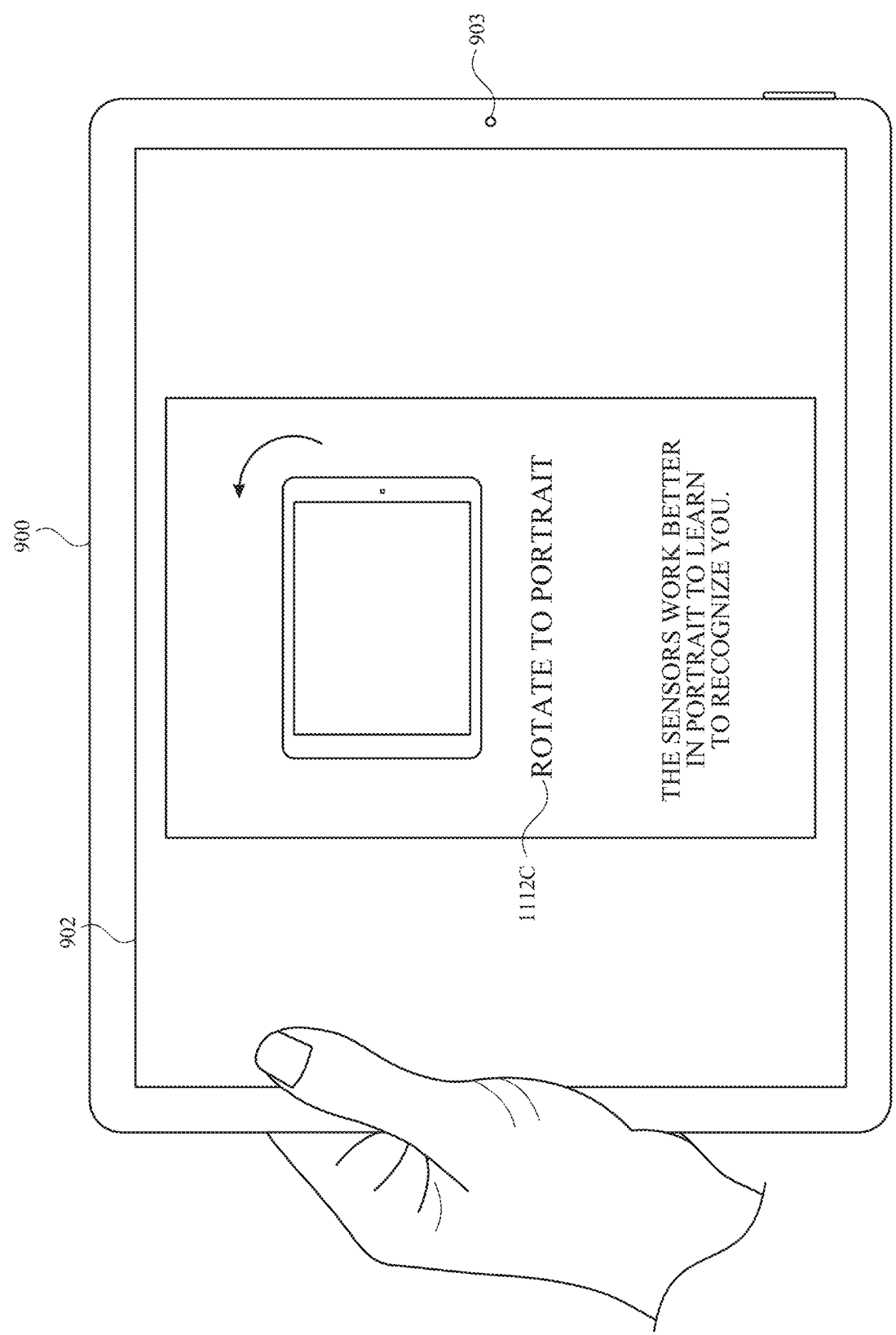
Figure 11R:
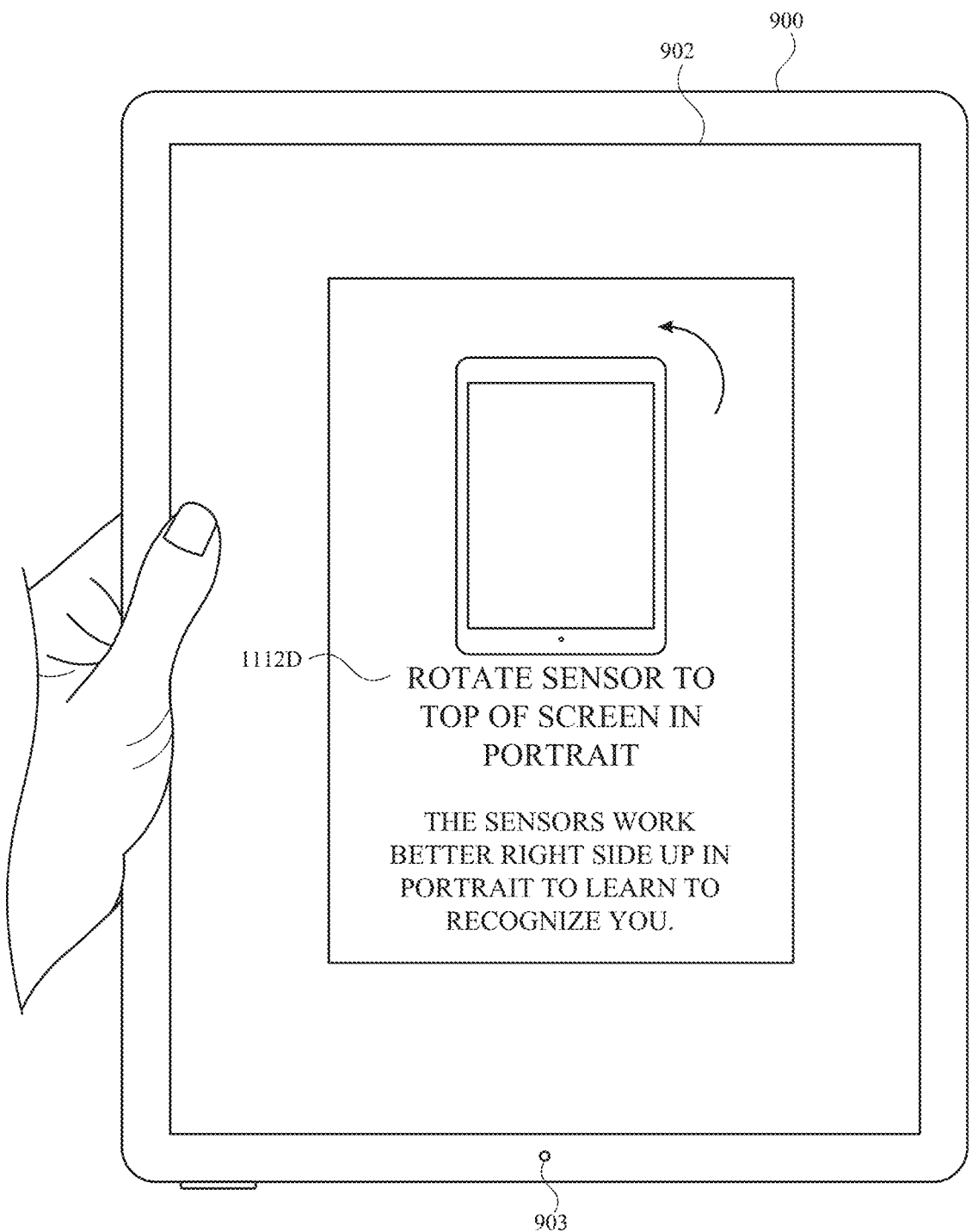

In some examples, instead of transitioning to an unlocked state as described with respect to FIG. 11N, electronic device 900 maintains a locked state if the obtained information does not match the stored authorized credentials. In some examples, as depicted in FIG. 11P, upon determining that the obtained information does not match the stored authorized credentials, electronic device 900 displays locked state interface 1132 while alternating the position of lock icon 1136 such that it simulates a "shake" effect, thereby providing an indication to the user that electronic device 900 remains in a locked state.

FIGS. 12A-12C are flow diagrams illustrating a method for orienting the device to enroll a biometric feature (e.g., a face for later use in biometric authentication), in accordance with some examples. Method 1200 is performed at an electronic device (e.g., 100, 300, 500, 900) with a display (e.g., 902) and one or more biometric sensors (e.g., 903) (e.g., a biometric sensor of a device with a plurality of biometric sensors) (e.g., a fingerprint sensor, a contactless biometric sensor (e.g., a biometric sensor that does not require physical contact, such as a thermal or optical facial recognition sensor), an iris scanner). In some examples, the one or more biometric sensors include one or more cameras. Some operations in method 1200 are, optionally, combined, the orders of some operations are, optionally, changed, and some operations are, optionally, omitted.

As described below, method 1200 provides an intuitive way for prompting a user to orient a device to enroll a biometric feature. The method reduces the cognitive burden on a user for enrolling a biometric feature (e.g., a face for later use in biometric authentication), thereby creating a more efficient human-machine interface. For battery-operated computing devices, enabling a user to enroll a biometric feature faster and more efficiently conserves power and increases the time between battery charges.

The electronic device (e.g., 100, 300, 500, 900) displays (1202), on the display (e.g., 902), a biometric enrollment user interface (e.g., 1106) for initiating biometric enrollment with the one or more biometric sensors.

While displaying (1204) the biometric enrollment user interface, the electronic device receives input (e.g., 1110) (e.g., touch gesture (e.g., tap), spoken user input) corresponding to a request to initiate biometric enrollment.

In response (1206) to receiving the input (e.g., 1110) and in accordance (1208) with a determination that an orientation of the electronic device (e.g., current orientation, an orientation of the electronic device at (or near) the time of the input) satisfies a set of enrollment criteria, the electronic device initiates a process for enrolling a biometric feature with the one or more biometric sensors (e.g., 903). In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. In some examples, the set of enrollment criteria includes whether the electronic device is in a certain (e.g., proper) orientation relative to a biometric feature (e.g., face) (e.g., a primary plane of the device (e.g., a plane defined by the display of the device) is facing the biometric feature). In some examples, initiating a process for enrolling a biometric feature includes capturing data corresponding to a face of a user using the one or more biometric sensors. In some examples, the set of enrollment criteria includes a requirement that the device is in an orientation that is suitable for enrolling a biometric feature for biometric authentication. In some examples, initiating a process for enrolling a biometric feature includes (or triggers) displaying a enrollment user interface (e.g., 1114) for capturing information about a biometric feature.

In response (1206) to receiving the input (e.g., 1110) and in accordance (1222) with a determination that the orientation of the electronic device does not satisfy the set of enrollment criteria, outputting one or more prompts (e.g., 1112A-B) (e.g., a visual, audio and/or tactile prompt) to change the orientation of the electronic device to a different orientation that satisfies the set of enrollment criteria. Outputting one or more prompts when the set of enrollment criteria are not satisfied provides the user with feedback as to what corrective actions to take to continue enrolling a biometric feature. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, outputting the one or more prompts includes outputting (1224) a first prompt (e.g., 1112A) to orient the electronic device to an initial orientation. In some examples, the initial orientation is an orientation such that the electronic device is not approximately parallel with respect to the ground. In some examples, the initial orientation is an orientation such that the electronic device is approximately parallel to the force of gravity. In some examples, the set of enrollment criteria includes a requirement that a primary plane of a device be substantially aligned with a predetermined plane (e.g., a plane that is substantially normal to the ground) such that the display of the device is substantially vertical. In some examples, the set of enrollment criteria includes a requirement that the primary plane of the device is not substantially aligned with a (second) predetermined plane (e.g., a plane that is substantially parallel to the ground) such that the device is not resting on a horizontal surface while attempting to enroll a biometric feature. In some examples, outputting the one or more prompts includes, subsequent to outputting the first prompt (e.g., 1112A), outputting (1226) a second prompt (e.g., 1112B) to orient the electronic device to the different orientation that satisfies the set of enrollment criteria, the first prompt being different from the second prompt. In some examples, the electronic device outputs the first prompt without outputting the second prompt. In some examples, the electronic device ceases outputting the first prompt when the orientation of the electronic device changes to the initial orientation. In some examples, the electronic device outputs the second prompt when the orientation of the electronic device changes to the initial orientation. In some examples, the electronic device outputs the second prompt without outputting the first prompt (e.g., when the electronic device is already in the initial orientation). In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. Outputting the first prompt without outputting the second prompt provides improved feedback to the user as it reduces the chances of confusion when the user is taking corrective actions to trigger enrollment of a biometric feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, outputting the one or more prompts includes outputting a third prompt (e.g., 1112B) to rotate the electronic device (e.g., about an axis perpendicular to the electronic device) to the different orientation that satisfies the set of enrollment criteria, the third prompt being based on the orientation of the electronic device while receiving the input. In some examples, the third prompt is the second prompt. In some examples, in accordance with a determination that the orientation of the electronic device is in a first orientation, the electronic device outputs a first rotation prompt to rotate the electronic device to the different orientation that satisfies the set of enrollment criteria. In some examples, in accordance with a determination that the orientation of the electronic device is in a second orientation that is different from the first orientation, the electronic device outputs a second rotation prompt to rotate the electronic device to the different orientation that satisfies the set of enrollment criteria, the second rotation prompt being different from the first rotation prompt. In some examples, the first rotation prompt or the second rotation prompt is the second prompt. In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. Outputting a prompt based on the orientation of the device provides feedback to the user as to an efficient process for achieving a suitable orientation of the device for enrolling a biometric feature. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, outputting the one or more prompts includes outputting a fourth prompt (e.g., 1112B) to rotate (e.g., along an axis parallel to a primary plane (e.g., a plane defined by the display of the device) of the device) the electronic device (e.g., about an axis perpendicular to the electronic device) to the different orientation that satisfies the set of enrollment criteria, the fourth prompt being based on an alignment of a primary plane of the device (e.g., a plane defined by the display of the device) to a predetermined plane (e.g., a plane that is substantially normal to the ground; a plane that is substantially parallel to the ground). In some examples, the electronic device outputs the fourth prompt in accordance with a determination that the electronic device is oriented substantially parallel to the ground. In some examples, the set of enrollment criteria includes a requirement that a primary plane of a device be substantially aligned with a predetermined plane (e.g., a plane that is substantially normal to the ground) such that the display of the device is substantially vertical. In some examples, the set of enrollment criteria includes a requirement that the primary plane of the device is not substantially aligned with a (second) predetermined plane (e.g., a plane that is substantially parallel to the ground) such that the device is not resting on a horizontal surface while attempting to enroll a biometric feature.

In some examples, the orientation of the electronic device (e.g., 900) does not satisfy the set of enrollment criteria due to the orientation resulting in the one or more biometric sensors (e.g., 903) being located (substantially) near (at or adjacent to) the right side of the electronic device (e.g., located (substantially) to the right of the center of the electronic device). In some examples, the location of the biometric sensor is with respect to the user. In some examples, the one or more prompts (e.g., 1112C) includes an animation of a representation of a device rotating by less than a first amount in a first direction (e.g., approximately 90 degrees counter-clockwise (e.g., to the left)). In some examples, the animation shows the representation rotating counter-clockwise such that the representation ends in a portrait orientation with the representation of a biometric sensor located near the top side of the representation. In some examples, the one or more prompts includes a textual indication and/or a pictorial illustration of the direction (and/or amount (e.g., degrees)) in which to rotate the device. Displaying an animation of a representation of a device rotating provides the user with feedback as to what corrective action to take to continue enrolling a biometric feature. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the orientation of the electronic device (e.g., 900) does not satisfy the set of enrollment criteria due to the orientation resulting in the one or more biometric sensors (e.g., 903) being located (substantially) near (at or adjacent to) the left side of the electronic device (e.g., located (substantially) to the left of the center of the electronic device. In some examples, the location of the biometric sensor is with respect to the user. In some examples, the one or more prompts (e.g., 1112B) includes an animation of a representation of a device rotating by less than the first amount in a second direction that is different from the first direction (e.g., approximately 90 degrees clockwise (e.g., to the right). In some examples, the animation shows the representation rotating clockwise such that the representation ends in a portrait orientation with the representation of a biometric sensor located near the top side of the representation. In some examples, the one or more prompts includes a textual indication and/or a pictorial illustration of the direction (and/or amount (e.g., degrees)) in which to rotate the device.

In some examples, the orientation of the electronic device (e.g., 900) does not satisfy the set of enrollment criteria due to the orientation resulting in the one or more biometric sensors (e.g., 903) being located (substantially) near (at or adjacent to) the bottom side of the electronic device (e.g., located (substantially) below the center of the electronic device). In some examples, the location of the biometric sensor is with respect to the user. In some examples, the one or more prompts (e.g., 1112D) includes an animation of a representation of a device rotating by more than the first amount (e.g., rotating upside down or approximately 180 degrees either clockwise or counterclockwise (e.g., to the right or to the left). In some examples, the animation shows the representation rotating clockwise or counter-clockwise 180 degrees such that the representation ends in a portrait orientation with the representation of a biometric sensor located near the top side of the representation. In some examples, the one or more prompts includes a textual indication and/or a pictorial illustration of the direction (and/or amount (e.g., degrees)) in which to rotate the device.

In some examples, subsequent to outputting the one or more prompts (e.g., 1112B-D) to change the orientation of the electronic device to a different orientation that satisfies the set of enrollment criteria, the electronic device detects a change in orientation of the electronic device. In some examples, in response to detecting the change in orientation of the electronic device: in accordance with a determination that the orientation of the electronic device still does not satisfy the set of enrollment criteria, the electronic device outputs one or more new prompts (e.g., 1112B-D) to change the orientation of the electronic device to a different orientation that satisfies the set of enrollment criteria. In some examples, the one or more new prompts (e.g., 1112B-D) are different from the one or more prompts described above. In some examples, the one or more new prompts (e.g., 1112B-D) can include any one of the animations described above (e.g., rotate clockwise, rotate counter-clockwise, rotate 180 degrees). In some examples, in response to detecting the change in orientation of the electronic device: in accordance with a determination that the orientation of the electronic device satisfies the set of enrollment criteria, the electronic device initiates a process for enrolling a biometric feature with the one or more biometric sensors, such as by displaying a biometric enrollment introduction interface (e.g., 1146).

In some examples, subsequent to initiating the process for enrolling the biometric feature (e.g., subsequent to successfully enrolling a biometric feature), the electronic device (e.g., 100, 300, 500, 900) receives a request to perform an operation that requires authentication (e.g., a request to unlock the device (e.g., perform a swipe at a predefined location)). In some examples, the electronic device receives the request to perform the operation that requires authentication subsequent to performing (or completing) biometric enrollment. In some examples, the electronic device receives the request to perform the operation that requires authentication subsequent to outputting the one or more prompts (e.g., 1112A-B) (e.g., a visual, audio and/or tactile prompt) to change the orientation of the electronic device to the different orientation that satisfies the set of enrollment criteria. In some examples, in response to receiving the request to perform the operation that requires authentication, the electronic device attempts authentication using the one or more biometric sensors (e.g., 903) (e.g., that includes obtaining data by the one or more biometric sensors). In some examples, after attempting (e.g., unsuccessfully attempting) authentication using the one or more biometric sensors and in accordance with a determination that data obtained by the one or more biometric sensors corresponds to less than a threshold amount of a biometric feature (e.g., part of a face/fingerprint, not a whole face/fingerprint) (e.g., due to the face being outside the field of view (e.g., 1138), the electronic device forgoes retrying authentication. In some examples, the electronic device forgoes automatically retrying authentication. In some examples, after attempting authentication using the one or more biometric sensors, the electronic device forgoes retrying authentication due to biometric authentication having failed more than a predetermined number of times (e.g., 5, 10, 15) since the last successful authentication with the device. In some examples, the electronic device forgoes retrying authentication without an explicit request to perform an operation that requires authentication (e.g., a request to unlock the device (e.g., perform a swipe at a predefined location)). In some examples, after an initial attempt at authentication does not succeed, the electronic device retries biometric authentication if a determination is not made that data obtained by the one or more biometric sensors corresponds to only a portion of a biometric feature. Forgoing retrying authentication when less than a threshold amount of a biometric feature is obtained avoids the user consuming the permitted number of attempts on repeated requests (e.g., repeated requests of the same type), thereby conserving at least one attempt for requests for other operations that require biometric authentication. Conserving at least one attempt enhances the operability of the device and makes the user-device interface more efficient (e.g., by avoiding exhaustion of authentication attempts on repeated, similar requests) which, additionally, reduces power usage and improves battery life of the device by enabling the user to use the device more quickly and efficiently.

In some examples, after attempting (e.g., unsuccessfully attempting) authentication using the one or more biometric sensors and in accordance with a determination that the data obtained by the one or more biometric sensors corresponds to not less (e.g., more) than the threshold amount of the biometric feature, the electronic device retries authentication. Automatically retrying authentication when a threshold amount of the biometric feature is obtained provides the user the ability to attempt authentication when the conditions are appropriate without requiring the user to explicitly request retrying authentication. Performing an operation when a set of conditions has been met without requiring further user input enhances the operability of the device (e.g., increases the chances of successful authentication) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, in accordance with a determination that authentication resulting from retrying authentication is successful, the electronic device (e.g., 100, 300, 500, 900) performs an operation corresponding to the request. In some examples, in accordance with a determination that authentication resulting from retrying authentication is not successful, the electronic device forgoes performing the operation corresponding to the request. In some examples, authentication is successful when the biometric information captured using the one or more biometric sensors corresponds to (or matches) authorized credentials (e.g., stored information about a biometric feature (e.g., face, fingerprint) that are authorized for use in biometric authentication). In some examples, authentication is unsuccessful when the biometric information captured using the one or more biometric sensors does not correspond to (or match) authorized credentials (e.g., stored information about a biometric feature (e.g., face, fingerprint) that are authorized for use in biometric authentication). Forgoing performing the operation when authentication is not successful enhances device security by preventing fraudulent and/or unauthorized access to the device. Improving security measures of the device enhances the operability of the device by preventing unauthorized access to content and operations and, additionally, reduces power usage and improves battery life of the device by enabling the user to use the device more efficiently.

In some examples, subsequent to outputting the one or more prompts (e.g., 1112A-B) (e.g., a visual, audio and/or tactile prompt) to change the orientation of the electronic device to the different orientation that satisfies the set of enrollment criteria, the electronic device (e.g., 100, 300, 500, 900) detects (1228) that the current orientation of the electronic device satisfies the set of enrollment criteria. In some examples, in response (1230) to determining that the current orientation of the electronic device satisfies the set of enrollment criteria, the electronic device initiates the process for enrolling the biometric feature with the one or more biometric sensors. In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. In some examples, the set of enrollment criteria includes a requirement that a primary plane of a device be substantially aligned with a predetermined plane (e.g., a plane that is substantially normal to the ground) such that the display of the device is substantially vertical. In some examples, the set of enrollment criteria includes a requirement that the primary plane of the device is not substantially aligned with a (second) predetermined plane (e.g., a plane that is substantially parallel to the ground) such that the device is not resting on a horizontal surface while attempting to enroll a biometric feature. In some examples, the set of enrollment criteria includes whether the electronic device is in a certain (e.g., proper) orientation relative to a biometric feature (e.g., face) (e.g., a primary plane of the device (e.g., a plane defined by the display of the device) is facing the biometric feature).

In some examples, initiating the process for enrolling a biometric feature with the one or more biometric sensors includes displaying a biometric enrollment introduction interface (e.g., 1146). In some examples, the biometric enrollment interface includes concurrently displaying a representation of a simulation of a biometric feature and a simulated progress indicator.

In some examples, initiating the process for enrolling the biometric feature with the one or more biometric sensors includes successfully enrolling the biometric feature. In some examples, subsequent to successfully enrolling the biometric feature, the electronic device (e.g., 100, 300, 500, 900) outputs (1212) a prompt (e.g., corresponding to 1122) to enroll the biometric feature for a second time with the one or more biometric sensors. In some examples, the electronic device outputs the prompt to enroll the biometric feature without prompting to change the orientation of the electronic device.

In some examples, initiating the process for enrolling the biometric feature with the one or more biometric sensors includes (1210) successfully enrolling the biometric feature. In some examples, subsequent to successfully enrolling the biometric feature, the electronic device (e.g., 100, 300, 500, 900) receives (1214) a request to perform an operation that requires authentication (e.g., a request to unlock the device (e.g., perform a swipe at a predefined location), request to access home screen (e.g., 1144)). In some examples, in response (1216) to receiving the request to perform the operation that requires authentication and in accordance (1218) with a determination that data obtained by the one or more biometric sensors corresponds to (e.g., matches) the enrolled biometric feature, the electronic device performs the operation that requires authentication. In some examples, in response to receiving the request to perform the operation that requires authentication, the electronic device performs authentication (or attempts to authenticate) using the one or more biometric sensor (e.g., 903). In some examples, in response (1216) to receiving the request to perform the operation that requires authentication and in accordance (1220) with a determination that data obtained by the one or more biometric sensors does not correspond to (e.g., does not match) the enrolled biometric feature, the electronic device forgoes performing the operation that requires authentication.

FIGS. 13A-13Z illustrate exemplary user interfaces for prompting a user to correct an error condition that is detected while attempting to biometrically authenticate the user, in accordance with some examples. The user interfaces in these figures are used to illustrate the processes described below, including the processes in FIGS. 14A-14B.

FIG. 13A illustrates electronic device 900 (e.g., portable multifunction device 100, device 300, device 500). In the exemplary examples illustrated in FIGS. 13A-13Z, electronic device 900 is a tablet computer. In other examples, electronic device 900 can be a different type of electronic device, such as a smartphone (e.g., electronic device 700). Electronic device 900 includes display 902, one or more input devices (e.g., touchscreen of display 902, button 904, and a microphone), a wireless communication radio, and biometric sensor 903. Electronic device 900 includes biometric sensor 903. In some examples, biometric sensor 903 includes one or more biometric sensors that can include a camera, such as an infrared camera, a thermographic camera, or a combination thereof. In some examples, biometric sensor 903 includes some or all of the features of biometric sensor 703. In some examples, biometric sensor 903 includes one or more fingerprint sensors (e.g., a fingerprint sensor integrated into a button). In some examples, electronic device 900 further includes a light-emitting device (e.g., light projector), such as an IR flood light, a structured light projector, or a combination thereof. The light-emitting device is, optionally, used to illuminate the biometric feature (e.g., the face or an iris) during capture of biometric data of biometric features by biometric sensor 903. In some examples, electronic device 900 includes a plurality of cameras separate from biometric sensor 903. In some examples, electronic device 900 includes only one camera separate from biometric sensor 903.

FIGS. 13A-13J illustrate a scenario where electronic device 900 detects an error condition while attempting to unlock the device using biometric sensor 903. A user wishes to access restricted content on electronic device 900. For example, the restricted content can be home screen 1324A of FIG. 13G, the most recently used application, or the content associated with notifications 1306, 1308, and/or 1310. To access the restricted content, the user must unlock the device, which requires successful authentication of the user.

To initiate the process of accessing restricted content on electronic device 900, the user lifts (or raises) electronic device 900 (e.g., from a substantially horizontal orientation to the orientation of the device as depicted in the user's hand in FIG. 13A). Due to the change in orientation of the device, electronic device 900 detects (e.g., via accelerometer 168) a request to perform an operation that requires authentication (e.g., a request to unlock the device). In response to detecting the request to unlock the device, electronic device 900 attempts to biometrically authenticate the user using biometric sensor 903. Attempting to biometrically authenticate the user using biometric sensor 903 includes attempting to capture information about a potentially valid biometric feature (e.g., a biometric feature that can be used for biometric authentication) using biometric sensor 903 and/or determining whether the captured information about the potentially valid biometric feature corresponds to, or matches, stored authorized credentials (e.g., a biometric template).

As depicted in FIG. 13A, the user's face is not substantially facing biometric sensor 903, largely due to the orientation in which electronic device 900 is being held. In particular, the orientation of the device results in biometric sensor 903 being located adjacent to the bottom edge of electronic device 900 (e.g., with respect to the user) and having only a partial view of the user's face, due to the angle of the device relative to the user (e.g., the chin and nose of the user are visible to the sensor from the bottom of the user's face, but the eyes and mouth are not visible or are visible at an angle that makes it difficult to consistently recognize the features when the face was enrolled from an angle where the eyes and mouth were closer to being directly facing the camera). While attempting to biometrically authenticate the user using biometric sensor 903, electronic device 900 detects that an error condition has occurred. In some examples, detecting that an error condition has occurred requires determining that a potentially valid biometric feature is not substantially facing biometric sensor 903. For example, electronic device 900 detects the presence of a face, but determines that the face is directed to a location that is substantially above biometric sensor 903. Given the orientation of the face, biometric sensor 903 can capture some information about the face. For example, biometric sensor 903 captures information about the lower portion of the face (e.g., chin, bottom of the nose, etc.), but not the upper portion (e.g., eyes, eyebrows, upper portion of the nose, etc.). However, electronic device 900 does not use this information to biometrically authenticate the user (e.g., determine whether the captured information matches stored authorized credentials). In some examples, electronic device 900 does not use this information for biometrically authenticating the user because information captured while the face is not substantially facing biometric sensor 903 is highly correlated with degradation or reduced accuracy of the captured information.

In some examples, detecting that the error condition has occurred requires determining that electronic device 900 is in an orientation that results in biometric sensor 903 being located adjacent to the bottom edge of the device (e.g., with respect to the user). In some examples, detecting that the error condition has occurred requires detecting that display 902 is on (e.g., active). In other words, if electronic device 900 detects that display 902 is off (e.g., inactive), electronic device 900 will not detect an error condition even if biometric sensor 903 is occluded. In some examples, detecting that the error condition has occurred requires detecting a request to unlock the device. In some examples, a request to unlock the device is, or includes, a request to initiate (or attempt) biometric authentication. In some examples, detecting that the error condition has occurred requires determining that a maximum (e.g., threshold) number of failed biometric authentication attempts has not been reached (e.g., at least one biometric authentication attempt is available).

In some examples, if a maximum number of failed attempts has been reached, the device does not perform biometric authentication until successful non-biometric authentication (e.g., passcode authentication) has been performed. In some examples, a request to perform an operation that requires authentication (e.g., a request to unlock the device) after the maximum number of failed biometric authentication attempts has been reached triggers display of an alternative authentication user interface (e.g., passcode entry UI 1320A).

At FIG. 13A, in response to detecting that the error condition has occurred, electronic device 900 maintains a locked state. Because electronic device 900 is in a locked state, the user is unable to access the restricted content. Electronic device 900 displays locked state UI 1300A with lock icon 1302, which provides an indication that the device is in a locked state.

Further in response to detecting that an error condition has occurred, electronic device 900 initially displays location indication 1304A (e.g., location indication 1304A was not displayed prior to detecting the error condition). Electronic device 900 displays location indication 1304A adjacent to lock icon 1302. Location indication 1304A includes an indication of a user action that can be performed to correct the detected error condition (e.g., for a subsequent biometric authentication attempt). In some examples, location indication 1304A includes an indication of the location of biometric sensor 903 on the device. In some examples, location indication 1304A includes a visual indication (e.g., text, arrow) describing or indicating the location of biometric sensor 903. For example, location indication 1304A can be an animated arrow, as described below with respect to location indication 1318 in FIGS. 13C-13D.

Figure 13B:
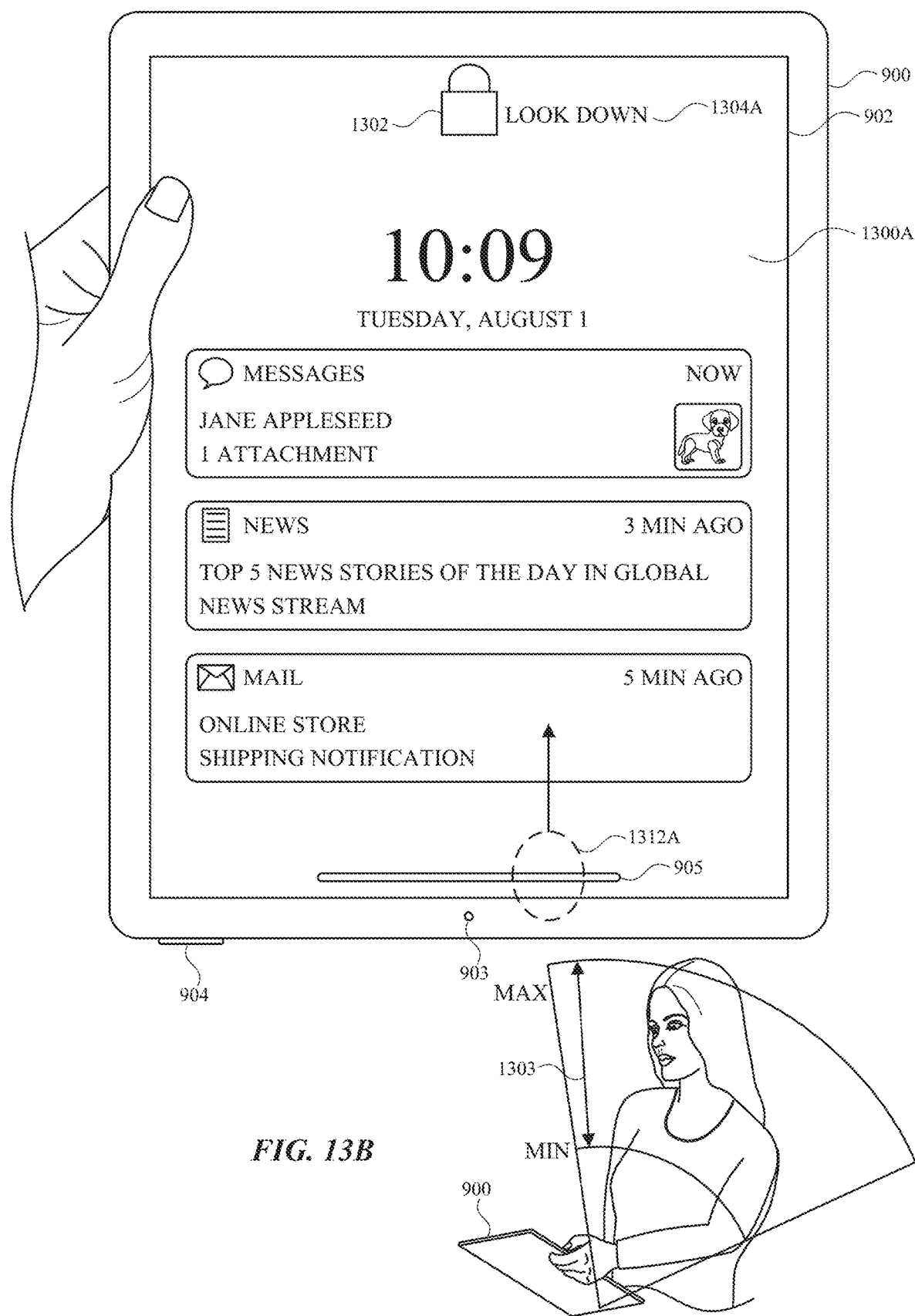

At FIG. 13B, the user still wishes to access restricted content on electronic device 900, so the user attempts to unlock the device via a swipe gesture despite not having corrected the error condition. Electronic device 900 displays unlock indication 905 in a predefined region adjacent to the bottom edge of display 902 (e.g., with respect to the user). Unlock indication 905 provides an indication of an approximate location on display 902 from which a user can start an upward swipe gesture to attempt to unlock the electronic device.

While displaying locked state UI 1300A with location indication 1304A, electronic device 900 detects a request to unlock the electronic device. Detecting a request to unlock the device includes receiving input 1312A starting at a location of display 902, and determining that input 1312A is an upward swipe gesture that starts within a predefined region adjacent to the bottom edge of display 902.

Figure 13C:
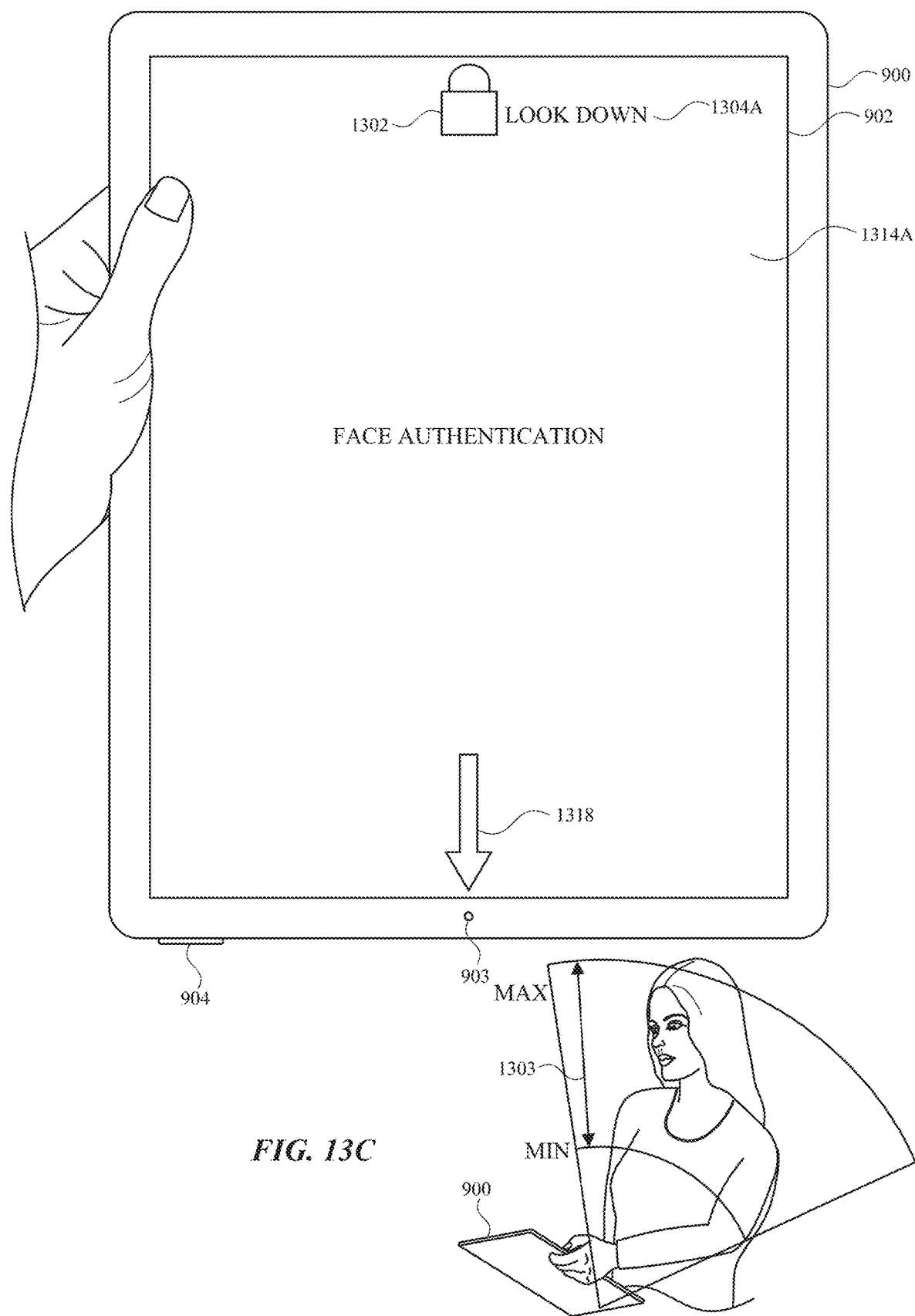

At FIG. 13C, in response to detecting the request to unlock the device, electronic device 900 displays (e.g., replaces display of locked state UI 1300A with) interstitial interface 1314A. Interstitial interface 1314A indicates to the user that electronic device 900 has not yet completed biometric authentication (e.g., is attempting to biometrically authenticate the user using biometric sensor 903). Displaying interstitial interface 1314A includes ceasing to display unlock indication 905. In some examples, displaying interstitial interface 1314A includes sliding the locked state UI 1300A in an upward direction to display (e.g., reveal) interstitial interface 1314A.

Figure 13D:
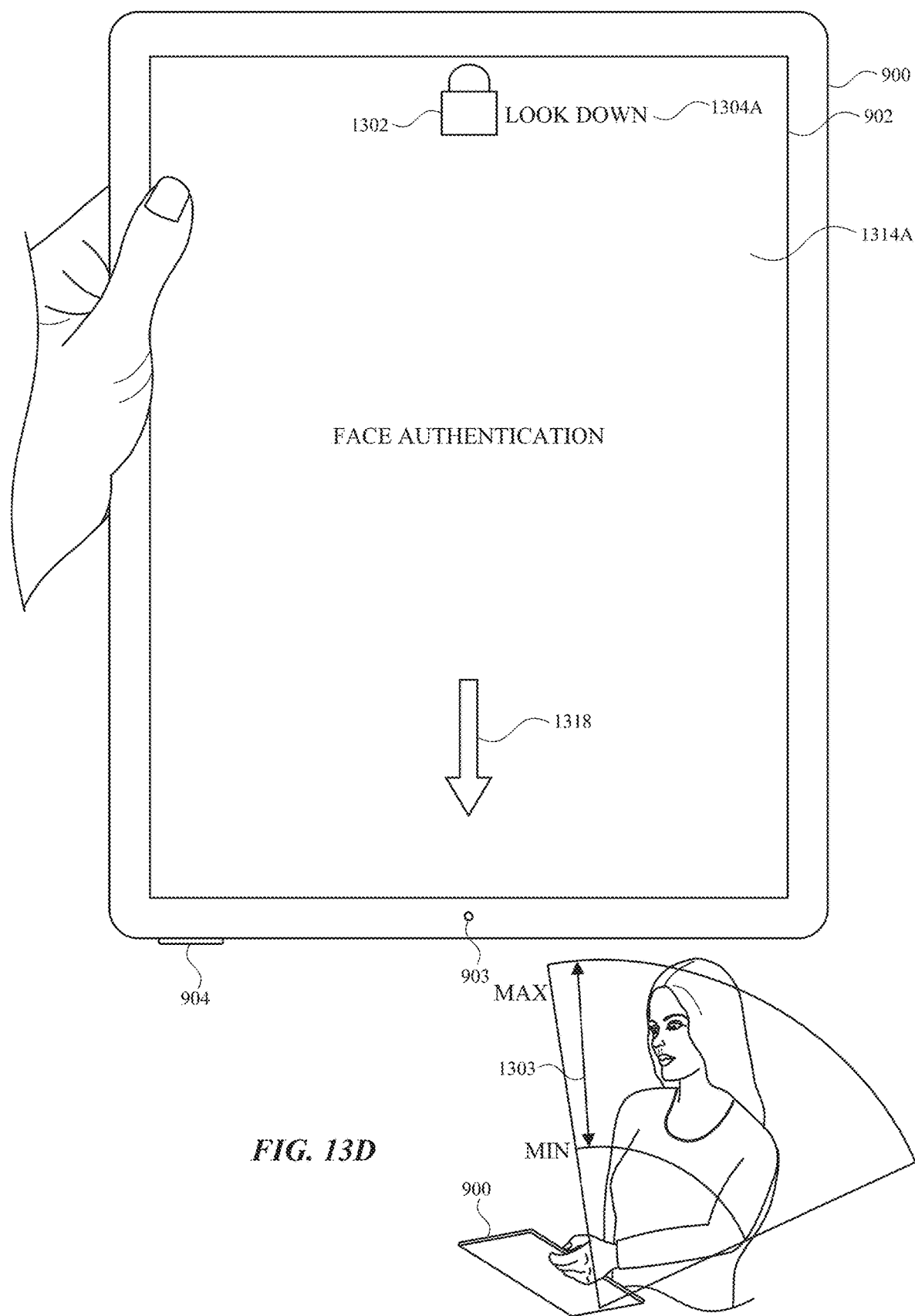

Further in response to detecting the request to unlock the device, electronic device 900 determines whether the error condition is still occurring. Upon a determination that the error condition is still occurring at a time immediately after the request to unlock the device, electronic device 900 maintains display of location indication 1304A and initially displays location indication 1318. Electronic device 900 displays location indication 1318 at a location on display 902 that is adjacent to biometric sensor 903 such that location indication 1318 is pointing at biometric sensor 903. As depicted in FIGS. 13C-13D, location indication 1318 includes a visual arrow that is animated in a manner where it appears to bounce near biometric sensor 903. Similar to location indication 1304A, location indication 1318 is a prompt to the user to take an action that corrects the error condition. For example, upon seeing location indication 1318, a user turns their head toward biometric sensor 903 such that their face is substantially directed to (or facing) biometric sensor 903.

At FIG. 13E, upon a determination that the error condition is still occurring after a predetermined amount of time has elapsed (e.g., 1, 3, or 5 seconds since receiving the request-and/or since displaying the interstitial interface 1314A) and/or a determination that biometric authentication has not successfully completed, electronic device 900 displays (e.g., replaces display of interstitial interface 1314 with) passcode entry UI 1320A. Passcode entry UI 1320A includes a plurality of entry affordances for entering a passcode (or password). Displaying passcode entry UI 1320A includes again initially displaying unlock indication 905 and maintaining display of lock icon 1302. Further upon a determination that the error condition is still occurring after a predetermined amount of time has elapsed, electronic device 900 ceases displaying location indication 1304A. In some examples, upon a determination that the error condition is still occurring (e.g., immediately after detecting the request to unlock the device, after a predetermined amount of time has elapsed (e.g., 1, 3, or 5 seconds since receiving the request and/or since displaying the interstitial interface 1314A)) and/or a determination that biometric authentication has not successfully completed, electronic device 900 forgoes attempting to unlock the device and/or attempting to biometrically authenticate the user.

Figure 13F:
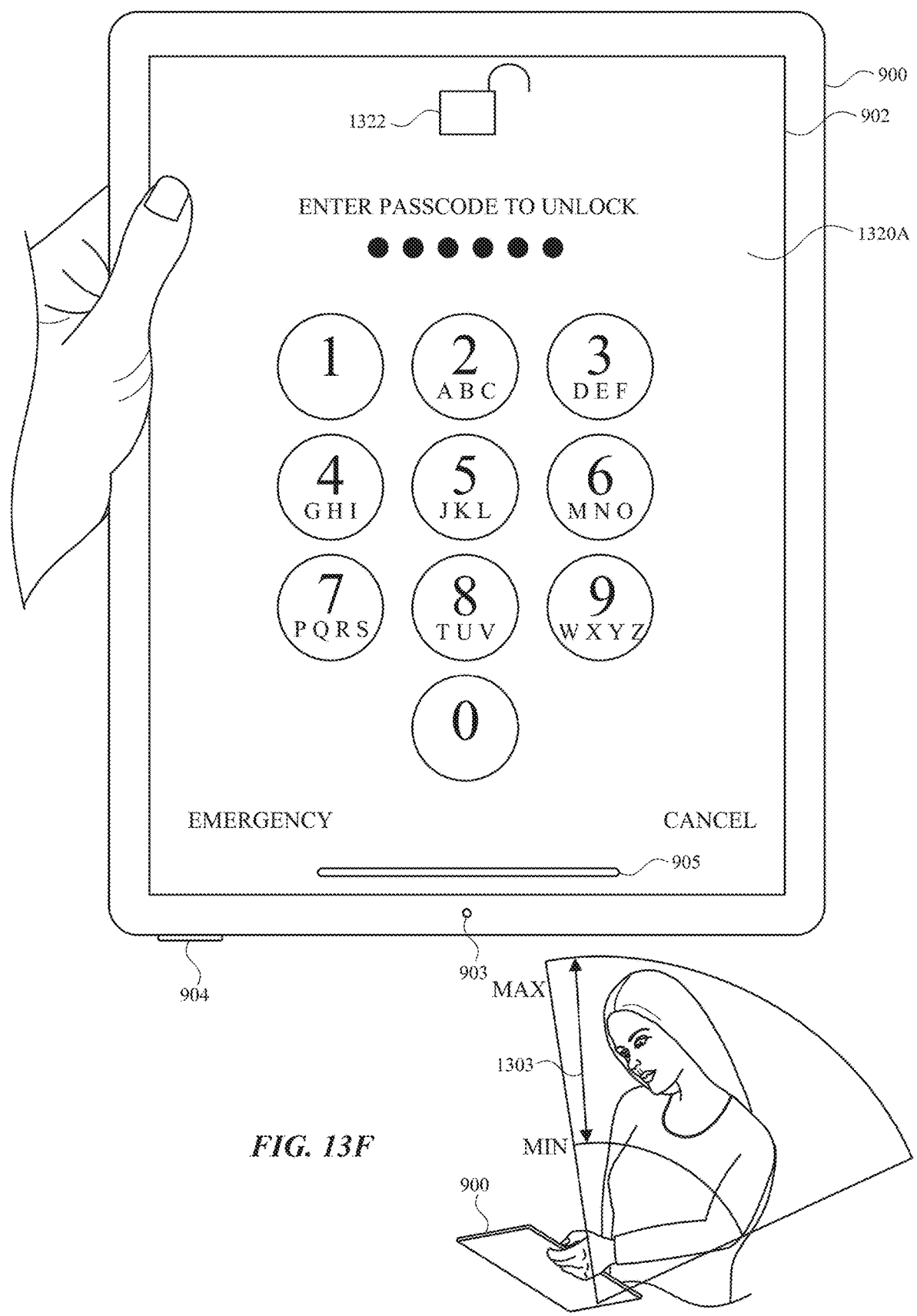
Figure 13G:
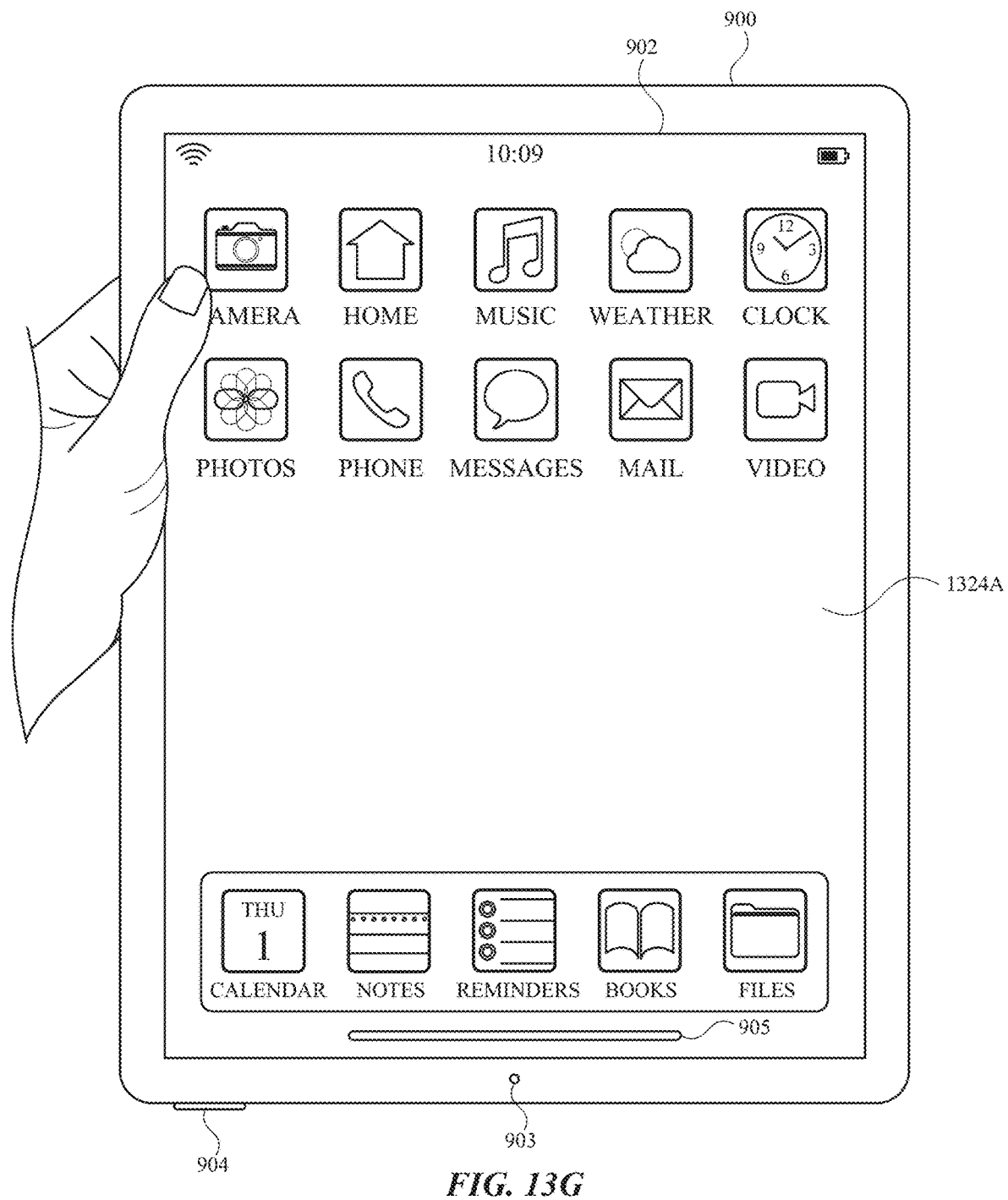

At FIG. 13F, electronic device 900 continues to determine whether the error condition is still occurring while displaying passcode entry UI 1320A. The user turns their head to a new orientation in which the user's face is substantially facing biometric sensor 903 (e.g., the user looks down to begin entering their passcode). Due to the turning of the user's head, electronic device 900 determines that the error condition is no longer occurring. In particular, electronic device 900 determines that a potentially valid biometric feature is substantially facing biometric sensor 903. In some examples, the user can correct the detected error condition by turning the user's face toward biometric sensor 903, or re-orienting the device to a new orientation in which the user's face is substantially facing biometric sensor 903 (e.g., rotating the device so that a face detection sensor is on a right edge, left edge, or top edge of the device as opposed to being on a bottom edge of the device).

Upon a determination that the error condition is no longer occurring, electronic device 900 attempts to unlock the device using biometric sensor 903. Upon a determination that the captured information about the user's face corresponds to stored authorized credentials, electronic device 900 transitions from a locked state to an unlocked state. Transitioning to an unlocked state includes displaying (e.g., replacing display of lock icon 1302 with) unlock icon 1322, which provides an indication that electronic device 900 has successfully been unlocked. Transitioning to an unlocked state further includes displaying (e.g., replacing display of passcode entry UI 1320A with) home screen 1324A of FIG. 13G or a most recently used application, or an application selected based on other criteria (such as an application corresponding to a selected or recently received notification or an application that the user was using on another related device). In some examples, attempting to unlock the device includes attempting to biometrically authenticate a user. Attempting to biometrically authenticate the user using biometric sensor 903 includes attempting to capture information about a potentially valid biometric feature (e.g., a biometric feature that can be used for biometric authentication) using biometric sensor 903 and/or determining whether the captured information about the potentially valid biometric feature corresponds to, or matches, stored authorized credentials (e.g., a biometric template). In some examples, attempting to capture information about a potentially valid biometric feature includes powering on biometric sensor 903. In some examples, electronic device 900 determines whether captured information about a potentially valid biometric feature matches stored authorized credentials if, or when, electronic device 900 successfully captures information about a potentially valid biometric feature. In some examples, if electronic device 900 does not, or fails to, capture information about a potentially valid biometric feature, electronic device 900 forgoes determining whether captured information about a potentially valid biometric feature matches stored authorized credentials.

Upon a determination that the captured information about the user's face does not correspond to stored authorized credentials, electronic device 900 maintains the locked state. For example, electronic device 900 maintains display of passcode entry UI 1320A with lock icon 1302, as depicted in FIG. 13E.

Figure 13H:
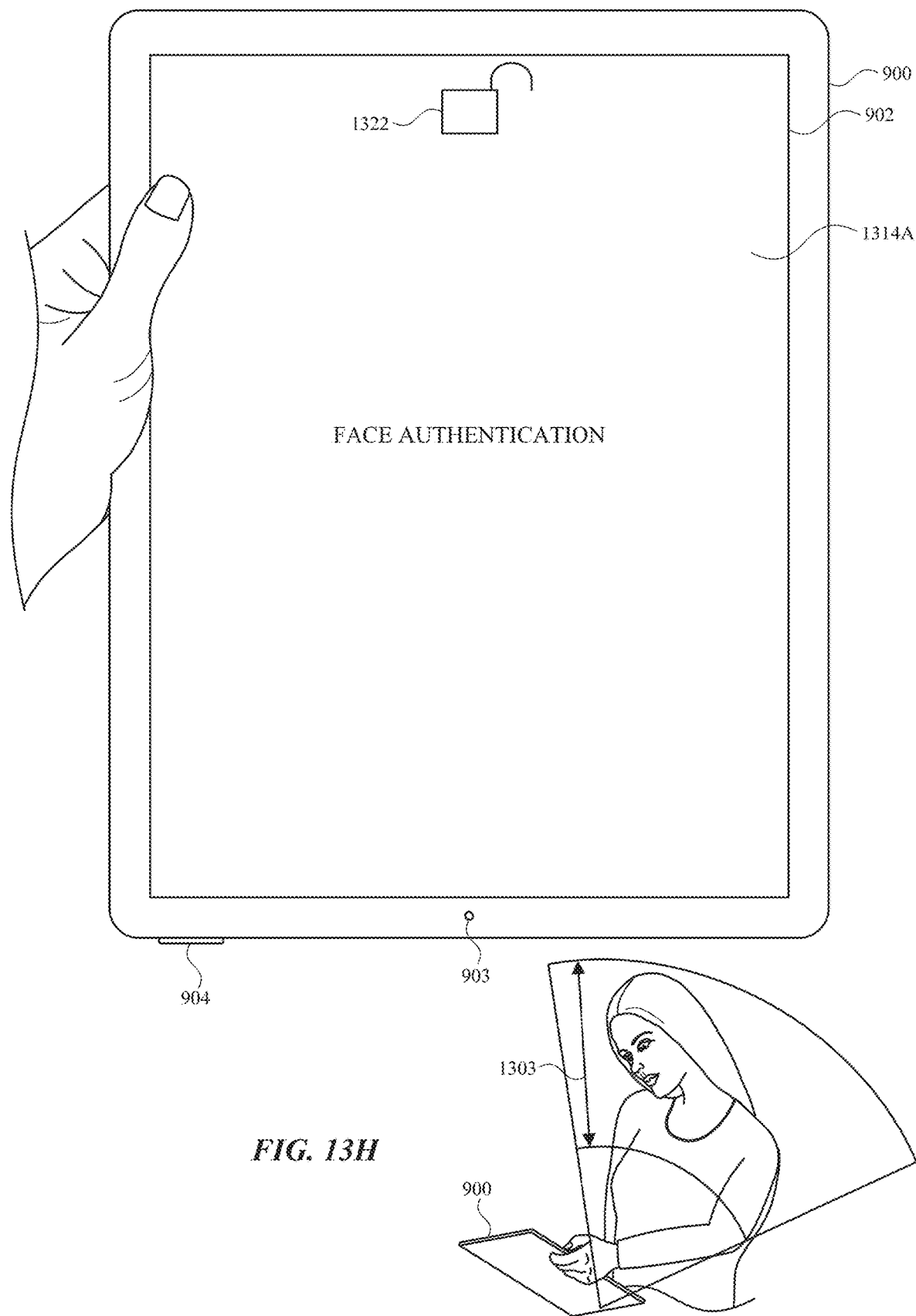

As described above with respect to FIGS. 13A-13D, the user does not correct the error condition while electronic device 900 displays locked state UI 1300A and/or interstitial UI 1314A. In some examples, instead of failing to correct the error condition in FIGS. 13A-13D, the user corrects the error condition by turning their head to a new orientation in which the user's face is substantially facing biometric sensor 903, as depicted in FIG. 13H. While location indication 1304A of FIGS. 13A-13D is displayed (e.g., after detecting a request to perform an operation that requires authentication, after detecting a request to unlock the device, and/or before passcode entry UI 1320A is displayed), electronic device 900 determines whether the error condition is still occurring. In some examples, electronic device 900 determines that the error condition is no longer occurring. In particular, electronic device 900 determines that a potentially valid biometric feature is substantially facing biometric sensor 903. Upon a determination that the error condition is no longer occurring, electronic device 900 attempts to unlock the device using biometric sensor 903.

In some examples, upon a determination that the captured information about the user's face does not correspond to stored authorized credentials, electronic device 900 maintains the locked state. For example, electronic device 900 displays (e.g., replaces display of interstitial interface 1314 with) passcode entry UI 1320A of FIG. 13E.

In some examples, the user does not correct the error condition and/or otherwise fails to successfully complete biometric authentication. Instead, while displaying passcode entry 1320A of FIG. 13E, electronic device 900 receives, via display 902, a sequence of one or more characters that corresponds to a password or passcode, as depicted in FIG. 13I. As an example, electronic device 900 receives character input 1326, which is a portion of the sequence of one or more characters.

At FIG. 13J, in some examples, upon a determination that the sequence of one or more characters corresponds to stored authorized credentials, electronic device 900 transitions from a locked state to an unlocked state. Transitioning to an unlocked state can include displaying (e.g., replacing display of lock icon 1302 with) unlock icon 1322, which provides an indication that electronic device 900 has successfully been unlocked. Transitioning to an unlocked state can include displaying (e.g., replacing display of passcode entry UI 1320A with) home screen 1324A of FIG. 13G or the most recently used application.

In some examples, upon a determination that the sequence of one or more characters does not correspond to stored authorized credentials, electronic device 900 maintains the locked state. For example, electronic device 900 maintains display of passcode entry UI 1320A of FIG. 13E.

Figure 13K:
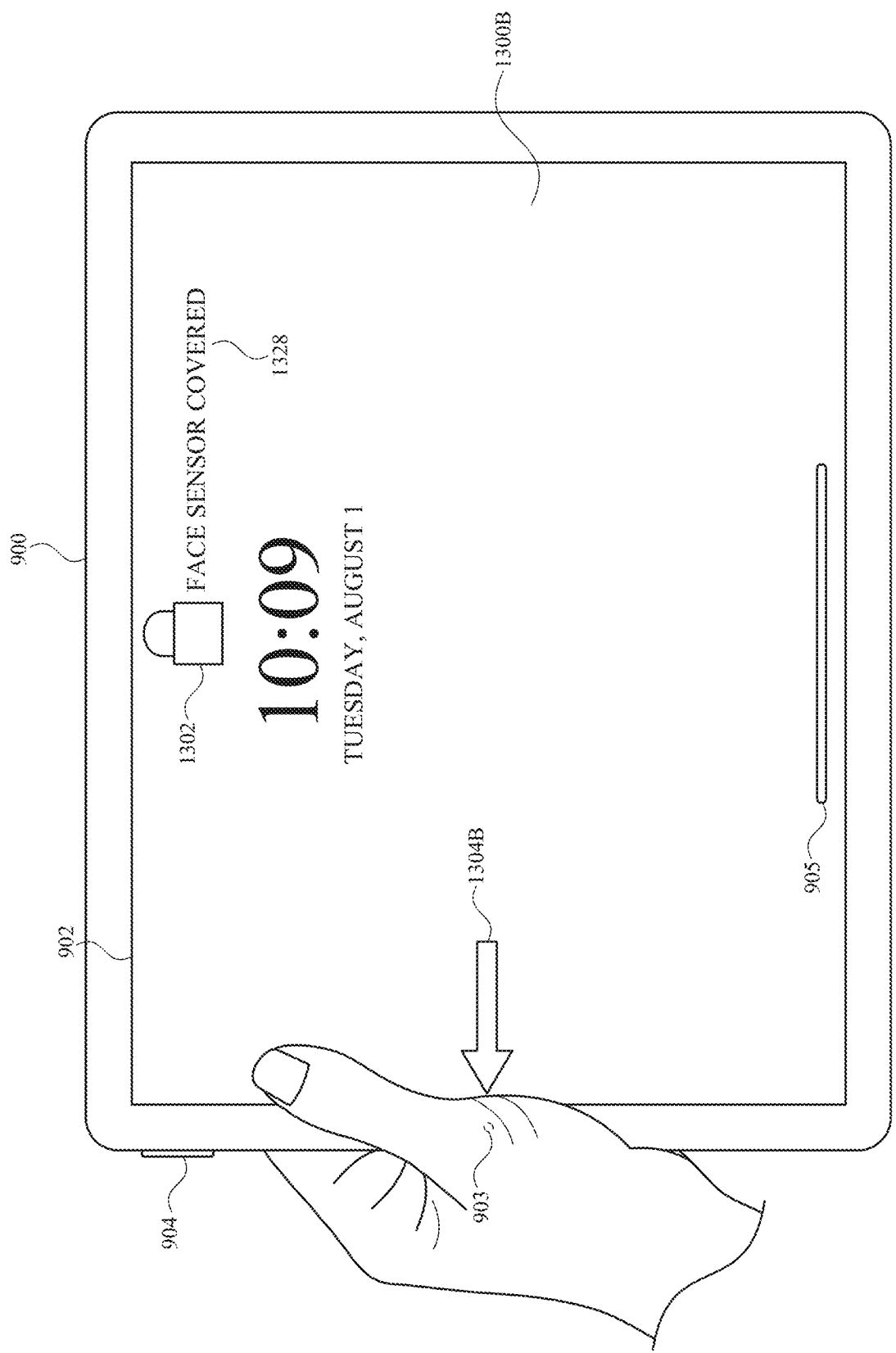

FIGS. 13K-13P illustrate another scenario where electronic device 900 detects an error condition while attempting to unlock the device using biometric sensor 903. FIG. 13K depicts processes that are analogous to the processes described above with respect to FIG. 13A. To initiate the process of accessing restricted content on electronic device 900, the user lifts (or raises) electronic device 900 (e.g., from a substantially horizontal orientation to the orientation of the device as depicted in the user's hand in FIG. 13K). In some examples, due to the change in orientation of the device, electronic device 900 detects (e.g., via accelerometer 168) a request to perform an operation that requires authentication (e.g., a request to unlock the device). In response to detecting the request to unlock the device, electronic device 900 attempts to biometrically authenticate the user using biometric sensor 903.

In some examples, while attempting to biometrically authenticate the user using biometric sensor 903, electronic device 900 detects that an error condition has occurred. In some examples, detecting that an error condition has occurred requires determining that biometric sensor 903 is occluded (e.g., by the user's hand). Because biometric sensor 903 is occluded at FIG. 13K, electronic device 900 is unable to capture information about the user's face. Accordingly, electronic device 900 has no captured information for biometrically authenticating the user. The user can correct the detected error condition by moving their hand away from biometric sensor 903 such that biometric sensor 903 is no longer occluded.

In some examples, in response to detecting that an error condition has occurred, electronic device 900 maintains a locked state. In some examples, further in response to detecting that an error condition has occurred, electronic device 900 initially displays location indication 1304B (e.g., location indication 1304B were not displayed prior to detecting the error condition). In some examples, location indication 1304B includes an indication of the location of biometric sensor 903 on the device. In some examples, electronic device 900 displays location indication 1304B at a location on display 902 that is adjacent to biometric sensor 903. In some examples, location indication 1304B includes a visual indication (e.g., text, arrow) describing or indicating the location of biometric sensor 903. For example, location indication 1304B can be an animated arrow, as described above with respect to location indication 1318 in FIGS. 13C-13D. In some examples, electronic device 900 displays location indication 1304C of FIG. 13Y in addition to or instead of location indication 1304B. In some examples, location indication 1304C includes some or all of the features of error indication 928 of FIGS. 9E-9I. In some examples, electronic device 900 displays location indication 1304D of FIG. 13Z in addition to or instead of location indication 1304B. In some examples, location indication 1304D includes a text description of the location of biometric sensor 903 (e.g., with respect to the user and/or with respect to location indication 1304D).

In some examples, further in response to detecting that an error condition has occurred, electronic device 900 initially displays error indication 1328. In some examples, electronic device 900 displays error indication 1328 adjacent to lock icon 1302. In some examples, error indication 1328 includes an indication of the cause of the error condition. In some examples, error indication 1328 includes an indication of a user action that can be performed to correct the detected error condition (e.g., for a subsequent biometric authentication attempt).

Figure 13L:
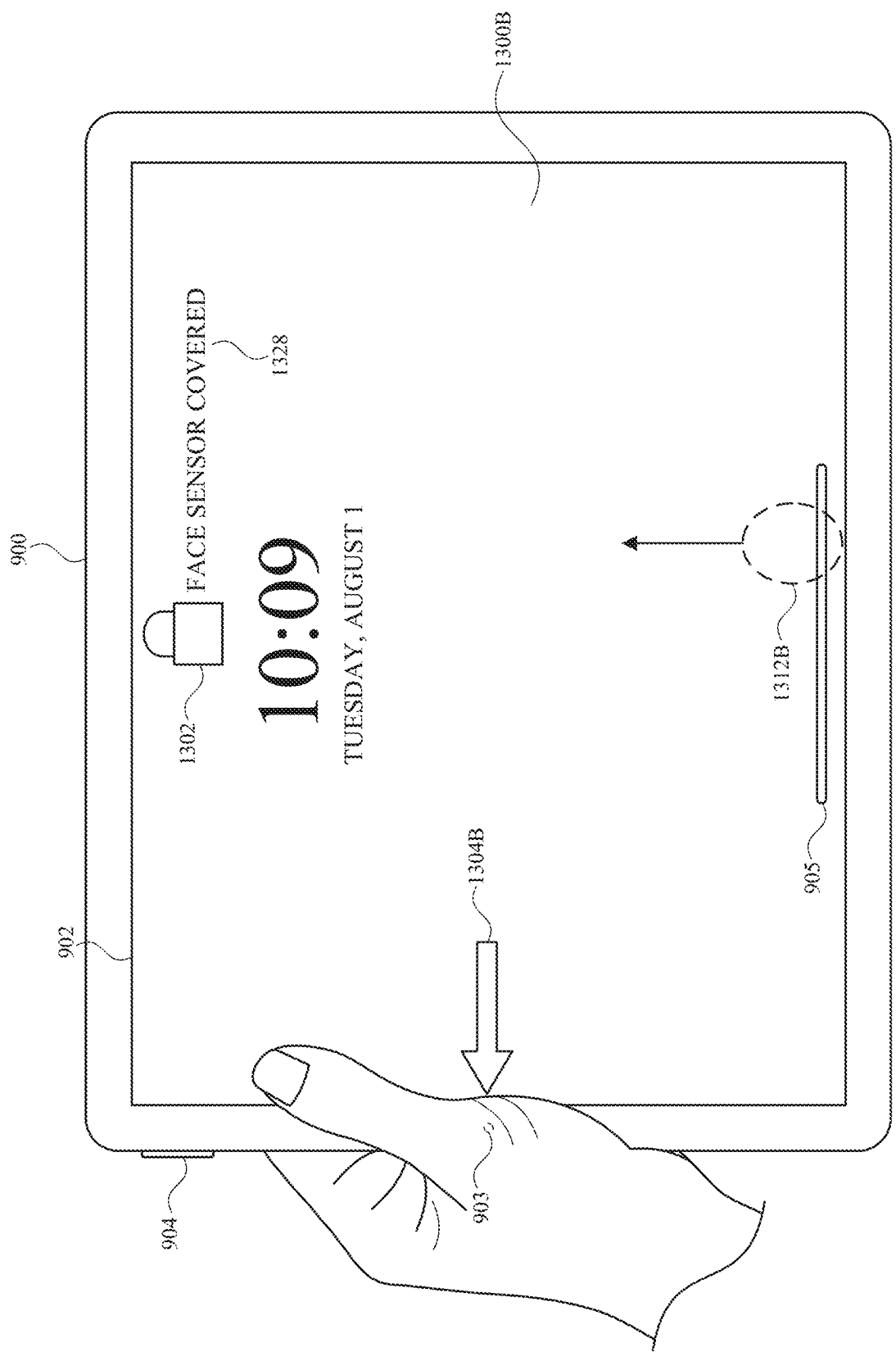

FIG. 13L depicts processes that are analogous to the processes described above with respect to FIG. 13B. At FIG. 13L, the user still wishes to access restricted content on electronic device 900, so the user attempts to unlock the device via a swipe gesture despite not having corrected the error condition. In some examples, while displaying locked state UI 1300B with location indication 1304B, electronic device 900 detects a request to unlock the electronic device using biometric sensor 903. Detecting a request to unlock the device includes receiving input 1312B starting at a location of display 902, and determining that input 1312B is an upward swipe gesture that starts within a predefined region adjacent to the bottom edge of display 902. Locked state UI 1300B is a landscape version of locked state UI 1300A, and includes some or all of the feature of locked state UI 1300A.

Figure 13M:
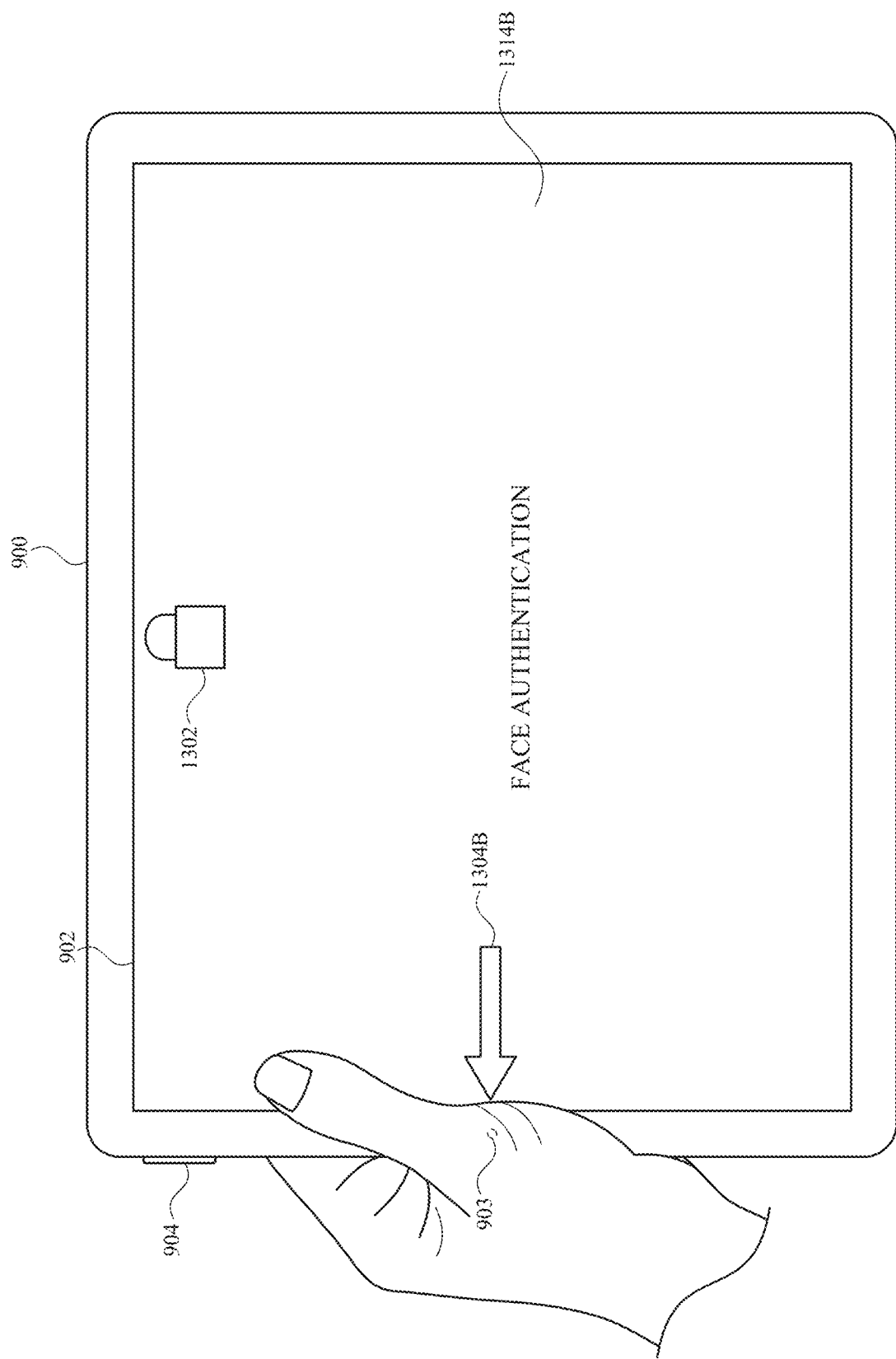

FIG. 13M depicts processes that are analogous to the processes described above with respect to FIG. 13C. At FIG. 13M, in some examples, in response to detecting the request to unlock the device, electronic device 900 displays (e.g., replaces display of locked state UI 1300B with) interstitial interface 1314B. Interstitial interface 1314B is a landscape version of interstitial interface 1314A, and includes some or all of the features of interstitial interface 1314A.

Further in response to receiving the request to unlock the device, electronic device 900 determines whether the error condition is still occurring. Upon a determination that the error condition is still occurring at a time immediately after the request to unlock the device, electronic device 900 maintains display of location indication 1304B.

Figure 13N:
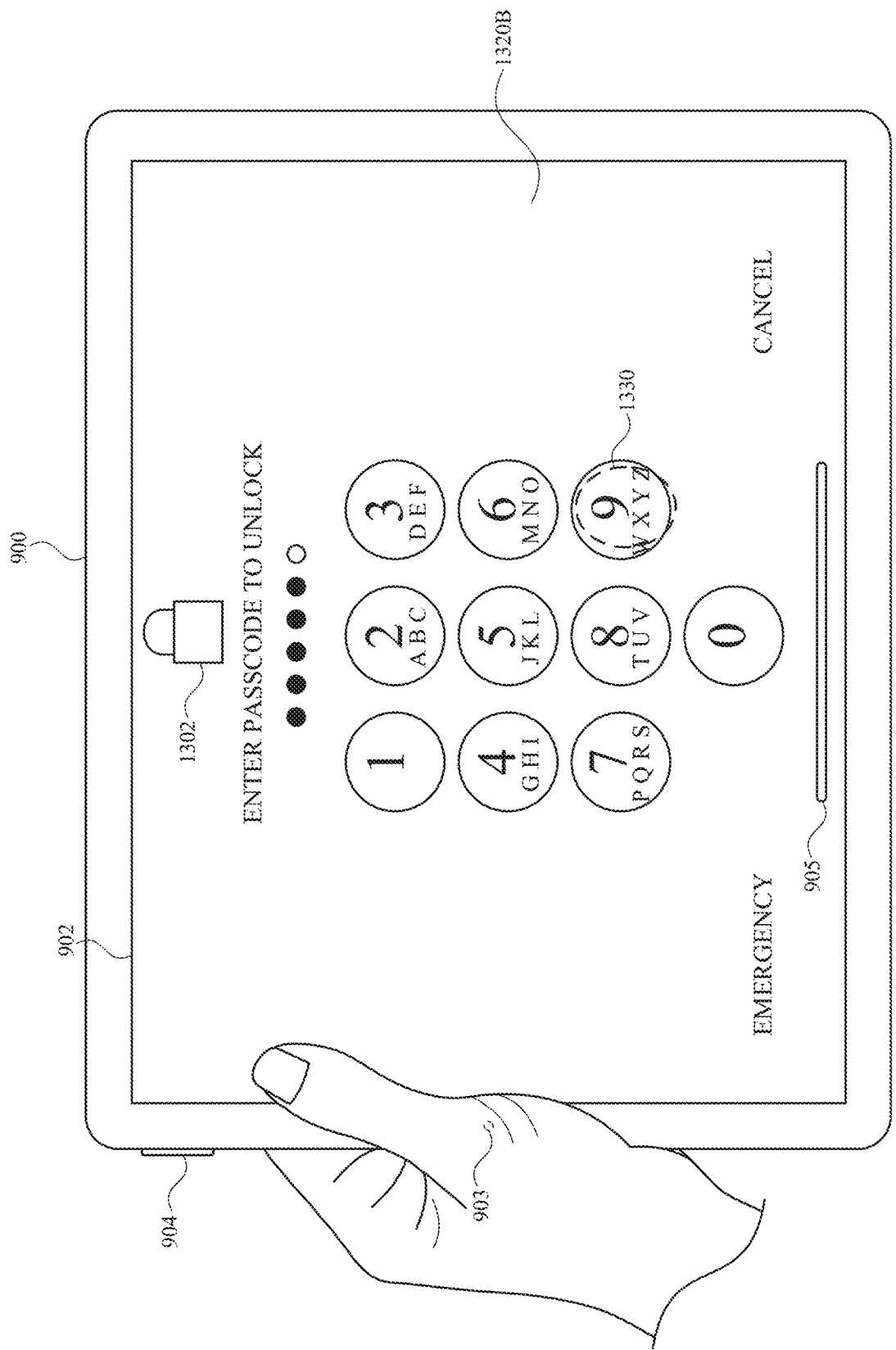

FIG. 13N depicts processes that are analogous to the processes described above with respect to FIG. 13I. At FIG. 13N, in some examples, upon a determination that the error condition is still occurring after a predetermined amount of time has elapsed (e.g., 1, 3, or 5 seconds), electronic device 900 displays (e.g., replaces display of interstitial interface 1314B with) passcode entry UI 1320B. Passcode entry UI 1320B is a landscape version of passcode entry UI 1320A, and includes some or all of the features of passcode entry UI 1320A.

In some examples, the user does not correct the error condition. Instead, while displaying passcode entry 1320B of FIG. 13N, electronic device 900 receives, via display 902, a sequence of one or more characters that corresponds to a password or passcode. As an example, electronic device 900 receives character input 1330, which is a portion of the sequence of one or more characters.

Figure 13O:
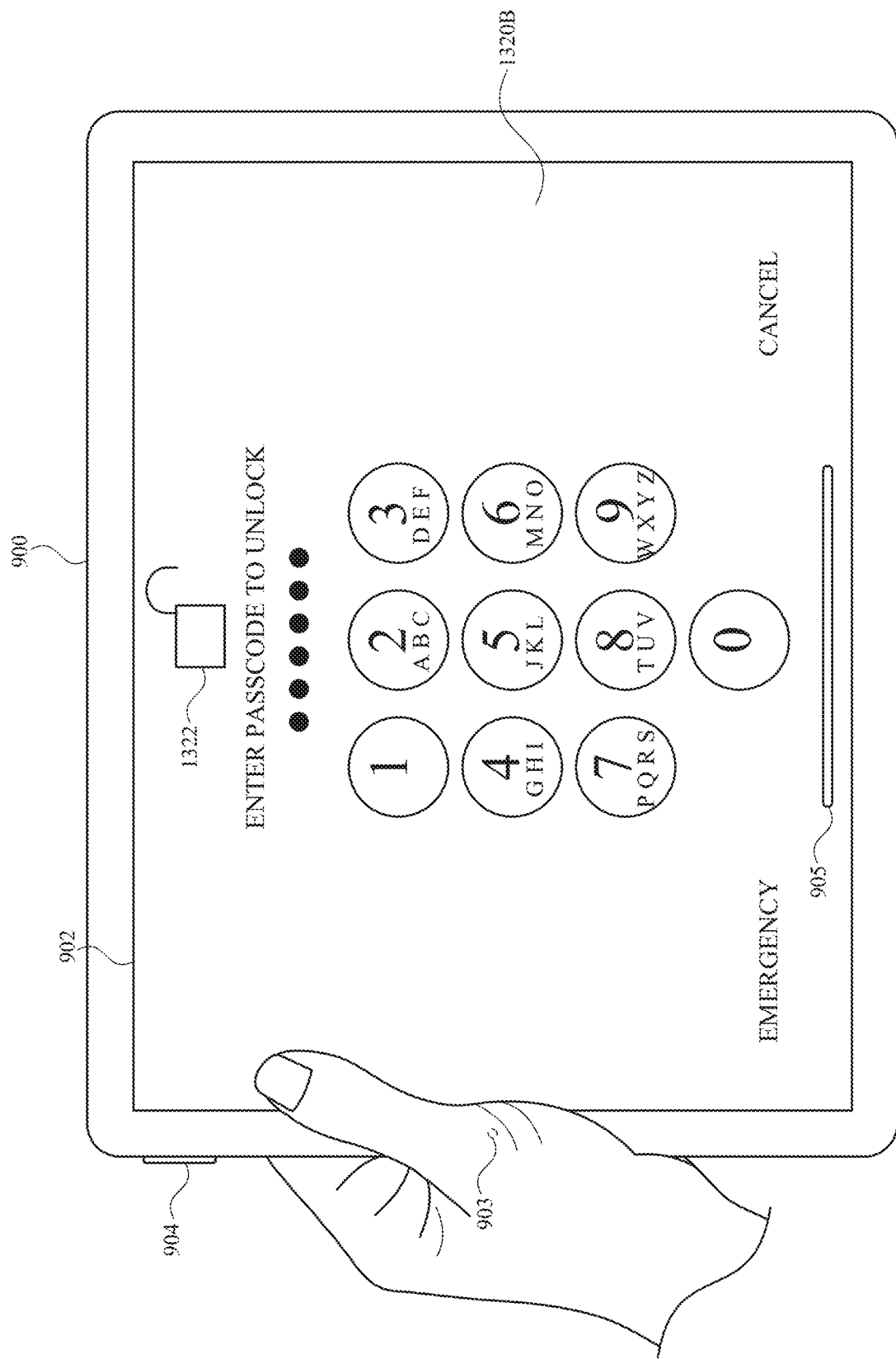
Figure 13P:
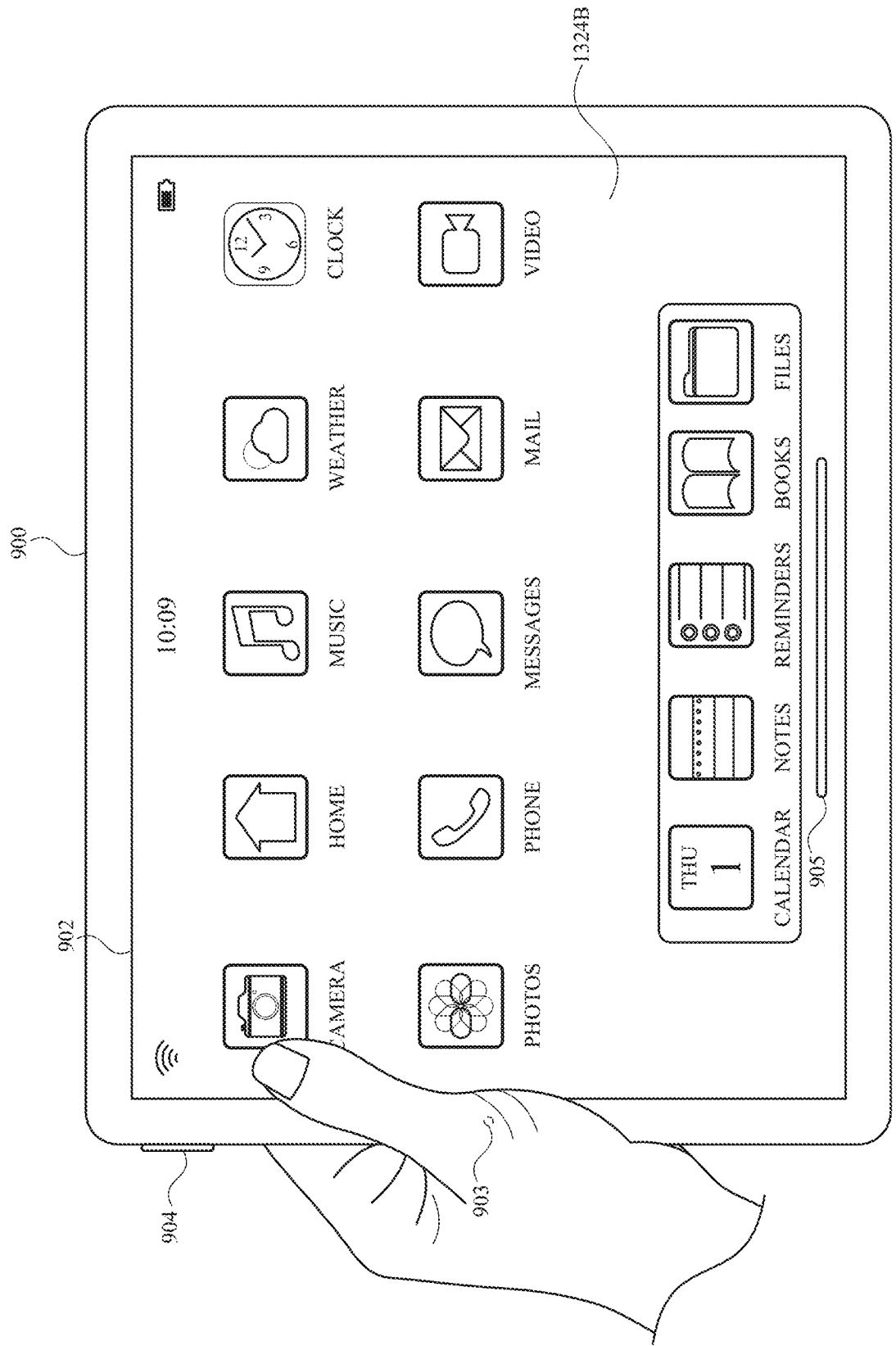

FIG. 13O depicts processes that are analogous to the processes described above with respect to FIG. 13J. At FIG. 13J, in some examples, upon a determination that the sequence of one or more characters corresponds to stored authorized credentials, electronic device 900 transitions from a locked state to an unlocked state. Transitioning to an unlocked state can include displaying (e.g., replacing display of lock icon 1302 with) unlock icon 1322, which provides an indication that electronic device 900 has successfully been unlocked. Transitioning to an unlocked state can include displaying (e.g., replacing display of passcode entry UI 1320B with) home screen 1324B of FIG. 13P or the most recently used application.

In some examples, upon a determination that the sequence of one or more characters does not correspond to stored authorized credentials, electronic device 900 maintains the locked state. For example, electronic device 900 maintains display of passcode entry UI 1320B of FIG. 13N.

At FIG. 13Q, in some examples, while in a locked state, electronic device 900 detects the occurrence of a type of error condition that is different from the type of error conditions detected in FIGS. 13A and 13K, as described above. The error conditions detected in FIGS. 13A and 13K are of the type where the location of biometric sensor 903 would be especially useful for the user to know in order to correct the error condition. In some examples, while attempting to biometrically authenticate the user using biometric sensor 903, electronic device 900 detects an error condition of a different type (e.g., a type where knowledge of the location of biometric sensor 903 is not especially useful). At FIG. 13Q, electronic device 900 detects that the biometric feature is outside acceptable distance range 1303 (e.g., too far from biometric sensor 903). In response to detecting an error condition of a different type, electronic device 900 displays error indication 1332, which includes some or all of the features of error indication 714A in FIG. 7G. Further in response to detecting an error condition of a different type, electronic device 900 forgoes displaying an indication of the location of biometric sensor 903.

Figure 13R:
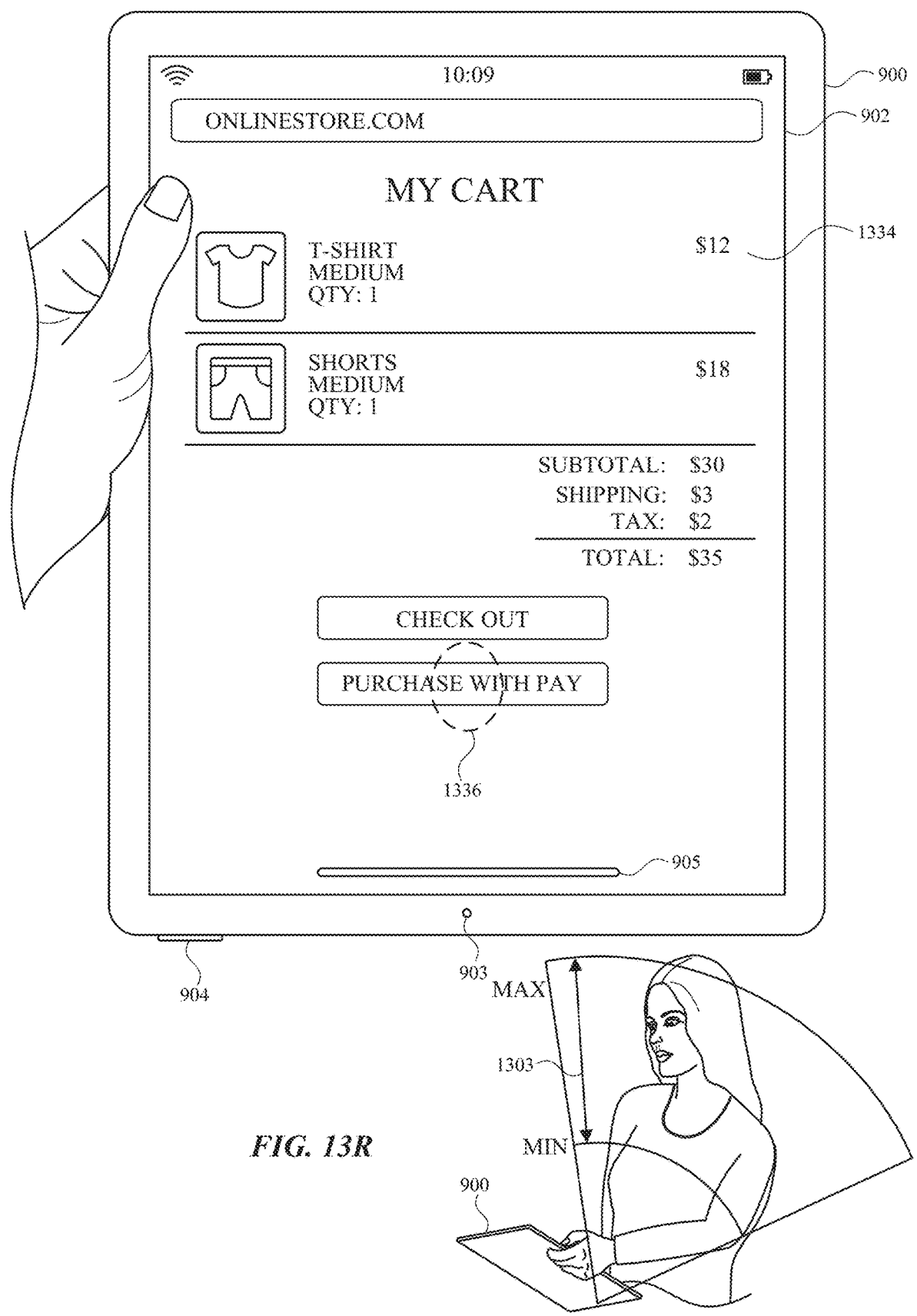
Figure 13S:
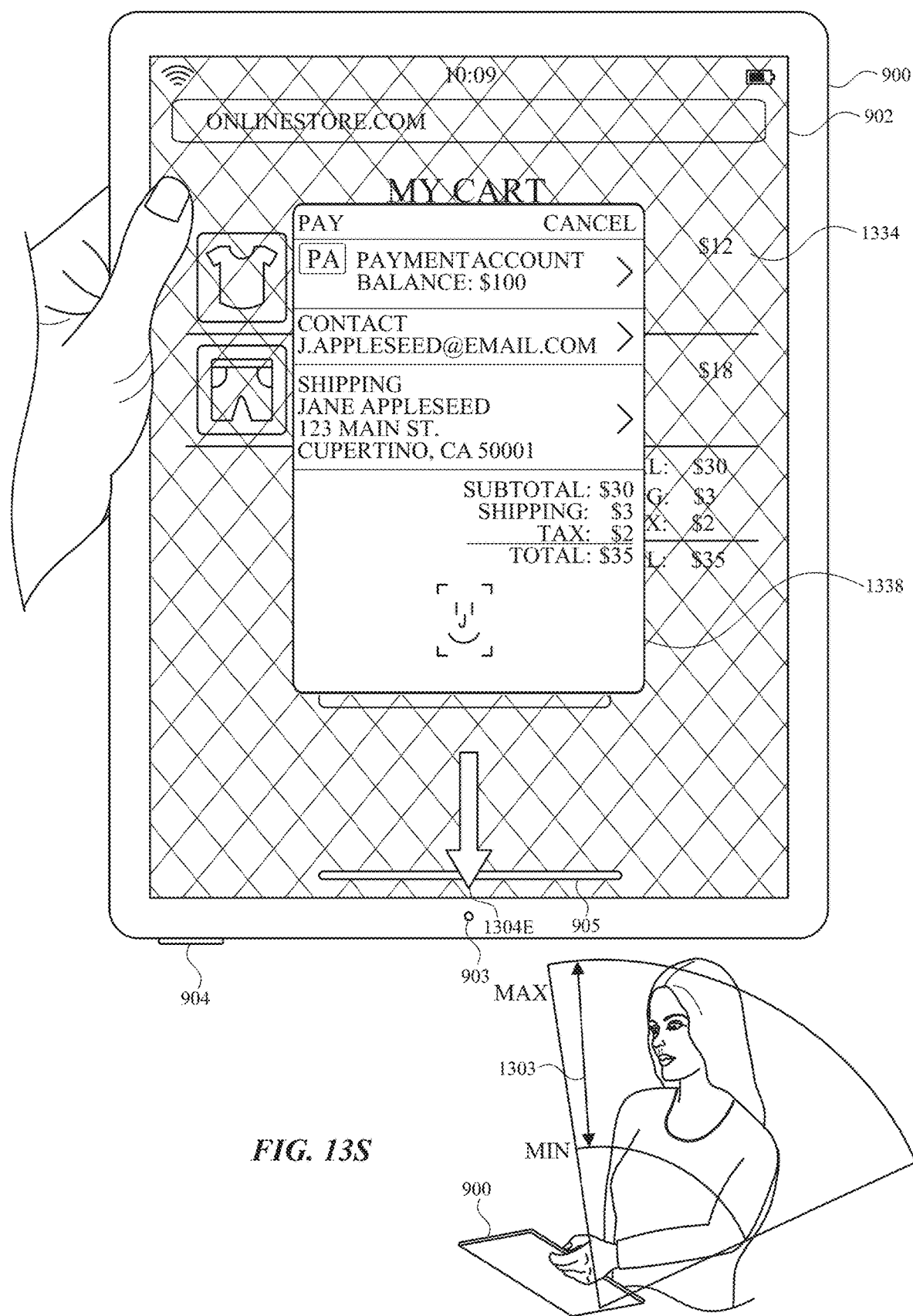
Figure 13T:
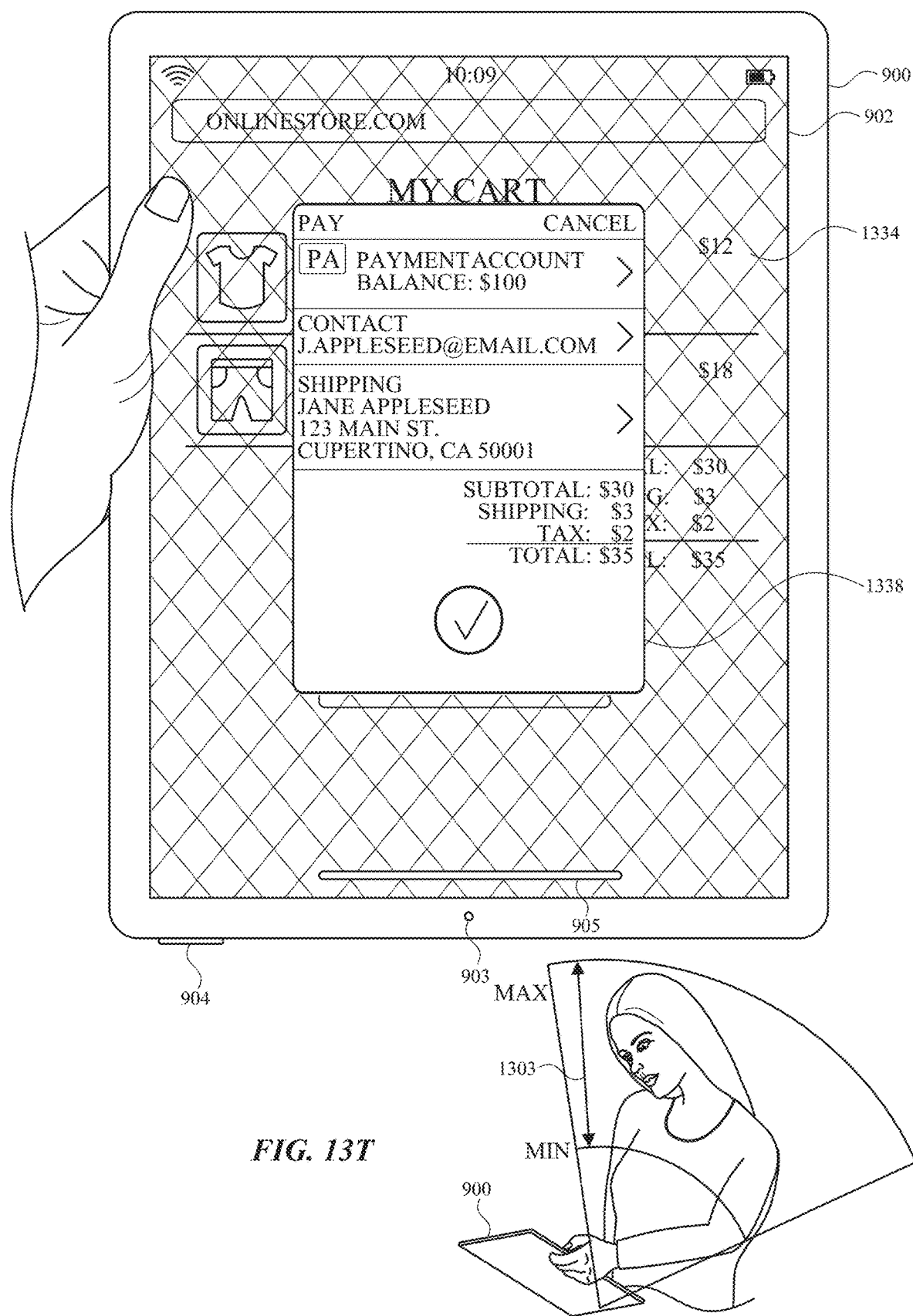

FIGS. 13R-13T illustrate a scenario where electronic device 900 detects an error condition while attempting to make a payment using biometric sensor 903. Similar to unlocking a device, as described above with respect to FIG. 13A, making a payment requires successful authentication of the user.

At FIG. 13R, a user wishes to purchase some items from an online retail store. In some examples, while displaying webpage 1334 of a browsing application, electronic device 900 detects a request to perform an operation that requires authentication (e.g., a request to make a payment to purchase an item). Specifically, electronic device 900 detects activation of a purchase affordance via input 1336.

In some examples, upon detecting the request to make a payment, electronic device 900 attempts to biometrically authenticate the user using biometric sensor 903. In some examples, while attempting to biometrically authenticate the user using biometric sensor 903, electronic device 900 detects that an error condition has occurred. Similar to the error condition detected with respect to FIG. 13A, electronic device 900 determines that a potentially valid biometric feature is not substantially facing biometric sensor 903. In some examples, further upon detecting the request to make a payment, electronic device 900 displays pay sheet interface 1338, which overlaps (e.g., partially overlaps) webpage 1334.

At FIG. 13S, upon detecting that an error condition has occurred, electronic device 900 initially displays location indication 1304E. In some examples, electronic device 900 displays location indication 1304E at a location on display 902 that is adjacent to biometric sensor 903 such that location indication 1304E is pointing at biometric sensor 903. In some examples, location indication 1304E is an animated arrow, as described above with respect to location indication 1318 in FIGS. 13C-13D.

Electronic device 900 continues to determine whether the error condition is still occurring while displaying location indication 1304E. Prompted by location indication 1304E, the user turns their head downward to a new orientation in which the user's face is substantially facing biometric sensor 903, as shown in FIG. 13T. Due to the turning of the user's head, electronic device 900 determines that the error condition is no longer occurring. In particular, electronic device 900 determines that a potentially valid biometric feature is substantially facing biometric sensor 903.

In some examples, upon a determination that the error condition is no longer occurring, electronic device 900 attempts to make a payment using biometric sensor 903. In some examples, upon a determination that the captured information about the user's face corresponds to stored authorized credentials, electronic device 900 makes the payment, as shown in FIG. 13T. In some examples, upon a determination that the captured information about the user's face does not correspond to stored authorized credentials, electronic device 900 forgoes making the payment.

FIGS. 13U-13X illustrate a scenario where electronic device 900 detects an error condition while attempting to biometrically authenticate using biometric sensor 903, as a precursor to autofilling fillable fields (e.g., username field, password field) using stored information. Similar to unlocking a device, as described above with respect to FIG. 13A, autofilling fillable fields requires successful authentication of the user.

Figure 13U:
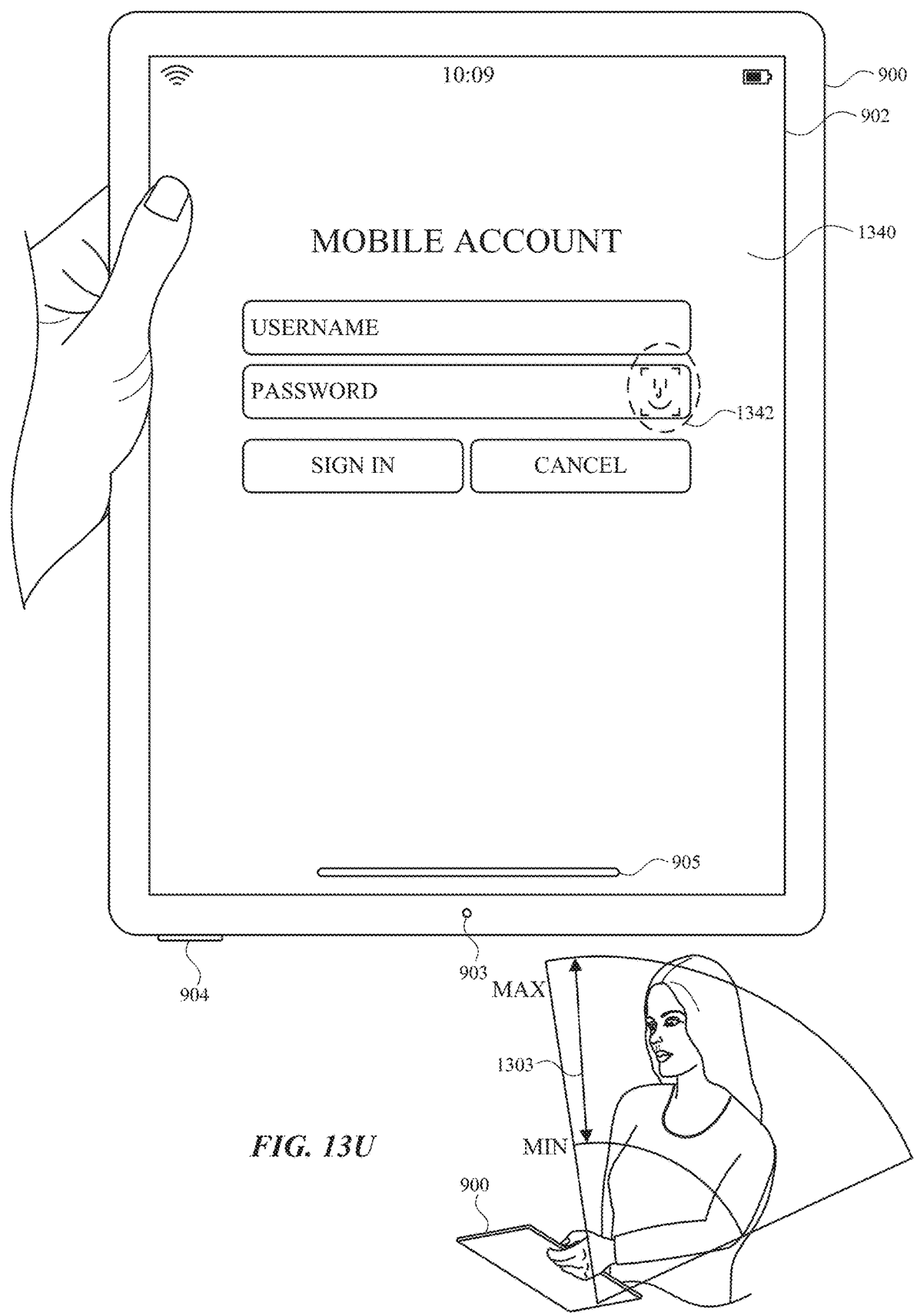

At FIG. 13U, a user wishes to autofill the username field and password field using stored log-in information. In some examples, while displaying log-in UI 1340 of a mobile application, electronic device 900 detects a request to perform an operation that requires authentication (e.g., a request to autofill). Specifically, electronic device 900 detects activation of an autofill affordance via input 1342.

In some examples, upon detecting the request to autofill fillable fields, electronic device 900 attempts to biometrically authenticate the user using biometric sensor 903. In some examples, while attempting to biometrically authenticate the user using biometric sensor 903, electronic device 900 detects that an error condition has occurred. Similar to the error condition detected with respect to FIG. 13A, electronic device 900 determines that a potentially valid biometric feature is not substantially facing biometric sensor 903.

Figure 13V:
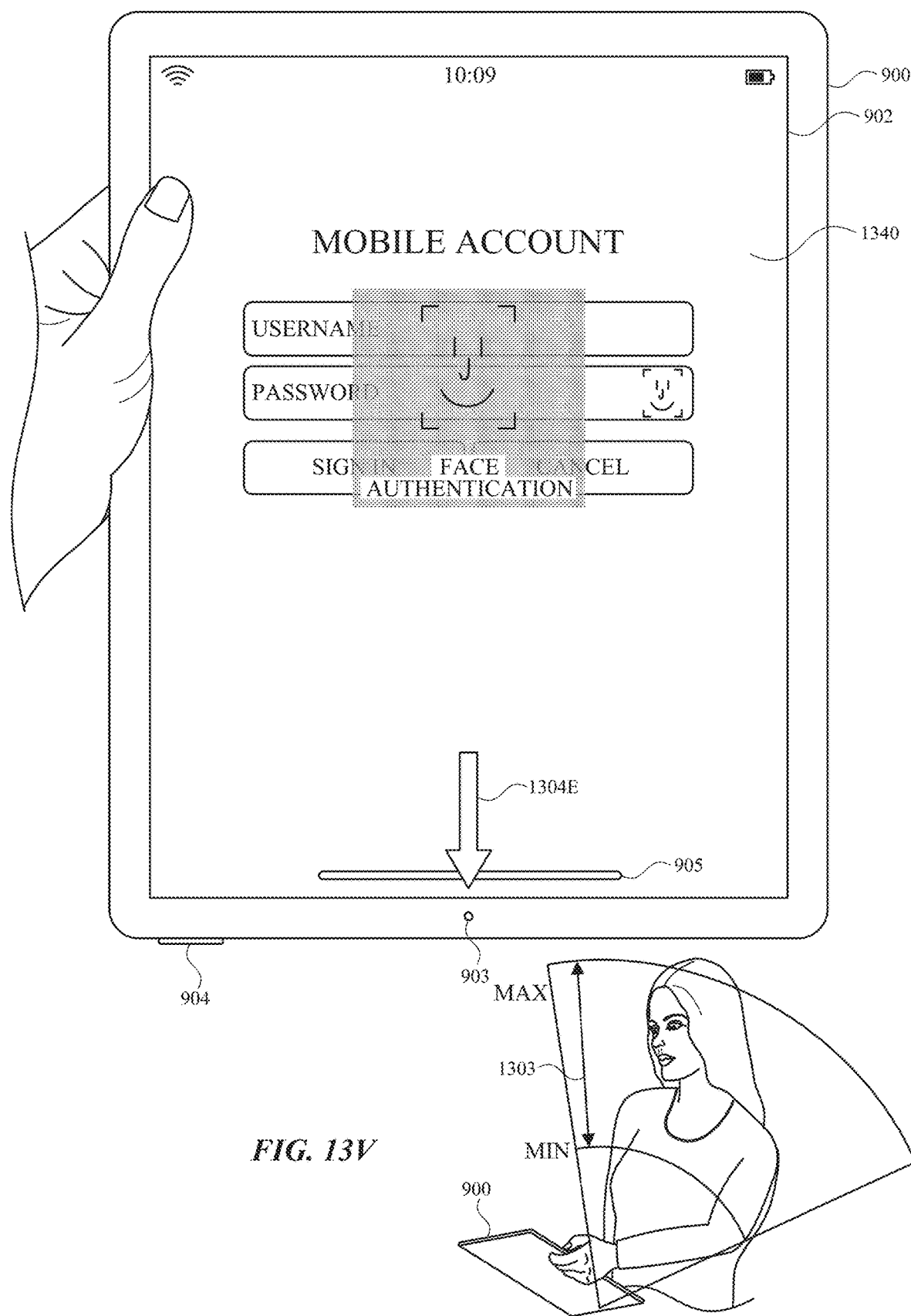
Figure 13W:
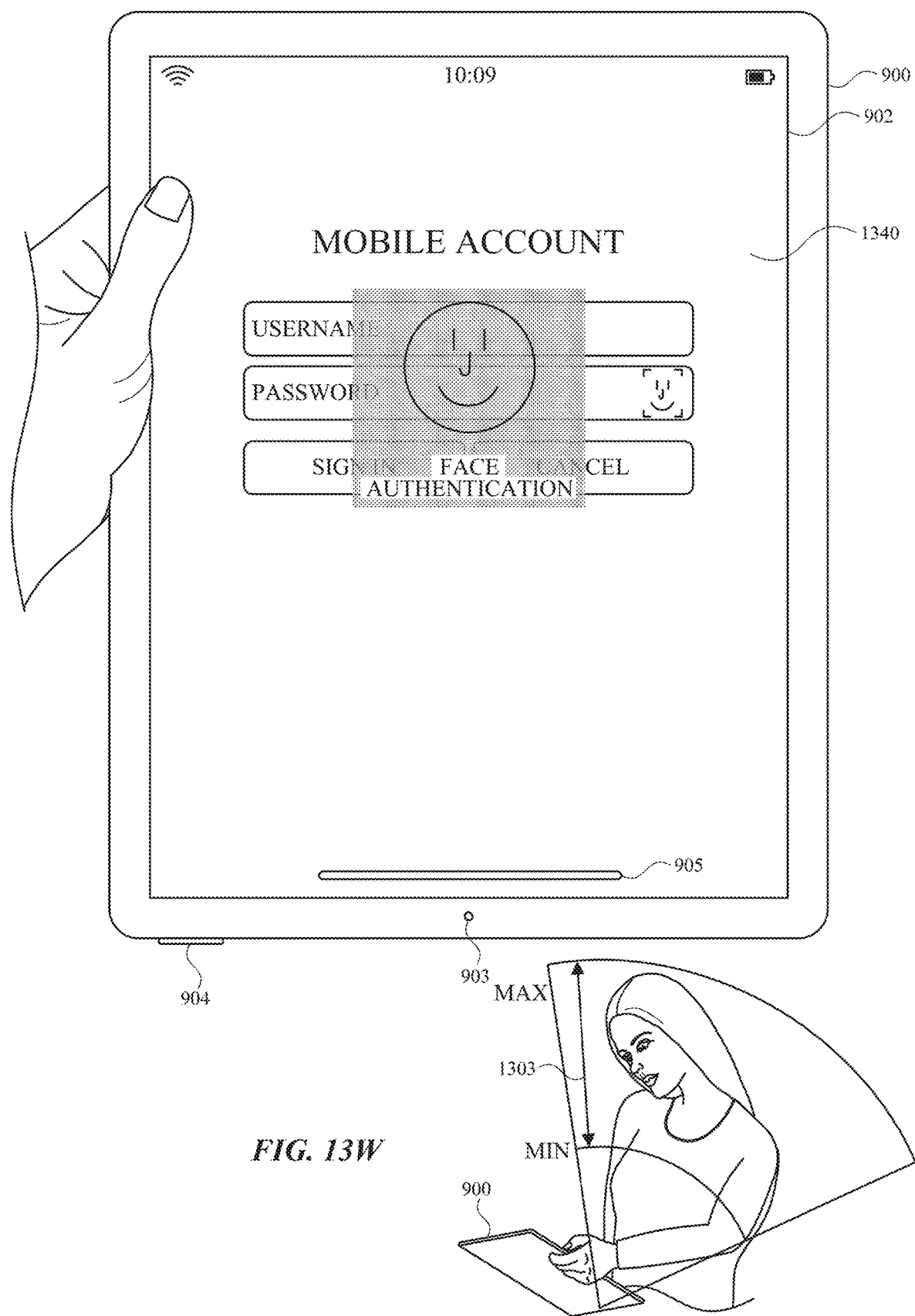

At FIG. 13V, upon detecting that an error condition has occurred, electronic device 900 initially displays location indication 1304E. In some examples, electronic device 900 displays location indication 1304E at a location on display 902 that is adjacent to biometric sensor 903 such that location indication 1304E is pointing at biometric sensor 903. In some examples, location indication 1304E is an animated arrow, as described above with respect to location indication 1318 in FIGS. 13C-13D.

Electronic device 900 continues to determine whether the error condition is still occurring while displaying location indication 1304E. Prompted by location indication 1304E, the user turns their head downward to a new orientation in which the user's face is substantially facing biometric sensor 903. Due to the turning of the user's head, electronic device 900 determines that the error condition is no longer occurring. In particular, electronic device 900 determines that a potentially valid biometric feature is substantially facing biometric sensor 903.

Figure 13X:
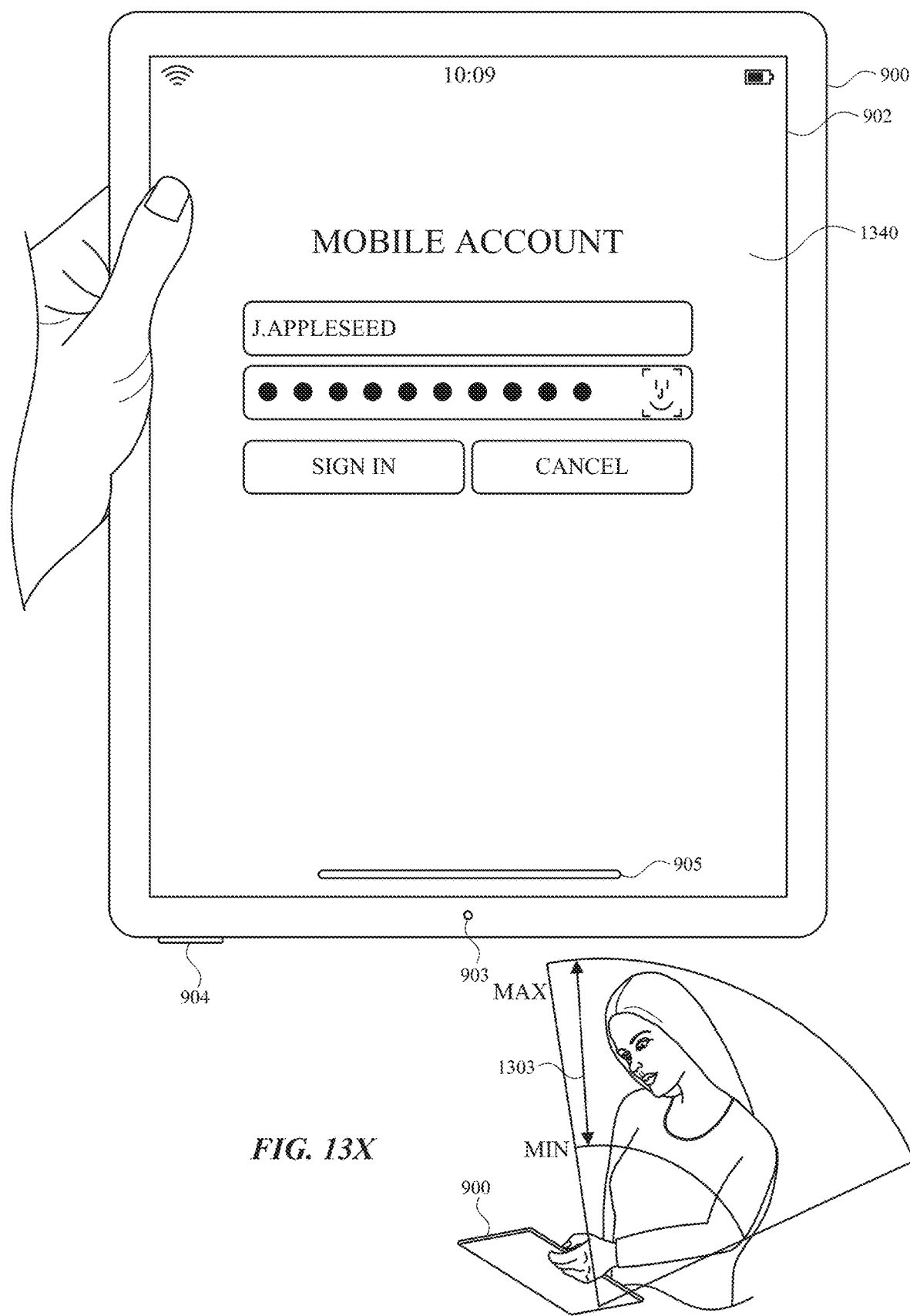
Figure 13Y:
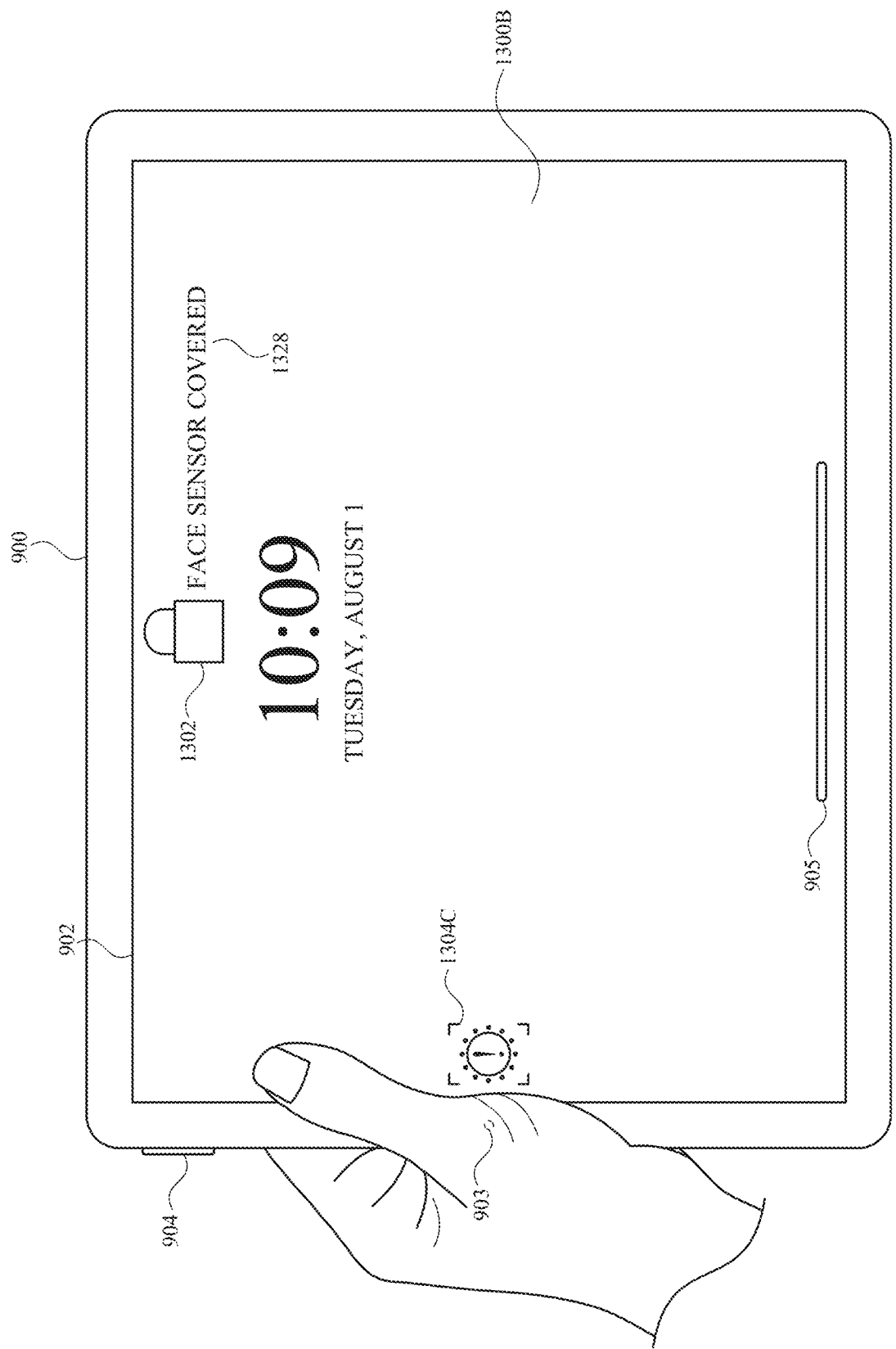

In some examples, upon a determination that the error condition is no longer occurring, electronic device 900 attempts to autofill the fillable fields using biometric sensor 903. At FIG. 13W, electronic device 900 determines that the captured information about the user's face corresponds to stored authorized credentials. In some examples, upon a determination that the captured information about the user's face corresponds to stored authorized credentials, electronic device 900 autofills the fillable fields, as shown in FIG. 13X. In some examples, autofilling the fillable fields includes automatically logging in the user. In some examples, the user must manually log-in by activating a displayed affordance for signing in the user (e.g., the device detects a request to log-in the user after the fillable fields are autofilled). In some examples, upon a determination that the captured information about the user's face does not correspond to stored authorized credentials, electronic device 900 forgoes autofilling the fillable fields.

FIGS. 14A-14B are flow diagrams illustrating a method for prompting a user to correct an error condition that is detected while attempting to biometrically authenticate the user, in accordance with some examples. Method 1400 is performed at an electronic device (e.g., 900) with a display (e.g., 902) and one or more biometric sensors (e.g., 903) (e.g., a first biometric sensor of a device with a plurality of biometric sensors) (e.g., a fingerprint sensor, a contactless biometric sensor (e.g., a biometric sensor that does not require physical contact, such as a thermal or optical facial recognition sensor), an iris scanner). In some examples, the one or more biometric sensors include one or more cameras. Some operations in method 1400 are, optionally, combined, the orders of some operations are, optionally, changed, and some operations are, optionally, omitted.

As described below, method 1400 provides an intuitive way for prompting a user to correct an error condition that is detected while attempting to biometrically authenticate the user. The method reduces the cognitive burden on a user performing biometric authentication, thereby creating a more efficient human-machine interface. For battery-operated computing devices, enabling a user to perform biometric authentication faster and more efficiently conserves power and increases the time between battery charges.

The electronic device (e.g., 900) with a biometric sensor (e.g., 903) and a touch-sensitive display (e.g., 902) detects (1402) occurrence of an error condition (e.g., biometric sensor is partially occluded or covered, fully occluded, occluded to a degree sufficient to inhibit operation of the sensor, biometric sensor is occluded by a portion of the user (e.g., a hand) while interacting with the electronic device, the biometric sensor is not directed to a portion of a biometric feature (e.g., face) that can be used for biometric authentication, the biometric feature is turned away from the biometric sensor, the biometric feature is not oriented such that it is substantially facing the biometric sensor) for detecting biometric information (e.g., information about, or corresponding to, a biometric feature) at the biometric sensor. In some examples, the user can correct the error condition by moving the user's hand away from the biometric sensor. In some examples, the user can correct the error condition by turning the user's face toward the biometric sensor and/or tilting/rotating the device (e.g., 900) so that the biometric sensor is in a position and/or orientation in which the biometric feature is substantially facing the biometric sensor. In some examples, the device detects occurrence of an error condition while the device is in a locked state. In some examples, detecting occurrence of an error condition is, or includes, determining that a set of one or more error condition criteria has been met. In some examples, detecting occurrence of an error condition is, or includes, determining that an error condition has occurred.

In some examples, the occurrence of the error condition (e.g., error condition criteria) includes a requirement (1404) that the biometric sensor (e.g., 903) is covered in order for the error condition to occur. In some examples, the occurrence of the error condition (e.g., error condition criteria) includes a requirement that the display (e.g., 902) is on for the error condition to occur. In some examples, the occurrence of the error condition (e.g., error condition criteria) includes a requirement that an input (e.g., 1312A-B, 1336, 1342) corresponding to a request to attempt biometric authentication (e.g., a request to perform an operation that requires authentication) has been met in order for the error condition to occur (e.g., an upward swipe, tilting device upward, waking device by pressing a button (e.g., 904) or tapping on the screen (e.g., display 902), tapping on screen when the display is on, activating an affordance, etc.).

In some examples, the occurrence of the error condition (e.g., error condition criteria) includes a requirement that a maximum number (e.g., a predetermined number) of failed authentication attempts has not yet been reached in order for the error condition to occur (e.g., the device allows only a respective number of failed authentication attempts before non-biometric authentication (e.g., password, passcode, or pattern) is required to unlock the device). In some examples, the occurrence of the error condition (e.g., error condition criteria) includes a requirement (1406) that the electronic device (e.g., 900) is oriented so that the biometric sensor (e.g., 903) is not directed to a portion of the biometric feature that can be used for biometric authentication in order for the error condition to occur. In some examples, in this orientation, the biometric sensor is located at (or adjacent or near) the bottom edge of the device. Requiring that a maximum number of failed authentication attempts has not yet been reached in order to detect the error condition reduces the instances of multiple resource-intensive re-attempts of biometric authentication that is likely to fail due to the error condition. This, in turn, reduces power usage and improves battery life of the device by limiting the performance of operations that are likely to fail.

In some examples, the occurrence of the error condition is detected when the error condition is of a first type (e.g., biometric sensor is partially occluded (or covered), fully occluded, occluded to a degree sufficient to inhibit operation of the sensor, biometric sensor is occluded by a portion of the user (e.g., a hand), while interacting with the electronic device, the biometric sensor is not directed to a portion of a biometric feature (e.g., face) that can be used for biometric authentication, the biometric feature is turned away from the biometric sensor, the biometric feature is not oriented such that it is substantially facing the biometric sensor). In some examples, the user can correct the error condition by moving the user's hand away from the biometric sensor. In some examples, the user can correct the error condition by turning the user's face toward the biometric sensor and/or tilting/rotating the device so that the biometric sensor is in a position (or orientation) in which the biometric feature is substantially facing the biometric sensor. In some examples, in response to detecting occurrence of a second type of error condition (e.g., error conditions different from the first type), the electronic device displays an indication (e.g., 1332) of the occurrence of the second type of error condition (e.g., information about the cause of the error condition (e.g., device too far away, device too close)) without displaying an indication (e.g., 1304A-E), of the location of the biometric sensor.

In response to (e.g., subsequent to) detecting the occurrence of the error condition, the electronic device (e.g., 900) displays (1408), on the touch-sensitive display (e.g., 902), an indication (e.g., 1304A-E) of a location of the biometric sensor (e.g., 903) on the electronic device (e.g., a textual indication (e.g., 1304A, 1304D) (e.g., text stating "look down"), a graphical, visual, or pictorial indication (e.g., 1304B-C, 1304E) (e.g., a visual object (e.g., arrow or other shape) that is static or animated (e.g., moves back and forth between two positions of the user interface, a bouncing object))). In some examples, in response to (e.g., subsequent to) detecting the occurrence of the error condition, the electronic device forgoes determining whether captured biometric information about a biometric feature corresponds to (or matches) stored authorized credentials (e.g., a biometric template).

In some examples, the indication of the location of the biometric sensor includes an indication (e.g., 1304A-1304E)

of a user action that can be performed to correct the error condition (e.g., for a subsequent authentication attempt). In some examples, the indication of the user action indicates how to correct the error condition for a subsequent authentication attempt. Displaying an indication of a user action that can be performed to correct the error condition provides feedback to the user as to what course of action to take so that the user can be biometrically authenticated in a subsequent authentication attempt. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the indication (e.g., 1304A-E) is located near (e.g., adjacent to) the biometric sensor. In some examples, the indication includes an instruction (1410) (e.g., 1304A) to change a pose (e.g., orientation) of the biometric feature toward the biometric sensor (e.g., textual indication (e.g., "look down")). In some examples, the indication includes a text description (1412) (e.g., 1304D) of where the biometric sensor is located (e.g., face sensor to right, face sensor to left, face sensor down)). In some examples, the indication includes a graphical indication (e.g., 1304B-C, 1304E) located near (e.g., adjacent to) the biometric sensor. In some examples, the indication includes a pictorial illustration (e.g., 1304B, 1304E) of a location of the biometric sensor (e.g., an object (e.g., arrow or other shape) pointing toward the sensor). In some examples, the indication (e.g., 1304A-E) includes an animation that illustrates a location of the biometric sensor (e.g., an object bouncing or sliding toward the sensor, an animation pulsing or glowing near the sensor). Displaying the indication near the biometric sensor provides feedback to the user of the location of the device that is the source of the error condition. By displaying the indication near the biometric sensor, the user is prompted to remove their hand from the biometric sensor to correct the error condition. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication. Displaying a pictorial illustration of the location of the biometric sensor provides feedback to the user of the location of the device that is the source of the error condition. By displaying a pictorial illustration of the location of the biometric sensor, the user is prompted to remove their hand from the biometric sensor to correct the error condition. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

While displaying the indication (e.g., 1304A-E) of the location of the biometric sensor (e.g., 903) on the electronic device (e.g., 900), the electronic device detects (1414) a request to unlock the electronic device using the biometric sensor (e.g., the request corresponds to a touch gesture input (e.g., 1312A-B) (e.g., swipe gesture (e.g., a contact that exceeds a threshold distance in a horizontal or vertical direction)), the request corresponds to a contact starting from an edge (e.g., bottom edge) of the display (e.g., 902) or starting from within a predefined region (e.g., lower portion) of the display). In some examples, the request corresponds to a touch gesture input (e.g., 1312A-B) starting at a first region of the display (e.g., a region along a bottom edge of the display) and ends (or progresses through) a second region of the display (e.g., a region above the region along the bottom edge of the display).

In response to (e.g., subsequent to) detecting the request to unlock the electronic device (e.g., 900) using the biometric sensor (e.g., 903): in accordance with a determination that the error condition is still occurring at a respective time that occurs after detecting the request to unlock the electronic device (e.g., a time immediately after detecting the request to unlock the electronic device or a respective time that occurs after a delay time period such as 1, 3, or 5 seconds has elapsed): the electronic device ceases (1416) to display the indication (e.g., 1304A-E) of the location of the biometric sensor; and displays (1416) a touch-based user interface (e.g., 1320A-B) for entering touch-based authentication information (e.g., a password, passcode, swipe pattern). In some examples, while displaying the touch-based user-interface, the electronic device determines that the error condition is no longer occurring. In some examples, in accordance with a determination that the error condition is no longer occurring, the electronic device attempts to unlock the electronic device using the biometric sensor. In some examples, a determination that a set of one or more error condition criteria is still being met is (or includes) a determination that the error condition is still occurring.

Ceasing to display the indication (e.g., text stating "look down") of the location of the biometric sensor after detecting a request to unlock the device improves feedback to the user by removing potential confusion resulting from displaying both the indication of the location of the biometric sensor and the passcode entry user interface. For example, if the electronic device were to continue displaying the indication of the location of the biometric sensor while also displaying, for example, a passcode entry user interface, the user is likely to become confused as to what action to take in order to perform biometric authentication (e.g., look down or enter passcode). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Automatically displaying a touch-based user interface in accordance with a determination that the error condition is still occurring provides a user the ability to attempt non-biometric authentication when the conditions are appropriate without requiring the user to explicitly request performing non-biometric authentication. Performing an operation when a set of conditions has been met without requiring further user input enhances the operability of the device (e.g., directs the user to the action needed to authenticate) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, while displaying the touch-based user interface (e.g., 1320A-B) for entering touch-based authentication information, the electronic device detects a touch input sequence (e.g., a sequence of one or more inputs (e.g., 1326, 1330) corresponding to one or more characters, a sequence of one or more characters) on the touch-sensitive display (e.g., for inputting a password, passcode, or swipe pattern). In some examples, in response to detecting the touch input sequence: in accordance with a determination that the touch input sequence matches authorized credentials (e.g., stored authorized credentials, password, passcode, swipe pattern), the electronic device transitions the electronic device from a locked state to an unlocked state. In some examples, in response to detecting the touch input sequence: in accordance with a determination that the touch input sequence does not match authorized credentials, the electronic device maintains the electronic device in a locked state.

In some examples, the respective time is a time that occurs (1418) after a predetermined delay time period from when the request to unlock the electronic device using the biometric sensor was detected.

In response to (e.g., subsequent to) detecting the request to unlock the electronic device (e.g., 900) using the biometric sensor (e.g., 903): in accordance with a determination that the error condition is no longer occurring (e.g., the error condition has been corrected), the electronic device attempts (1420) to unlock the electronic device using the biometric sensor (e.g., comparing the information captured by the biometric sensor with stored authorized credentials (e.g., a biometric template associated with the user)). In some examples, if the captured information matches, within a threshold time period, the stored authorized credentials, the device transitions from a locked state to an unlocked state. In some examples, if the captured information does not match, within the threshold, the stored authorized credentials, the device maintains the locked state and/or displays the touch-based interface (e.g., 1320A-B) for entering touch-based authentication information. In some examples, attempting to unlock the electronic device via biometric authentication occurs without displaying the touch-based user interface for entering touch-based authentication information. In some examples, a determination that a set of one or more error condition criteria is no longer being met is (or includes) a determination that the error condition is no longer occurring. In some examples, the determination that the error condition is no longer occurring can be made at any time up to the respective time that occurs after detecting the request to unlock the electronic device. Automatically attempting to unlock the electronic device in accordance with a determination that the error condition is no longer occurring improves the chance of success of the attempt to unlock the device. For example, the device performs the attempt immediately after the device detects that the error condition has been corrected. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, attempting to unlock the electronic device (e.g., 900) includes: in accordance with a determination that biometric authentication is successful (e.g., information captured using the biometric sensor (e.g., 903) matches or corresponds to stored authorized credentials), unlocking the electronic device (e.g., transitioning the device from a locked state to an unlocked state). In some examples, attempting to unlock the electronic device includes: in accordance with a determination that biometric authentication is not successful (e.g., information captured using the biometric sensor (e.g., 903) does not match or correspond to stored authorized credentials), displaying, on the touch-sensitive display (e.g., 902), an alternative authentication user interface (e.g., 1320A-B) (e.g., the touch-based user interface for entering touch-based authentication information (e.g., a password, passcode, swipe pattern). In some examples, further in accordance with a determination that biometric authentication is not successful, the electronic device maintains a locked state. In some examples, attempting to unlock the electronic device includes attempting to biometrically authenticate the user using the biometric sensor.

In some examples, the determination that the error condition is no longer occurring is made (1422) subsequent to detecting the request to unlock the electronic device (e.g., 900) using the biometric sensor (e.g., 903) (e.g., after detecting the request to unlock but before the predetermined amount of time lapses) and while displaying the indication (e.g., 1304A-E) of the location of the biometric sensor.

Note that details of the processes described above with respect to method 1400 (e.g., FIGS. 14A-14B) are also applicable in an analogous manner to the methods described above. For example, method 800, method 1000, and/or method 1200 optionally include one or more of the characteristics of the various methods described above with reference to method 1400. For example, displaying the indication of the location of the biometric sensor, as described in method 1400, can be performed in method 800, method 1000, and method 1200 in response to detecting an error condition. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

One aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
a biometric sensor;
a touch-sensitive display;
one or more processors; and
memory storing one or more programs configured to be executed by the one or more processors, the one or more programs including instructions for:
detecting occurrence of an error condition for detecting biometric information at the biometric sensor;
in response to detecting the occurrence of the error condition, displaying, on the touch-sensitive display, an indication of a location of the biometric sensor on the electronic device, wherein the indication is a graphical indicator that is displayed at a respective location on the touch-sensitive display that is a first distance from a first edge of the electronic device, wherein the first edge of the electronic device corresponds to the location of the biometric sensor on the electronic device, and wherein the respective location on the touch-sensitive display is a second distance from a second edge of the electronic device, wherein the second edge is opposite from the first edge, and wherein the second distance is greater than the first distance;
while displaying the indication of the location of the biometric sensor on the electronic device, detecting a request to unlock the electronic device using the biometric sensor; and
in response to detecting the request to unlock the electronic device using the biometric sensor:
in accordance with a determination that the error condition is still occurring at a respective time that occurs after detecting the request to unlock the electronic device:

ceasing to display the indication of the location of the biometric sensor; and displaying a touch-based user interface for entering touch-based authentication information; and in accordance with a determination that the error condition is no longer occurring, attempting to unlock the electronic device using the biometric sensor.

2. The electronic device of claim 1, the one or more programs including instructions for:

while displaying the touch-based user interface for entering touch-based authentication information, detecting a touch input sequence on the touch-sensitive display;

in response to detecting the touch input sequence:

in accordance with a determination that the touch input sequence matches authorized credentials, transitioning the electronic device from a locked state to an unlocked state; and in accordance with a determination that the touch input sequence does not match authorized credentials, maintaining the electronic device in a locked state.

3. The electronic device of claim 1, wherein the respective time is a time that occurs after a predetermined delay time period from when the request to unlock the electronic device using the biometric sensor was detected.

4. The electronic device of claim 1, wherein attempting to unlock the electronic device includes:

in accordance with a determination that biometric authentication is successful, unlocking the electronic device; and in accordance with a determination that biometric authentication is not successful, displaying, on the touch-sensitive display, an alternative authentication user interface.

5. The electronic device of claim 1, wherein the occurrence of the error condition includes a requirement that the biometric sensor is covered in order for the error condition to occur.

6. The electronic device of claim 1, wherein the occurrence of the error condition includes a requirement that the touch-sensitive display is on for the error condition to occur.

7. The electronic device of claim 1, wherein the occurrence of the error condition includes a requirement that an input corresponding to a request to attempt biometric authentication has been met in order for the error condition to occur.

8. The electronic device of claim 1, wherein the occurrence of the error condition includes a requirement that a maximum number of failed authentication attempts has not yet been reached in order for the error condition to occur.

9. The electronic device of claim 1, wherein the occurrence of the error condition includes a requirement that the electronic device is oriented so that the biometric sensor is not directed to a portion of a biometric feature that can be used for biometric authentication in order for the error condition to occur.

10. The electronic device of claim 1, wherein the indication includes an instruction to change a pose of a biometric feature toward the biometric sensor.

11. The electronic device of claim 1, wherein the indication includes a text description of where the biometric sensor is located.

12. The electronic device of claim 1, wherein the indication includes a pictorial illustration of a location of the biometric sensor.

13. The electronic device of claim 1, wherein the indication includes an animation that illustrates a location of the biometric sensor.

14. The electronic device of claim 1, wherein the occurrence of the error condition is detected when the error condition is of a first type, the one or more programs including instructions for:

in response to detecting occurrence of a second type of error condition, displaying an indication of the occurrence of the second type of error condition without displaying an indication of the location of the biometric sensor.

15. The electronic device of claim 1, wherein the determination that the error condition is no longer occurring is made subsequent to detecting the request to unlock the electronic device using the biometric sensor and while displaying the indication of the location of the biometric sensor.

16. A non-transitory computer-readable storage medium storing one or more programs configured to be executed by one or more processors of an electronic device with a biometric sensor and a touch-sensitive display, the one or more programs including instructions for:

detecting occurrence of an error condition for detecting biometric information at the biometric sensor;

in response to detecting the occurrence of the error condition, displaying, on the touch-sensitive display, an indication of a location of the biometric sensor on the electronic device, wherein the indication is a graphical indicator that is displayed at a respective location on the touch-sensitive display that is a first distance from a first edge of the electronic device, wherein the first edge of the electronic device corresponds to the location of the biometric sensor on the electronic device, and wherein the respective location on the touch-sensitive display is a second distance from a second edge of the electronic device, wherein the second edge is opposite from the first edge, and wherein the second distance is greater than the first distance;

while displaying the indication of the location of the biometric sensor on the electronic device, detecting a request to unlock the electronic device using the biometric sensor; and in response to detecting the request to unlock the electronic device using the biometric sensor:

in accordance with a determination that the error condition is still occurring at a respective time that occurs after detecting the request to unlock the electronic device:

ceasing to display the indication of the location of the biometric sensor; and displaying a touch-based user interface for entering touch-based authentication information; and in accordance with a determination that the error condition is no longer occurring, attempting to unlock the electronic device using the biometric sensor.

17. A method, comprising:

at an electronic device with a biometric sensor and a touch-sensitive display:

detecting occurrence of an error condition for detecting biometric information at the biometric sensor;

in response to detecting the occurrence of the error condition, displaying, on the touch-sensitive display, an indication of a location of the biometric sensor on the electronic device, wherein the indication is a graphical indicator that is displayed at a respective location on the touch-sensitive display that is a first distance from a first edge of the electronic device, wherein the first edge of the electronic device corresponds to the location of the biometric sensor on the electronic device, and wherein the respective location on the touch-sensitive display is a second distance from a second edge of the electronic device, wherein the second edge is opposite from the first edge, and wherein the second distance is greater than the first distance;

while displaying the indication of the location of the biometric sensor on the electronic device, detecting a request to unlock the electronic device using the biometric sensor; and in response to detecting the request to unlock the electronic device using the biometric sensor:

in accordance with a determination that the error condition is still occurring at a respective time that occurs after detecting the request to unlock the electronic device:

ceasing to display the indication of the location of the biometric sensor; and displaying a touch-based user interface for entering touch-based authentication information; and in accordance with a determination that the error condition is no longer occurring, attempting to unlock the electronic device using the biometric sensor.

18. The electronic device of claim 1, wherein the request to unlock the electronic device using the biometric sensor is detected via the touch-sensitive display.

19. The electronic device of claim 1, wherein using the biometric sensor includes obtaining data that corresponds to facial features.

20. The non-transitory computer-readable storage medium of claim 16, the one or more programs including instructions for:

while displaying the touch-based user interface for entering touch-based authentication information, detecting a touch input sequence on the touch-sensitive display;

in response to detecting the touch input sequence:

in accordance with a determination that the touch input sequence matches authorized credentials, transitioning the non-transitory computer-readable storage medium from a locked state to an unlocked state; and in accordance with a determination that the touch input sequence does not match authorized credentials, maintaining the non-transitory computer-readable storage medium in a locked state.

21. The non-transitory computer-readable storage medium of claim 16, wherein the respective time is a time that occurs after a predetermined delay time period from when the request to unlock the non-transitory computer-readable storage medium using the biometric sensor was detected.

22. The non-transitory computer-readable storage medium of claim 16, wherein attempting to unlock the non-transitory computer-readable storage medium includes:

in accordance with a determination that biometric authentication is successful, unlocking the non-transitory computer-readable storage medium; and in accordance with a determination that biometric authentication is not successful, displaying, on the touch-sensitive display, an alternative authentication user interface.

23. The non-transitory computer-readable storage medium of claim 16, wherein the occurrence of the error condition includes a requirement that the biometric sensor is covered in order for the error condition to occur.

24. The non-transitory computer-readable storage medium of claim 16, wherein the occurrence of the error condition includes a requirement that the touch-sensitive display is on for the error condition to occur.

25. The non-transitory computer-readable storage medium of claim 16, wherein the occurrence of the error condition includes a requirement that an input corresponding to a request to attempt biometric authentication has been met in order for the error condition to occur.

26. The non-transitory computer-readable storage medium of claim 16, wherein the occurrence of the error condition includes a requirement that a maximum number of failed authentication attempts has not yet been reached in order for the error condition to occur.

27. The non-transitory computer-readable storage medium of claim 16, wherein the occurrence of the error condition includes a requirement that the non-transitory computer-readable storage medium is oriented so that the biometric sensor is not directed to a portion of a biometric feature that can be used for biometric authentication in order for the error condition to occur.

28. The non-transitory computer-readable storage medium of claim 16, wherein the indication includes an instruction to change a pose of a biometric feature toward the biometric sensor.

29. The non-transitory computer-readable storage medium of claim 16, wherein the indication includes a text description of where the biometric sensor is located.

30. The non-transitory computer-readable storage medium of claim 16, wherein the indication includes a pictorial illustration of a location of the biometric sensor.

31. The non-transitory computer-readable storage medium of claim 16, wherein the indication includes an animation that illustrates a location of the biometric sensor.

32. The non-transitory computer-readable storage medium of claim 16, wherein the occurrence of the error condition is detected when the error condition is of a first type, the one or more programs including instructions for:

in response to detecting occurrence of a second type of error condition, displaying an indication of the occurrence of the second type of error condition without displaying an indication of the location of the biometric sensor.

33. The non-transitory computer-readable storage medium of claim 16, wherein the determination that the error condition is no longer occurring is made subsequent to detecting the request to unlock the non-transitory computer-readable storage medium using the biometric sensor and while displaying the indication of the location of the biometric sensor.

34. The non-transitory computer-readable storage medium of claim 16, wherein the request to unlock the electronic device using the biometric sensor is detected via the touch-sensitive display.

35. The non-transitory computer-readable storage medium of claim 16, wherein using the biometric sensor includes obtaining data that corresponds to facial features.

36. The method of claim 17, further comprising:

while displaying the touch-based user interface for entering touch-based authentication information, detecting a touch input sequence on the touch-sensitive display;

in response to detecting the touch input sequence:

in accordance with a determination that the touch input sequence matches authorized credentials, transitioning the method from a locked state to an unlocked state; and in accordance with a determination that the touch input sequence does not match authorized credentials, maintaining the method in a locked state.

37. The method of claim 17, wherein the respective time is a time that occurs after a predetermined delay time period from when the request to unlock the method using the biometric sensor was detected.

38. The method of claim 17, wherein attempting to unlock the method includes:

in accordance with a determination that biometric authentication is successful, unlocking the method; and in accordance with a determination that biometric authentication is not successful, displaying, on the touch-sensitive display, an alternative authentication user interface.

39. The method of claim 17, wherein the occurrence of the error condition includes a requirement that the biometric sensor is covered in order for the error condition to occur.

40. The method of claim 17, wherein the occurrence of the error condition includes a requirement that the touch-sensitive display is on for the error condition to occur.

41. The method of claim 17, wherein the occurrence of the error condition includes a requirement that an input corresponding to a request to attempt biometric authentication has been met in order for the error condition to occur.

42. The method of claim 17, wherein the occurrence of the error condition includes a requirement that a maximum number of failed authentication attempts has not yet been reached in order for the error condition to occur.

43. The method of claim 17, wherein the occurrence of the error condition includes a requirement that the method is oriented so that the biometric sensor is not directed to a portion of a biometric feature that can be used for biometric authentication in order for the error condition to occur.

44. The method of claim 17, wherein the indication includes an instruction to change a pose of a biometric feature toward the biometric sensor.

45. The method of claim 17, wherein the indication includes a text description of where the biometric sensor is located.

46. The method of claim 17, wherein the indication includes a pictorial illustration of a location of the biometric sensor.

47. The method of claim 17, wherein the indication includes an animation that illustrates a location of the biometric sensor.

48. The method of claim 17, wherein the occurrence of the error condition is detected when the error condition is of a first type, further comprising:

in response to detecting occurrence of a second type of error condition, displaying an indication of the occurrence of the second type of error condition without displaying an indication of the location of the biometric sensor.

49. The method of claim 17, wherein the determination that the error condition is no longer occurring is made subsequent to detecting the request to unlock the method using the biometric sensor and while displaying the indication of the location of the biometric sensor.

50. The method of claim 17, wherein the request to unlock the electronic device using the biometric sensor is detected via the touch-sensitive display.

51. The method of claim 17, wherein using the biometric sensor includes obtaining data that corresponds to facial features.

\* \* \* \* \*